(12) United States Patent
Butcher et al.

(10) Patent No.: US 9,645,732 B2
(45) Date of Patent: May 9, 2017

(54) DEVICES, METHODS, AND GRAPHICAL USER INTERFACES FOR DISPLAYING AND USING MENUS

(71) Applicant: Apple Inc., Cupertino, CA (US)

(72) Inventors: Gary I. Butcher, Los Gatos, CA (US); Christopher P. Foss, San Francisco, CA (US); Raymond S. Sepulveda, Campbell, CA (US); Alexander J. Perry, Oakland, CA (US); Patrick L. Coffman, San Francisco, CA (US); Aram David Kudurshian, San Francisco, CA (US); Cédric J. Bray, Sunnyvale, CA (US); Usama M. Hajj, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/866,981

(22) Filed: Sep. 27, 2015

(65) Prior Publication Data

US 2016/0259495 A1    Sep. 8, 2016

Related U.S. Application Data

(60) Provisional application No. 62/183,139, filed on Jun. 22, 2015, provisional application No. 62/129,954, filed on Mar. 8, 2015.

(51) Int. Cl.
G06F 3/0482    (2013.01)
G06F 3/0484    (2013.01)
(Continued)

(52) U.S. Cl.
CPC ............ G06F 3/0488 (2013.01); G06F 3/016 (2013.01); G06F 3/0482 (2013.01);
(Continued)

(58) Field of Classification Search
CPC ..... G06F 3/0488; G06F 3/0484; G06F 3/0482
(Continued)

(56) References Cited

U.S. PATENT DOCUMENTS 4,674,044 A    6/1987    Kalmus et al.
4,750,135 A    6/1988    Boilen
(Continued)

FOREIGN PATENT DOCUMENTS

CN    1658150    8/2005
CN    1661556    8/2005
(Continued)

OTHER PUBLICATIONS

Alzona, "Full Screen Maximization with RightZoom," http://www.brighhub.com/computing/mac-platform/articles/31024.aspx>, Mar. 31, 2009, 6 pages.
(Continued)

*Primary Examiner* — Andrea Leggett
(74) *Attorney, Agent, or Firm* — Morgan, Lewis & Bockius LLP

(57) ABSTRACT

An electronic device: displays, on a display, a user interface that includes one or more user interface elements; and detects a press input by a contact on a touch-sensitive surface at a location that corresponds to a respective user interface element. In response to detecting the press input, the device: if the respective user interface meets first action criteria including a criterion that the respective user interface element is associated with a single option associated with the press input, initiates performance of an action corresponding to the single option; and, if the respective user interface element meets second action criteria including a criterion that the respective user interface element is associated with a first number of options associated with the press input, where the first number is greater than one,
(Continued)

displays a first menu overlaid on the user interface with a first set of selectable options.

27 Claims, 113 Drawing Sheets

(51) Int. Cl.
    *G06F 3/0488*     (2013.01)
    *G06F 3/01*     (2006.01)

(52) U.S. Cl.
    CPC ...... *G06F 3/04842* (2013.01); *G06F 3/04845* (2013.01); *G06F 3/04847* (2013.01); *G06F 3/04883* (2013.01); *G06F 2203/04806* (2013.01); *G06F 2203/04808* (2013.01)

(58) Field of Classification Search
    USPC ........................................................ 715/834
    See application file for complete search history.

(56) References Cited

U.S. PATENT DOCUMENTS

| | | | |
|---|---|---|---|
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,374,787 A | 12/1994 | Miller et al. | |
| 5,455,965 A | 10/1995 | Shaughnessy et al. | |
| 5,463,722 A | 10/1995 | Venolia | |
| 5,510,813 A | 4/1996 | Makinwa et al. | |
| 5,555,354 A | 9/1996 | Strasnick et al. | |
| 5,559,301 A | 9/1996 | Bryan, Jr. et al. | |
| 5,590,265 A | 12/1996 | Nakazawa | |
| 5,627,914 A | 5/1997 | Pagallo | |
| 5,689,651 A | 11/1997 | Lozman | |
| 5,695,400 A | 12/1997 | Fennell, Jr. et al. | |
| 5,717,725 A | 2/1998 | Campana, Jr. | |
| 5,719,796 A | 2/1998 | Chen | |
| 5,727,165 A | 3/1998 | Ordish et al. | |
| 5,774,877 A | 6/1998 | Patterson, Jr. et al. | |
| 5,775,996 A | 7/1998 | Othmer et al. | |
| 5,793,301 A | 8/1998 | Patterson, Jr. et al. | |
| 5,793,360 A | 8/1998 | Fleck et al. | |
| 5,797,002 A | 8/1998 | Patterson, Jr. et al. | |
| 5,801,692 A | 9/1998 | Muzio et al. | |
| 5,805,144 A | 9/1998 | Scholder et al. | |
| 5,820,463 A | 10/1998 | O'Callaghan | |
| 5,825,352 A | 10/1998 | Bisset et al. | |
| 5,844,560 A | 12/1998 | Crutcher et al. | |
| 5,845,266 A | 12/1998 | Lupien et al. | |
| 5,872,922 A | 2/1999 | Hogan et al. | |
| 5,880,733 A | 3/1999 | Horvitz et al. | |
| 5,910,882 A | 6/1999 | Burrell | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,647 A | 8/1999 | Miller et al. | |
| 5,946,667 A | 8/1999 | Tull, Jr. et al. | |
| 5,953,708 A | 9/1999 | Midorikawa et al. | |
| 5,963,923 A | 10/1999 | Garber | |
| 6,002,397 A | 12/1999 | Jaaskelainen, Jr. | |
| 6,012,046 A | 1/2000 | Lupien et al. | |
| 6,014,643 A | 1/2000 | Minton | |
| 6,035,287 A | 3/2000 | Stallaert et al. | |
| 6,072,488 A | 6/2000 | Mcfarland | |
| 6,088,019 A | 7/2000 | Rosenberg | |
| 6,088,027 A | 7/2000 | Konar et al. | |
| 6,098,051 A | 8/2000 | Lupien et al. | |
| 6,115,043 A | 9/2000 | Levine et al. | |
| 6,131,087 A | 10/2000 | Luke et al. | |
| 6,134,535 A | 10/2000 | Belzberg | |
| 6,180,894 B1 | 1/2001 | Chao et al. | |
| 6,195,647 B1 | 2/2001 | Martyn et al. | |
| 6,208,329 B1 | 3/2001 | Ballare | |
| 6,208,340 B1 | 3/2001 | Amin et al. | |
| 6,219,034 B1 | 4/2001 | Elbing et al. | |
| 6,227,743 B1 | 5/2001 | Robb | |
| 6,229,542 B1 | 5/2001 | Miller | |
| 6,243,080 B1 | 6/2001 | Molne | |
| 6,247,000 B1 | 6/2001 | Hawkins et al. | |
| 6,252,594 B1 | 6/2001 | Xia et al. | |
| 6,266,684 B1 | 7/2001 | Kraus et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,323,846 B1 | 11/2001 | Westerman et al. | |
| 6,347,997 B1 | 2/2002 | Armstrong | |
| 6,377,940 B2 | 4/2002 | Tilfors et al. | |
| 6,396,523 B1 | 5/2002 | Segal et al. | |
| 6,396,962 B1 | 5/2002 | Haffey et al. | |
| 6,400,303 B2 | 6/2002 | Armstrong | |
| 6,405,180 B2 | 6/2002 | Tilfors et al. | |
| 6,408,282 B1 | 6/2002 | Buist | |
| 6,411,998 B1 | 6/2002 | Bryant et al. | |
| 6,429,846 B2 | 8/2002 | Rosenberg et al. | |
| 6,448,977 B1 | 9/2002 | Braun et al. | |
| 6,456,778 B2 | 9/2002 | Armstrong | |
| 6,459,424 B1 | 10/2002 | Resman | |
| 6,459,442 B1 | 10/2002 | Edwards et al. | |
| 6,469,691 B1 | 10/2002 | Armstrong | |
| 6,470,078 B1 | 10/2002 | Armstrong | |
| 6,489,975 B1 | 12/2002 | Patil et al. | |
| 6,504,527 B1 | 1/2003 | Armstrong | |
| 6,512,761 B1 | 1/2003 | Schuster et al. | |
| 6,532,000 B2 | 3/2003 | Armstrong | |
| 6,551,357 B1 | 4/2003 | Madduri | |
| 6,559,831 B1 | 5/2003 | Armstrong | |
| 6,563,487 B2 | 5/2003 | Martin et al. | |
| 6,567,102 B2 | 5/2003 | Kung | |
| 6,570,557 B1 | 5/2003 | Westerman et al. | |
| 6,583,798 B1 | 6/2003 | Hoek et al. | |
| 6,590,568 B1 | 7/2003 | Astala et al. | |
| 6,659,861 B1 | 12/2003 | Faris et al. | |
| 6,661,438 B1 | 12/2003 | Shiraishi et al. | |
| 6,670,952 B2 | 12/2003 | Jaeger et al. | |
| 6,677,932 B1 | 1/2004 | Westerman | |
| 6,735,307 B1 | 5/2004 | Volckers | |
| 6,772,132 B1 | 8/2004 | Kemp, II et al. | |
| 6,822,635 B2 | 11/2004 | Shahoian et al. | |
| 6,831,666 B1 | 12/2004 | Kreis | |
| 6,891,551 B2 | 5/2005 | Keely et al. | |
| 6,904,405 B2 | 6/2005 | Suominen | |
| 6,919,927 B1 | 7/2005 | Hyodo | |
| 6,954,899 B1 | 10/2005 | Anderson | |
| 7,036,088 B2 | 4/2006 | Tunney | |
| 7,058,146 B2 | 6/2006 | Paulraj et al. | |
| 7,114,091 B2 | 9/2006 | Vrancic | |
| 7,134,093 B2 | 11/2006 | Etgen et al. | |
| 7,138,983 B2 | 11/2006 | Wakai et al. | |
| 7,159,189 B2 | 1/2007 | Weingart et al. | |
| 7,259,752 B1 | 8/2007 | Simmons | |
| 7,346,855 B2 | 3/2008 | Hellyar et al. | |
| 7,380,218 B2 | 5/2008 | Rundell | |
| 7,411,575 B2 | 8/2008 | Hill et al. | |
| 7,441,204 B2 | 10/2008 | Thomson et al. | |
| 7,461,026 B2 | 12/2008 | Schluetter | |
| 7,479,949 B2 | 1/2009 | Jobs et al. | |
| 7,492,720 B2 | 2/2009 | Pruthi et al. | |
| 7,532,206 B2 | 5/2009 | Morrison et al. | |
| 7,533,352 B2 | 5/2009 | Chew et al. | |
| 7,577,167 B2 | 8/2009 | Kikuchi et al. | |
| 7,577,530 B2 | 8/2009 | Vignalou-Marche | |
| 7,581,186 B2 | 8/2009 | Dowdy et al. | |
| 7,614,008 B2 | 11/2009 | Ording | |
| 7,619,616 B2 | 11/2009 | Rimas Ribikauskas et al. | |
| 7,633,076 B2 | 12/2009 | Huppi et al. | |
| 7,653,883 B2 | 1/2010 | Hotelling et al. | |
| 7,656,413 B2 | 2/2010 | Khan et al. | |
| 7,657,849 B2 | 2/2010 | Chaudhri et al. | |

(56) References Cited

U.S. PATENT DOCUMENTS

| | | |
|---|---|---|
| 7,663,607 B2 | 2/2010 | Hotelling et al. |
| 7,673,255 B2 | 3/2010 | Schechter et al. |
| 7,680,513 B2 | 3/2010 | Haitani et al. |
| 7,683,889 B2 | 3/2010 | Rimas Ribikauskas et al. |
| 7,694,231 B2 | 4/2010 | Kocienda et al. |
| 7,694,236 B2 | 4/2010 | Gusmorino et al. |
| 7,739,604 B1 | 6/2010 | Lyons et al. |
| 7,743,348 B2 | 6/2010 | Robbins et al. |
| 7,752,115 B2 | 7/2010 | Schluetter |
| 7,757,185 B2 | 7/2010 | Paquette et al. |
| 7,760,187 B2 | 7/2010 | Kennedy |
| 7,787,026 B1 | 8/2010 | Flory et al. |
| 7,788,595 B2 | 8/2010 | Biwer et al. |
| 7,797,642 B1 | 9/2010 | Karam et al. |
| 7,801,796 B2 | 9/2010 | Friedman et al. |
| 7,812,826 B2 | 10/2010 | Ording et al. |
| 7,817,568 B2 | 10/2010 | Paik et al. |
| 7,844,914 B2 | 11/2010 | Andre et al. |
| 7,880,728 B2 | 2/2011 | de los Reyes et al. |
| 7,890,862 B2 | 2/2011 | Kompe et al. |
| 7,921,373 B2 | 4/2011 | Yamashita et al. |
| 7,952,566 B2 | 5/2011 | Poupyrev et al. |
| 7,956,847 B2 | 6/2011 | Christie |
| 7,957,762 B2 | 6/2011 | Herz et al. |
| 7,966,352 B2 | 6/2011 | Madan et al. |
| 7,973,778 B2 | 7/2011 | Chen |
| 8,001,189 B2 | 8/2011 | Nielsen et al. |
| 8,006,002 B2 | 8/2011 | Kalayjian et al. |
| 8,010,900 B2 | 8/2011 | Hart et al. |
| 8,020,028 B1 | 9/2011 | Lutter |
| 8,024,670 B1 | 9/2011 | Rahmation et al. |
| 8,040,142 B1 | 10/2011 | Bokma et al. |
| 8,046,712 B2 | 10/2011 | Landman et al. |
| 8,106,856 B2 | 1/2012 | Matas et al. |
| 8,209,628 B1 | 6/2012 | Davidson |
| 8,214,768 B2 | 7/2012 | Boule et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,390,583 B2 | 3/2013 | Forutanpour et al. |
| 8,438,504 B2 | 5/2013 | Cranfill et al. |
| 8,479,122 B2 | 7/2013 | Hotelling et al. |
| 8,508,494 B2 | 8/2013 | Moore |
| 8,542,205 B1 * | 9/2013 | Keller .................. G06F 3/0488 345/173 |
| 8,581,870 B2 | 11/2013 | Bokma et al. |
| 8,587,542 B2 | 11/2013 | Moore |
| 8,593,415 B2 | 11/2013 | Han et al. |
| 8,674,932 B2 | 3/2014 | Armstrong |
| 8,698,765 B1 | 4/2014 | Keller |
| 8,698,845 B2 | 4/2014 | Lemay |
| 8,717,305 B2 | 5/2014 | Williamson et al. |
| 8,743,069 B2 | 6/2014 | Morton et al. |
| 8,773,389 B1 | 7/2014 | Freed |
| 8,806,369 B2 | 8/2014 | Khoe et al. |
| 8,875,044 B2 | 10/2014 | Ozawa et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,058,186 B2 | 6/2015 | Chaudhri |
| 9,069,460 B2 | 6/2015 | Moore |
| 9,098,188 B2 | 8/2015 | Kim |
| 9,116,571 B2 | 8/2015 | Zeliff et al. |
| 9,122,364 B2 | 9/2015 | Kuwabara et al. |
| 9,148,618 B2 | 9/2015 | Matas et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,471,145 B2 | 10/2016 | Langlois et al. |
| 9,477,393 B2 | 10/2016 | Zambetti et al. |
| 2001/0045965 A1 | 11/2001 | Orbanes et al. |
| 2002/0008691 A1 | 1/2002 | Hanajima et al. |
| 2002/0015024 A1 | 2/2002 | Westerman et al. |
| 2002/0015064 A1 | 2/2002 | Robotham et al. |
| 2002/0023038 A1 | 2/2002 | Fritsch et al. |
| 2002/0026321 A1 | 2/2002 | Faris et al. |
| 2002/0027957 A1 | 3/2002 | Paulraj et al. |
| 2002/0035534 A1 | 3/2002 | Buist et al. |
| 2002/0055899 A1 | 5/2002 | Williams |
| 2002/0073016 A1 | 6/2002 | Furbush et al. |
| 2002/0075289 A1 | 6/2002 | Hatori et al. |
| 2002/0077117 A1 | 6/2002 | Cloutier et al. |
| 2002/0107748 A1 | 8/2002 | Boies et al. |
| 2002/0109678 A1 | 8/2002 | Marmolin et al. |
| 2002/0120837 A1 | 8/2002 | Maxemchuk et al. |
| 2002/0138401 A1 | 9/2002 | Allen et al. |
| 2002/0140680 A1 | 10/2002 | Lu |
| 2002/0149609 A1 | 10/2002 | Suzuki et al. |
| 2002/0149630 A1 | 10/2002 | Kitainik et al. |
| 2002/0161687 A1 | 10/2002 | Serkin et al. |
| 2002/0161693 A1 | 10/2002 | Greenwalk |
| 2002/0178102 A1 | 11/2002 | Scheinberg et al. |
| 2002/0180763 A1 | 12/2002 | Kung |
| 2003/0074413 A1 | 4/2003 | Nielsen et al. |
| 2003/0086496 A1 | 5/2003 | Zhang et al. |
| 2003/0117440 A1 | 6/2003 | Hellyar et al. |
| 2003/0119562 A1 | 6/2003 | Kokubo |
| 2003/0151589 A1 | 8/2003 | Bensen et al. |
| 2003/0177154 A1 | 9/2003 | Vrancic |
| 2003/0184574 A1 | 10/2003 | Phillips et al. |
| 2003/0189647 A1 | 10/2003 | Kang |
| 2003/0222915 A1 | 12/2003 | Marion et al. |
| 2004/0021643 A1 | 2/2004 | Hoshino et al. |
| 2004/0025112 A1 | 2/2004 | Chasen et al. |
| 2004/0056849 A1 | 3/2004 | Lohbihler et al. |
| 2004/0085328 A1 | 5/2004 | Maruyama et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0155908 A1 | 8/2004 | Wagner |
| 2004/0174398 A1 | 9/2004 | Luke et al. |
| 2004/0174399 A1 | 9/2004 | Wu et al. |
| 2004/0219969 A1 | 11/2004 | Casey et al. |
| 2005/0022138 A1 | 1/2005 | Tunney |
| 2005/0073961 A1 | 4/2005 | Paik et al. |
| 2005/0110769 A1 | 5/2005 | DaCosta et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0177798 A1 | 8/2005 | Thomson et al. |
| 2005/0183017 A1 | 8/2005 | Cain |
| 2005/0183035 A1 | 8/2005 | Ringel et al. |
| 2005/0184973 A1 | 8/2005 | Lum et al. |
| 2005/0190059 A1 | 9/2005 | Wehrenberg |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0017692 A1 | 1/2006 | Wehrenberg et al. |
| 2006/0022955 A1 | 2/2006 | Kennedy |
| 2006/0022956 A1 | 2/2006 | Lengeling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0036971 A1 | 2/2006 | Mendel et al. |
| 2006/0041846 A1 | 2/2006 | Masselle et al. |
| 2006/0055662 A1 | 3/2006 | Rimas-Ribikauskas et al. |
| 2006/0067677 A1 | 3/2006 | Tokiwa et al. |
| 2006/0101347 A1 | 5/2006 | Runov et al. |
| 2006/0107226 A1 | 5/2006 | Matthews et al. |

(56) References Cited

U.S. PATENT DOCUMENTS

| | | |
|---|---|---|
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161868 A1 | 7/2006 | Van Dok et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224986 A1 | 10/2006 | Lindsay et al. |
| 2006/0233248 A1 | 10/2006 | Rynderman et al. |
| 2006/0242602 A1 | 10/2006 | Schechter et al. |
| 2006/0265653 A1 | 11/2006 | Paasonen et al. |
| 2006/0274042 A1 | 12/2006 | Krah et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0004451 A1 | 1/2007 | Anderson |
| 2007/0004461 A1 | 1/2007 | Bathina et al. |
| 2007/0024595 A1 | 2/2007 | Baker et al. |
| 2007/0024646 A1 | 2/2007 | Saarinen et al. |
| 2007/0070066 A1 | 3/2007 | Bakhash |
| 2007/0080953 A1 | 4/2007 | Lii |
| 2007/0115264 A1 | 5/2007 | Yu et al. |
| 2007/0124699 A1 | 5/2007 | Michaels |
| 2007/0128899 A1 | 6/2007 | Mayer |
| 2007/0152980 A1 | 7/2007 | Kocienda et al. |
| 2007/0157089 A1 | 7/2007 | Van Os et al. |
| 2007/0168890 A1 | 7/2007 | Zhao et al. |
| 2007/0176904 A1 | 8/2007 | Russo |
| 2007/0186178 A1 | 8/2007 | Schiller |
| 2007/0220445 A1 | 9/2007 | Yach et al. |
| 2007/0222768 A1 | 9/2007 | Geurts et al. |
| 2007/0226327 A1 | 9/2007 | Redpath |
| 2007/0229455 A1 | 10/2007 | Martin et al. |
| 2007/0226450 A1 | 10/2007 | Colgate et al. |
| 2007/0236477 A1 | 10/2007 | Ryu et al. |
| 2007/0245241 A1 | 10/2007 | Bertram et al. |
| 2007/0245249 A1 | 10/2007 | Weisberg |
| 2007/0257821 A1 | 11/2007 | Son et al. |
| 2007/0262964 A1 | 11/2007 | Zotov et al. |
| 2007/0270182 A1 | 11/2007 | Gulliksson et al. |
| 2007/0294295 A1 | 12/2007 | Finkelstein et al. |
| 2007/0294639 A1 | 12/2007 | Van Berkel et al. |
| 2007/0296333 A1 | 12/2007 | Kim et al. |
| 2008/0024459 A1 | 1/2008 | Poupyrev et al. |
| 2008/0034306 A1 | 2/2008 | Ording |
| 2008/0036743 A1 | 2/2008 | Westerman et al. |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094368 A1 | 4/2008 | Ording et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0165144 A1 | 7/2008 | Forstall et al. |
| 2008/0165152 A1 | 7/2008 | Forstall et al. |
| 2008/0168379 A1 | 7/2008 | Forstall et al. |
| 2008/0168395 A1 | 7/2008 | Ording et al. |
| 2008/0168401 A1 | 7/2008 | Boule et al. |
| 2008/0168403 A1 | 7/2008 | Westerman et al. |
| 2008/0202824 A1 | 8/2008 | Philipp et al. |
| 2008/0204424 A1 | 8/2008 | Jin et al. |
| 2008/0204427 A1 | 8/2008 | Heesemans et al. |
| 2008/0211959 A1 | 9/2008 | Balram et al. |
| 2008/0219493 A1 | 9/2008 | Tadmor |
| 2008/0222545 A1 | 9/2008 | Lemay et al. |
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0270910 A1 | 10/2008 | Lukasik et al. |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307335 A1 | 12/2008 | Chaudhri et al. |
| 2008/0307351 A1 | 12/2008 | Louch et al. |
| 2008/0307359 A1 | 12/2008 | Louch et al. |
| 2008/0307360 A1 | 12/2008 | Chaudhri et al. |
| 2008/0316183 A1 | 12/2008 | Westerman et al. |
| 2008/0317378 A1 | 12/2008 | Steinberg et al. |
| 2008/0320391 A1 | 12/2008 | Lemay et al. |
| 2008/0320419 A1 | 12/2008 | Matas et al. |
| 2009/0002392 A1 | 1/2009 | Hou et al. |
| 2009/0007017 A1 | 1/2009 | Anzures et al. |
| 2009/0036108 A1 | 2/2009 | Chou |
| 2009/0046110 A1 | 2/2009 | Sadler et al. |
| 2009/0051667 A1 | 2/2009 | Park et al. |
| 2009/0058828 A1 | 3/2009 | Jiang et al. |
| 2009/0066668 A1 | 3/2009 | Kim et al. |
| 2009/0073118 A1 | 3/2009 | Yamaji et al. |
| 2009/0083665 A1* | 3/2009 | Anttila .................. G06F 3/0482 715/834 |
| 2009/0085878 A1 | 4/2009 | Heubel et al. |
| 2009/0094562 A1 | 4/2009 | Jeong et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0167507 A1 | 7/2009 | Maenpaa |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0167728 A1 | 7/2009 | Geaghan et al. |
| 2009/0197635 A1 | 8/2009 | Kim et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0267906 A1 | 10/2009 | Schroderus |
| 2009/0282360 A1 | 11/2009 | Park et al. |
| 2009/0293007 A1 | 11/2009 | Duarte et al. |
| 2009/0293009 A1 | 11/2009 | Meserth et al. |
| 2009/0303187 A1 | 12/2009 | Pallakoff |
| 2009/0322893 A1 | 12/2009 | Stallings et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0023858 A1 | 1/2010 | Ryu et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088628 A1 | 4/2010 | Flygh et al. |
| 2010/0090988 A1 | 4/2010 | Park |
| 2010/0125816 A1 | 5/2010 | Bezos |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0149096 A1 | 6/2010 | Migos et al. |
| 2010/0156812 A1 | 6/2010 | Stallings et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0194693 A1 | 8/2010 | Selin et al. |
| 2010/0211872 A1 | 8/2010 | Rolston et al. |
| 2010/0214257 A1 | 8/2010 | Wussler et al. |

(56) References Cited

U.S. PATENT DOCUMENTS

| | | |
|---|---|---|
| 2010/0225604 A1 | 9/2010 | Homma et al. |
| 2010/0228644 A1 | 9/2010 | Schluetter |
| 2010/0231534 A1 | 9/2010 | Chaudhri et al. |
| 2010/0235735 A1 | 9/2010 | Ording et al. |
| 2010/0235746 A1 | 9/2010 | Anzures |
| 2010/0251168 A1 | 9/2010 | Fujita et al. |
| 2010/0269039 A1 | 10/2010 | Pahlavan et al. |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0299597 A1 | 11/2010 | Shin et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0325578 A1 | 12/2010 | Mital et al. |
| 2011/0018695 A1 | 1/2011 | Bells et al. |
| 2011/0035662 A1 | 2/2011 | King et al. |
| 2011/0043652 A1 | 2/2011 | King et al. |
| 2011/0050588 A1 | 3/2011 | Li et al. |
| 2011/0050591 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0057886 A1 | 3/2011 | Ng et al. |
| 2011/0063248 A1 | 3/2011 | Yoon |
| 2011/0069012 A1 | 3/2011 | Martensson |
| 2011/0069016 A1 | 3/2011 | Victor |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0096174 A1 | 4/2011 | King et al. |
| 2011/0107272 A1 | 5/2011 | Aquilar |
| 2011/0115721 A1 | 5/2011 | Li et al. |
| 2011/0116716 A1 | 5/2011 | Kwon et al. |
| 2011/0122087 A1 | 5/2011 | Jang et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145068 A1 | 6/2011 | King et al. |
| 2011/0145752 A1 | 6/2011 | Fagans |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0167058 A1 | 7/2011 | Van Os |
| 2011/0167339 A1 | 7/2011 | Lemay |
| 2011/0167382 A1 | 7/2011 | Van Os |
| 2011/0169765 A1 | 7/2011 | Aono |
| 2011/0179368 A1 | 7/2011 | King et al. |
| 2011/0179381 A1 | 7/2011 | King |
| 2011/0181538 A1 | 7/2011 | Aono |
| 2011/0185316 A1 | 7/2011 | Reid et al. |
| 2011/0193809 A1 | 8/2011 | Walley et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202872 A1 | 8/2011 | Park |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0252376 A1 | 10/2011 | Chaudhri |
| 2011/0258537 A1 | 10/2011 | Rives et al. |
| 2011/0258582 A1 | 10/2011 | Bang |
| 2011/0263298 A1 | 10/2011 | Park |
| 2011/0267530 A1 | 11/2011 | Chun |
| 2011/0279380 A1 | 11/2011 | Weber et al. |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291951 A1 | 12/2011 | Tong |
| 2011/0296333 A1 | 12/2011 | Bateman et al. |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0307778 A1 | 12/2011 | Tsai et al. |
| 2012/0013541 A1 | 1/2012 | Boka et al. |
| 2012/0013542 A1 | 1/2012 | Shenfield |
| 2012/0026110 A1 | 2/2012 | Yamano |
| 2012/0038580 A1 | 2/2012 | Sasaki |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0089932 A1 | 4/2012 | Kano et al. |
| 2012/0092355 A1 | 4/2012 | Yamamoto et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0154329 A1 | 6/2012 | Shinozaki |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216139 A1 | 8/2012 | Ording et al. |
| 2012/0216143 A1 | 8/2012 | Shiplacoff et al. |
| 2012/0218203 A1 | 8/2012 | Kanki |
| 2012/0218304 A1 | 8/2012 | Anzures et al. |
| 2012/0235912 A1 | 9/2012 | Laubach |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0299859 A1 | 11/2012 | Kinoshita |
| 2012/0304132 A1 | 11/2012 | Sareen et al. |
| 2012/0304133 A1 | 11/2012 | Nan et al. |
| 2012/0306764 A1 | 12/2012 | Kamibeppu |
| 2012/0306765 A1 | 12/2012 | Moore |

(56) References Cited

U.S. PATENT DOCUMENTS

| | | |
|---|---|---|
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0311429 A1 | 12/2012 | Decker et al. |
| 2012/0311437 A1 | 12/2012 | Weeldreyer et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0080923 A1 | 3/2013 | Anzures et al. |
| 2013/0082824 A1 | 4/2013 | Colley |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097562 A1 | 4/2013 | Kermoian et al. |
| 2013/0106766 A1 | 5/2013 | Yilmaz et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0159893 A1 | 6/2013 | Lewis et al. |
| 2013/0162667 A1 | 6/2013 | Eskolin et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0198690 A1 | 8/2013 | Barsoum et al. |
| 2013/0212541 A1 | 8/2013 | Dolenc et al. |
| 2013/0222671 A1 | 8/2013 | Tseng et al. |
| 2013/0227450 A1 | 8/2013 | Na et al. |
| 2013/0232402 A1 | 9/2013 | Lu et al. |
| 2013/0232445 A1 | 9/2013 | Ording et al. |
| 2013/0234929 A1 | 9/2013 | Libin |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0063316 A1 | 3/2014 | Lee et al. |
| 2014/0078343 A1 | 3/2014 | Dai et al. |
| 2014/0092025 A1 | 4/2014 | Pala et al. |
| 2014/0111456 A1 | 4/2014 | Kashiwa et al. |
| 2014/0111670 A1 | 4/2014 | Lord et al. |
| 2014/0152581 A1 | 6/2014 | Case et al. |
| 2014/0160063 A1 | 6/2014 | Yairi et al. |
| 2014/0160073 A1 | 6/2014 | Matsuki |
| 2014/0165006 A1 | 6/2014 | Chaudhri et al. |
| 2014/0184526 A1 | 7/2014 | Cho |
| 2014/0210758 A1 | 7/2014 | Park et al. |
| 2014/0210798 A1 | 7/2014 | Wilson |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0313130 A1 | 10/2014 | Yamano et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobyakov et al. |
| 2015/0026592 A1 | 1/2015 | Mohammed et al. |
| 2015/0033184 A1 | 1/2015 | Kim et al. |
| 2015/0046876 A1 | 2/2015 | Goldenberg |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0121225 A1 | 4/2015 | Somasundaram et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1 | 7/2015 | Koide et al. |
| 2015/0234446 A1 | 8/2015 | Nathan et al. |
| 2015/0253866 A1 | 9/2015 | Amm et al. |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0132139 A1 | 5/2016 | Du et al. |
| 2016/0210025 A1 | 7/2016 | Bernstein et al. |
| 2016/0259412 A1 | 9/2016 | Flint et al. |
| 2016/0259413 A1 | 9/2016 | Anzures et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |

(56) References Cited

U.S. PATENT DOCUMENTS

| | | |
|---|---|---|
| 2016/0259528 A1 | 9/2016 | Foss et al. |
| 2016/0259536 A1 | 9/2016 | Kudurshian et al. |
| 2016/0274686 A1 | 9/2016 | Alonso Ruiz et al. |
| 2016/0274728 A1 | 9/2016 | Luo et al. |
| 2016/0274761 A1 | 9/2016 | Alonso Ruiz et al. |
| 2016/0320906 A1 | 11/2016 | Bokma et al. |
| 2016/0357305 A1 | 12/2016 | Wells et al. |
| 2016/0357368 A1 | 12/2016 | Federighi et al. |
| 2016/0357387 A1 | 12/2016 | Penha et al. |
| 2016/0357389 A1 | 12/2016 | Dakin et al. |
| 2016/0357390 A1 | 12/2016 | Federighi et al. |
| 2016/0357400 A1 | 12/2016 | Penha et al. |
| 2016/0357404 A1 | 12/2016 | Alonso Ruiz et al. |
| 2016/0360097 A1 | 12/2016 | Penha et al. |
| 2016/0360098 A1 | 12/2016 | King et al. |
| 2016/0360116 A1 | 12/2016 | Penha et al. |

FOREIGN PATENT DOCUMENTS

| | | |
|---|---|---|
| CN | 1808362 A | 7/2006 |
| CN | 1955906 | 5/2007 |
| CN | 101102573 | 1/2008 |
| CN | 201107762 | 8/2008 |
| CN | 101727268 | 6/2010 |
| CN | 102037435 | 4/2011 |
| CN | 102099776 | 6/2011 |
| CN | 102385478 A | 3/2012 |
| CN | 102662573 A | 9/2012 |
| CN | 103097992 A | 5/2013 |
| DE | 100 59 906 A1 | 6/2002 |
| DE | 21 2009 000 073 | 2/2011 |
| DE | 20 2009 018 283 | 8/2011 |
| DE | 11 2009 001 276 | 1/2012 |
| DE | 11 2009 001 281 | 1/2012 |
| EP | 0 388 162 A2 | 3/1990 |
| EP | 0859307 A1 | 8/1998 |
| EP | 0 880 090 A2 | 11/1998 |
| EP | 1 028 583 A1 | 8/2000 |
| EP | 1 067 471 A1 | 1/2001 |
| EP | 1 406 150 A1 | 4/2004 |
| EP | 1 571 549 A2 | 2/2005 |
| EP | 1 562 105 A2 | 8/2005 |
| EP | 1 568 966 A2 | 8/2005 |
| EP | 1 640 855 A2 | 3/2006 |
| EP | 1 674 977 A2 | 6/2006 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 286 324 | 2/2011 |
| EP | 2 286 325 | 2/2011 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 568 359 A2 | 3/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 350 991 | 12/2000 |
| GB | 2 366 630 A | 3/2002 |
| GB | 2 402 105 A | 12/2004 |
| GB | 2 492 709 A | 11/2009 |
| GB | 2 473 389 A | 3/2011 |
| GB | 2 474 153 A | 4/2011 |
| JP | H07-151512 A | 6/1995 |
| JP | H09-330175 A | 12/1997 |
| JP | H11-203044 A | 7/1999 |
| JP | 2000-148348 A | 5/2000 |
| JP | 2001-202192 A | 7/2001 |
| JP | 2002-041023 A | 2/2002 |
| JP | 2002-149312 A | 5/2002 |
| JP | 2002-268867 A | 9/2002 |
| JP | 2002-286489 | 10/2002 |
| JP | 2003-084744 A | 3/2003 |
| JP | 2003-157131 A | 5/2003 |
| JP | 2003-186597 A | 7/2003 |
| JP | 2004-054861 A | 2/2004 |
| JP | 2004-070492 A | 3/2004 |
| JP | 2004-086733 A | 3/2004 |
| JP | 2004-152169 A | 5/2004 |
| JP | 2005-070777 A | 3/2005 |
| JP | 2005-092386 A | 4/2005 |
| JP | 2005-135106 A | 5/2005 |
| JP | 2005-157842 A | 6/2005 |
| JP | 2005-222553 A | 8/2005 |
| JP | 2005-309933 A | 11/2005 |
| JP | 2006-185443 A | 7/2006 |
| JP | 2007-116384 A | 5/2007 |
| JP | 2007-517462 A | 6/2007 |
| JP | 2007-264808 A | 10/2007 |
| JP | 2008-009759 A | 1/2008 |
| JP | 2008-015890 A | 1/2008 |
| JP | 2008-017373 A | 1/2008 |
| JP | 2008-033739 A | 2/2008 |
| JP | 2008-076818 A | 4/2008 |
| JP | 2008-076853 A | 4/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2009-217815 A | 9/2009 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-070342 A | 4/2011 |
| JP | 2011-100290 A | 5/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-242386 A | 12/2011 |
| JP | 2011-253556 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053926 A | 3/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| KR | 2006-0071353 A | 6/2006 |
| KR | 2008-0054346 A | 6/2008 |
| KR | 2008-0078108 A | 8/2008 |
| KR | 2010-0010302 | 2/2010 |
| KR | 2010-0023637 | 3/2010 |

(56) References Cited

FOREIGN PATENT DOCUMENTS

| | | |
|---|---|---|
| KR | 2010-0034608 | 4/2010 |
| KR | 2010 0046087 | 6/2010 |
| KR | 2010 0133246 A | 12/2010 |
| KR | 2011 0086501 A | 7/2011 |
| KR | 2013 0099647 A | 9/2013 |
| KR | 20150021977 A | 3/2015 |
| WO | WO 90/10910 A1 | 9/1990 |
| WO | WO 90/11571 A1 | 10/1990 |
| WO | WO 91/14231 A1 | 9/1991 |
| WO | WO 95/26005 A1 | 9/1995 |
| WO | WO 98/49639 A1 | 11/1998 |
| WO | WO 99/19821 A1 | 4/1999 |
| WO | WO 99/30259 A1 | 6/1999 |
| WO | WO 99/53424 A1 | 10/1999 |
| WO | WO 00/11587 A1 | 3/2000 |
| WO | WO 00/50974 A2 | 8/2000 |
| WO | WO 00/52619 A1 | 9/2000 |
| WO | WO 00/62187 A2 | 10/2000 |
| WO | WO 00/65510 A1 | 11/2000 |
| WO | WO 01/16830 A1 | 3/2001 |
| WO | WO 01/16852 A2 | 3/2001 |
| WO | WO 01/22263 A2 | 3/2001 |
| WO | WO 01/22315 A2 | 3/2001 |
| WO | WO 01/88808 A1 | 11/2001 |
| WO | WO 00/62187 A3 | 12/2001 |
| WO | WO 01/22263 A3 | 1/2002 |
| WO | WO 01/22315 A3 | 1/2002 |
| WO | WO 02/07032 A1 | 1/2002 |
| WO | WO 02/15461 A2 | 2/2002 |
| WO | WO 01/16852 A8 | 6/2002 |
| WO | WO 2005/106637 A2 | 11/2005 |
| WO | WO 2006/013485 A2 | 2/2006 |
| WO | WO 2006/042309 A1 | 4/2006 |
| WO | WO 2006/073020 A1 | 7/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/059062 A2 | 5/2009 |
| WO | WO 2009/143075 A2 | 11/2009 |
| WO | WO 2009/143076 A2 | 11/2009 |
| WO | WO 2009/143294 A2 | 11/2009 |
| WO | WO 2009/148781 A2 | 12/2009 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |
| WO | WO 2011/093045 A1 | 8/2011 |
| WO | WO 2011/105009 A1 | 9/2011 |
| WO | WO 2011/105091 A | 9/2011 |
| WO | WO 2011/114630 A1 | 9/2011 |
| WO | WO 2011/115187 A1 | 9/2011 |
| WO | WO 2011/121375 A1 | 10/2011 |
| WO | WO 2012/096804 A2 | 7/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149473 A1 | 9/2014 |

OTHER PUBLICATIONS

Apple Inc., "iPhone User Guide for iPhone and iPhone 3G," http://manuals.info.apple.com/en_US/iPhone_User_Guide.pdf, Jul. 11, 2008, 154 pages.
Ask.MetaFilter, "Enable Screen Resize?" ask. Metafilter.com, Jan. 29, 2006, http://ask.metafilter.com/31720/Enable-screen-resize, 4 pages.
Awduche et al., "Synchronized Broadcast in Cellular Networks," 2nd Telecommunications R&D Conference in Massachusetts, Mar. 1996, 12 pages.
Azundris, "A Fire in the Sky," http://web.archive.org/web/20140722062639/http://blog.azundrix.com/archives/168-A-fire-in-the-sky.html, Jul. 22, 2014, 8 pages.
Bautista, "Microsoft Mathematics Tutorial 7—The Ink Input", <URL:http://mathandmultimedia.com/2012/05/23/microsoft-math-tutorial-7-ink>, May 23, 2012, 3 pages.
Cohen, Cinemagraphs are Animated Gifs for Adults, http:www.tubefilter.com//2011/07/10/cinemagraph/, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Deeter, "DigiStamp Signs Strategic Partnership with European Trust Center EuroSignCard to Safeguard Monetary Transactions in Financial Sector," http://proquest.umi.com/, Mar. 14, 2001, 2 pages.
Dilger, "Inside Apple's iPad: Multitasking," Appleinsider.com, <http://www.appleinsider.com/articles/10/02/18/inside_apples_ipad_multitasking.html>, Feb. 17, 2010, 3 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fahey, "The iPad Blows Up iPhone Apps Read Good," Kotaku http://kotaku.com/5458316/the-ipad-blows-up-iphone-apps-rel-good, Jan. 27, 2010, 3 pages.
Fehily, "Visual QuickStart Guide: Microsoft Windows 7," Peachpit Press, 9 pages.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
Gorman, "Hands-On With Immersion HD Integrator Hi-Fi Haptics," http://www.engadget.com/2012/02/23/hands-on-with-immersion-hd-integrator-hi-fi-haptics/?utm_medium=referral&utm_source=pulsenews, Feb. 23, 2012, 10 pages.
Harris, "Windows 8 Consumer Preview: Product Demo," https://www.youtube.com/watch?feature=[;auer-embedded&v=jDYAQmQ-phX8, Feb. 28, 2012, 3 pages.

(56) References Cited

OTHER PUBLICATIONS

Harrison, "Stylus-Based Interface with Full Mouse Emulation", IBM Technical Disclosure Bulletin, vol. 34, No. 10B, Mar. 1, 1992, 3 pages.
HTC, "HTC One (M7)," Wikipedia, the free encyclopedia, https://en.wikipedia.org/wiki/HTC_One_(M7), Mar. 2013, 20 pages.
HTC, "User Manual—PDA Phone—HTC_P3050 Touch," http://web.archive.org/web/20101228223033/http://www.comparecellular.com, Nov. 2, 2007, 154 pages.
IBM et al., "Pressure-Sensitive Icons", IBM, US, Jun. 1, 1990, 3 pages.
ICIMS Recruiting Software, "Blackberry Playbook Review," http://www.tested.com/tech.tablets/5749-blackberry-playbook-review/, 2015, 11 pages.
Jade et al., "Apple's iPhone 4.0 to Support Multitasking via Expose-like Interface," AppleInsider.com, Mar. 31, 2010, 4 pages.
Jade et al., "Apple's iPhone 4.0 Software to Deliver Multitasking Support," AppleSider.com, Mar. 11, 2010, 3 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Nikon, "Scene Recognition System and Advanced SRS," http://www.nikonusa.com/en/Learn-And-Explore/Article/ftlzi4rr/Scene-Recognition-System-html, downloaded on May 20, 2016, 2 pages.
Kishore, "Make the OS X Maximize Button Work like Windows," http://www.switchingtomac.com/making-the-switch/make-the-os-x-maximize-buttom-work-like-windows/, May 5, 2009, 11 pages.
MacRumors, "Fit to Screen Button Poll for Mac / Windows Users," http://forums.macrumors.com/showthread.php?t=615215>, Dec. 11, 2008, 15 pages.
MacRumors, "Window, Fit to Screen?," http://forums.macrumors.com/showthread.php?t=439783>, Feb. 22, 2008, 5 pages.
MetaFilter Network Inc., "Enable Screen Resize?", http://ask.metafilter.com/31720/Enable-screen-resize>, Jan. 29, 2006, 4 pages.
Mick, "iPhone OS 4.0 Will Bring True Multitasking This Summer", Daily Tech, http:///www.dailytech.com/report+iphone+os+40+will+bring+true+multitasking+this+summer/article 17878.htm>, Mar. 11, 2010, 3 pages.
Minsky, "Computational Haptics The *Sandpaper* System for Synthesizing Texture for a Force-Feedback Display," Massachusetts Institute of Technology, Jun. 1978, 217 pages.
Moth, "Share Code—Write Code Once for Both Mobile and Desktop Apps," MSDN Magazine, Jul. 2007, http://msdn.microsoft.com/en-us/magazine/cc163387.aspx, 8 pages.
Newman, "Sprint's HTC EVO 4G: 5 Killer Features," pcworld, http://www.pcworld.com/article/192286/sprints_htc_evo_4g_5_killer_features.html, Mar. 24, 2010, 3 pages.
Nickinson, "Review: The New HTC Sense Interface on Android Phones," Android Central, Feb. 22, 2010, http://www.androidcentral.com/review-new-htc-sense-android-phone, 10 pages.
Nilsson, "Design Guidelines for Mobile Applications," SINTEF ICT, Jun. 2008, 73 pages.
Nilsson et al., "Design Patterns for User Interface for Mobile Applications," Advances in Engineering Software, Elsevier Science, Oxford, GB vol. 40, No. 12, Dec. 1, 2009, 11 pages.
O'Hara, et al., "Pressure-Sensitive Icons", ip.com Journal, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.

Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Reiger, "Effective Design for Multiple Screen Sizes," mobiForge, http://mobiforge.com/designing/story/effective-design-multiple-screen-sizes, Jan. 2009, 12 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSenseII: Bi-directional Touch and Pressure Sensing Interactions with Tactile Feedback", Conference on Human Factors in Computing Systems Archive, ACM, Apr. 22, 2006, 6 pages.
Robertson et al., "The Task Gallery: A 3D Window Manager," Redmond, WA, Sep. 12, 1999, 8 pages.
Savov, "HTC Enhances Sense with Leap and Friend Stream (updated with video)," Engadget, http://www.engadget.com/2010/02/16/htc-enhances-sense-with-leap-and-friend-stream/, Feb. 16, 2010, 4 pages.
Seffah et al., Multi-devices "Multiple" User Interfaces: Development Models and Research Opportunities, The Journal of Systems Software, www.sciencedirect.com, Dec. 25, 2003, 14 pages.
Siracusa, "Antacid Tablet," http://arstechnica.com/staff/2010/01/antacid-tablet/>, Jan. 1, 2010, 3 pages.
Song, et al., "Grips and Gestures on a Multi-Touch Pen," The ACM CHI Conference on Human Factors in Computing Systems, <URL:research.microsoft.com/pubs/.../gripsandgenstures%20mtpen-chi201>, May 7-12, 2011,10 pages.
Sony, "Intelligent Scene Recognition," https://www.sony-asia.com/article/252999/section/product/product/dsc-t77, downloaded on May 20, 2016, 5 pages.
Sony, "Sony Xperia Z1", Wikipedia, the free encyclopedia, https://en.wikipedia.org/wiki/Sony_Xperia_Z1, Sep. 2013, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Viana et al., "Xmobile: A MB-UID Environment for Semi-Automatic Generation of Adaptive Applications for Mobile Devices," The Journal of Systems and Software, www.sciencedirect.com, Jun. 9, 2007, 13 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, 2 pages.
Wikipedia, "Mobile Ad Hoc Network," Wikipedia, the free encyclopedia, http://en.wikipedia.org/wiki/Mobile_ad_hoc_network, May 20, 2016, 4 pages.
Windows, "Stupid Geek Tricks: Tile or Cascade Multiple Windows in Windows 7," How to Geek, Feb. 18, 2010, 3 pages.
YouTube, "Blackberry Playbook bezel interation," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.

(56) References Cited

OTHER PUBLICATIONS

Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Jul. 9, 2015, received in Australian Patent Application No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Aug. 10, 2015, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/052,515, 11 pages.
Office Action, dated Apr. 5, 2016, received in Danish Patent Application No. 201500577, which corresponds with U.S. Appl. No. 14/864,737, 7 pages.
Office Action, dated Mar. 18, 2016, received in Danish Patent Application No. 201500575, which corresponds with U.S. Appl. No. 14/866,981, 9 pages.
Office Action, dated Mar. 9, 2016, received in Danish Patent Application No. 201500574, which corresponds with U.S. Appl. No. 14/866,159, 11 pages.
Office Action, dated Mar. 30, 2016, received in Danish Patent Application No. 201500588, which corresponds with U.S. Appl. No. 14/868,078, 9 pages.
Office Action, Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Notice of Allowance, dated Jun. 8, 2016, received in Danish Patent Application No. 201500576, which corresponds with U.S. Appl. No. 14/866,989, 2 pages.
Office Action, dated Feb. 3, 2016, received in Danish Patent Application No. 201500592, which corresponds with U.S. Appl. No. 14/869,899, 9 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Office Action, dated Jan. 25, 2016, received in U.S. Appl. No. 14/864,580, 29 pages.
Notice of Allowance, dated May 17, 2016, received in U.S. Appl. No. 14/152,971, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.

(56) References Cited

OTHER PUBLICATIONS

Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Office Action, dated Apr. 1, 2016, received in Danish Patent Application No. 201500589, which corresponds with U.S. Appl. No. 14/866,989, 8 pages.
Office Action, dated Apr. 11, 2016, received in U.S. Appl. No. 14/871,236, 23 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Apr. 7, 2016, received in Danish Patent Application No. 201500597, which corresponds with U.S. Appl. No. 14/871,227, 7 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
Invitation to Pay Additional Fees dated Feb. 10, 2014, received in International Application No. PCT/US2013/069472, which corresponds to U.S. Appl. No. 14/608,895, 6 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
Invitation to Pay Additional Fees dated Sep. 25, 2013, received in International Application No. PCT/US2013/040061, which corresponds to U.S. Appl. No. 14/536,464, 6 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
Invitation to Pay Additional Fees dated Oct. 8, 2013, received in International Application No. PCT/US2013/040067, which corresponds to U.S. Appl. No. 14/536,644, 8 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
Invitation to Pay Additional Fees dated Oct. 28, 2013, received in International Application No. PCT/US2013/040072, which corresponds to U.S. Appl. No. 14/536,141, 7 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
Invitation to Pay Additional Fees dated Feb. 14, 2014, received in International Application No. PCT/US2013/069483, which corresponds with U.S. Appl. No. 14/608,942, 7 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
Invitation to Pay Additional Fees dated Oct. 28, 2013, received in International Application No. PCT/US2013/040087, which corresponds to U.S. Appl. No. 14/536,166, 8 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.

(56) References Cited

OTHER PUBLICATIONS

International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
Invitation to Pay Additional Fees dated Apr. 17, 2014, received in International Application No. PCT/US2013/069484, which corresponds with U.S. Appl. No. 14/608,965, 7 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
Invitation to Pay Additional Fees dated Sep. 25, 2013, received in International Application No. PCT/US2013/040098, which corresponds to U.S. Appl. No. 14/536,247, 8 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
Invitation to Pay Additional Fees dated Aug. 7, 2013, received in International Application No. PCT/US2013/040101, which corresponds to U.S. Appl. No. 14/536,267, 7 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
Invitation to Pay Additional Fees dated Aug. 7, 2013, received in International Application No. PCT/US2013/040108, which corresponds to U.S. Appl. No. 14/536,291, 6 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
Invitation to Pay Additional Fees dated Apr. 1, 2014, received in International Application No. PCT/US2013/069486, which corresponds with U.S. Appl. No. 14/608,985, 7 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
Agarwal, "How to Copy and Paste Text on Windows Phone 8," Guiding Tech, http://web.archive.org/web/20130709204246/http://www.guidingtech.com/20280/copy-past-text-windows-phone-8/, Jul. 9, 2013, 10 pages.
Azundris, "A Fire in the Sky," http://web.archive.org/web/20140722062639/http://blog.azundrix.com/archives/168-A-fire-in-the-pie.html, Jul. 22, 2014, 8 pages.
McRitchie, "Internet Explorer Right-Click Menus," http://web.archive.org/web/20140502040020/http:/dmcritchie.mvps.org/ie/rightie6.htm, May 2, 2014, 10 pages.
Office Action, dated Mar. 18, 2016, received in Danish Patent Application No. 201500581, which corresponds with U.S. Appl. No. 14/867,990, 9 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Laurie, "The Power of the Right Click," http://vlaurie.com/right-click/customize-context-menu.html, 2002-2016, 3 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Wikipedia, "Context Menu," Wikipedia, the free encyclopedia https://en.wikipedia.org/wiki/Context menu, Last Modified May 15, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Patent Certificate, dated Jun. 9, 2016, received in Australian Patent Application No. 2016100247, which corresponds with U.S. Appl. No. 14/868,078, 1 page.
Final Office Action, dated Jun. 16, 2016, received in U.S. Appl. No. 14/857,645, 12 pages.
Office Action, dated Jun. 10, 2016, received in Australian Patent Application No. 2016100292, which corresponds with U.S. Appl. No. 14/866,361, 4 pages.
Notice of Allowance, dated Jun. 10, 2016, received in Danish Patent Application No. 201500587, which corresponds with U.S. Appl. No. 14/866,987, 2 pages.
Notice of Allowance, dated Jun. 10, 2016, received in Danish Patent Application No. 201500589, which corresponds with U.S. Appl. No. 14/866,989, 2 pages.
Office Action, dated Jun. 9, 2016, received in Danish Patent Application No. 201500596, which corresponds with U.S. Appl. No. 14/870,882, 9 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Cohen, Cinemagraphs are Animated Gifs for Adults, http://www.tubefilter.com/2011/07/10/cinemagraph, Jul. 10, 2011, 3 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.

(56) References Cited

OTHER PUBLICATIONS

Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
IPodHacks142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Certificate of Grant, dated Jul. 29, 2016, received in Australian Patent Application No. 2013368441, which corresponds with U.S. Appl. No. 14/608,926, 1 page.
Notice of Allowance, dated Jul. 5, 2016, received in Australian Patent Application No. 2013259613, which corresponds with U.S. Appl. No. 14/536,646, 3 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.
Office Action, dated Jul. 4, 2016, received in Japanese Patent Application No. 2015-549393, which corresponds with U.S. Appl. No. 14/536,141, 4 pages.
Office Action, dated Aug. 1, 2016, received in U.S. Appl. No. 14/536,203, 14 pages.
Notice of Allowance, dated Jun. 15, 2016, received in Australian Patent Application No. 2013259630, which corresponds with U.S. Appl. No. 14/536,203, 3 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Jul. 22, 2016, received in European Office Action No. 13798465.4, which corresponds with U.S. Appl. No. 14/608,965, 8 pages.
Notice of Allowance, dated Jun. 28, 2016, received in Australian Patent Application No. 2013259637, which corresponds with U.S. Appl. No. 14/536,267, 3 pages.
Notice of Allowance, dated Sep. 26, 2016, eceived in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.

(56) References Cited

OTHER PUBLICATIONS

Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.
Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Australian Patent Application No. 201500588, which corresponds with U.S. Appl. No. 14/868,078, 9 pages.
Office Action, dated Sep. 2, 2016, received in Australian Patent Application No. 201500588, which corresponds with U.S. Appl. No. 14/868,078, 4 pages.
Office Action, dated May 9, 2016, received in U.S. Appl. No. 14/863,432, 26 pages.
Office Action, dated Aug. 19, 2016, received in Australian Patent Application No. 2016100647, which corresponds with U.S. Appl. No. 14/863,432, 5 pages.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Patent, dated Aug. 8, 2016, received in Australian Patent Application 2016100653, corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.

Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Notice of Allowance, dated Aug. 26, 2016, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.
Office Action, dated Aug. 19, 2016, received in Australian Patent Application No. 2016100648, which corresponds with U.S. Appl. No. 14/864,580, 6 pages.
Office Action, dated Oct. 7, 2016, received in Danish Patent Application No. 201500584, which corresponds with U.S. Appl. No. 14/864,580, 3 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action and Search Report, dated Sep. 9, 2016, received in Danish Patent Application No. 201670463, which corresponds with U.S. Appl. No. 14/866,987, 7 pages.
Certificate of Exam, dated Jul. 21, 2016, received in Australian Patent Application No. 2016100652, which corresponds with U.S. Appl. No. 14/866,989, 1 page.
Office Action, dated Jun. 28, 2016, received in U.S. Appl. No. 14/871,236, 21 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436, which corresponds with U.S. Appl. No. 14/871,236, 1 pages.
Office Action, dated Oct. 17, 2016, received in Australian Patent Application No. 2016203040, which corresponds with U.S. Appl. No. 14/871,227, 7 pages.
Grant, dated Jun. 21, 2016, received in Danish Patent Application No. 201500597, which corresponds with U.S. Appl. No. 14/871,227, 2 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Extended European Search Report, dated Oct. 7, 2016, received in European Patent Application No. 16177861.4, which corresponds with U.S. Appl. No. 14/536,267, 12 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Aug. 29, 2016, received in International Patent Application No. PCT/US2016/021400, which corresponds with U.S. Appl. No. 14/869,899, 48 pages.
Office Action, dated Jan. 20, 2017, received in U.S. Appl. No. 15/231,745, 21 pages.
Office Action and Search Report, dated Oct. 17, 2016, received in Danish Patent Application No. 201670590, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.
Office Action and Search Report, dated Oct. 12, 2016, received in Danish Patent Application No. 201670593, which corresponds with U.S. Appl. No. 15/231,745, 7 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Dec. 15, 2016, received in International Patent Application No. PCT/US2016/046403, which corresponds with U.S. Appl. No. 15/009,661, 17 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Anonymous, "Notifications, Android 4.4 and lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Gardner, "Recenz—Recent Apps In One Tap", You Tube, https://www.youtube.com/watch?v=qaiISHRgsTo, May 15, 2015, 1 pages.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.obj.io/issues/11-android/android-notifications, Apr. 30, 2014, 26 pages.
Kiener, "Force Touch on iPhone", https://www.youtube.com/watch?v=CEMmnsU5fC8, Aug. 4, 2015, 4 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-distrub-iphone, Jul. 14, 2014, 30 pages.
Nacca, "NiLS Lock Screen Notifications/Floating Panel—Review", http://www.youtube.com/watch?v=McT4QnS9TDY, Feb. 3, 2014, 4 pages.
Phonebuff, "Hot To Pair Bluetooth On The iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.

(56) References Cited

OTHER PUBLICATIONS

Notice of Allowance, dated Dec. 22, 2016, received in Japanese Patent Application No. 2015-511645, which corresponds with U.S. Appl. No. 14/536,646, 2 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Certificate of Grant, dated Oct. 21, 2016, received in Australian Patent Application No. 2013259630, which corresponds with U.S. Appl. No. 14/536,203, 3 pages.
Certificate of Grant, dated Oct. 21, 2016, received in Australian Patent Application No. 2013259637, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Office Action, dated Jan. 5, 2017, received in Korean Patent Application No. 2016-7029533, which corresponds with U.S. Appl. No. 14/536,267, 2 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 10, 2017, received in Australian Patent Application No. 2013368445, which corresponds with U.S. Appl. No. 14/608,985, 4 pages.
Office Action, dated Nov. 4, 2016, received in Korean Patent Application No. 10-2015-7019984, which corresponds with U.S. Appl. No. 14/608,985, 8 pages.
Office Action, dated Jan. 19, 2017, received in U.S. Appl. No. 14/609,042, 12 pages.
Patent, dated Nov. 2, 2016, received in Australian Patent Application No. 2016100254, which corresponds with U.S. Appl. No. 14/866,981, 1 page.
Office Action, dated Dec. 5, 2016, received in Danish Patent Application No. 201500575, which corresponds with U.S. Appl. No. 14/866,981, 3 pages.
Notice of Allowance, dated Nov. 14, 2016, received in U.S. Appl. No. 14/863,432, 7 pages.
Notice of Allowance, dated Jan. 12, 2017, received in Chinese Patent Application No. 201620470063.8, which corresponds with U.S. Appl. No. 14/863,432, 1 page.
Notice of Allowance, dated Jan. 12, 2017, received in Chinese Patent Application No. 201620470281.1, which corresponds with U.S. Appl. No. 14/866,511, 1 page.
Office Action, dated Nov. 22, 2016, received in Danish Patent Application No. 201670594, which corresponds with U.S. Appl. No. 14/869,899, 9 pages.
Office Action, dated Nov. 22, 2016, received in Australian Patent Application No. 2016101418, which corresponds with U.S. Appl. No. 14/866,992, 7 pages.
Notice of Allowance, dated Jan. 4, 2017, received in U.S. Appl. No. 14/845,217, 5 pages.
Notice of Allowance, dated Oct. 24, 2016, received in U.S. Appl. No. 14/857,645, 6 pages.
Notice of Allowance, dated Dec. 28, 2016, received in U.S. Appl. No. 14/864,580, 8 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Notice of Allowance, dated Nov. 23, 2016, received in U.S. Appl. No. 14/864,601, 12 pages.
Certificate of Examination, dated Dec. 8, 2016, received in Australian Patent Application No. 2016100292, which corresponds with U.S. Appl. No. 14/866,361, 1 page.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Office Action, dated Oct. 31, 2016, received in Australian Patent Application No. 2016101438, which corresponds with U.S. Appl. No. 14/871,236, 6 pages.
Office Action, dated Oct. 18, 2016, received in Australian Patent Application No. 2016101431, which corresponds with U.S. Appl. No. 14/871,227, 3 pages.
Final Office Action, dated Nov. 2, 2016, received in U.S. Appl. No. 14/867,892, 48 pages.
Office Action, dated Oct. 25, 2016, received in Chinese Patent Application No. 201620176221.9, which corresponds with U.S. Appl. No. 14/867,990, 7 pages.
Office Action, dated Nov. 25, 2016, received in U.S. Appl. No. 15/081,771, 17 pages.
Office Action, dated Jan. 20, 2017, received in European Patent Application No. 15183980.0, which corresponds with U.S. Appl. No. 14/536,426, 5 pages.
Notice of Allowance, dated Jan. 4, 2017, received in European Patent Application No. 13724102.2, which corresponds with U.S. Appl. No. 14/536,646, 5 pages.
Notice of Allowance, dated Feb. 1, 2017, received received in U.S. Appl. No. 14/536,203, 9 pages.
Notice of Allowance, dated Jan. 24, 2017, received in Japanese Patent Application No. 2015-550384, which corresponds with U.S. Appl. No. 14/608,985, 5 pages.
Notice of Allowance, dated Jan. 30, 2017, received in received in Danish Patent Application No. 201500588, which corresponds with U.S. Appl. No. 14/868,078, 2 pages.
Final Office Action, dated Jan. 27, 2017, received in U.S. Appl. No. 14/866,511, 26 pages.
Patent, dated Jan. 23, 2017, received in Danish Patent Application No. 201500576, which corresponds with U.S. Appl. No. 14/866,511, 3 pages.
Notice of Allowance, dated Jan. 31, 2017, received in U.S. Appl. No. 14/864,627, 7 pages.
Notice of Allowance, dated Jan. 31, 2017, received in Danish Patent Application No. 201670463, which corresponds with U.S. Appl. No. 14/866,987, 3 pages.
International Search Report and Written Opinion, dated Jan. 12, 2017, received in International Patent No. PCT/US2016/046419, which corresponds with U.S. Appl. No. 14/866,992, 23 pages.

* cited by examiner

In accordance with a determination that the user input satisfies one or more second input criteria that correspond to a second input type, distinct from the first input type: — 710

Display the first menu overlaid on the user interface with one or more selectable options that correspond to the respective user interface element without displaying the second menu, where the first menu includes a subset of the one or more selectable options included in the second menu (A)

A contact in the user input corresponds to a cursor displayed on the display, and — 718

In accordance with the determination that the user input corresponds to the second input type, cease display of the cursor on the display The first menu is a radial menu with two or more distinct portions that is located on the display at a location that corresponds to a location of a contact in the user input on the touch sensitive surface — 720

The radial menu includes two halves each comprising a distinct, unitary region forming half of the radial menu — 722

The radial menu includes four quadrants each comprising a distinct, unitary region forming a quarter of the radial menu — 724

The four quadrants are oriented within the first menu in the cardinal directions — 726

One or more of the quadrants are empty — 728

One or more of the quadrants are disabled — 730

Selectable options in the first menu that correspond to destructive actions are visually distinguished from selectable options that correspond to nondestructive actions — 732

DEVICES, METHODS, AND GRAPHICAL USER INTERFACES FOR DISPLAYING AND USING MENUS

RELATED APPLICATIONS

This application claims priority to U.S. Provisional Patent Application Ser. No. 62/183,139, filed Jun. 22, 2015, entitled "Devices, Methods, and Graphical User Interfaces for Displaying and Using Menus," and U.S. Provisional Patent Application Ser. No. 62/129,954, filed Mar. 8, 2015, entitled "Devices, Methods, and Graphical User Interfaces for Displaying and Using Menus," both of which are incorporated herein in their entirety.

TECHNICAL FIELD

This relates generally to electronic devices with touch-sensitive surfaces, including but not limited to electronic devices with touch-sensitive surfaces that display and use menus.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to navigate and interact with user interfaces on a display. One way to interact with user interfaces is via menus displayed on the display.

But existing methods and devices for displaying and using menus are cumbersome and inefficient. For example, menus often display numerous options that are rarely used. The display of these options makes it more difficult to find and activate menu options that are more frequently used. On the other hand, it is also desirable to provide ready access to both rarely used options and more frequently used options.

SUMMARY

Accordingly, there is a need for electronic devices with faster, more efficient methods and interfaces for displaying and using menus. Such methods and interfaces optionally complement or replace conventional methods for displaying and using menus. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Executable instructions for performing these functions are, optionally, included in a transitory computer readable medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: displaying, on the display, a user interface that includes one or more user interface elements; and detecting a user input on the touch-sensitive surface at a location that corresponds to a respective user interface element of the one or more user interface elements. In response to detecting the user input, the method includes: in accordance with a determination that the user input satisfies one or more first input criteria that correspond to a first input type, displaying a second menu overlaid on the user interface with one or more selectable options that correspond to the respective user interface element without displaying a first menu that is distinct from the second menu; and, in accordance with a determination that the user input satisfies one or more second input criteria that correspond to a second input type, distinct from the first input type, displaying the first menu overlaid on the user interface with one or more selectable options that correspond to the respective user interface element without displaying the second menu, where the first menu includes a subset of the one or more selectable options included in the second menu.

In accordance with some embodiments, a method is performed at an electronic device with a display, a touch-sensitive surface, and one or more sensors to detect intensity of contacts with the touch-sensitive surface. The method includes: displaying, on the display: a user interface that includes one or more user interface elements, and a cursor. The method includes: detecting a user input on the touch-sensitive surface while the cursor is displayed on the display at a location over a respective user interface element of the one or more user interface elements. In response to detecting the user input, the method includes, in accordance with a determination that the user input satisfies one or more first input criteria that correspond to a first input type: displaying a first menu overlaid on the user interface with one or more selectable options that correspond to the respective interface element; and ceasing to display the cursor on the display. In some embodiments, in response to detecting the user input, and in accordance with a determination that the user input satisfies one or more second input criteria that correspond to a second input type distinct from the first input type, the method includes: initiating performance of an action associated with the respective user interface element; and maintaining display of the cursor.

In accordance with some embodiments, a method is performed at an electronic device with a display, a touch-sensitive surface, and one or more sensors to detect intensity of contacts with the touch-sensitive surface. The method includes: displaying, on the display, a user interface that includes one or more user interface elements; and detecting a press input by a contact on the touch-sensitive surface at a location that corresponds to a respective user interface element of the one or more user interface elements. In response to detecting the press input, the method includes: in accordance with a determination that the respective user interface meets first action criteria, the first action criteria including a criterion that respective the user interface element is associated with a single option associated with the press input, initiating performance of an action that corresponds to the single option; and, in accordance with a determination that the respective user interface element meets second action criteria, the second action criteria including a criterion that the respective user interface element is associated with a first number of options associated with the press input, where the first number is greater than one, displaying a first menu overlaid on the user interface, where the first menu includes a first set of selectable options.

In accordance with some embodiments, a method is performed at an electronic device with a display, a touch-sensitive surface, and one or more sensors to detect intensity of contacts with the touch-sensitive surface. The method includes: displaying, on the display, a user interface that includes one or more user interface elements; and detecting a press input by a contact on the touch-sensitive surface at a location that corresponds to a respective user interface element of the one or more user interface elements. In response to detecting the press input, in accordance with a determination that the contact in the press input has an intensity above a first intensity threshold, the method includes displaying an additional user interface element overlaid on the user interface with one or more selectable options that correspond to the respective interface element. While displaying the additional user interface element overlaid on the user interface, the method includes detecting that the intensity of the contact in the press input is below a second intensity threshold. In response to detecting that the intensity of the contact in the press input is below the second intensity threshold, and in accordance with a determination that the press input meets predefined timing criteria, the method includes: in accordance with a determination that a respective location of the contact in the press input satisfies predetermined location criteria, initiating performance of an action associated with the respective user interface element and ceasing to display the additional user interface element overlaid on the user interface; and, in accordance with a determination that the respective location of the contact in the press input does not satisfy the predetermined location criteria, ceasing to display the additional user interface element overlaid on the user interface while forgoing performance of the action associated with the respective user interface element.

In accordance with some embodiments, a method is performed at an electronic device with a display, a touch-sensitive surface, and one or more tactile output generators configured to provide tactile outputs. The method includes displaying, on the display, a map that is associated with a first orientation. The method also includes receiving a touch input on the touch-sensitive surface, and, in response to receiving the touch input on the touch-sensitive surface, rotating the map on the display in accordance with the touch input. The method further includes, while rotating the map on the display in accordance with the touch input, in response to determining that a displayed orientation of the rotated map corresponds to the first orientation of the map, generating a first tactile output.

In accordance with some embodiments, an electronic device includes a display unit configured to display a user interface, a touch-sensitive surface unit to receive contacts, one or more sensor units to detect intensity of contacts with the touch-sensitive surface unit, optionally one or more tactile output generators to provide tactile outputs; and a processing unit coupled with the display unit, the touch-sensitive surface unit, and the one or more sensor units. The processing unit is configured to: enable display of on the display unit, a user interface that includes one or more user interface elements; and detect a user input on the touch-sensitive surface unit at a location that corresponds to a respective user interface element of the one or more user interface elements. In response to detecting the user input, the processing unit is configured to: in accordance with a determination that the user input satisfies one or more first input criteria that correspond to a first input type, enable display of a second menu overlaid on the user interface with one or more selectable options that correspond to the respective user interface element without enabling display of a first menu that is distinct from the second menu; and in accordance with a determination that the user input satisfies one or more second input criteria that correspond to a second input type, distinct from the first input type, enable display of the first menu overlaid on the user interface with one or more selectable options that correspond to the respective user interface element without enabling display the second menu, where the first menu includes a subset of the one or more selectable options included in the second menu.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of, on the display unit, a user interface that includes one or more user interface elements and a cursor; and detect a user input on the touch-sensitive surface unit while the cursor is displayed on the display unit at a location over a respective user interface element of the one or more user interface elements. In response to detecting the user input, and in accordance with a determination that the user input satisfies one or more first input criteria that correspond to a first input type, the processing unit is configured to: enable display of a first menu overlaid on the user interface with one or more selectable options that correspond to the respective interface element; and cease display of the cursor on the display unit.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of, on the display unit, a user interface that includes one or more user interface elements; and detect a press input by a contact on the touch-sensitive surface unit at a location that corresponds to a respective user interface element of the one or more user interface elements. In response to detecting the press input, the processing unit is configured to: in accordance with a determination that the respective user interface meets first action criteria, the first action criteria including a criterion that the user interface element is associated with a single option associated with the press input, initiate performance of an action that corresponds to the single option; and, in accordance with a determination that the respective user interface element meets second action criteria, the second action criteria including a criterion that the user interface element is associated with a first number of options associated with the press input, where the first number is greater than one, enable display of a first menu overlaid on the user interface, where the first menu includes a first set of selectable option.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display of, on the display unit, a user interface that includes one or more user interface elements; and detect a press input by a contact on the touch-sensitive surface unit at a location that corresponds to a respective user interface element of the one or more user interface elements. In response to detecting the press input, and in accordance with a determination that the contact in the press input has an intensity above a first intensity threshold, enable display of an additional user interface element overlaid on the user interface with one or more selectable options that correspond to the respective interface element. While enabling display of the additional user interface element overlaid on the user interface, the processing unit is configured to detect that the intensity of the contact in the press input is below a second intensity threshold. In response to detecting that the intensity of the contact in the press input is below the second intensity threshold, and in accordance with a determination that the press input meets predefined timing criteria, the processing unit is configured to: in accordance with a determination that a respective location of the contact in the press input satisfies predetermined location criteria: initiate performance of an action associated with the respective user interface element; and cease display of the additional user interface element overlaid on the user interface. In response to detecting that the intensity of the contact in the press input is below the second intensity threshold, and in accordance with a determination that the press input meets predefined timing criteria, the processing unit is configured to: in accordance with a determination that a respective location of the contact in the press input does not satisfy the predetermined location criteria, cease display of the additional user interface element overlaid on the user interface while forgoing performance of the action associated with the respective user interface element.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for displaying and using menus, thereby increasing the effectiveness, efficiency, and user satisfaction with such devices. Such methods and interfaces may complement or replace conventional methods for displaying and using menus.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7F are flow diagrams illustrating a method of displaying and using menus in accordance with some embodiments.

DESCRIPTION OF EMBODIMENTS

As noted above, existing methods and devices for displaying and using menus are cumbersome and inefficient. For example, menus often display numerous options that are rarely used. The display of these options makes it more difficult to find and activate menu options that are more frequently used. On the other hand, it is also desirable to provide ready access to both rarely used options and more frequently used options.

Here, devices and methods are disclosed that improve upon the display and use of menus.

In some embodiments, a reduced menu with fewer options is displayed in response detecting user inputs of a first type, and an expanded menu with more options is displayed in response detecting user inputs of a second type. The input types optionally depend on the number of contacts and/or the intensity (e.g., force or pressure) of the contacts used in the input. In some embodiments, the reduced menus are radial menus with four or fewer options, which make it easy to see and activate the desired option.

In some embodiments, a cursor that is displayed over a user interface object ceases to be displayed when a reduced menu is displayed. This indicates to the user that precise control of a cursor is not needed or used to activate a menu option; imprecise finger gestures (e.g., taps or swipes) without a cursor are used instead.

In some embodiments, if a press input at a location that corresponds to a user interface element has only a single option for the press input, an action is initiated that corresponds to the single option, without displaying a menu. On the other hand, if the press input is at a location that corresponds to a user interface element with multiple options for the press input, then a menu is overlaid on the user interface element. This avoids the display of unnecessary menus.

In some embodiments, a menu for a particular user interface element is displayed in response to a press input. When the press input intensity falls below a threshold, if location and timing criteria are met, an action is performed that is associated with the particular user interface element and display of the menu ceases. On the other hand, if the location criteria are not met, the action is not performed and, if the timing criteria are not met, the menu continues to be displayed. This helps to display and dismiss the menu as needed.

In some embodiments, a map is displayed which a user can rotate by performing a touch input on a touch-sensitive surface (e.g., a two-finger rotation gesture). The touch-sensitive surface includes one or more tactile output generators that generate a tactile output when the map aligns with certain orientations (e.g., true north and/or transit north). In some embodiments, the tactile output provides the user with a sensation that the map is "snapping" into important orientations.

Figure 8A:
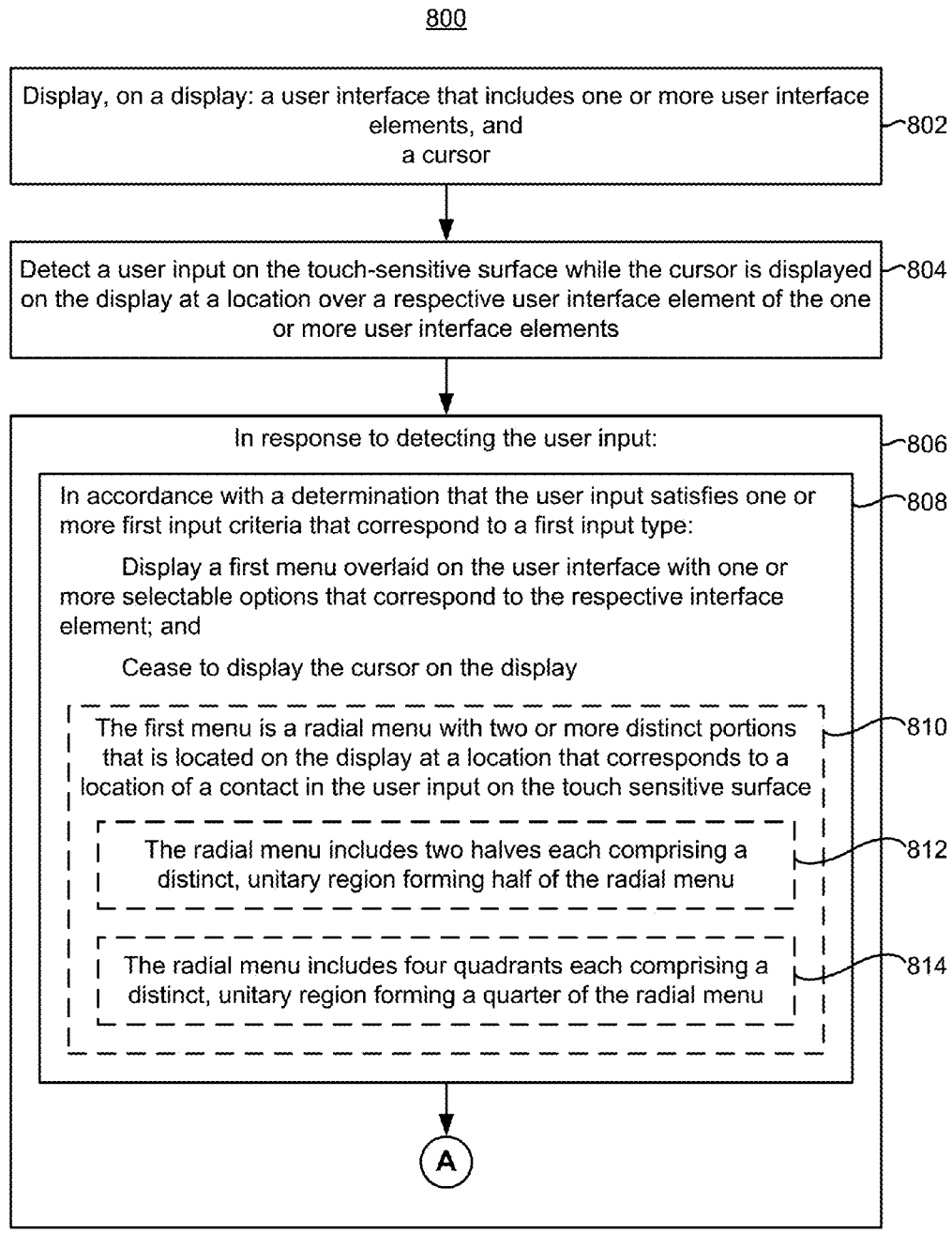
FIGS. 8A-8B are flow diagrams illustrating a method of displaying and using menus in accordance with some embodiments.
Figure 8B:
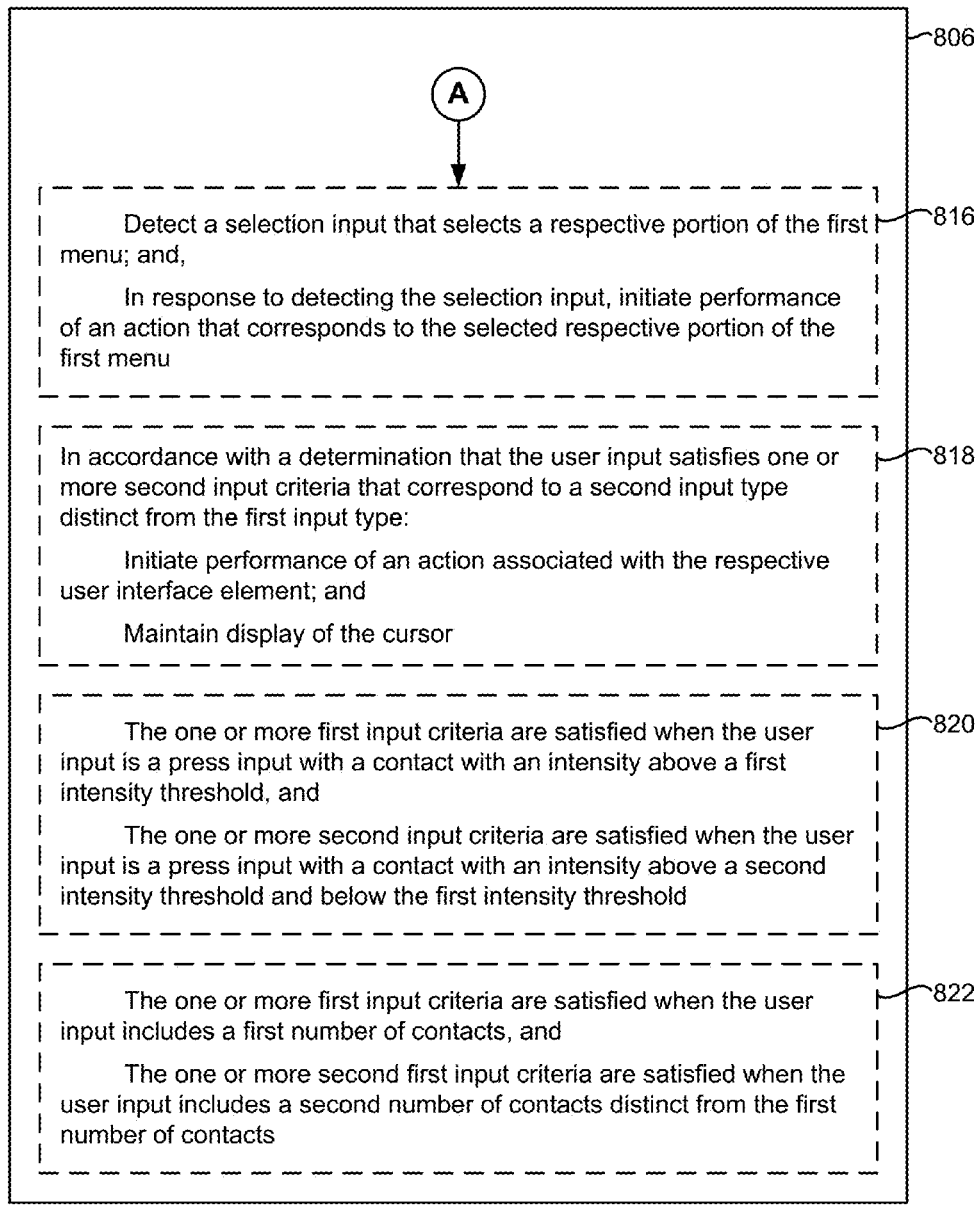
Figure 9A:
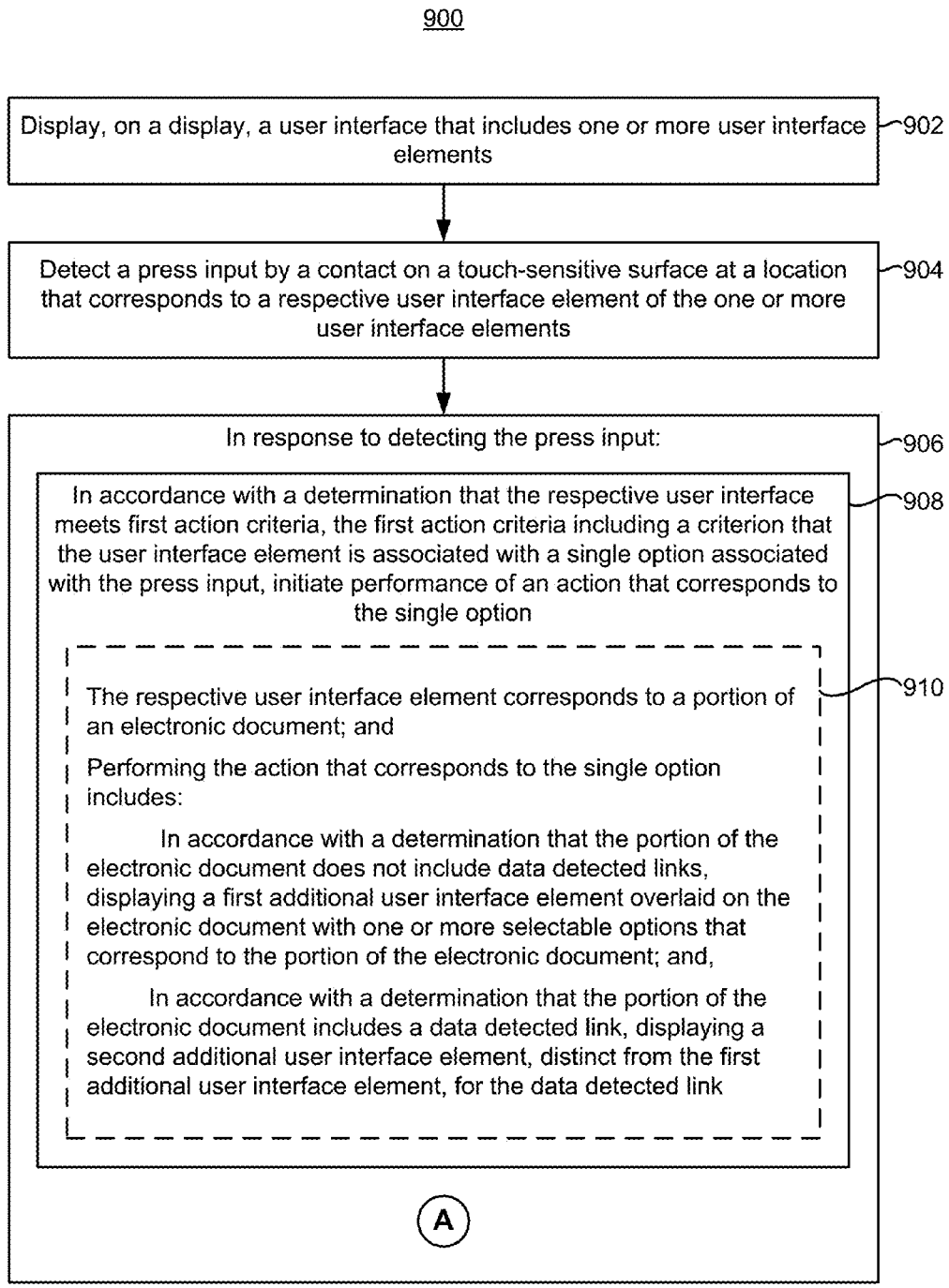
FIGS. 9A-9C are flow diagrams illustrating a method of displaying and using menus in accordance with some embodiments.
Figure 9B:
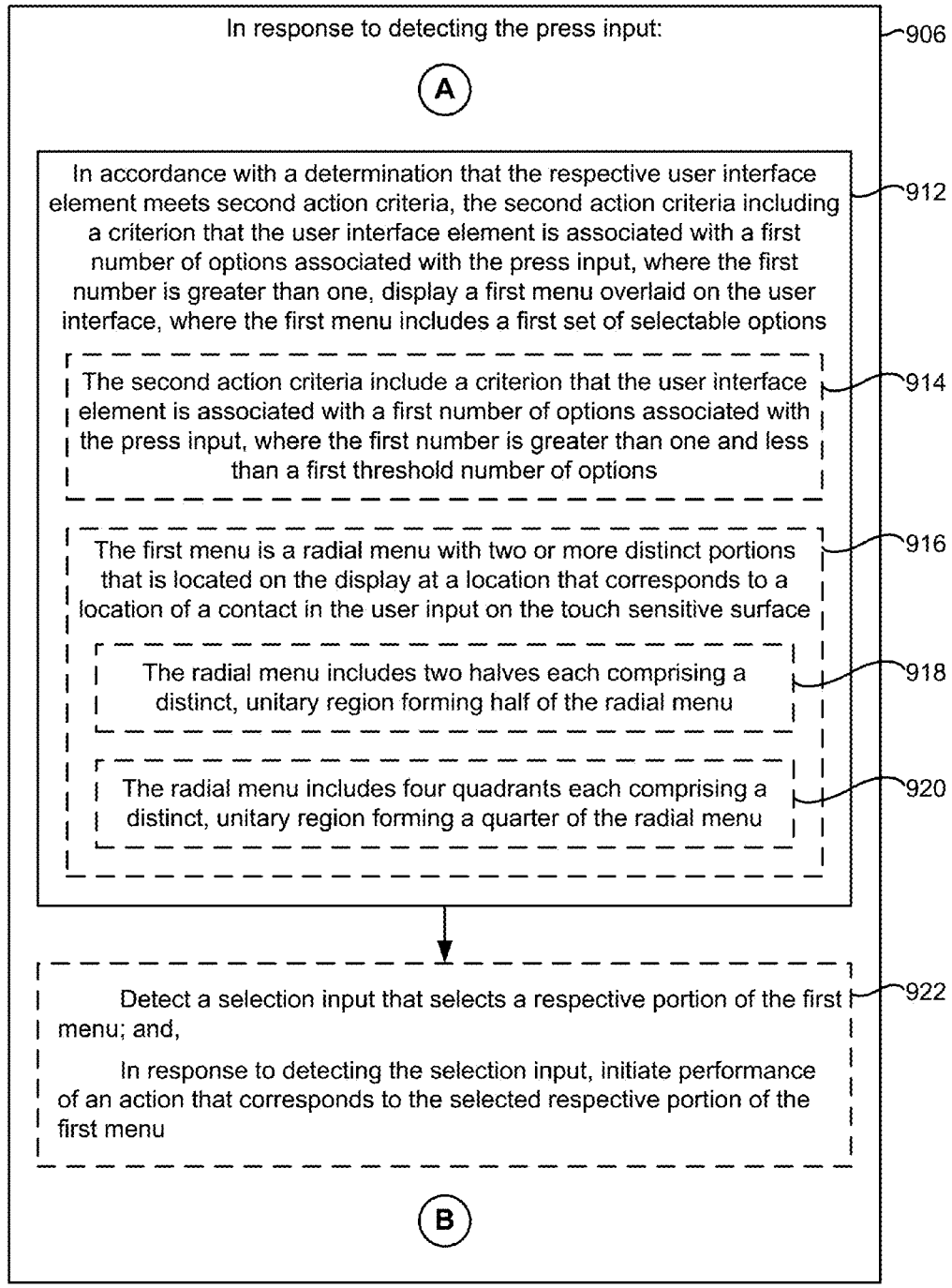
Figure 9C:
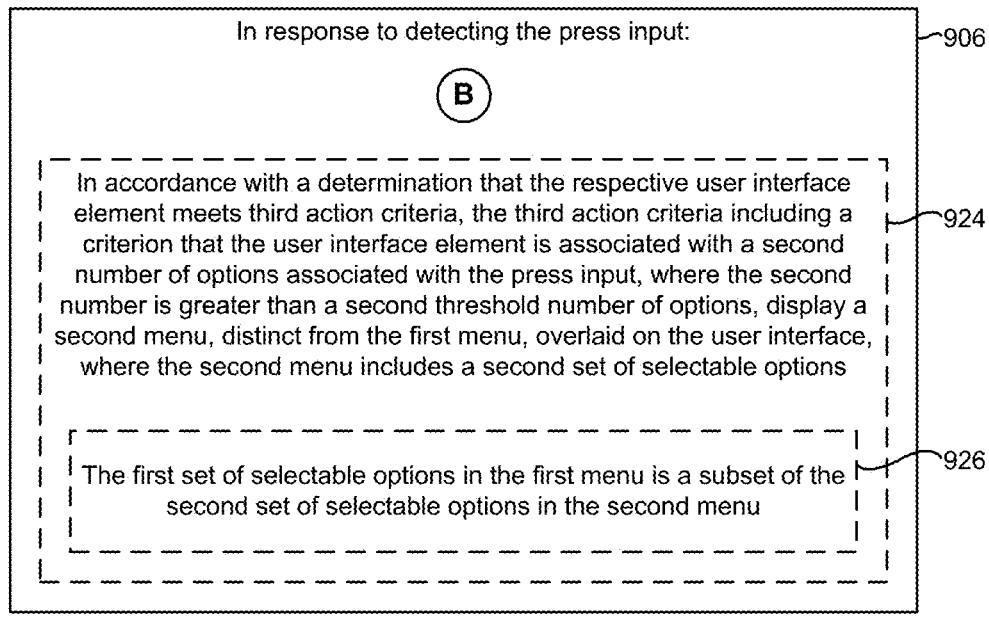
Figure 10A:
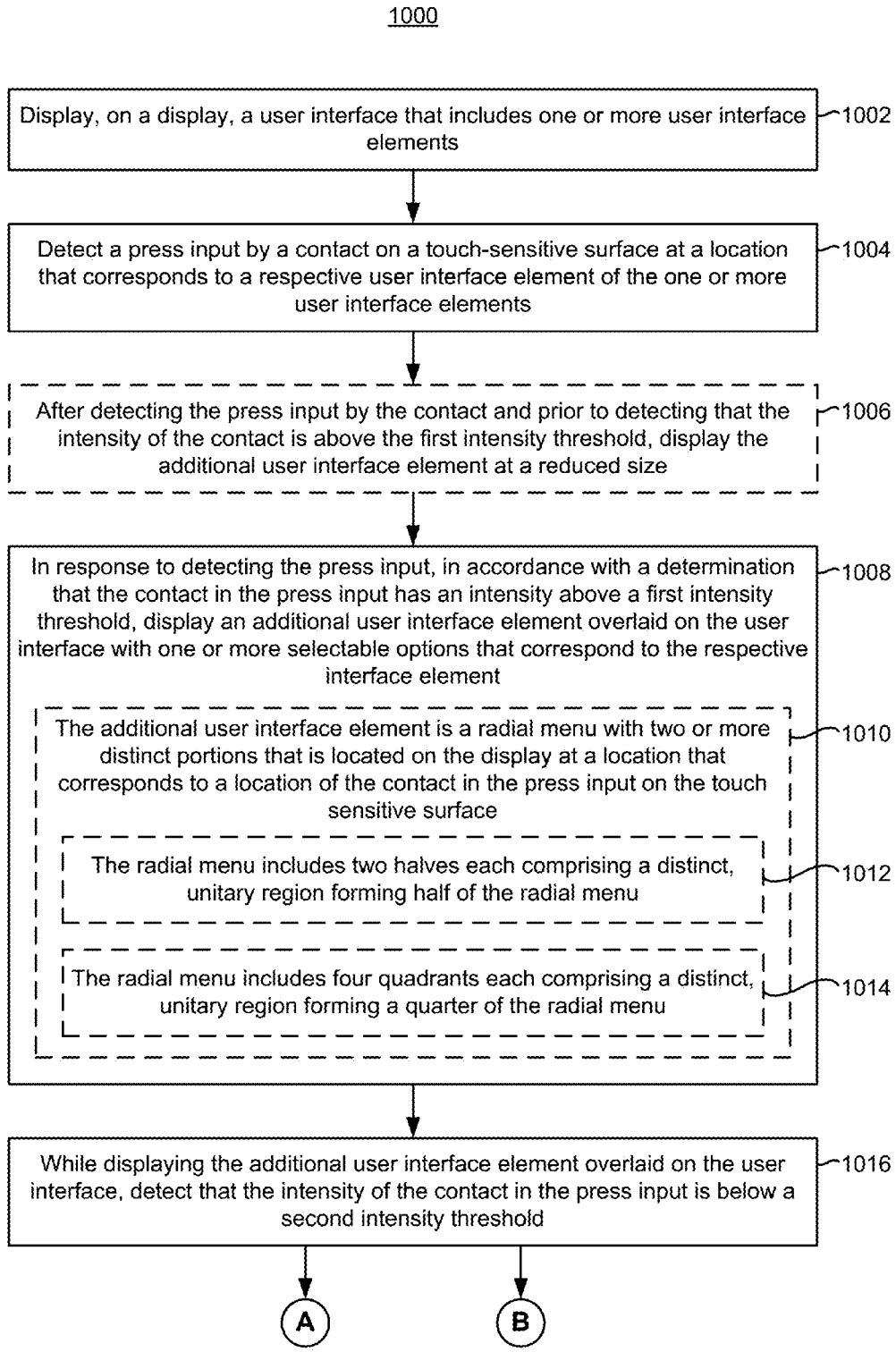
FIGS. 10A-10D are flow diagrams illustrating a method of displaying and using menus in accordance with some embodiments.
Figure 10B:
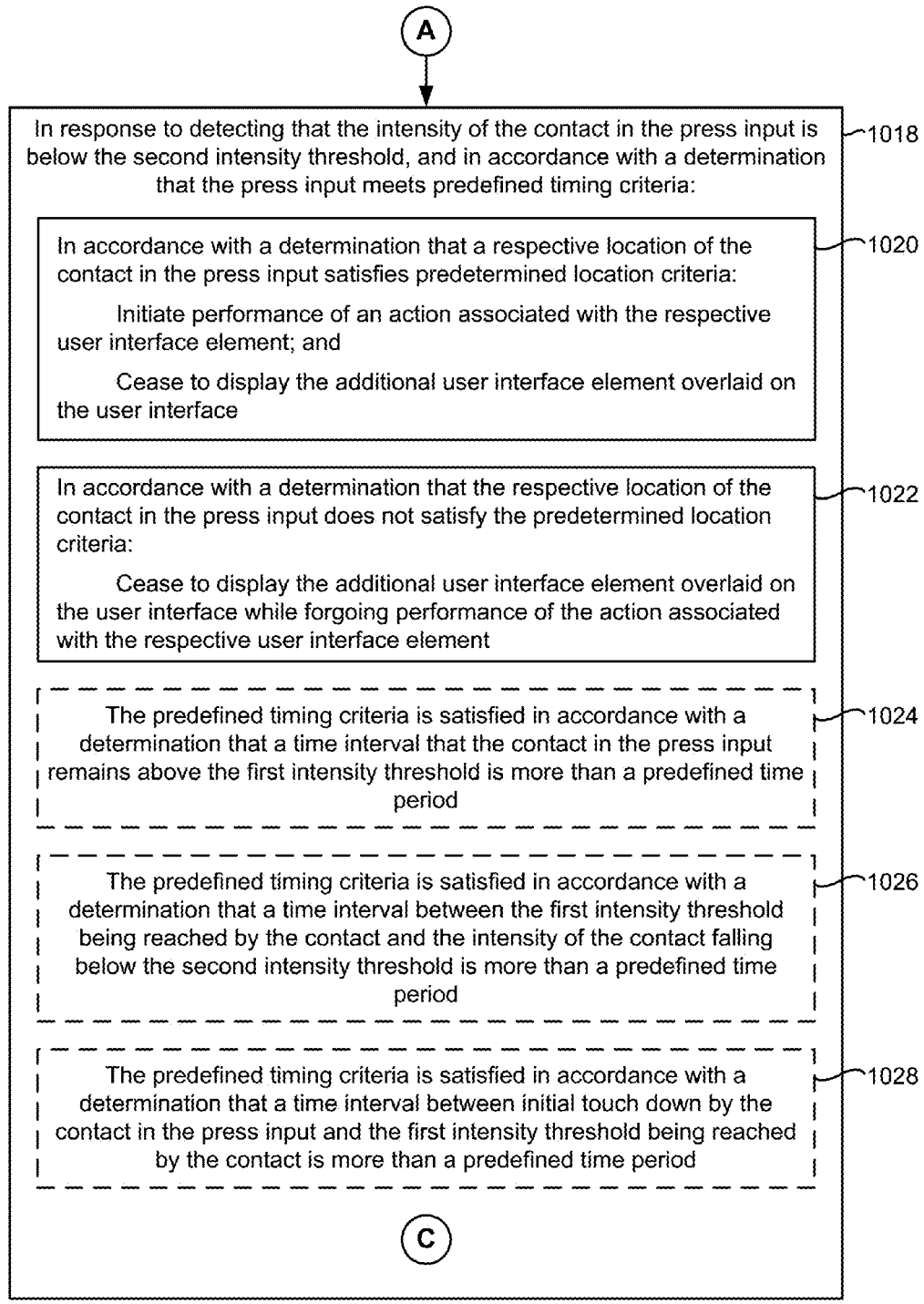
Figure 10C:
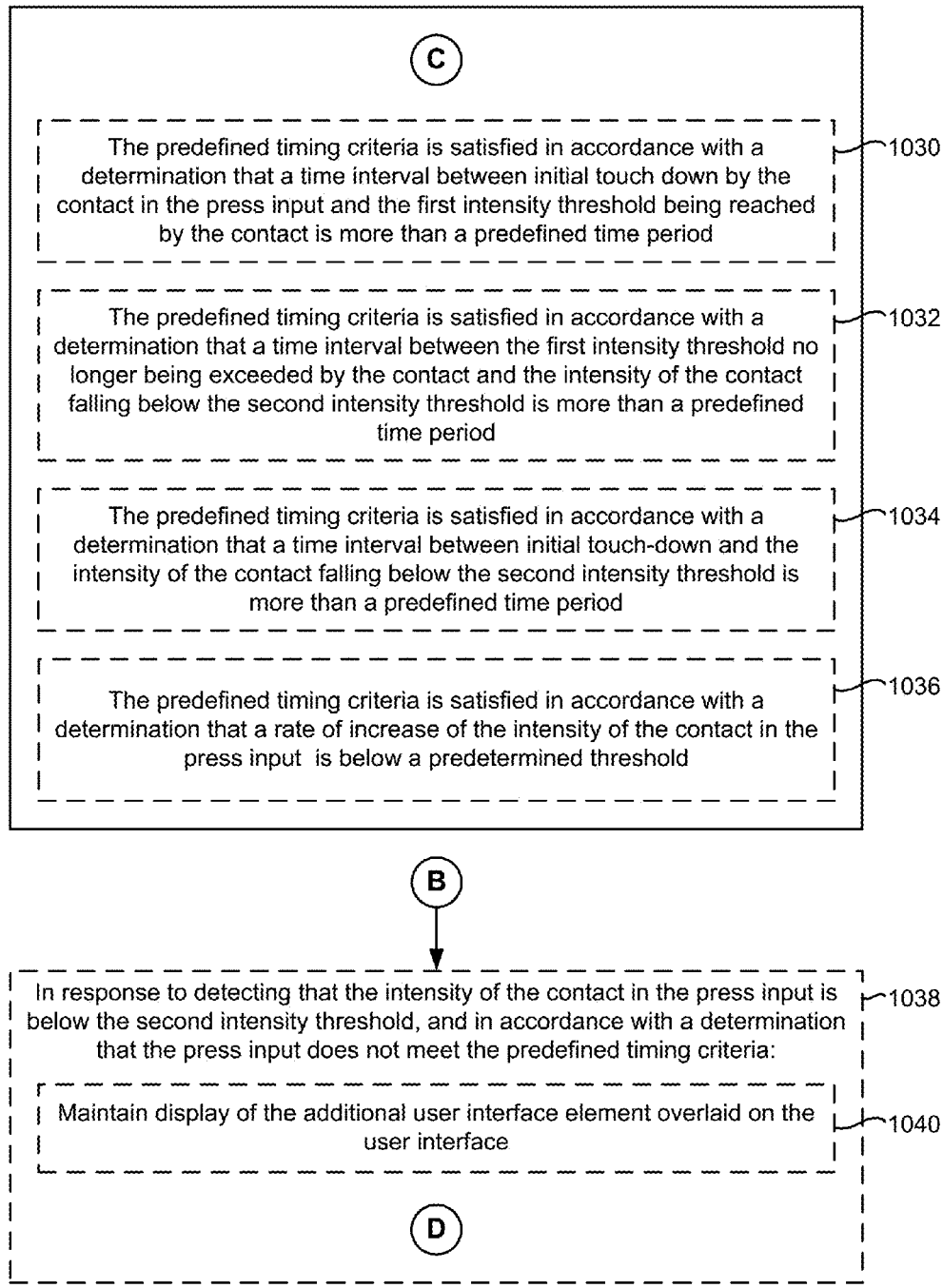
Figure 10D:
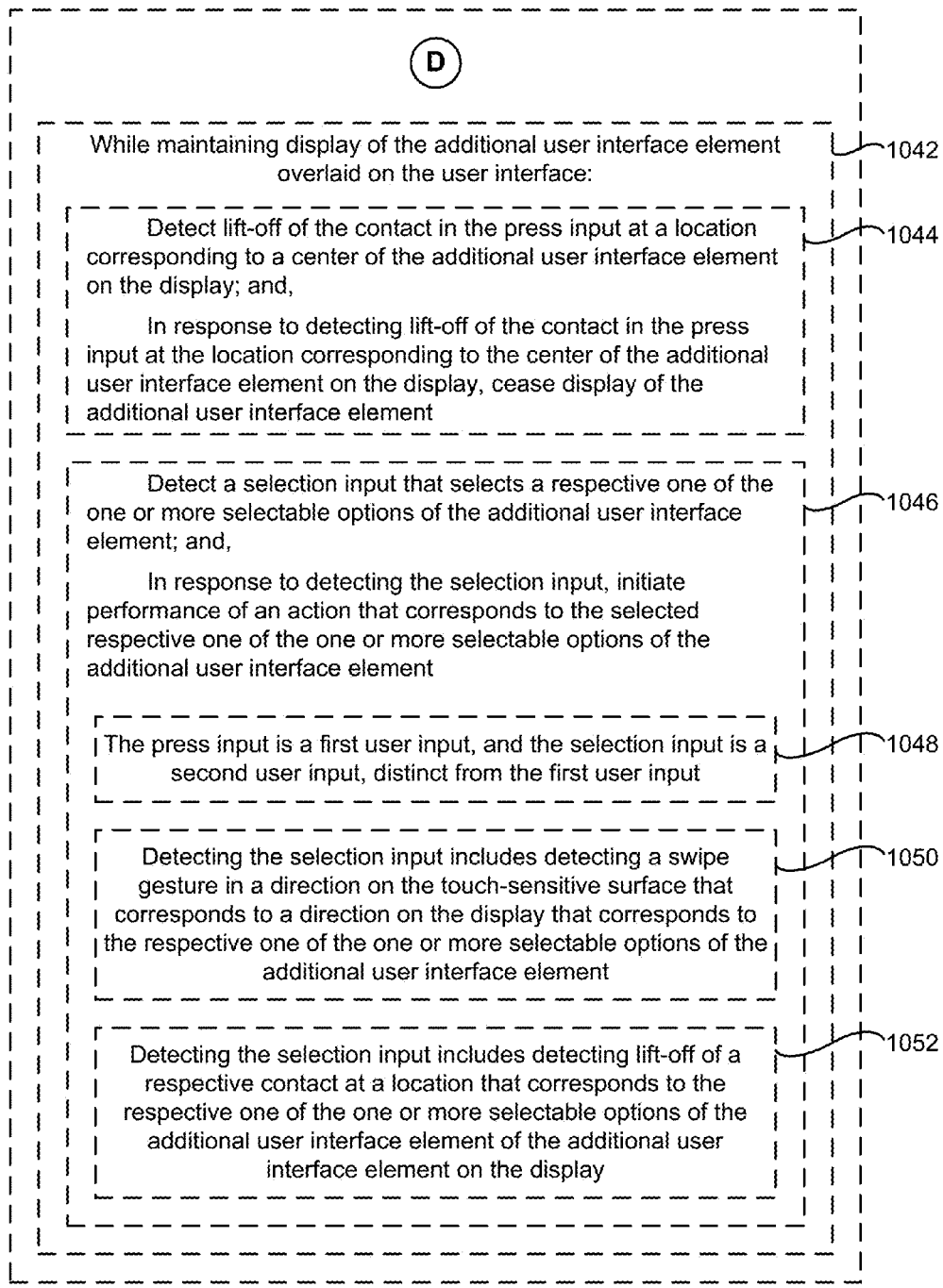
Figure 15A:
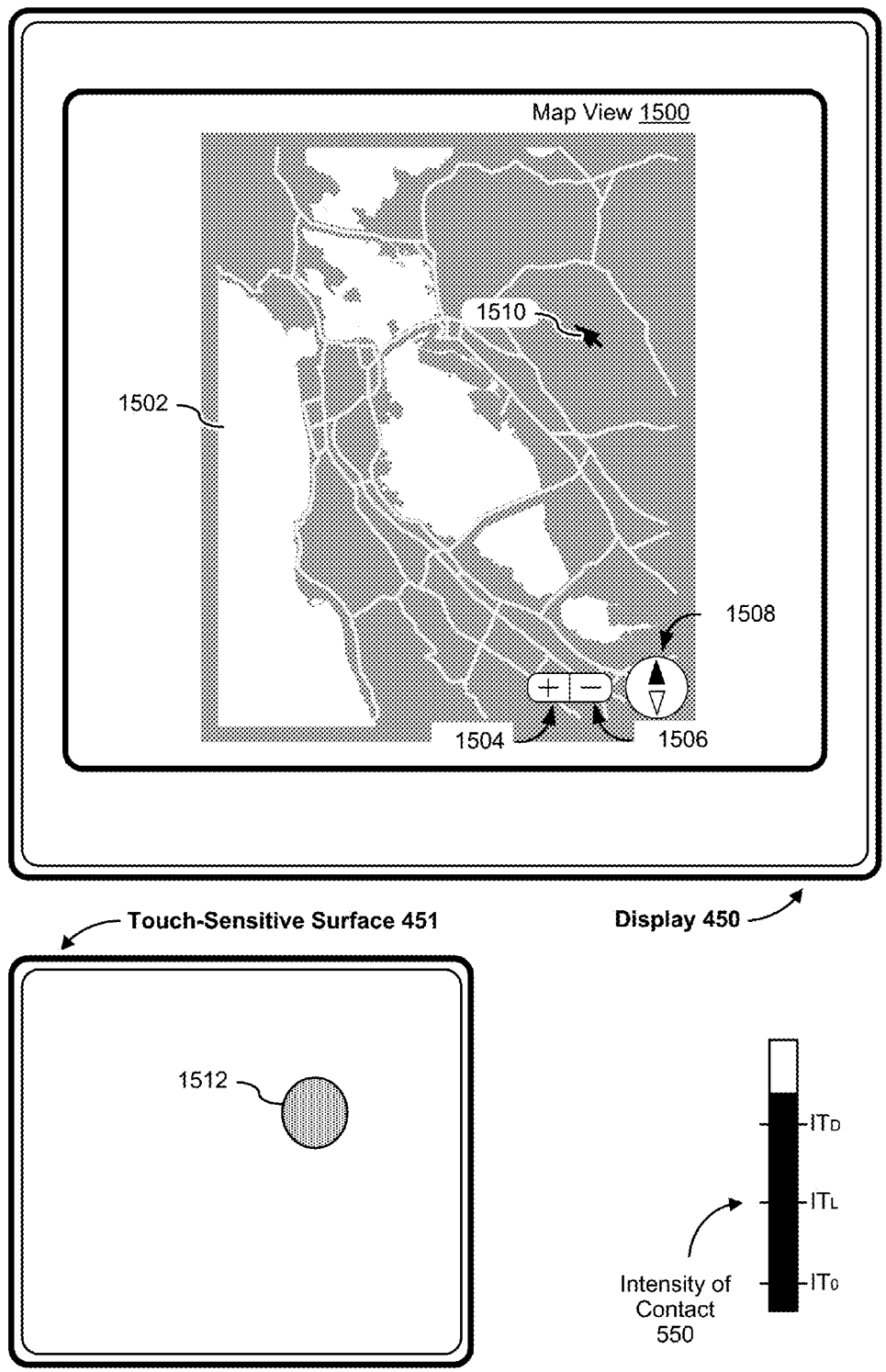
FIGS. 15A-15S illustrate exemplary user interfaces for interacting with a map in accordance with some embodiments.
Figure 15B:
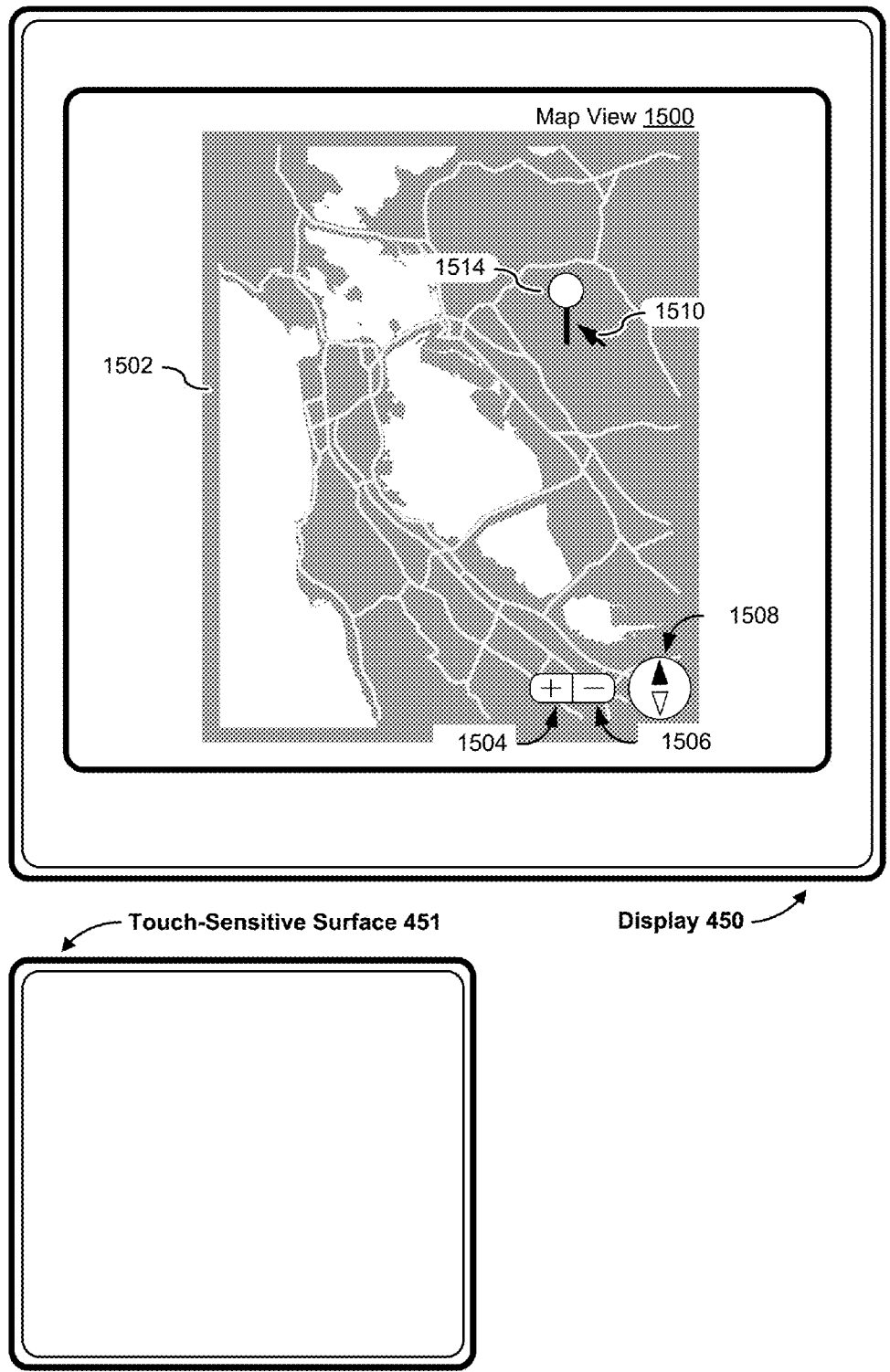
Figure 15S:
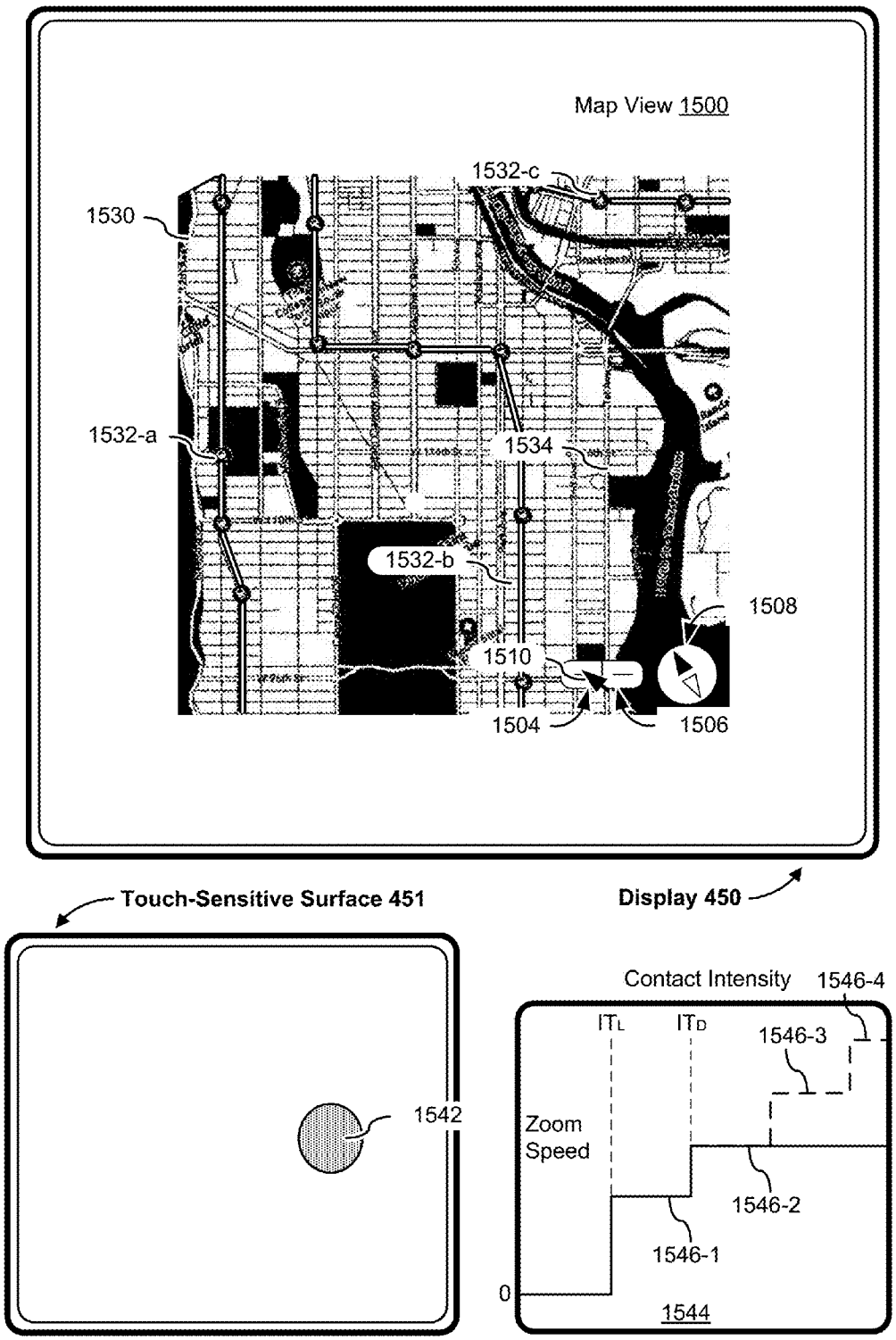
Figure 16A:
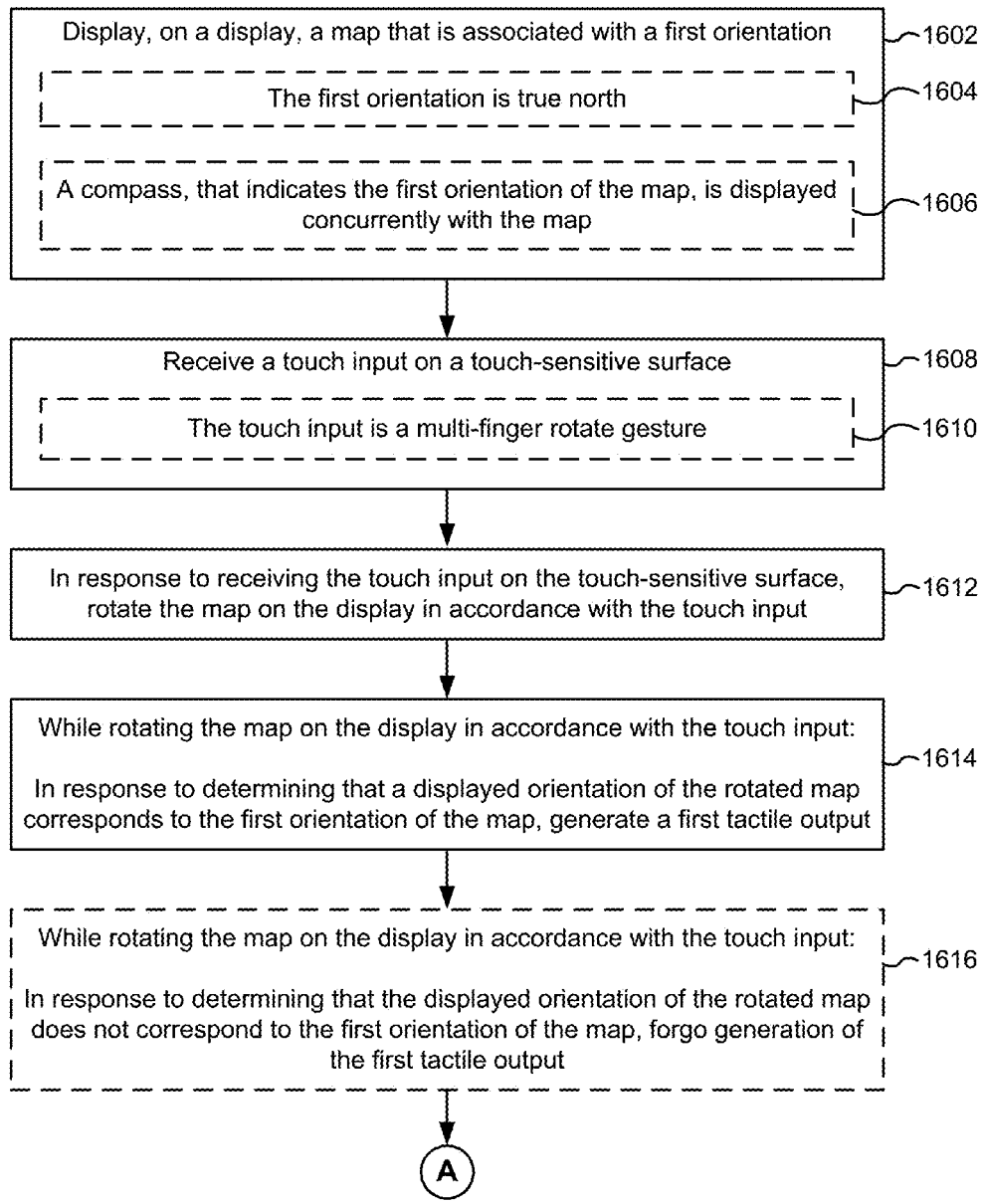
FIGS. 16A-16B illustrate a flow diagram of a method of generating a tactile (e.g., haptic) output when a user rotates display map into certain predetermined orientations in accordance with some embodiments.
Figure 16B:
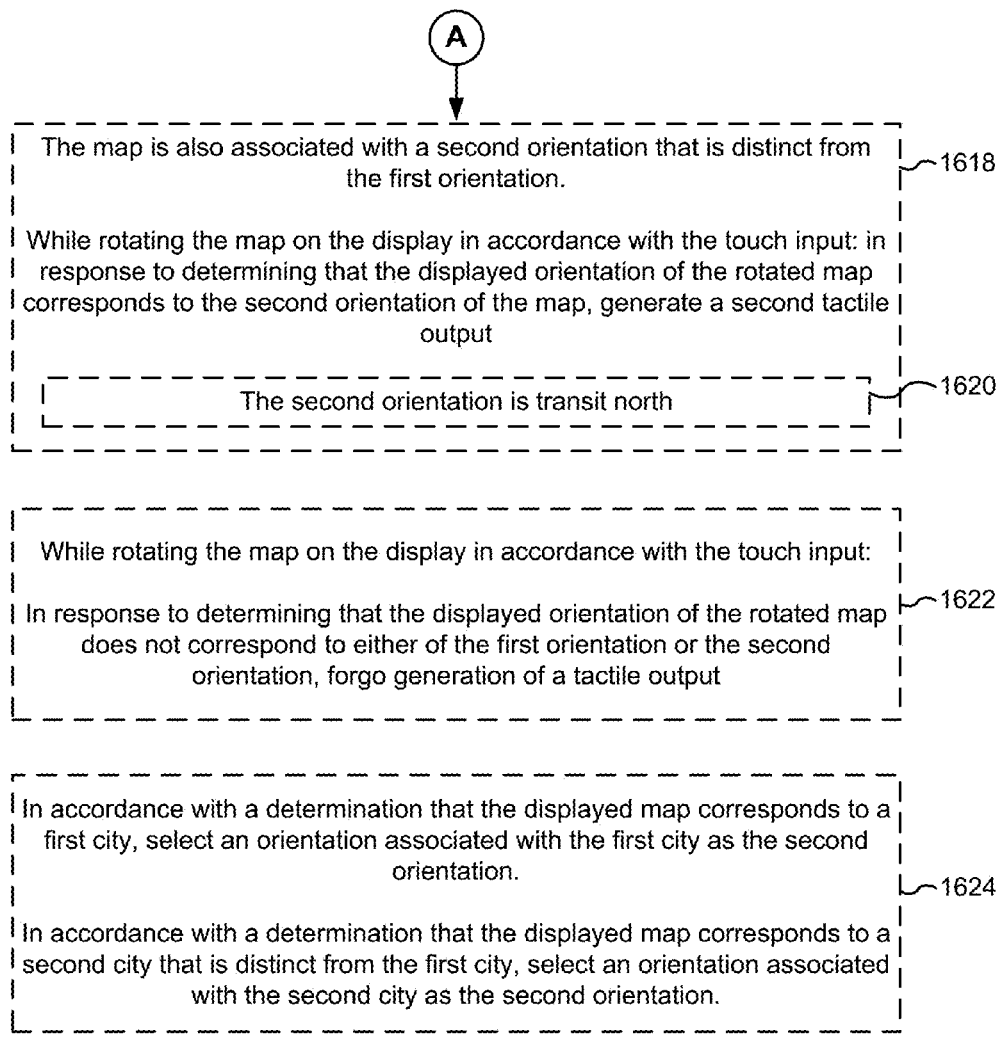

Below, FIGS. 1A-1B, 2, and 3 provide a description of exemplary devices. FIGS. 4A-4B, 5A-5NN, and 6A-6X illustrate exemplary user interfaces for displaying and using menus. FIGS. 7A-7F illustrate a flow diagram of a method of displaying and using menus. FIGS. 8A-8B illustrate a flow diagram of another method of displaying and using menus. FIGS. 9A-9C illustrate a flow diagram of yet another method of displaying and using menus. FIGS. 10A-10D illustrate a flow diagram of yet another method of displaying and using menus. FIGS. 15A-15S illustrate exemplary user interfaces for interacting with maps. FIGS. 16A-16B illustrate a flow diagram of a method of generating tactile (e.g., haptic) outputs when a user rotates a displayed map into certain predetermined directions. The user interfaces in FIGS. 5A-5NN, 6A-6X, and 15A-15S, are used to illustrate the processes in FIGS. 7A-7F, 8A-8B, 9A-9C, 10A-10D, and 16A-16B.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
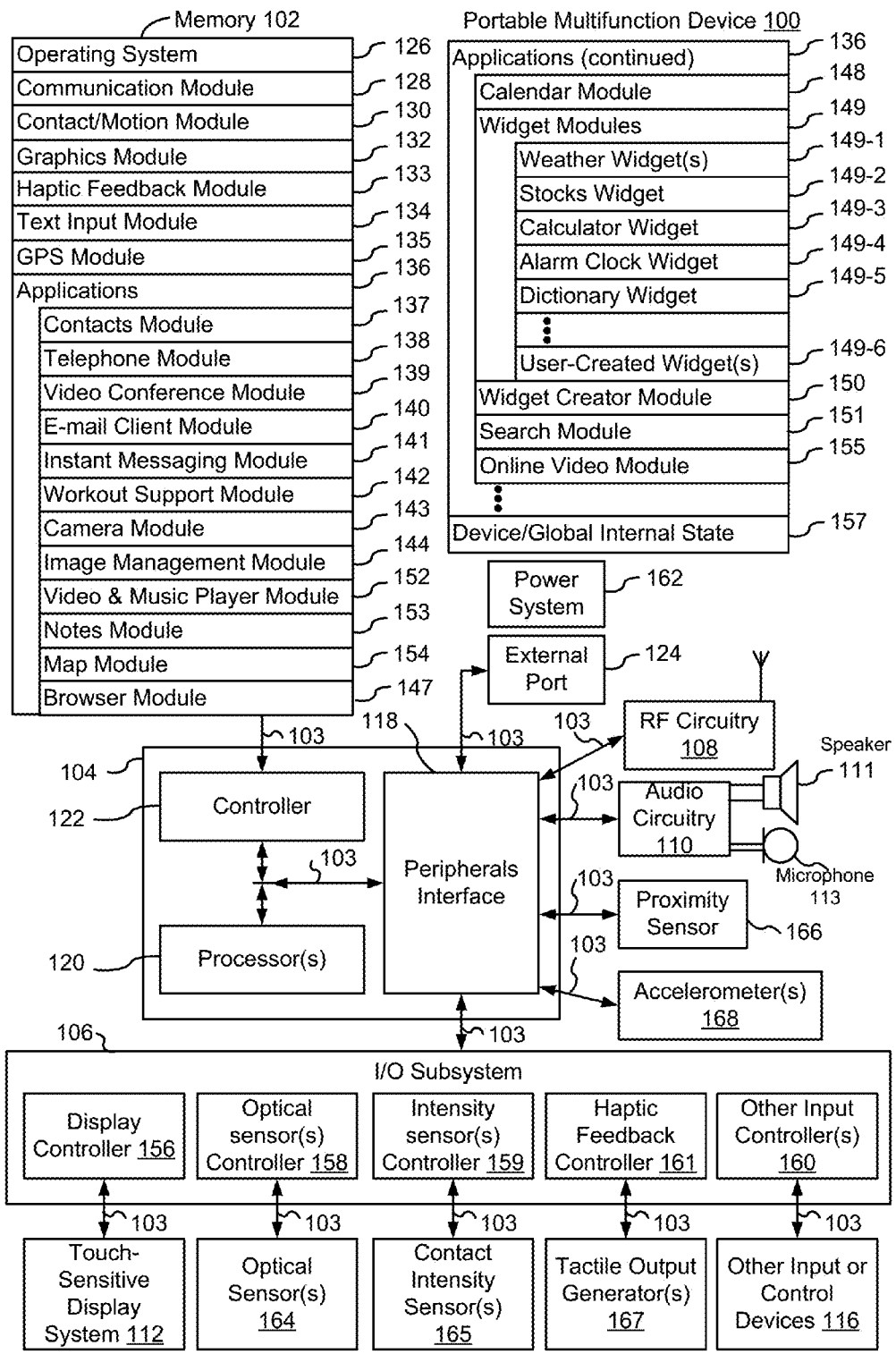
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
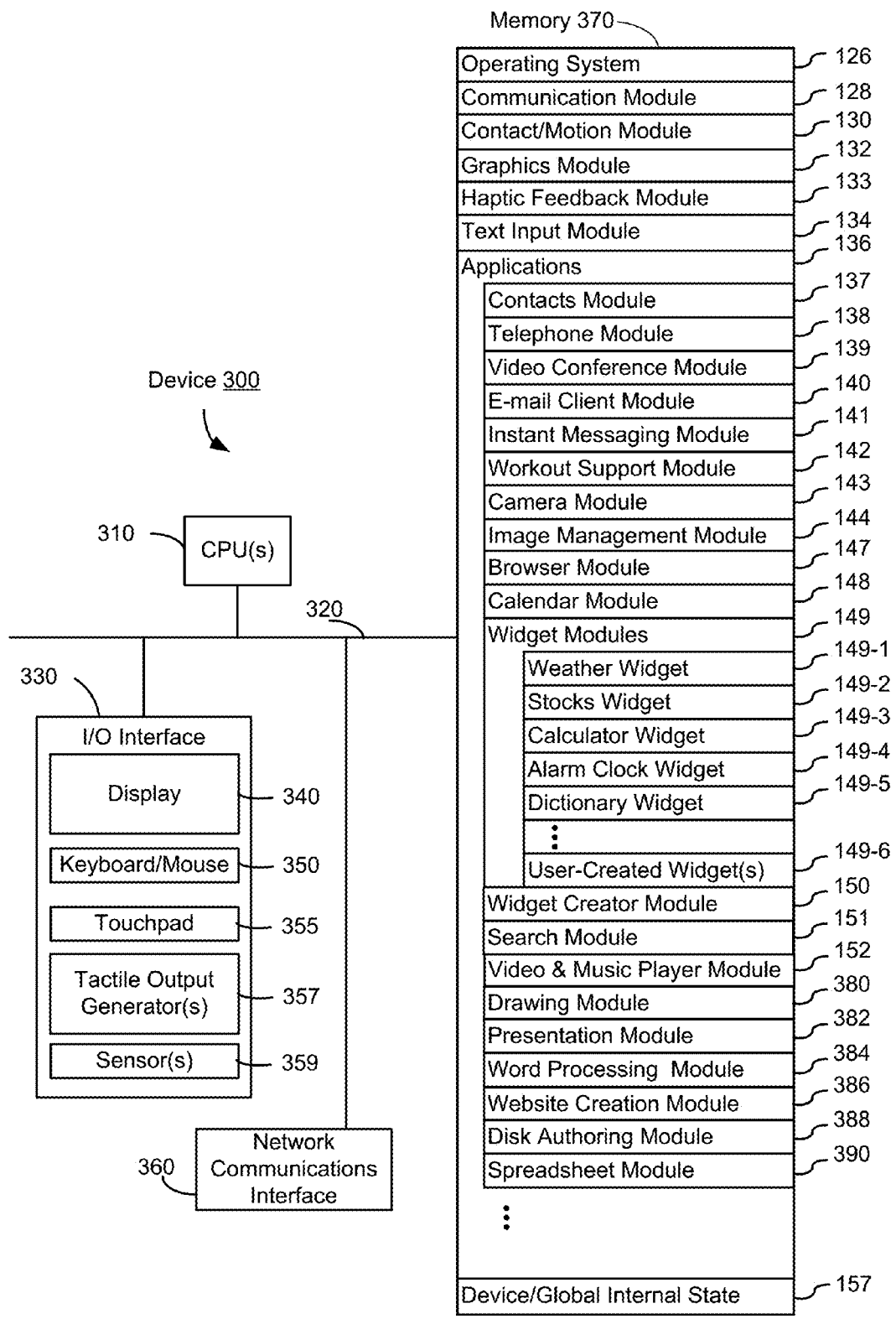
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
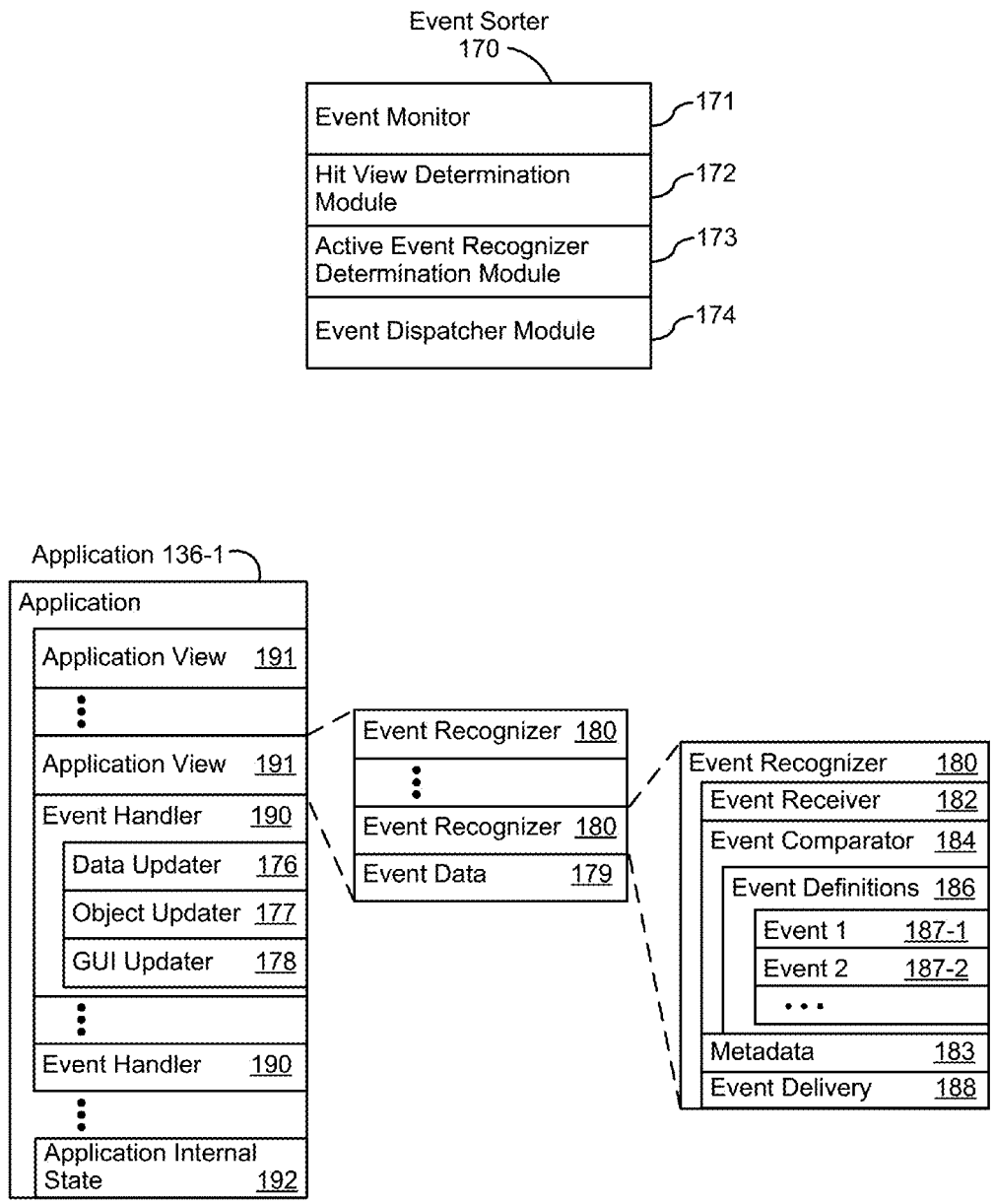
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally uses or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the forgoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally used as inputs corresponding to sub-events which define an event to be recognized.

Figure 2:
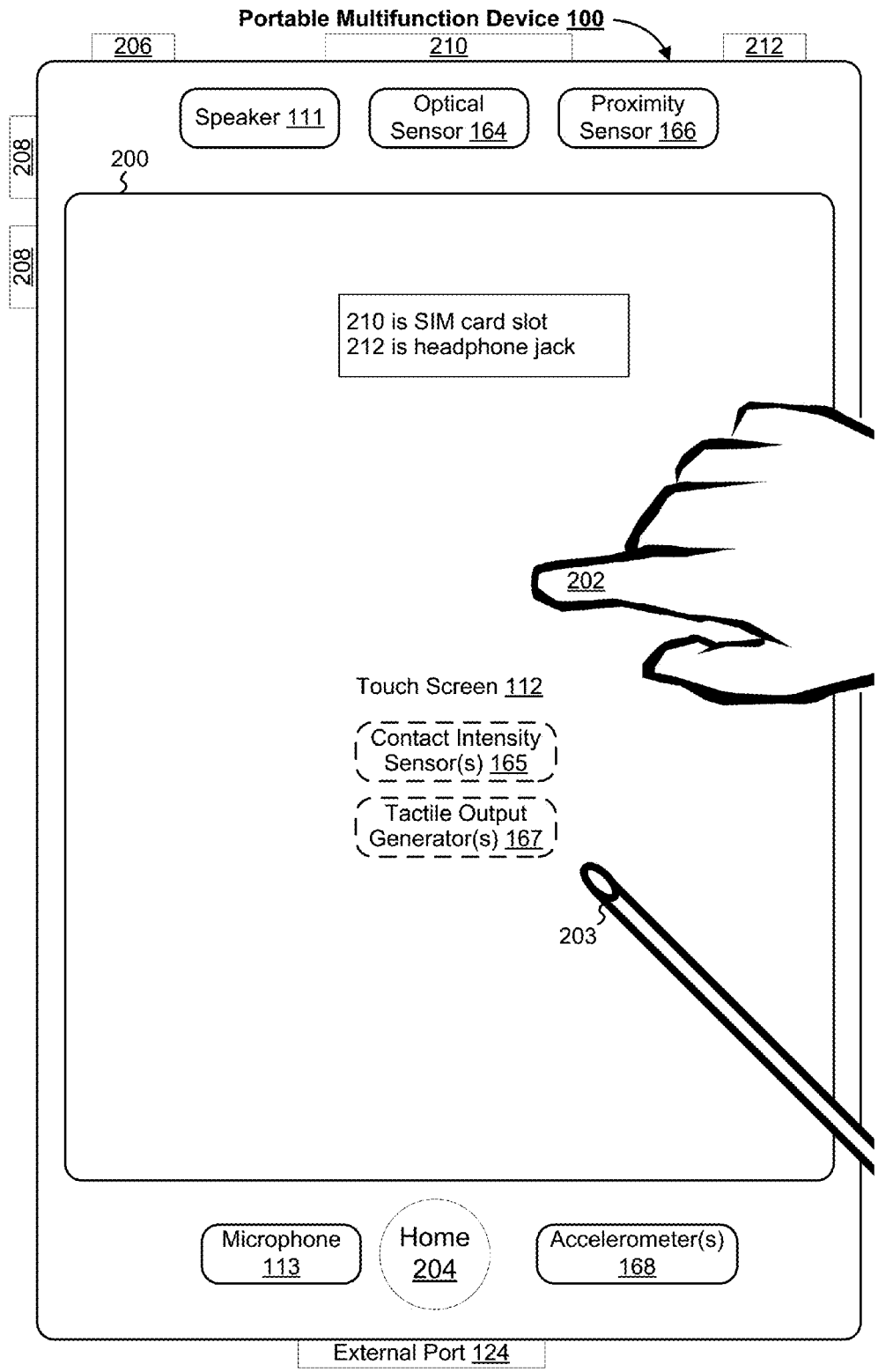
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
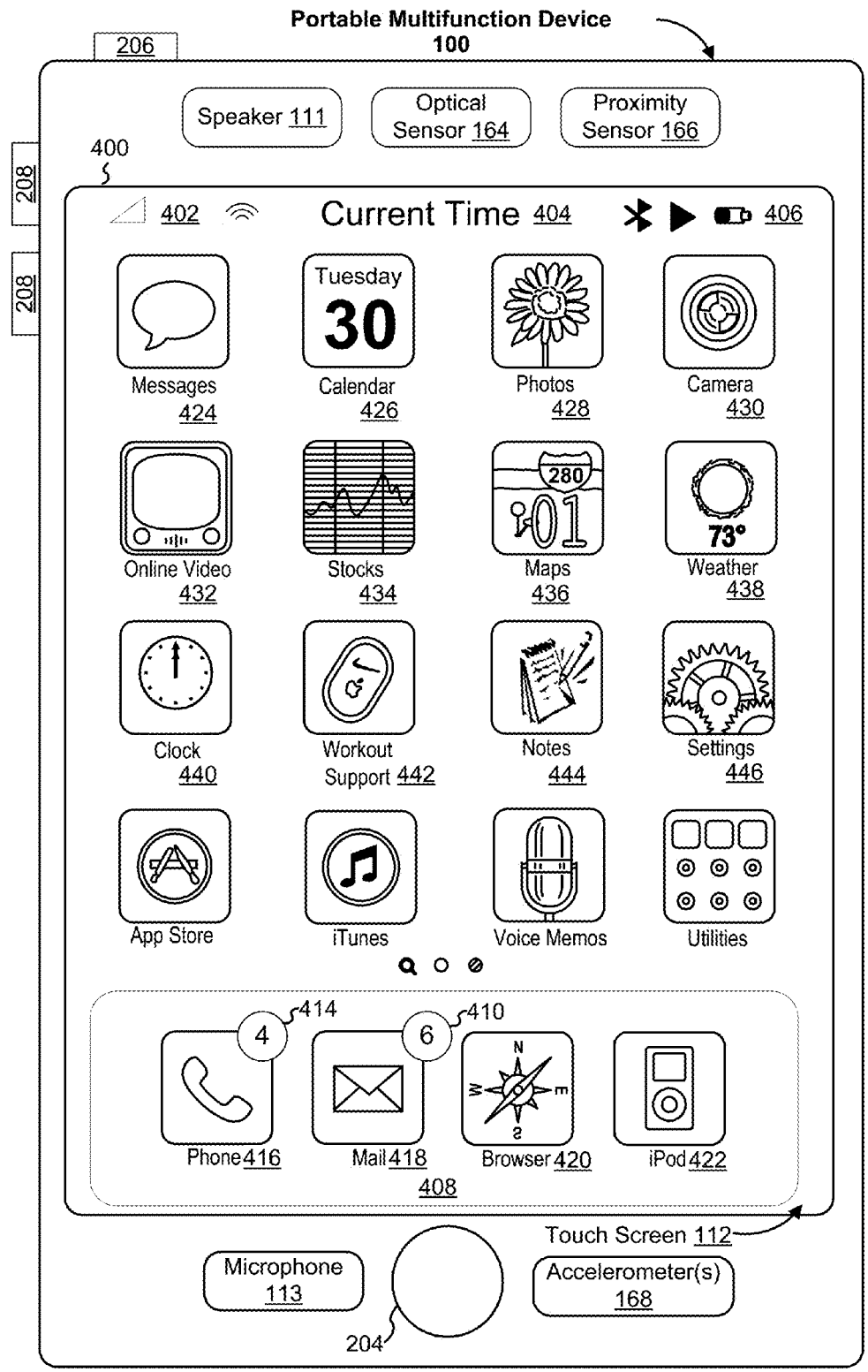
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
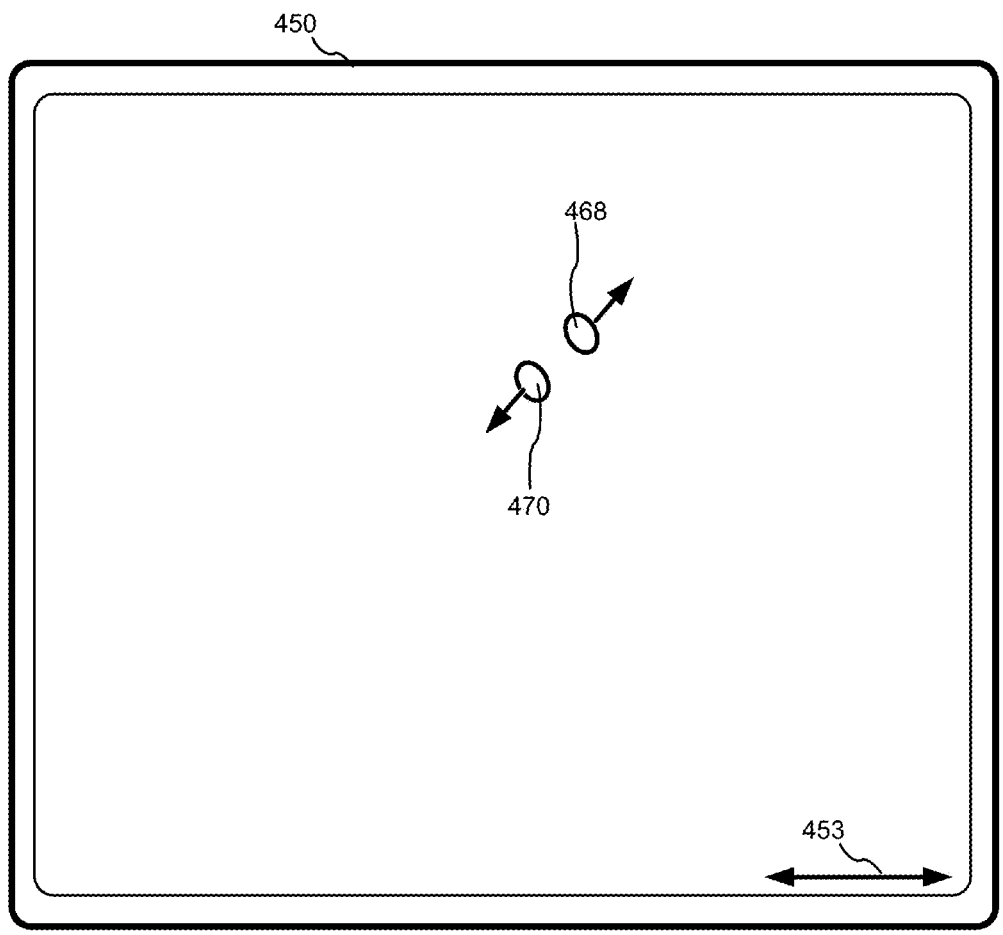
FIG. 4B illustrates an exemplary user interface for a multifunction device with a touch-sensitive surface that is separate from the display in accordance with some embodiments.
Figure 4B:
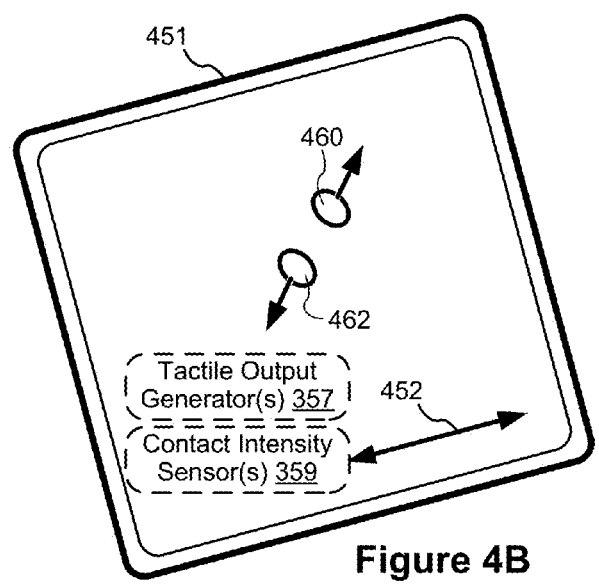

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Many of the examples that follow will be given with reference to a device that detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein (e.g., FIGS. 5A-5NN, 6A-6X, and 15A-15S) optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
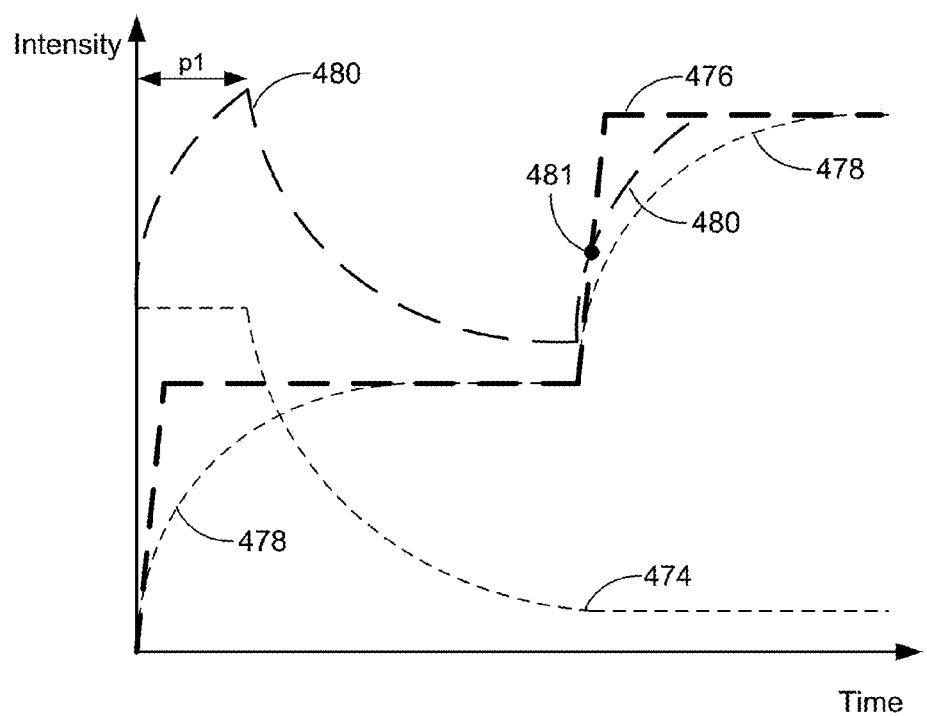
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
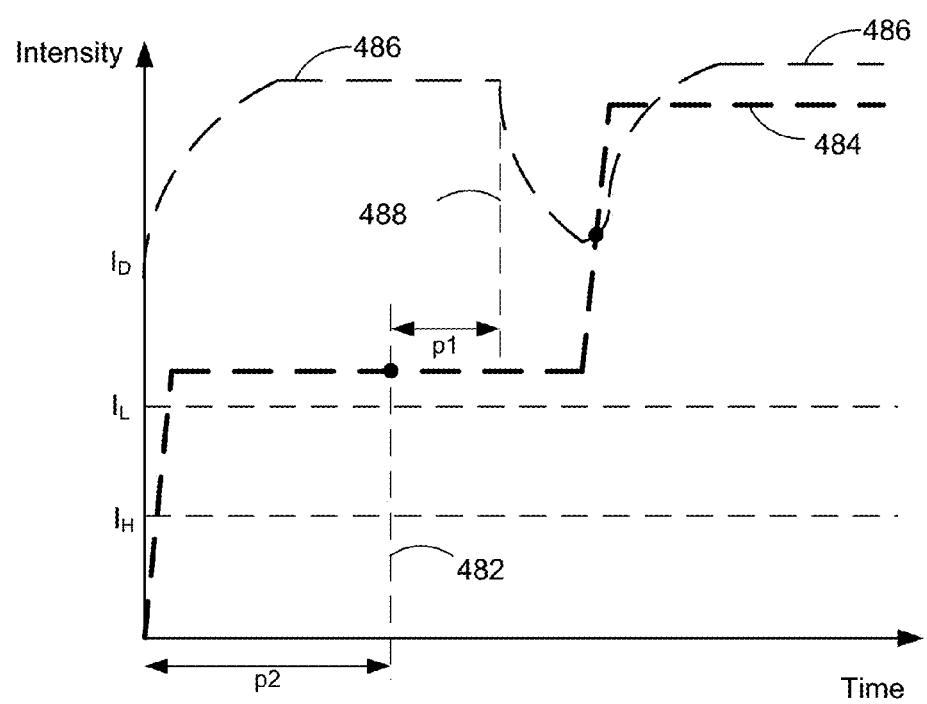

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
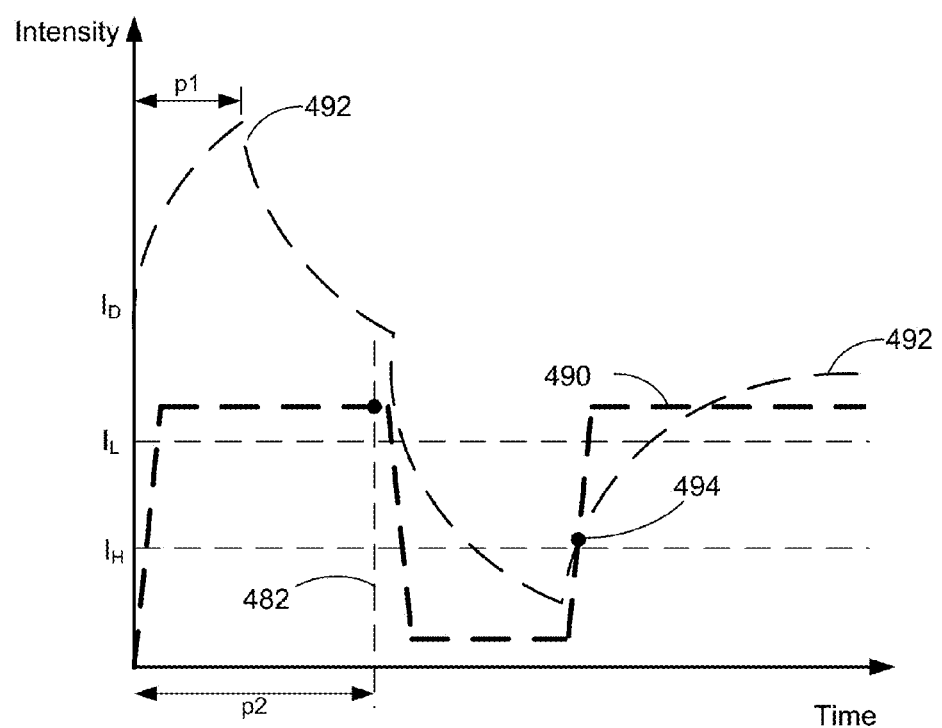

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" (sometimes also called "touch-down") of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" (sometimes also called "lift-off") of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiment, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

Figure 5A:
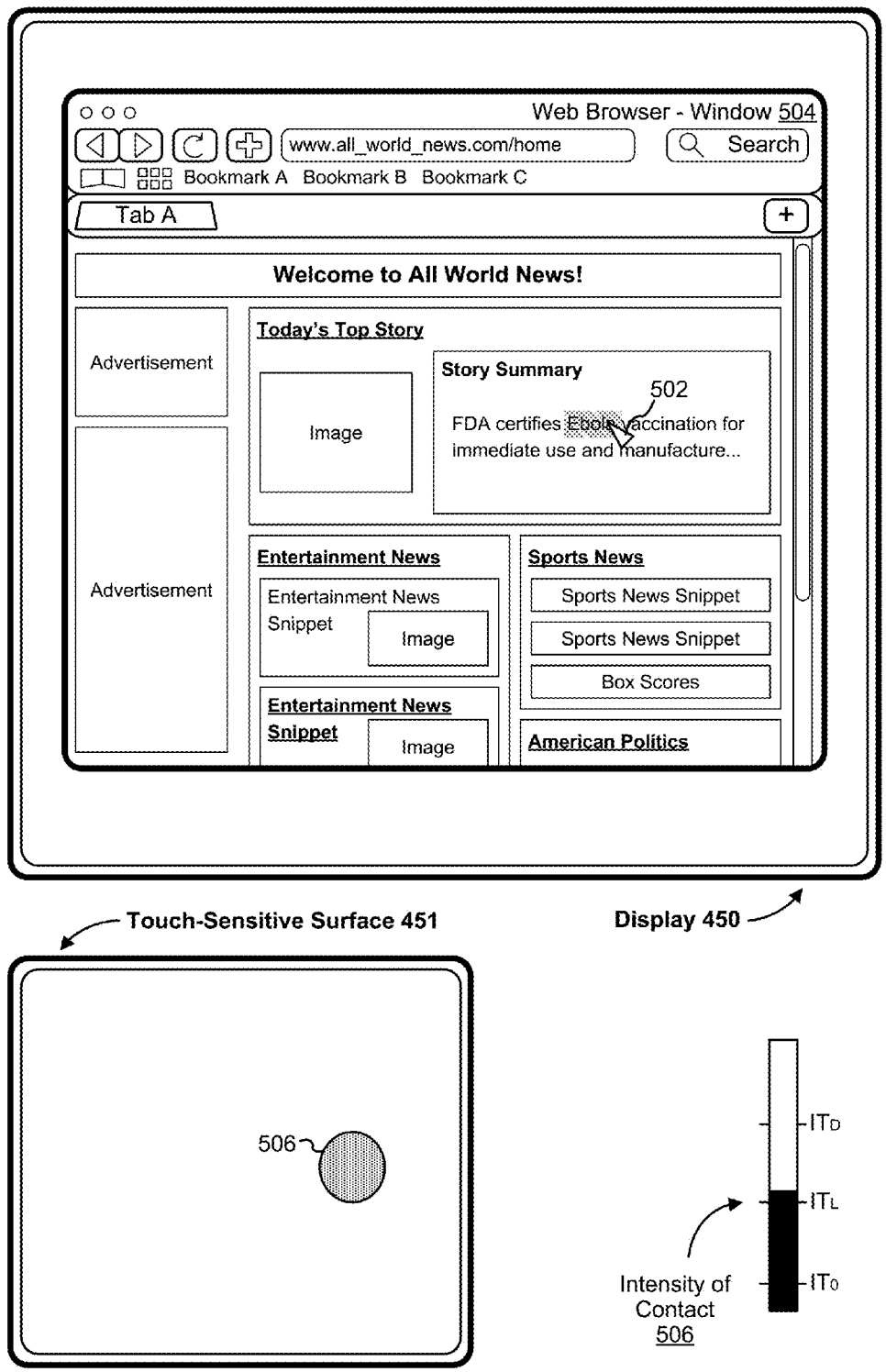
FIGS. 5A-5NN illustrate exemplary user interfaces for displaying and using menus in accordance with some embodiments.
Figure 5B:
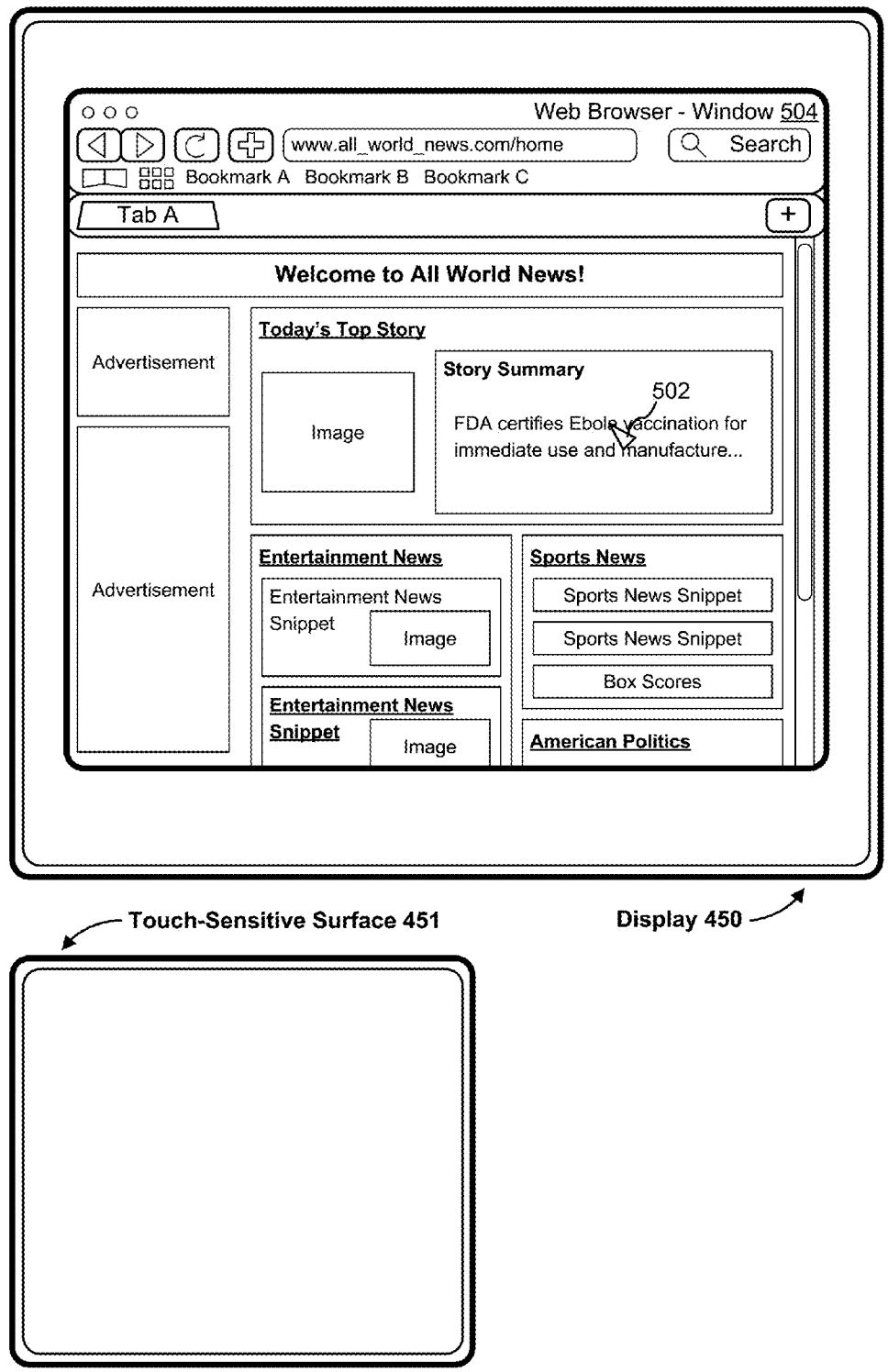
Figure 5C:
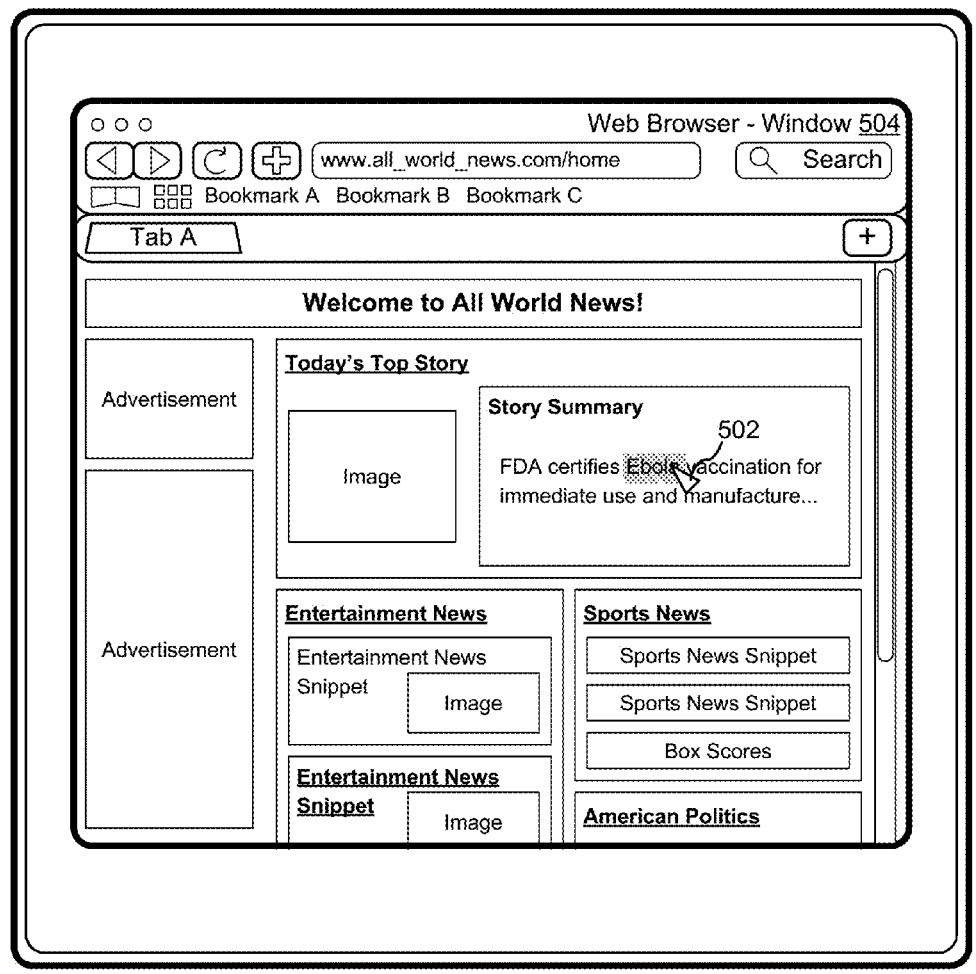
Figure 5C:
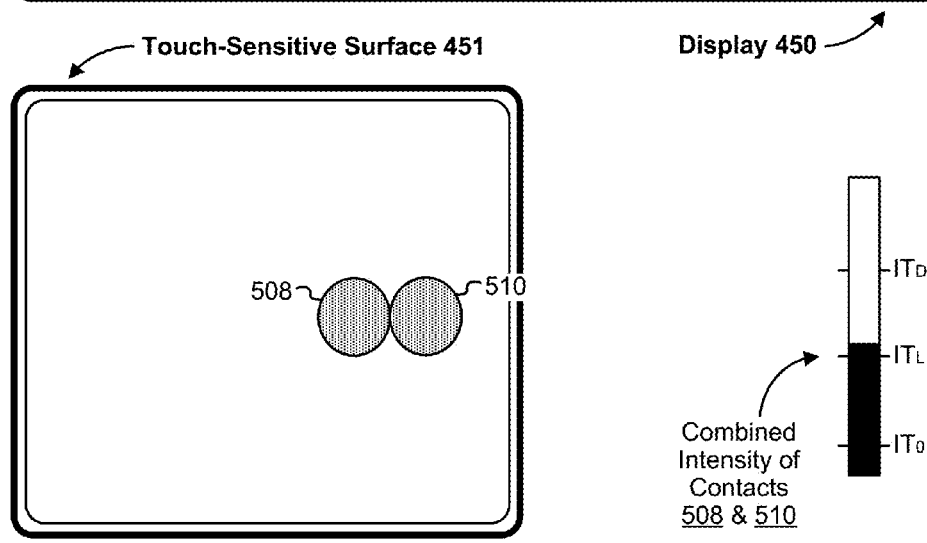
Figure 5D:
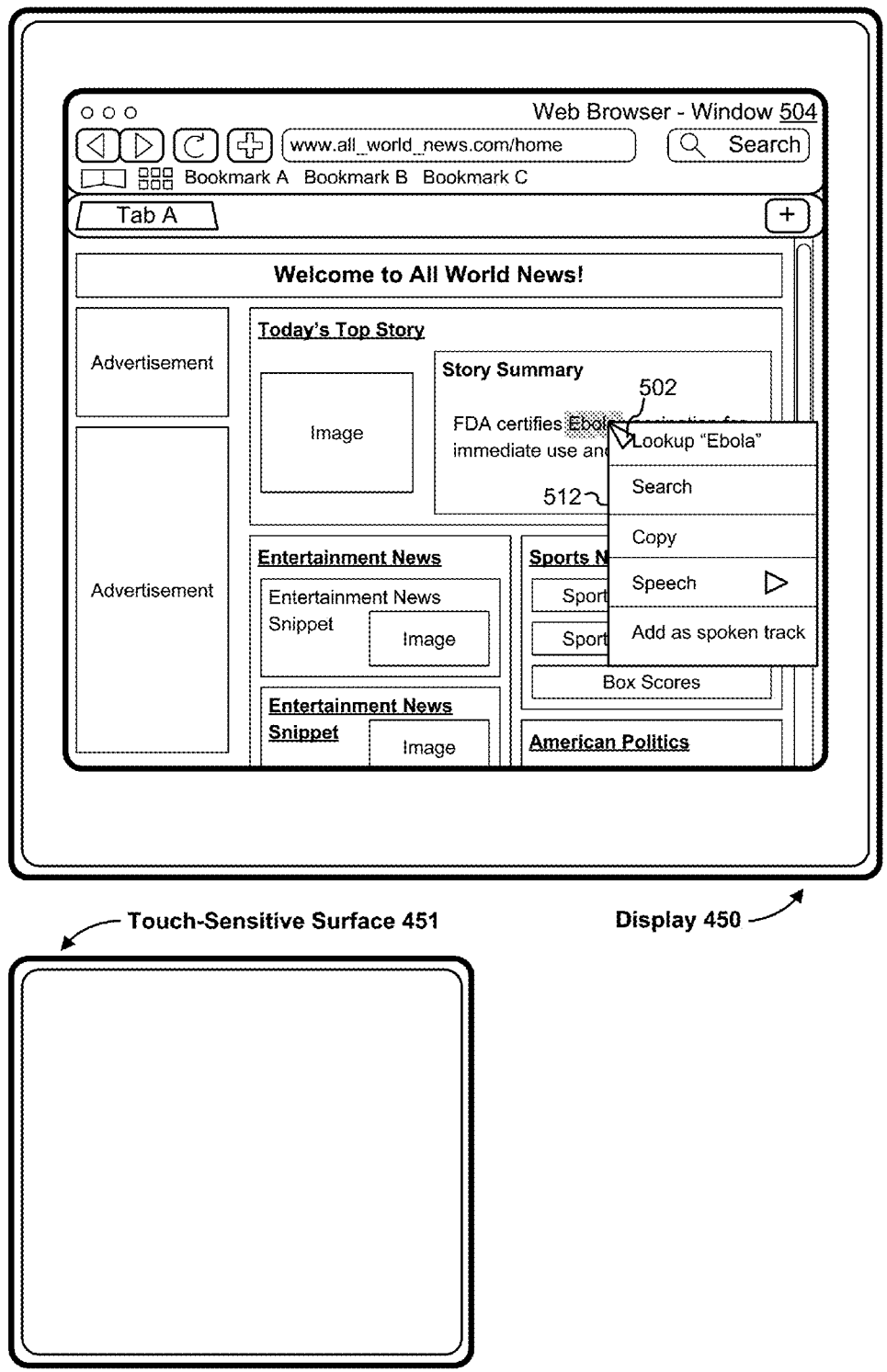
Figure 5E:
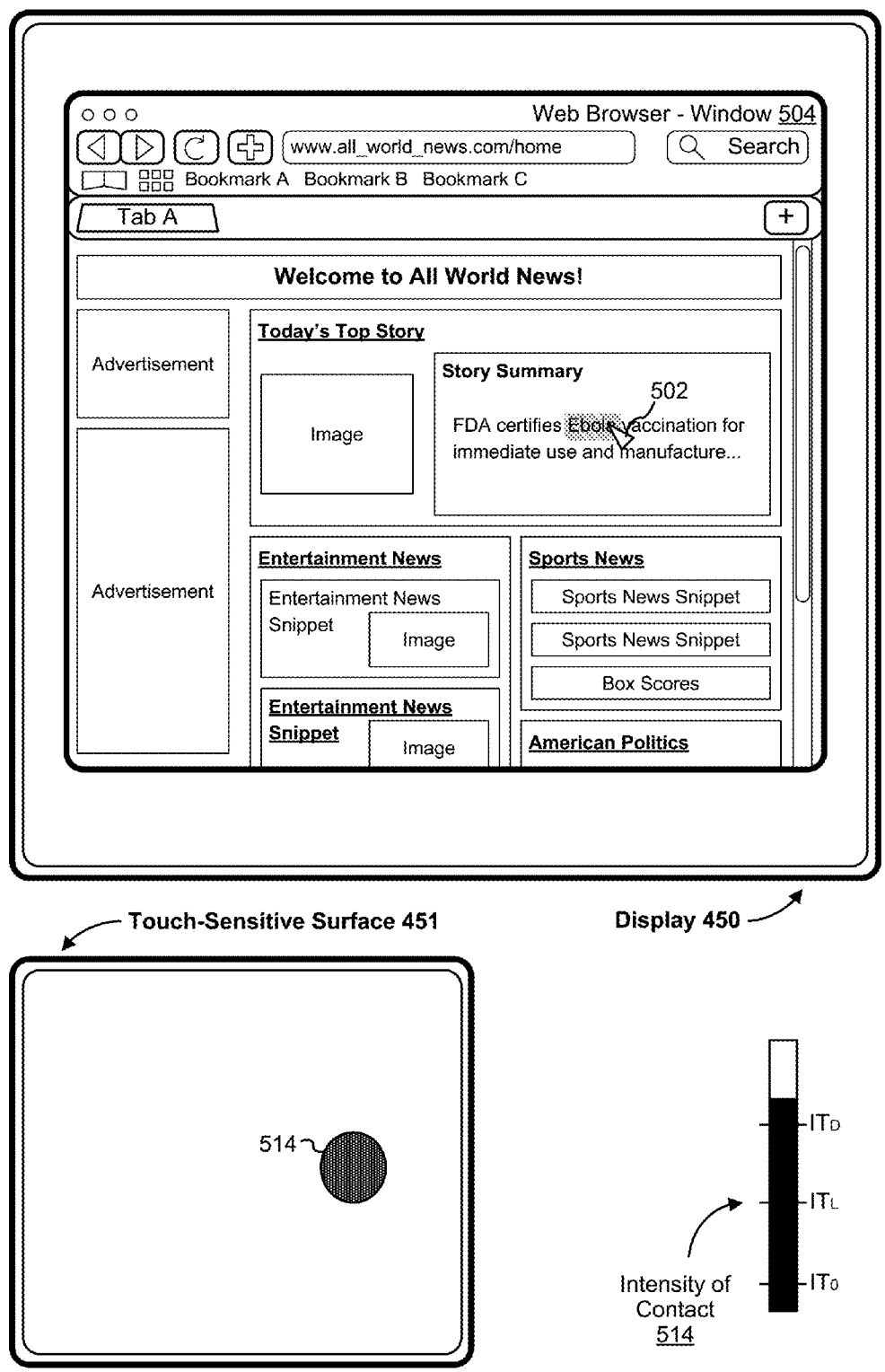
Figure 5F:
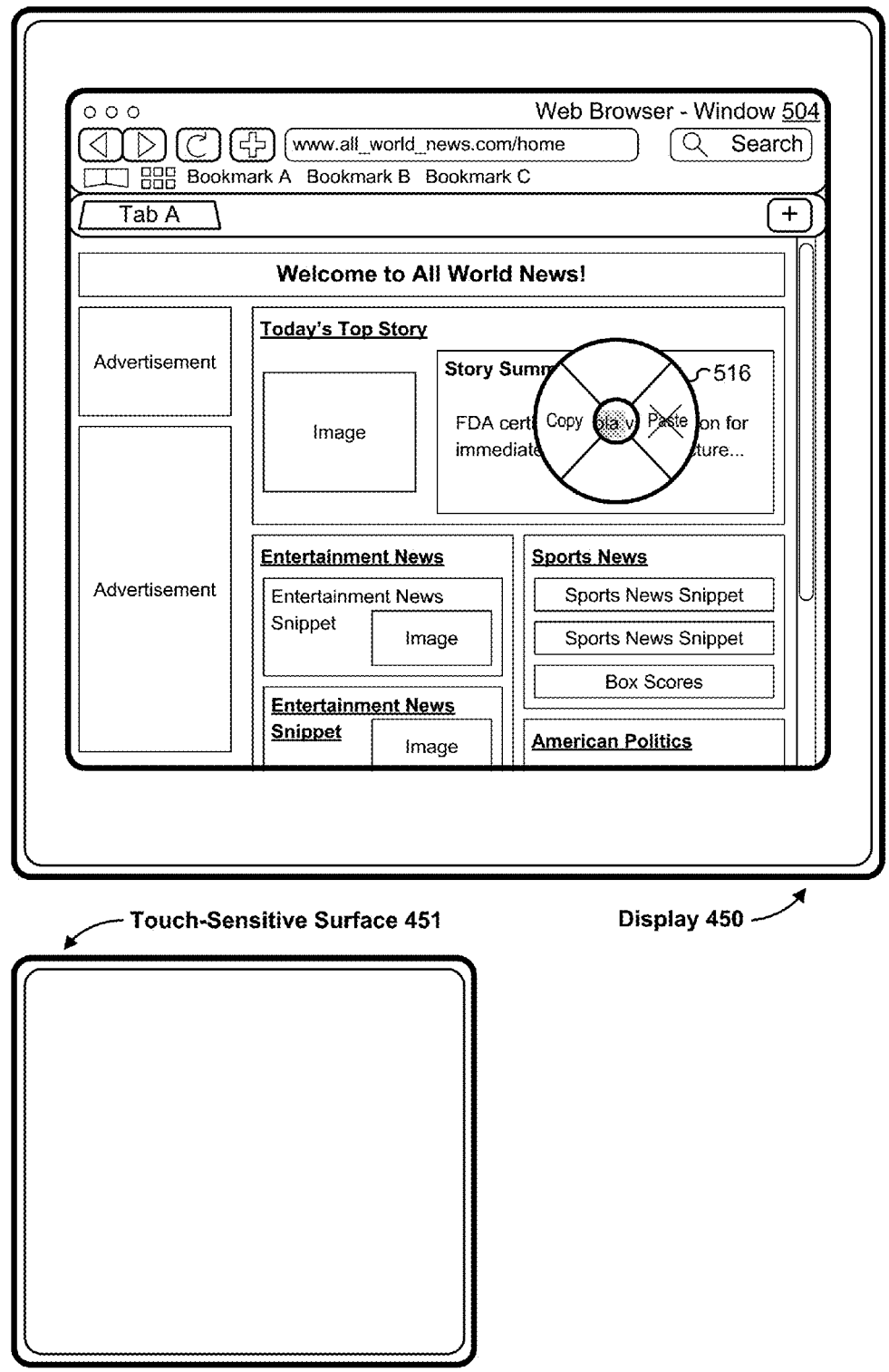
Figure 5G:
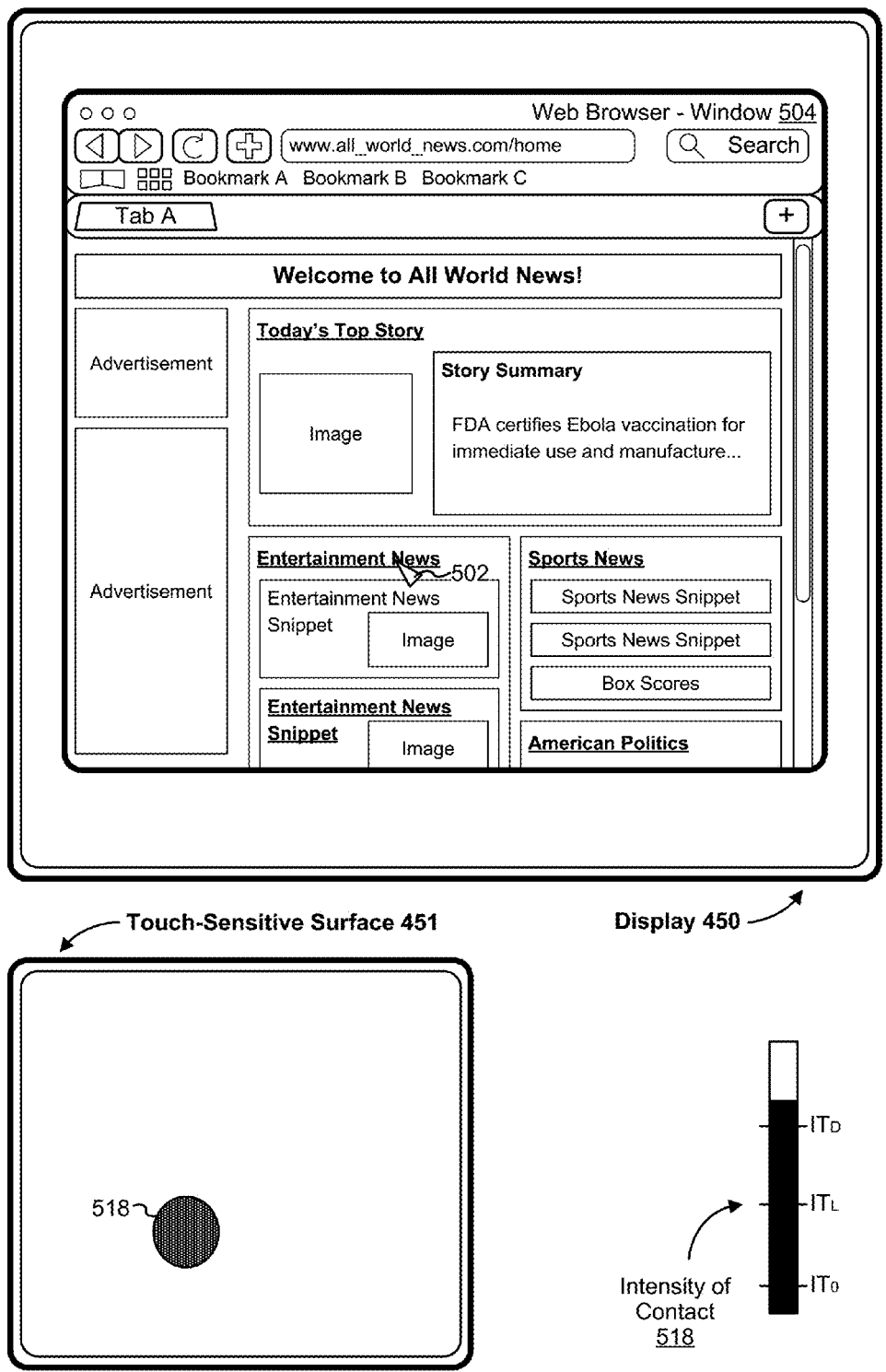
Figure 5H:
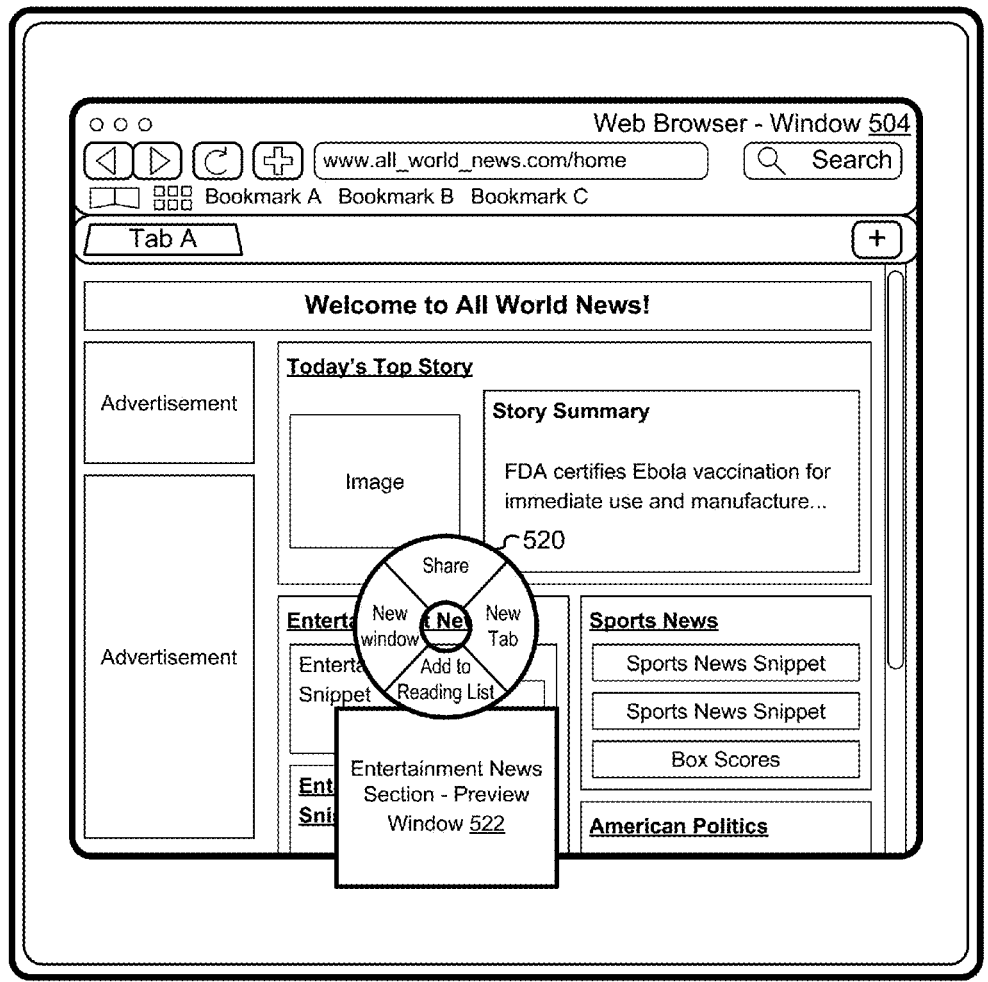
Figure 5H:
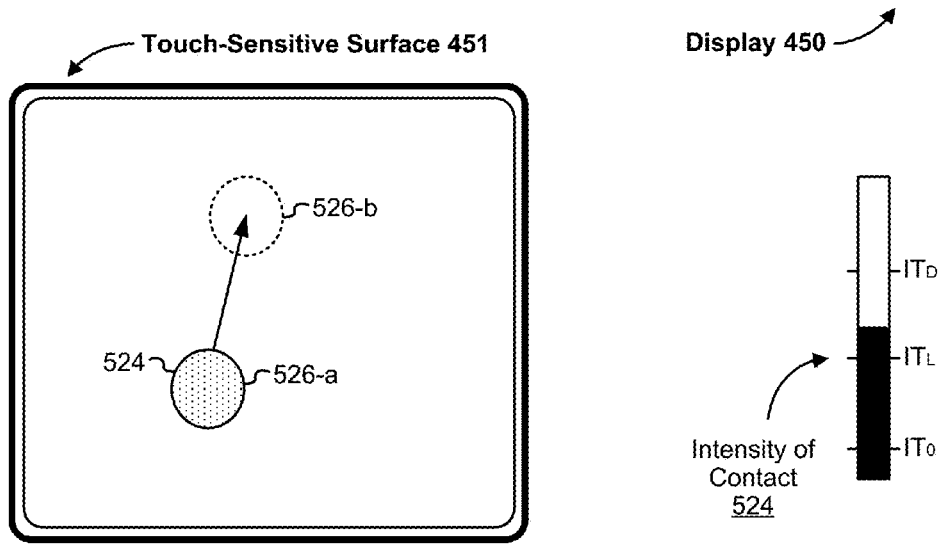
Figure 5I:
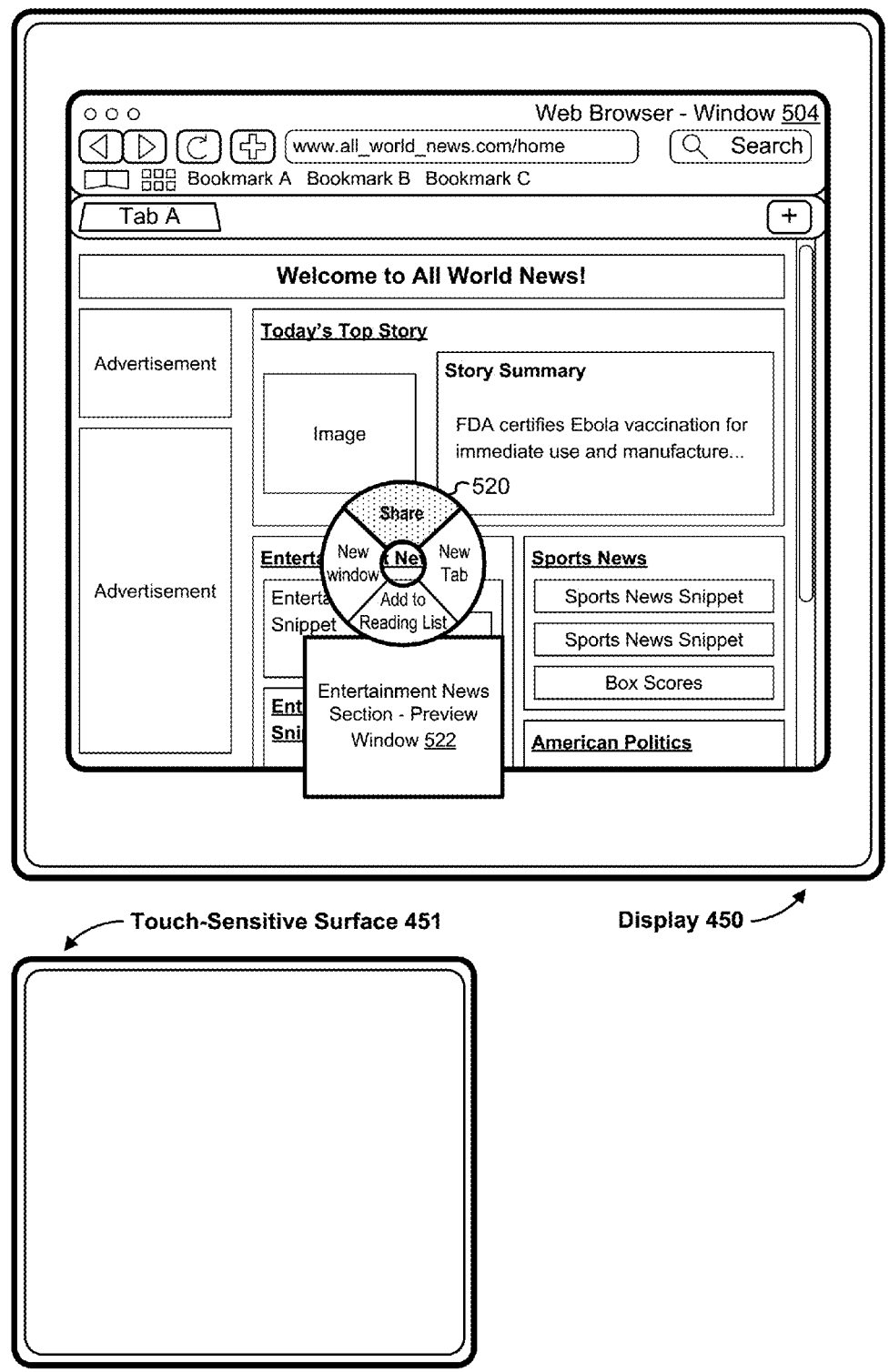
Figure 5J:
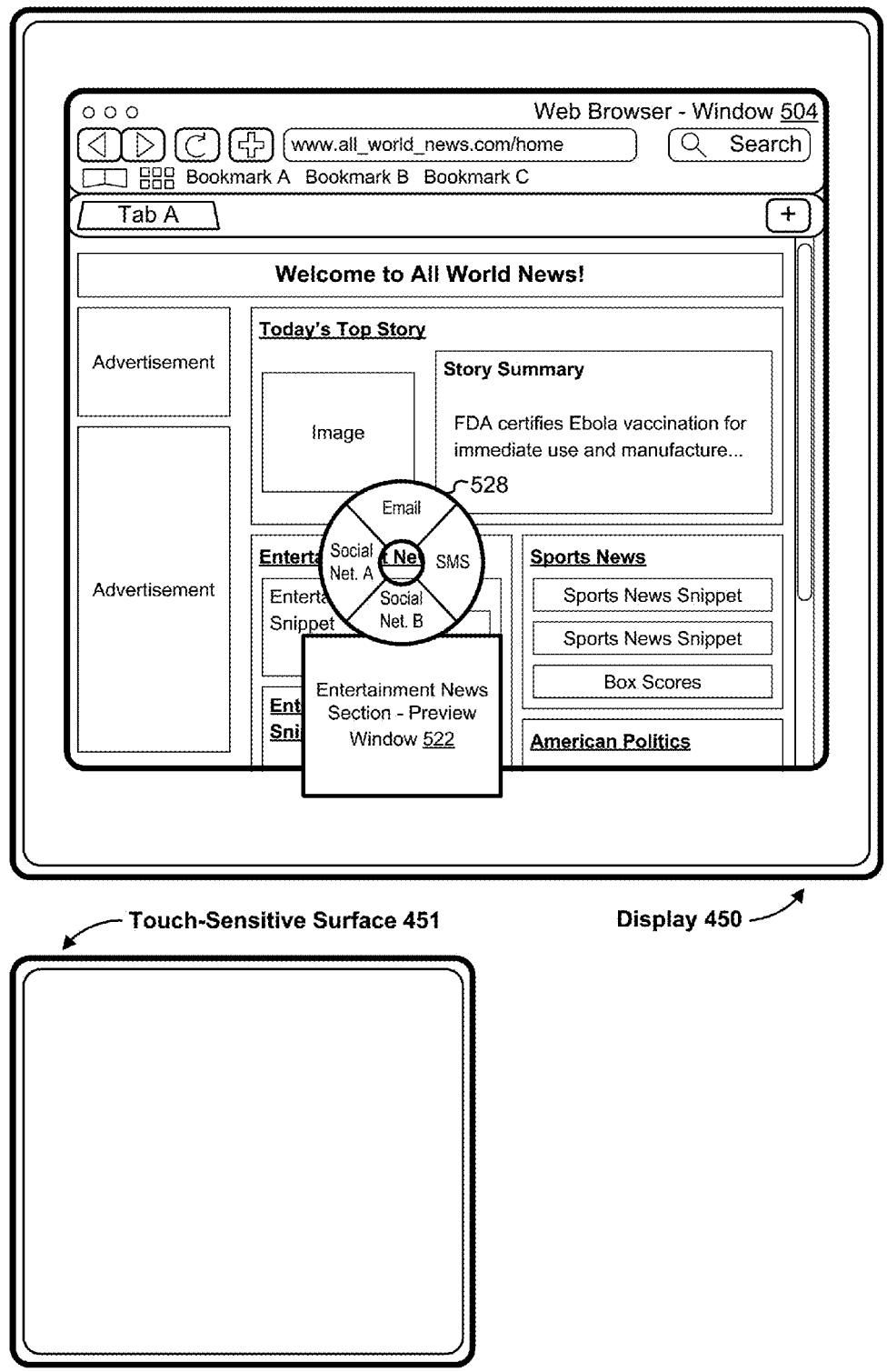
Figure 5K:
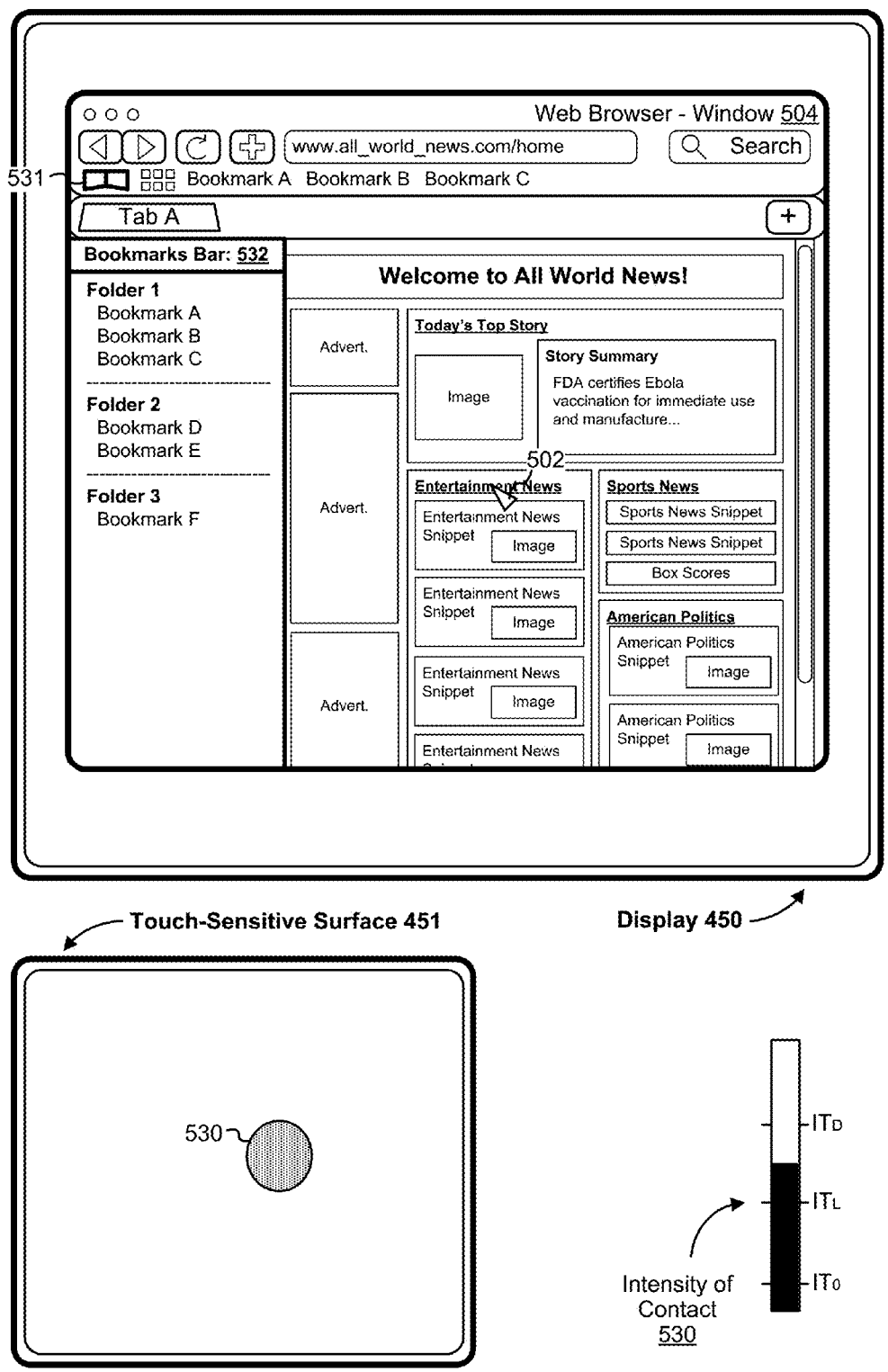
Figure 5L:
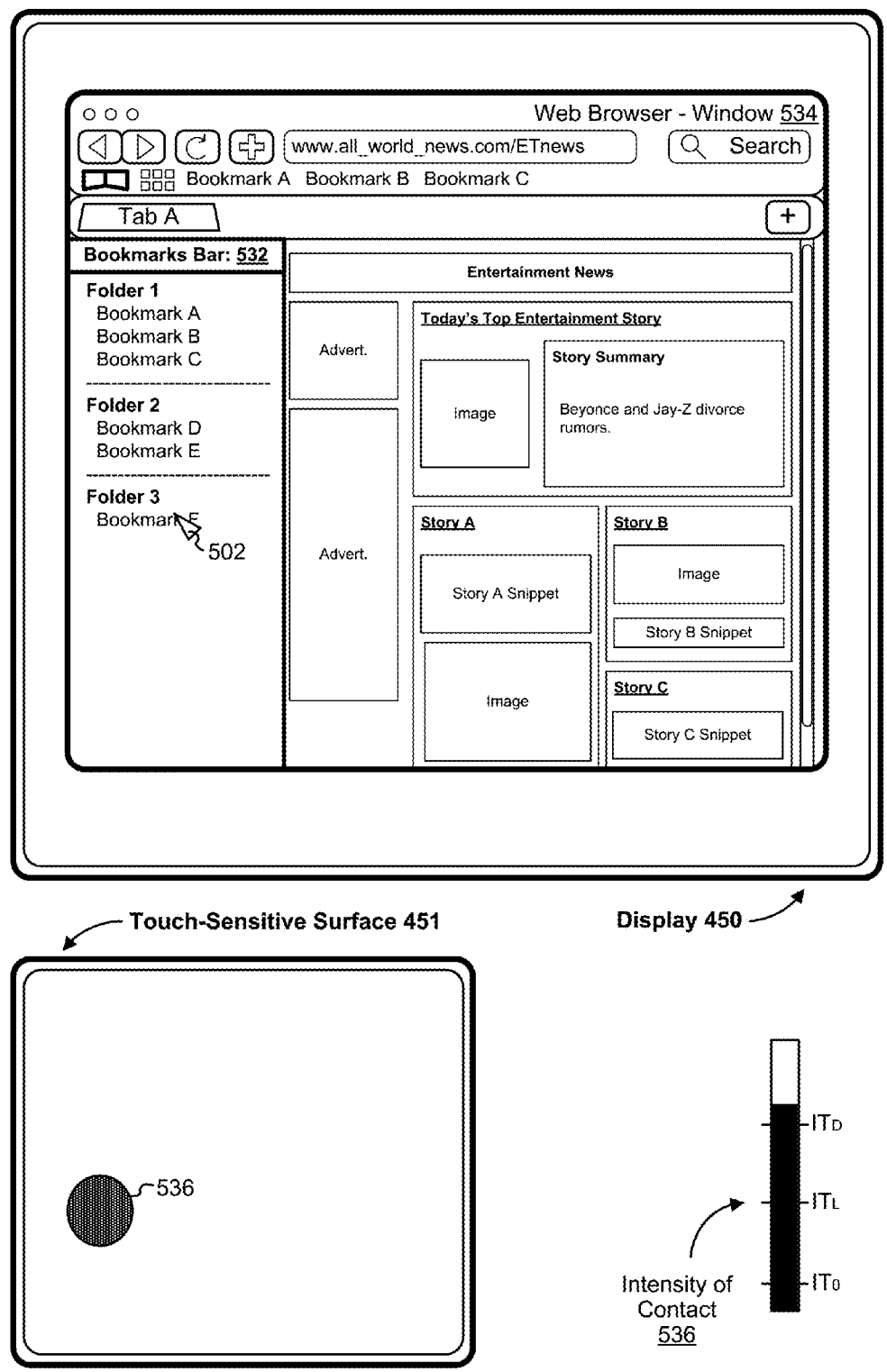
Figure 5M:
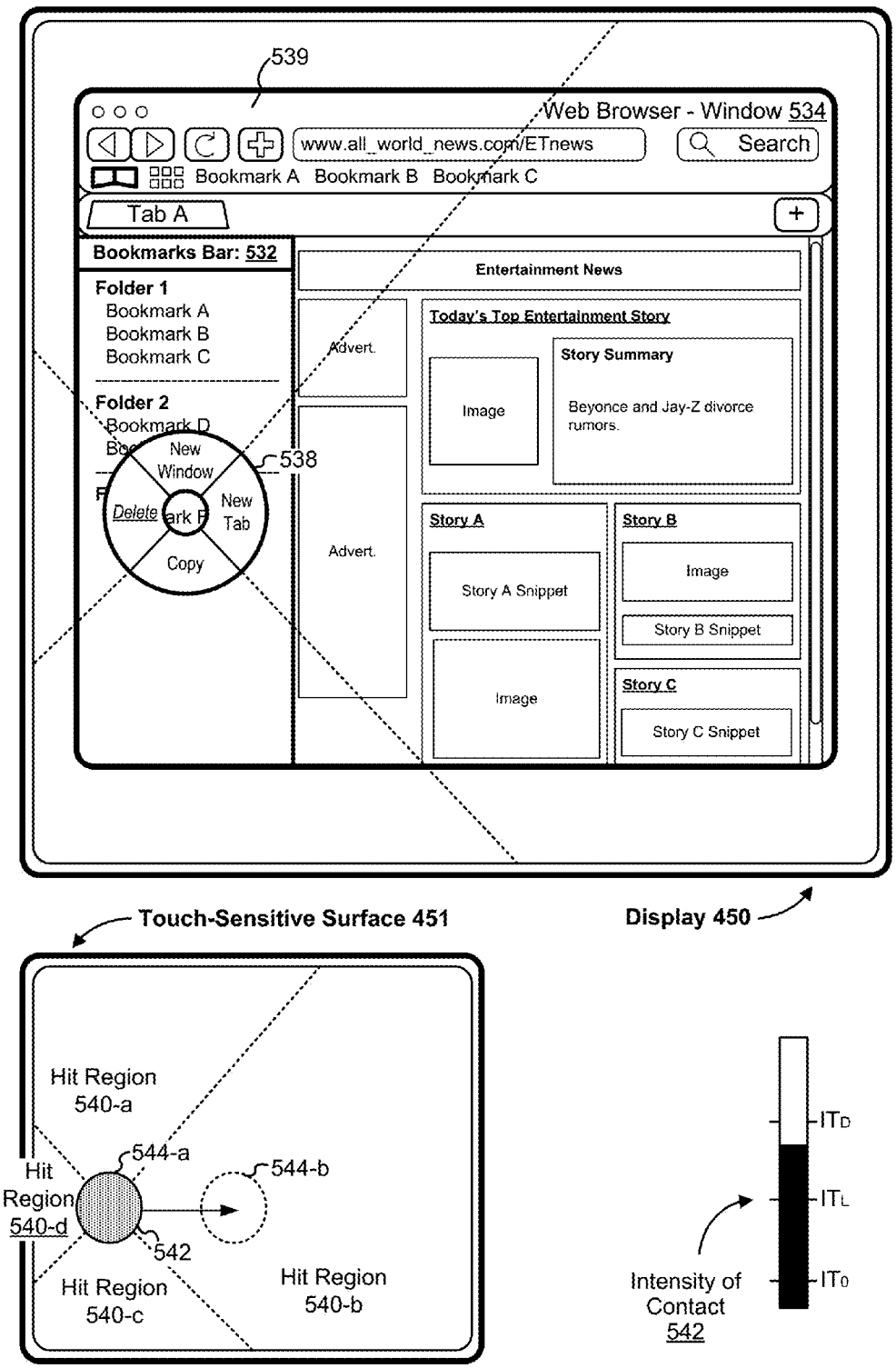
Figure 5N:
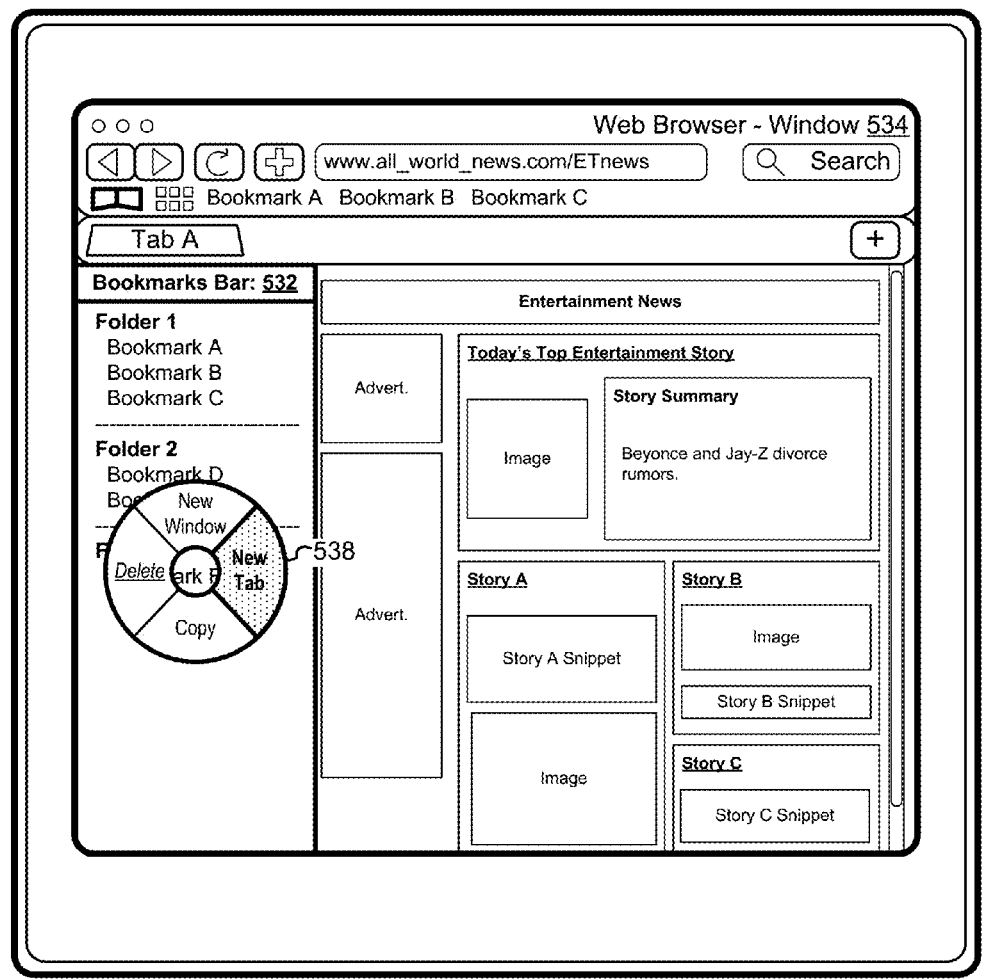
Figure 5N:
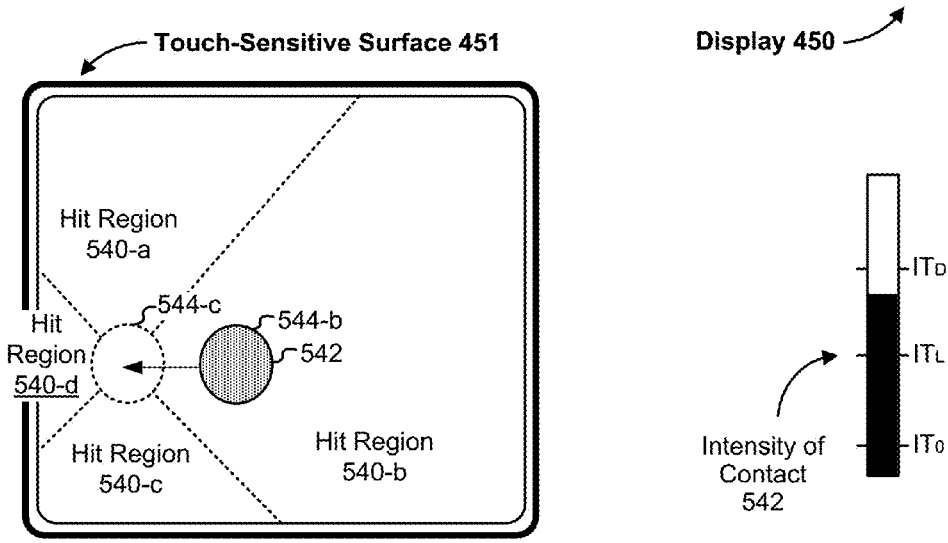

FIGS. 5A-5NN illustrate exemplary user interfaces for displaying and using menus in accordance with some embodiments. The user interfaces in these figures are used to illustrate the processes described below, including the processes in FIGS. 7A-7F, 8A-8B, 9A-9C, 10A-10D, and 16A-16B. At least some of FIGS. 5A-5NN include intensity diagrams that show the current intensity of the contact on the touch-sensitive surface relative to a plurality of intensity thresholds including $IT_0$, $IT_L$, and $IT_D$. In some embodiments, operations similar to those described below with reference to $IT_D$ are performed with reference to a different intensity threshold (e.g., "$IT_L$"). In some embodiments, operations similar to those described below with reference to $IT_L$ are performed with reference to a different intensity threshold (e.g., "$IT_0$").

In some embodiments, the device on which the user interfaces are displayed is an electronic device with a display (e.g., display 450) and a separate touch-sensitive surface (e.g., touch-sensitive surface 451). For example, see FIGS. 5A-5II. In some embodiments, the device on which the user interfaces are displayed is the portable multifunction device 100, the display is touch-sensitive display system 112, and the touch-sensitive surface includes tactile output generators 167 on the display (FIG. 1A). For example, see FIG. 5JJ-5NN.

For convenience of explanation, the embodiments described with reference to FIGS. 5A-5II will be discussed with reference to a device with a display 450 and a separate touch-sensitive surface 451; however, analogous operations are, optionally, performed on a device with a touch-sensitive display system 112 in response to detecting the contacts described in FIGS. 5A-5II on the touch-sensitive display system 112 while displaying the user interfaces shown in FIGS. 5A-5II on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 502.

FIGS. 5A-5B show a sequence in which a one-finger light press gesture is performed on highlighted text within a web page. FIG. 5A illustrates a window 504 for a web browser application displayed on display 450. In FIG. 5A, the window 504 shows a home page (e.g., corresponding to the URL www.all_world_news.com/home) for a website (e.g., the "All World News" website) where a portion of the text (e.g., "Ebola") is highlighted. For example, the word "Ebola" was previously selected or highlighted via a click and drag gesture performed with the cursor 502 or the like by a user. FIG. 5A further illustrates a contact 506 detected on touch-sensitive surface 451 and a displayed representation of a focus selector (e.g., cursor 502) corresponding to contact 506 at a location on the display 450 that corresponds to the highlighted portion of text (e.g., "Ebola") within the window 504. In this example, the intensity of the contact 506 is between $IT_L$ and $IT_D$ (e.g., sometimes called a light press intensity level). In FIG. 5B, the portion of the text (e.g., "Ebola") of the home page is no longer highlighted in response to detecting the one-finger light press gesture in FIG. 5A.

FIGS. 5C-5D show a sequence in which a two-finger light press gesture is performed on highlighted text within a web page. FIG. 5C illustrates contacts 508 and 510 detected on touch-sensitive surface 451 and a displayed representation of a focus selector (e.g., the cursor 502) corresponding to contacts 508 and 510 at a location on the display 450 that corresponds to the highlighted portion of text (e.g., "Ebola") within the window 504. In this example, the combined intensity of the contacts 508 and 510 is between $IT_L$ and $IT_D$ (e.g., the light press intensity level). In this example, the combined intensity is the average of the intensities of contacts 508 and 510, the sum of the intensities of contacts 508 and 510, a total intensity detected by one or more intensity sensors associated with touch-sensitive surface 451, the maximum intensity between the intensity of contact 508 and the intensity of contact 510, or the like.

In FIG. 5D, an expanded menu 512 is displayed in response to detecting the two-finger light press gesture in FIG. 5C. In this example, the expanded menu 512 includes a plurality of selectable options associated with the highlighted portion of the text (e.g., "Ebola") of the web page, including: performing a lookup on the word "Ebola," performing a web search on the word "Ebola" with a search engine, copying the word "Ebola" (e.g., to the clipboard), performing speech-related options associated with the word "Ebola," and adding the word "Ebola" as spoken track. One of ordinary skill in the art will appreciate that a greater or lesser number of options may be included in the expanded menu 512.

FIGS. 5E-5F show a sequence in which a one-finger deep press gesture is performed on highlighted text within a web page. FIG. 5E illustrates contact 514 detected on touch-sensitive surface 451 and a displayed representation of a focus selector (e.g., the cursor 502) corresponding to contact 514 at a location on the display 450 that corresponds to the highlighted portion of text (e.g., "Ebola") within the window 504. In this example, the intensity of the contact 514 is above $IT_D$ (e.g., sometimes called a deep press intensity level).

In FIG. 5F, the cursor 502 ceases to be displayed and a reduced menu 516 is displayed on display 450 in response to detecting the one-finger deep press gesture in FIG. 5E. In this example, the reduced menu 516 is centered at the location where cursor 502 was displayed in FIG. 5E when the intensity of the contact 514 exceeded $IT_D$. In FIG. 5F, the reduced menu 516 includes four distinct selectable quadrants oriented in the cardinal directions. The left quadrant of the reduced menu 516, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 516, which is typically associated with a paste action, is inactive or disabled due to the lack of a currently copied item (e.g., the clipboard is empty). The top and bottom quadrants of the reduced menu 516 are empty. In some embodiments, the reduced menu 516, in FIG. 5F, includes a subset of the selectable options included in the expanded menu 512 in FIG. 5D. In other embodiments, the reduced menu 516, in FIG. 5F, includes a set of selectable options that are distinct from the set of selectable options in the expanded menu 512 in FIG. 5D. One of ordinary skill in the art will appreciate that different selectable options may be included in the reduced menu 516. In some embodiments, the options included in the reduced menu for a respective user interface element are pre-set and/or are user customizable.

FIGS. 5G-5J show a sequence in which a one-finger deep press gesture is performed on a link within a web page. FIG. 5G illustrates contact 518 detected on touch-sensitive surface 451 and a displayed representation of a focus selector (e.g., the cursor 502) corresponding to contact 518 at a location on the display 450 that corresponds to a link (e.g., to an "Entertainment News" section of the website) within the window 504. In this example, the intensity of the contact 518 is above $IT_D$ (e.g., sometimes called a deep press intensity level).

In FIG. 5H, the cursor 502 ceases to be displayed and a reduced menu 520 is concurrently displayed on the display 450 along with a preview window 522 in response to detecting the one-finger deep press gesture in FIG. 5G. In this example, the reduced menu 520 is centered at the location cursor 502 was displayed in FIG. 5G when the intensity of the contact 518 exceeded $IT_D$. The preview window 522 displays at least a portion of the web page that corresponds to an "Entertainment News" section of the website. In some embodiments, preview window 522 is not displayed in response to detecting the one-finger deep press gesture in FIG. 5G.

In FIG. 5H, the reduced menu 520 is associated with a plurality of selectable options that correspond to the link (e.g., to the "Entertainment News" section of the website) within the window 504, including: a new window action, a share action, a new tab action, and an add to reading list action. The left quadrant of the reduced menu 520, when activated (e.g., with a tap gesture at a location on the touch-sensitive surface 451 that corresponds to the left quadrant or a gross swipe gesture in the direction of the left quadrant), causes the "Entertainment News" section of the website to be opened in a new window of the web browser application. In some embodiments, the new window (e.g., the "Entertainment News" section of the website) is prefetched. The top quadrant of the reduced menu 520, when activated (e.g., with a tap gesture at a location on the touch-sensitive surface 451 that corresponds to the top quadrant or a gross swipe gesture in the direction of the top quadrant), causes share options to be displayed in a separate reduced menu (e.g., as shown in FIG. 5J) or other menu.

The right quadrant of the reduced menu 520, when activated (e.g., with a tap gesture at a location on the touch-sensitive surface 451 that corresponds to the right quadrant or a gross swipe gesture in the direction of the right quadrant), causes the "Entertainment News" section of the website to be opened in a new tab within window 504 of the web browser application or, optionally, in a new browser window (depending on system default preferences or user-selected preferences). The bottom quadrant of the reduced menu 520, when activated (e.g., with a tap gesture at a location on the touch-sensitive surface 451 that corresponds to the bottom quadrant or a gross swipe gesture in the direction of the bottom quadrant), causes the "Entertainment News" section of the website to be added to the user's reading list for future access and perusal.

FIG. 5H also illustrates detection of a swipe gesture corresponding to the movement of contact 524 from a first location 526-a to a second location 526-b in the direction of the top quadrant associated with the share action. In this example, the intensity of the contact 524 is between $IT_L$ and $IT_D$ (e.g., the light press intensity level). In FIG. 5I, a visual characteristic of the top quadrant of the reduced menu 520 is changed in response to detecting the swipe gesture in the direction of the top quadrant in FIG. 5H. In some embodiments, this response also occurs provided the intensity of the contact is above $IT_0$. The changed visual characteristic (e.g., highlighting, shading, outlining, etc.) indicates to the user that the top quadrant is selected in response to detecting the swipe gesture.

In FIG. 5J, a reduced menu 528 is displayed on the display 450 in response to detecting the swipe gesture in FIG. 5H. In FIG. 5J, the reduced menu 528 is associated with a plurality of selectable options associated with the share action including: an email option, an instant messaging (e.g., SMS) option, Social Network A option, and Social Network B option. The left quadrant of the reduced menu 528, when activated (e.g., with a tap gesture at a location on the touch-sensitive surface 451 that corresponds to the left quadrant or a gross swipe gesture in the direction of the left quadrant), causes a link to the "Entertainment News" section of the website to be shared with one or more predefined users or one or more subsequently selected users via Social Network A. The top quadrant the reduced menu 528, when activated (e.g., with a tap gesture at a location on the touch-sensitive surface 451 that corresponds to the top quadrant or a gross swipe gesture in the direction of the top quadrant), causes a link to the "Entertainment News" section of the website to be shared with one or more predefined users or one or more subsequently selected users via email.

The right quadrant of the reduced menu 528, when activated (e.g., with a tap gesture at a location on the touch-sensitive surface 451 that corresponds to the right quadrant or a gross swipe gesture in the direction of the right quadrant), causes a link to the "Entertainment News" section of the website to be shared with one or more predefined users or one or more subsequently selected users via instant messaging (e.g., SMS). The bottom quadrant of the reduced menu 528, when activated (e.g., with a tap gesture at a location on the touch-sensitive surface 451 that corresponds to the bottom quadrant or a gross swipe gesture in the direction of the bottom quadrant), causes a link to the "Entertainment News" section of the website to be shared with one or more predefined users or one or more subsequently selected users via Social Network B.

FIGS. 5K-5L show a sequence in which a one-finger light press gesture is performed on a link within a web page. FIG. 5K illustrates bookmarks bar 532 displayed within the window 504. For example, the bookmarks bar 532 is displayed in response to a previous click on the "all bookmarks" affordance 531 with the cursor 502 or in response to detecting a predefined gesture or physical key combination. FIG. 5K also illustrates contact 530 detected on touch-sensitive surface 451 and a displayed representation of a focus selector (e.g., the cursor 502) corresponding to contact 530 at a location on the display 450 that corresponds to a link (e.g., an "Entertainment News" section of the website) within the window 504. In this example, the intensity of the contact 530 is between $IT_L$ and $IT_D$ (e.g., the light press intensity level). In FIG. 5L, a window 534 for a web browser application is displayed on display 450 in response to detecting the one-finger light press gesture in FIG. 5K. In FIG. 5L, the window 534 shows the "Entertainment News" section (e.g., corresponding to the URL www.all_world_news.com/ETnews) of the website (e.g., the "All World News" website) along with the bookmarks bar 532.

FIGS. 5L-5P show a sequence in which a one-finger deep press gesture is performed on a bookmark within a bookmarks bar. FIG. 5L illustrates contact 536 detected on touch-sensitive surface 451 and a displayed representation of a focus selector (e.g., the cursor 502) corresponding to contact 536 at a location on the display 450 that corresponds to an entry for "Bookmark F" within the bookmarks bar 532. In this example, the intensity of the contact 536 is above $IT_D$ (e.g., the deep press intensity level).

In FIG. 5M, the cursor 502 ceases to be displayed and a reduced menu 538 is displayed on the display 450 in response to detecting the one-finger deep press gesture in FIG. 5L. In this example, the reduced menu 538 is centered at the location cursor 502 was displayed in FIG. 5L when the intensity of the contact 536 exceeded $IT_D$. In FIG. 5M, the reduced menu 538 is associated with a plurality of selectable options associated with "Bookmark F," including: a delete action, a new window action, a new tab action, and a copy action.

For example, each of the quadrants of the reduced menu 538 is associated with a hit region on the touch-sensitive surface 451 that is larger than its displayed area on the display 450. Furthermore, the location of the hit regions are determined based on the location cursor 502 was displayed in FIG. 5L when the intensity of the contact 536 exceeded $IT_D$. The left quadrant of the reduced menu 538, when activated (e.g., with a tap gesture at a location on the touch-sensitive surface 451 that corresponds to the left quadrant or a gross swipe gesture in the direction of the left quadrant), causes the "Bookmark F" to be deleted from the bookmarks bar 532 and also from the navigation bar 539. For example, the left quadrant is associated with hit region 540-d, and detection of a contact within hit region 540-d causes the left quadrant to be selected and lift-off of a contact within hit region 540-d activates the deletion action associated with the left quadrant. In this example, the left quadrant is visually distinct from the other quadrants (e.g., the text is italicized and underlined) to indicate that the deletion action associated with the left quadrant is a destructive one. The top quadrant of the reduced menu 538, when activated (e.g., with a tap gesture at a location on the touch-sensitive surface 451 that corresponds to the top quadrant or a gross swipe gesture in the direction of the top quadrant), causes a web page associated with "Bookmark F" to be displayed within a new window of the web browser application. In some embodiments, the web page in the new window is prefetched. For example, the top quadrant is associated with hit region 540-a, and detection of a contact within hit region 540-a causes the top quadrant to be selected and lift-off of a contact within hit region 540-a activates the new window action associated with the top quadrant.

The right quadrant of the reduced menu 538, when activated (e.g., with a tap gesture at a location on the touch-sensitive surface 451 that corresponds to the right quadrant or a gross swipe gesture in the direction of the right quadrant), causes the "web page associated with "Bookmark F" to be opened in a new tab within window 534 of the web browser application. For example, the right quadrant is associated with hit region 540-b, and detection of a contact within hit region 540-b causes the right quadrant to be selected and lift-off of a contact within hit region 540-b activates the new tab action associated with the right quadrant. The bottom quadrant of the reduced menu 538, when activated (e.g., with a tap gesture at a location on the touch-sensitive surface 451 that corresponds to the bottom quadrant or a gross swipe gesture in the direction of the bottom quadrant), causes the URL associated with "Bookmark F" to be copied to the clipboard. For example, the bottom quadrant is associated with hit region 540-c, and detection of a contact within hit region 540-c causes the bottom quadrant to be selected and lift-off of a contact within hit region 540-c activates the copy action associated with the bottom quadrant.

Figure 5O:
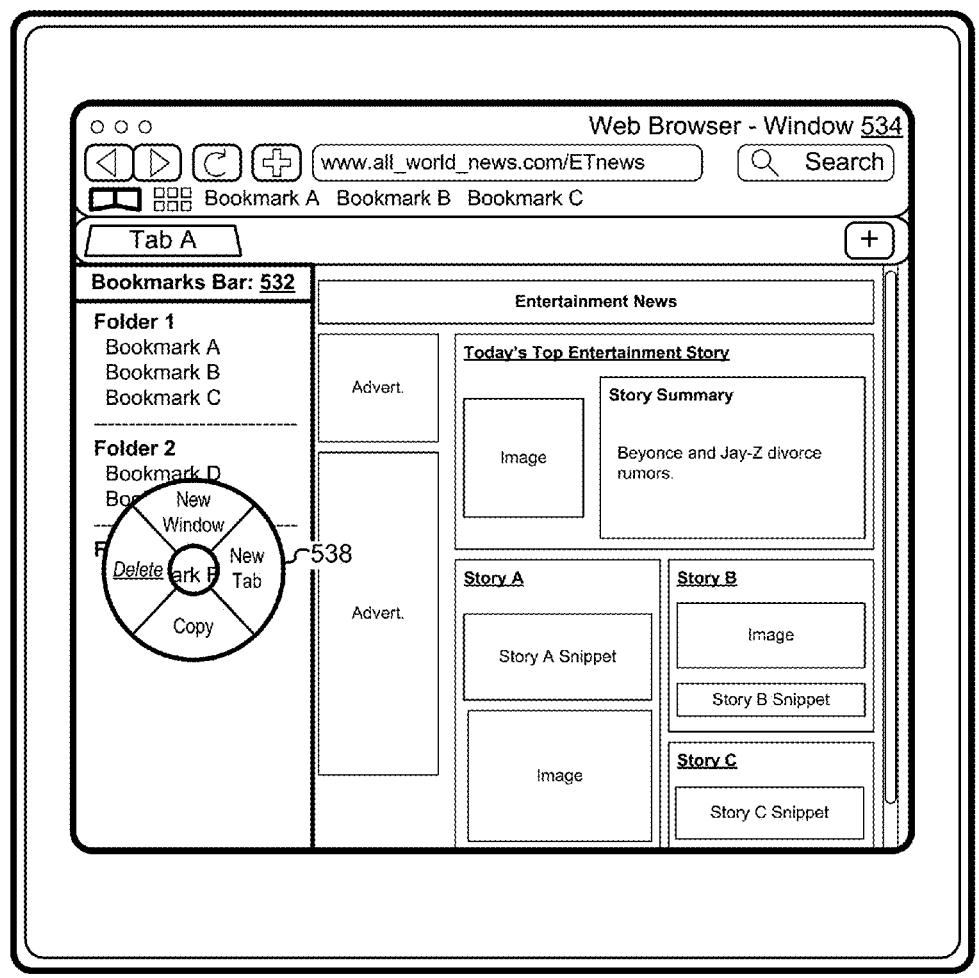
Figure 5O:
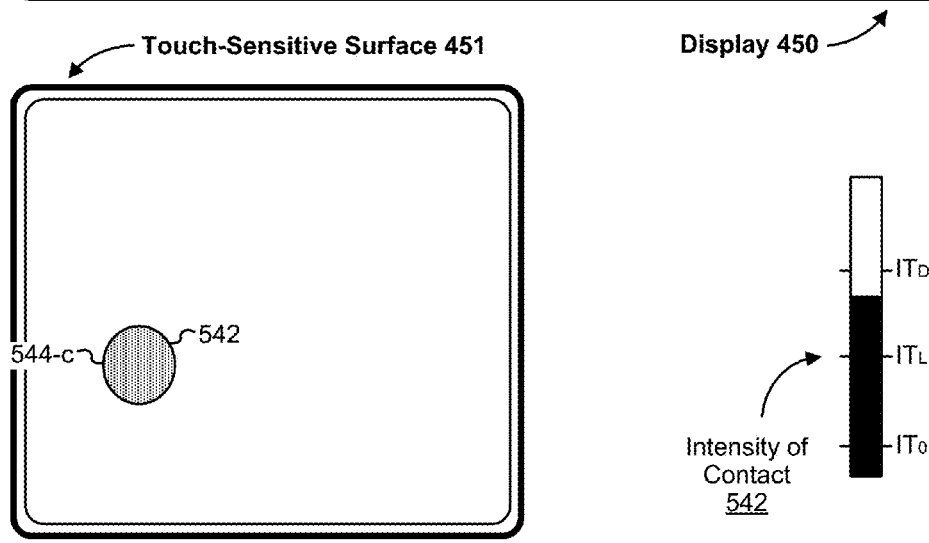
Figure 5P:
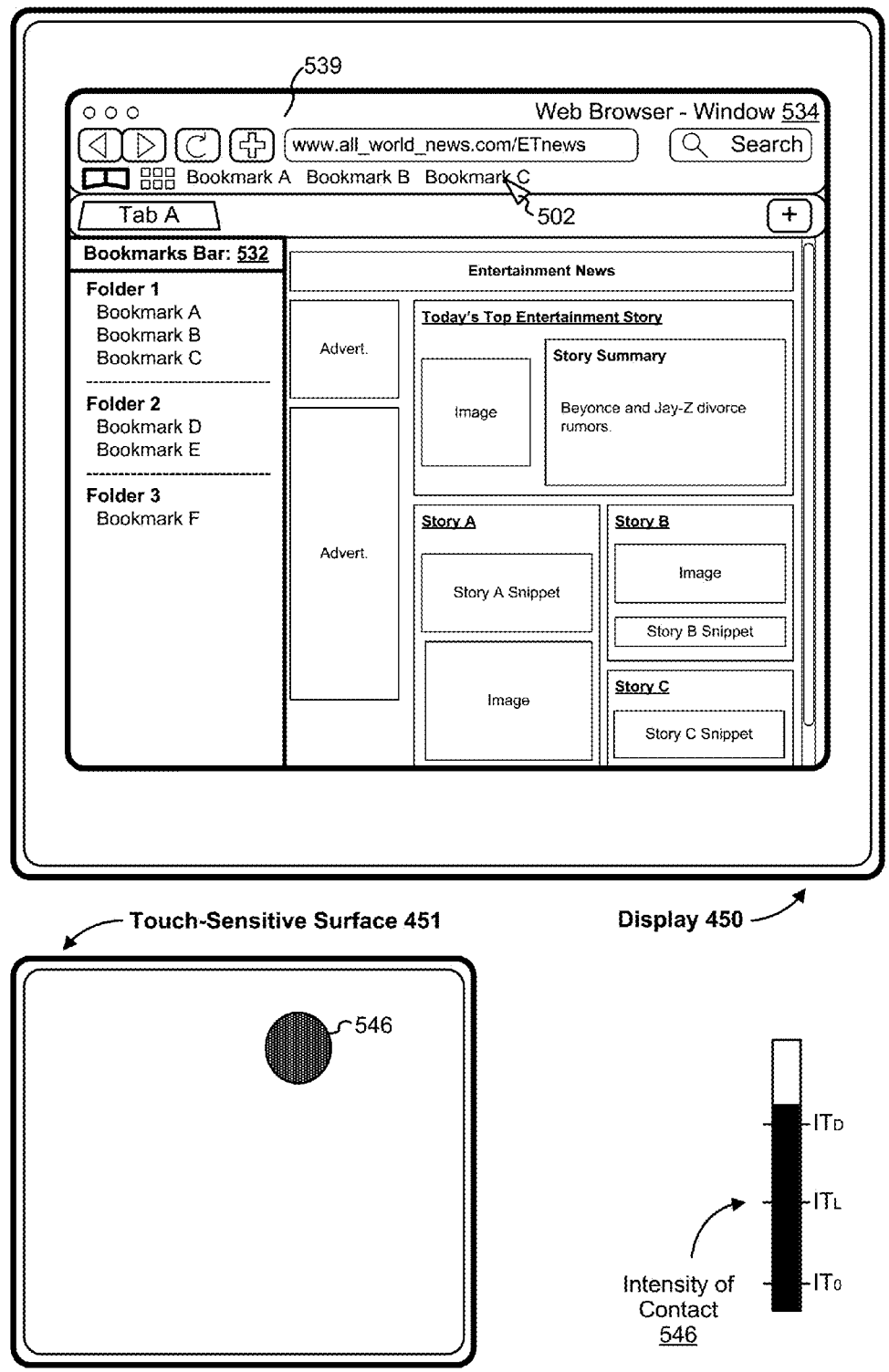

FIG. 5M also illustrates detection of a swipe gesture corresponding to the movement of contact 542 from a first location 544-a to a second location 544-b (e.g., corresponding to hit region 540-b) in the direction of the right quadrant associated with the new tab action. In this example, the intensity of the contact 542 is between $IT_L$ and $IT_D$ (e.g., the light press intensity level). In FIG. 5N, a visual characteristic of the right quadrant of the reduced menu 538 is changed in response to detecting the contact 542 within the hit region 540-b at the second location 544-b. FIG. 5N illustrates detection of a swipe gesture corresponding to the movement of the contact 542 from the second location 544-b to a third location 544-c (e.g., corresponding to center of the reduced menu 538 and a center "dead-zone" of the hit regions 540). In this example, the intensity of the contact 542 is between $IT_L$ and $IT_D$ (e.g., the light press intensity level). In FIG. 5O, the visual characteristic of the right quadrant of the reduced menu 538 is no longer changed (e.g., no longer highlighted or otherwise visually distinguished from the other quadrants in the reduced menu) in response to detecting contact 542 at the third location 544-c (e.g., corresponding to center of the reduced menu 538 and a center "dead-zone" of the hit regions 540). In some embodiments, these responses also occur provided the intensity of the contact is above $IT_0$. In FIG. 5P, the reduced menu 538 ceases to be displayed and the cursor 502 is re-displayed on the display 450 in response to detecting lift-off of contact 542 from the third location 544-c (e.g., corresponding to center of the reduced menu 538 and a center "dead-zone" of the hit regions 540).

FIGS. 5P-5T show a sequence in which a one-finger deep press gesture is performed on a bookmark within a navigation bar. FIG. 5P illustrates contact 546 detected on touch-sensitive surface 451 and a displayed representation of a focus selector (e.g., the cursor 502) corresponding to contact 546 at a location on the display 450 that corresponds to a "Bookmark C" within the navigation bar 539. In this example, the intensity of the contact 546 is above $IT_D$ (e.g., the deep press intensity level).

Figure 5Q:
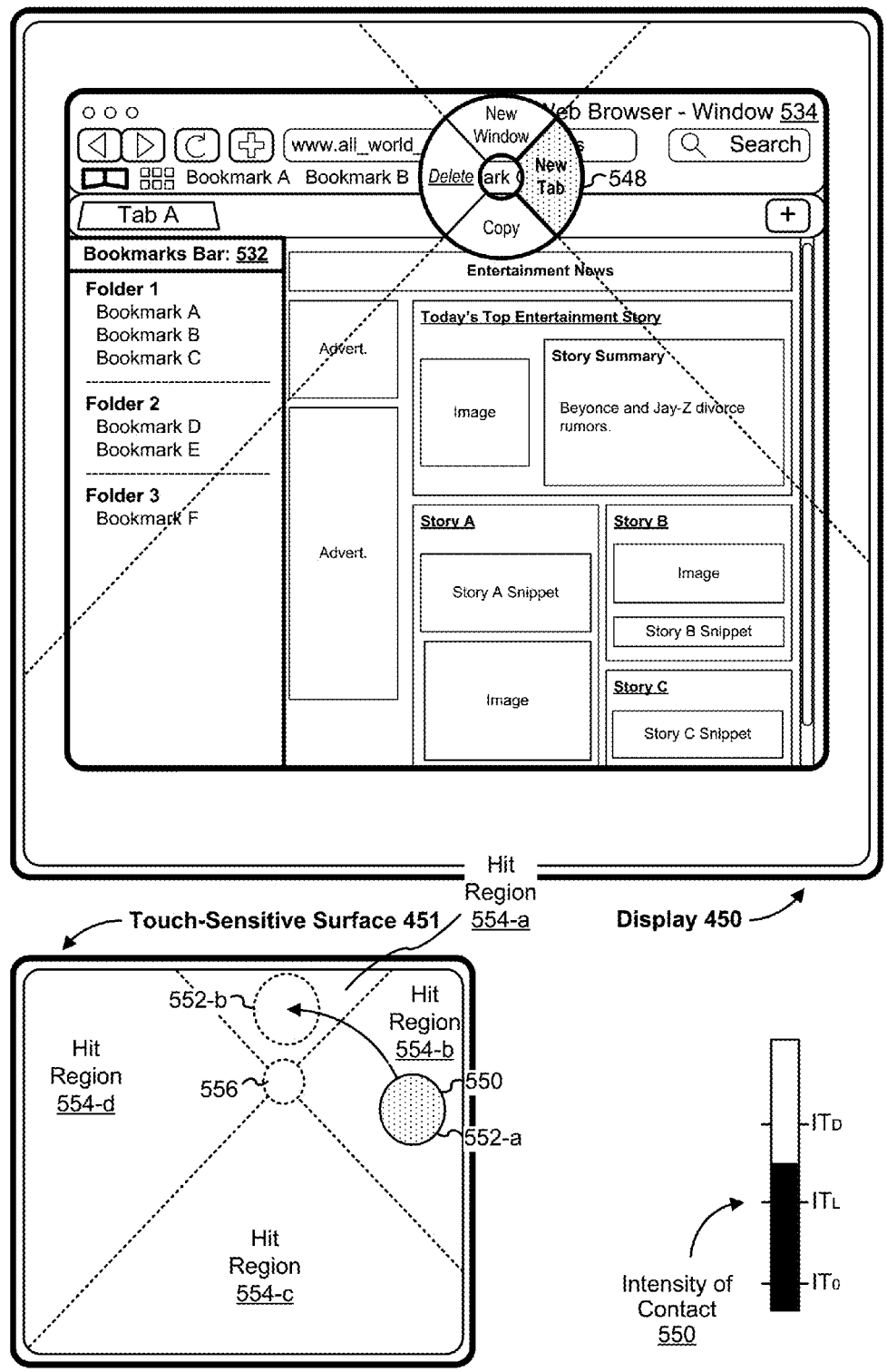

In FIG. 5Q, the cursor 502 ceases to be displayed and a reduced menu 548 is displayed on the display 450 in response to detecting the one-finger deep press gesture in FIG. 5P. In this example, the reduced menu 548 is centered at the location cursor 502 was displayed in FIG. 5P when the intensity of the contact 546 exceeded $IT_D$. In FIG. 5Q, the reduced menu 548 is associated with a plurality of selectable options associated with "Bookmark C," including: a delete action, a new window action, a new tab action, and a copy action.

The left quadrant of the reduced menu 548, when activated (e.g., with a tap gesture at a location on the touch-sensitive surface 451 that corresponds to the left quadrant or a gross swipe gesture in the direction of the left quadrant), causes the "Bookmark C" to be deleted from the bookmarks bar 532 and also from the navigation bar 539. For example, the left quadrant is associated with hit region 554-d, and detection of a contact within hit region 554-d causes the left quadrant to be selected and lift-off of a contact within hit region 554-d activates the deletion action associated with the left quadrant. In this example, the left quadrant is visually distinct from the other quadrants (e.g., the text is italicized and underlined) to indicate that the deletion action associated with the left quadrant is a destructive one. The top quadrant of the reduced menu 548, when activated (e.g., with a tap gesture at a location on the touch-sensitive surface 451 that corresponds to the top quadrant or a gross swipe gesture in the direction of the top quadrant), causes a web page associated with "Bookmark C" to be displayed within a new window of the web browser application. In some embodiments, the web page in the new window is prefetched. For example, the top quadrant is associated with hit region 554-a, and detection of a contact within hit region 554-a causes the top quadrant to be selected and lift-off of a contact within hit region 554-a activates the new window action associated with the top quadrant.

The right quadrant of the reduced menu 548, when activated (e.g., with a tap gesture at a location on the touch-sensitive surface 451 that corresponds to the right quadrant or a gross swipe gesture in the direction of the right quadrant), causes the "web page associated with "Bookmark C" to be opened in a new tab within window 534 of the web browser application. For example, the right quadrant is associated with hit region 554-b, and detection of a contact within hit region 554-b causes the right quadrant to be selected and lift-off of a contact within hit region 554-b activates the new tab action associated with the right quadrant. The bottom quadrant of the reduced menu 548, when activated (e.g., with a tap gesture at a location on the touch-sensitive surface 451 that corresponds to the bottom quadrant or a gross swipe gesture in the direction of the bottom quadrant), causes the URL associated with "Bookmark C" to be copied to the clipboard. For example, the bottom quadrant is associated with hit region 554-c, and detection of a contact within hit region 554-c causes the bottom quadrant to be selected and lift-off of a contact within hit region 554-c activates the copy action associated with the bottom quadrant. In FIG. 5Q, the center of the reduced menu 548 is associated with a center "dead-zone" 556 of the hit regions 554. For example, lift-off of a contact within the center "dead-zone" 556 causes dismissal of the reduced menu 548 while forgoing actions associated with the quadrants of the reduced menu 548.

In FIG. 5Q, a visual characteristic of the right quadrant of the reduced menu 548 is changed in response to detecting contact 550 at a first location 552-a within the hit region 554-b. FIG. 5Q also illustrates detection of a swipe gesture corresponding to the movement of contact 550 from the first location 544-a (e.g., corresponding to hit region 554-b) to a second location 552-b (e.g., corresponding to hit region 554-a) in the direction of the top quadrant associated with the new window action. In this example, the intensity of the contact 550 is between $IT_L$ and $IT_D$ (e.g., the light press intensity level).

Figure 5R:
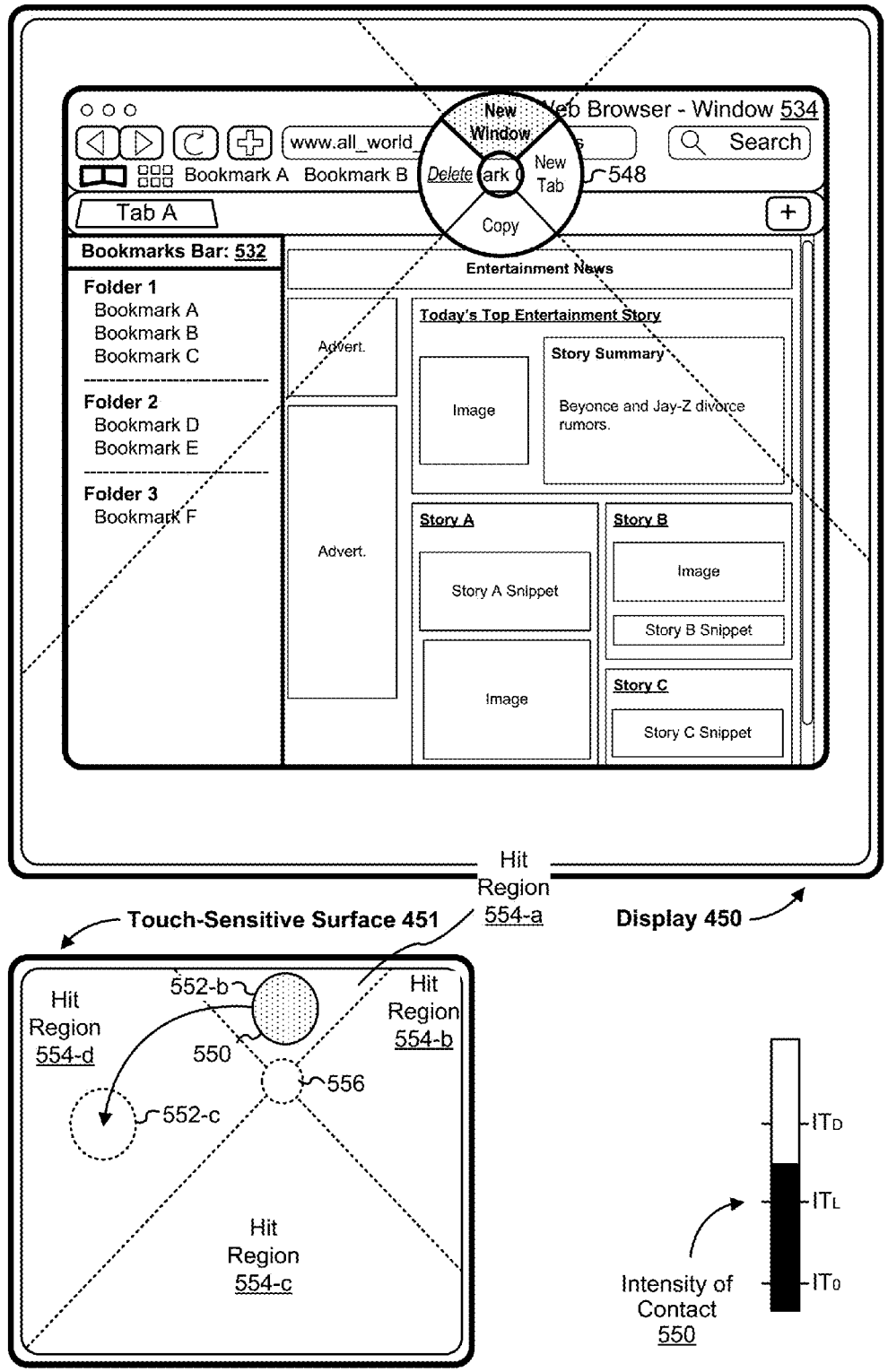

In FIG. 5R, a visual characteristic of the top quadrant of the reduced menu 548 is changed in response to detecting contact 550 at the second location 552-b within the hit region 554-a. FIG. 5R also illustrates detection of a swipe gesture corresponding to the movement of contact 550 from the second location 552-b (e.g., corresponding to hit region 554-a) to a third location 552-c (e.g., corresponding to hit region 554-d) in the direction of the left quadrant associated with the deletion action. In this example, the intensity of the contact 550 is between $IT_L$ and $IT_D$ (e.g., the light press intensity level). In some embodiments, these responses also occur provided the intensity of the contact is above $IT_0$.

Figure 5S:
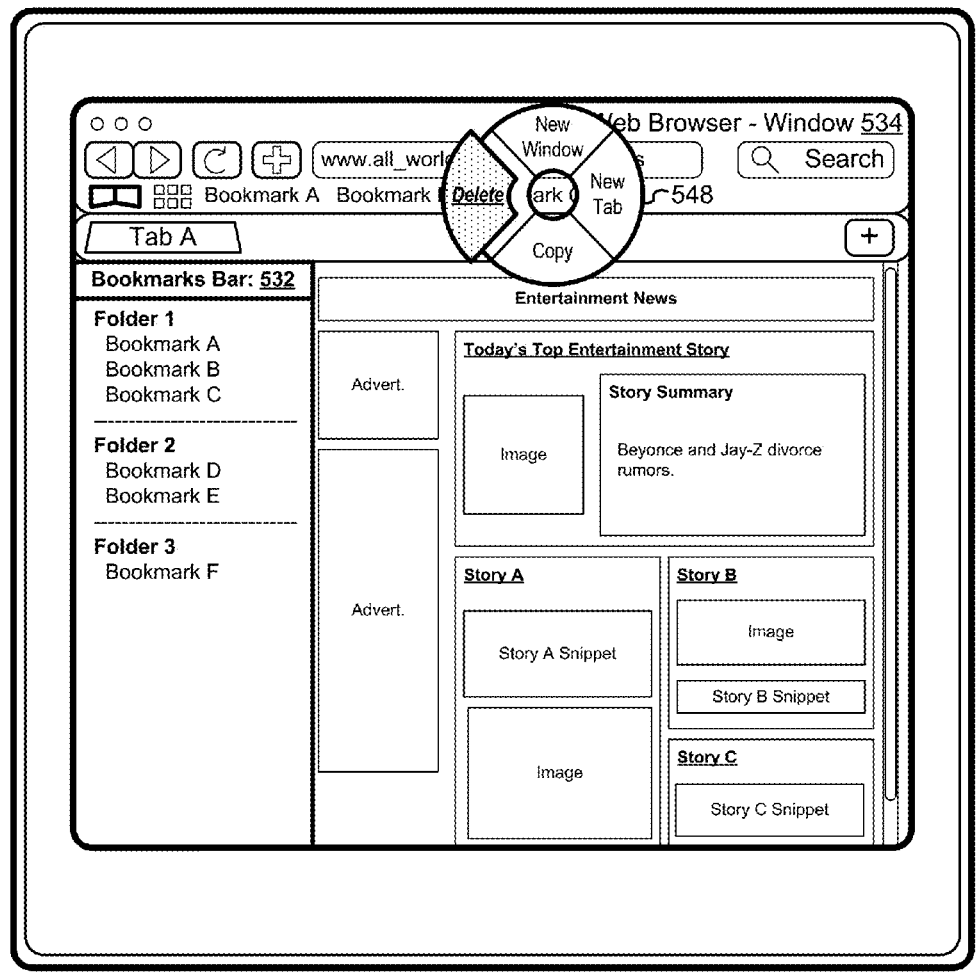
Figure 5S:
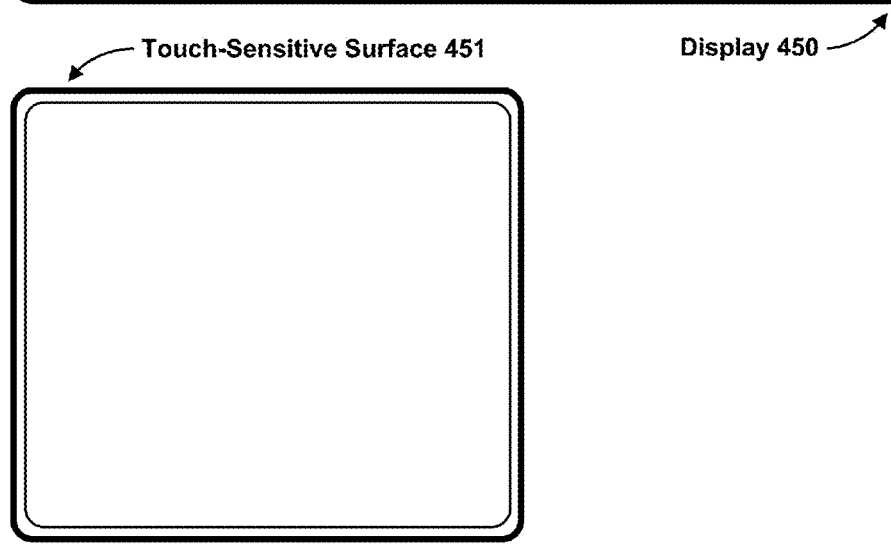
Figure 5T:
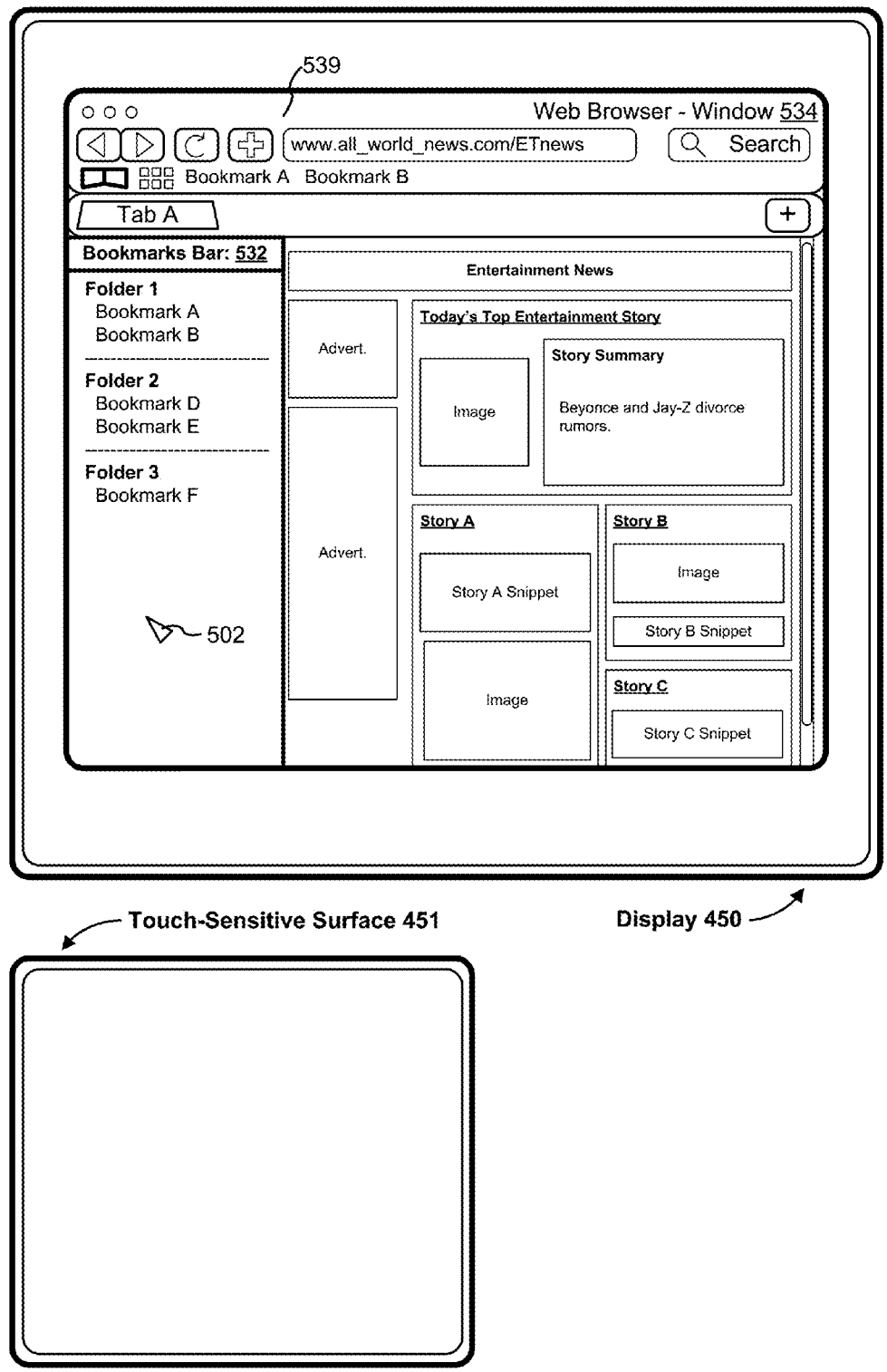

FIG. 5S shows an animation in which the left quadrant is torn away from the reduced menu 548 and a visual characteristic of the left quadrant of the reduced menu 548 is changed in response to detecting lift-off of contact 550 at the third location 552-c within the hit region 554-d. In FIG. 5T, "Bookmark C" is no longer displayed within the bookmark bar 532 and the navigation bar 539 in response to detecting lift-off of contact 550 at the third location 552-c within the hit region 554-d. The use of reduced menus with bookmarks described herein is merely exemplary. Reduced menus are optionally used in an analogous manner with iconic, thumbnail, and/or snapshot representations of favorite websites and/or frequently visited sites, for example in a Favorites view, a Frequently Visited Sites view, and/or a Top Sites view in the browser. Reduced menus are optionally used in an analogous manner with tabs in a browser (e.g., in a Tab view that shows tabs on the current device (e.g., device 100) and, optionally, tabs on other devices that also belong to the owner of the current device, such as iCloud Tabs in the Safari browser from Apple Inc. of Cupertino, Calif.).

Figure 5U:
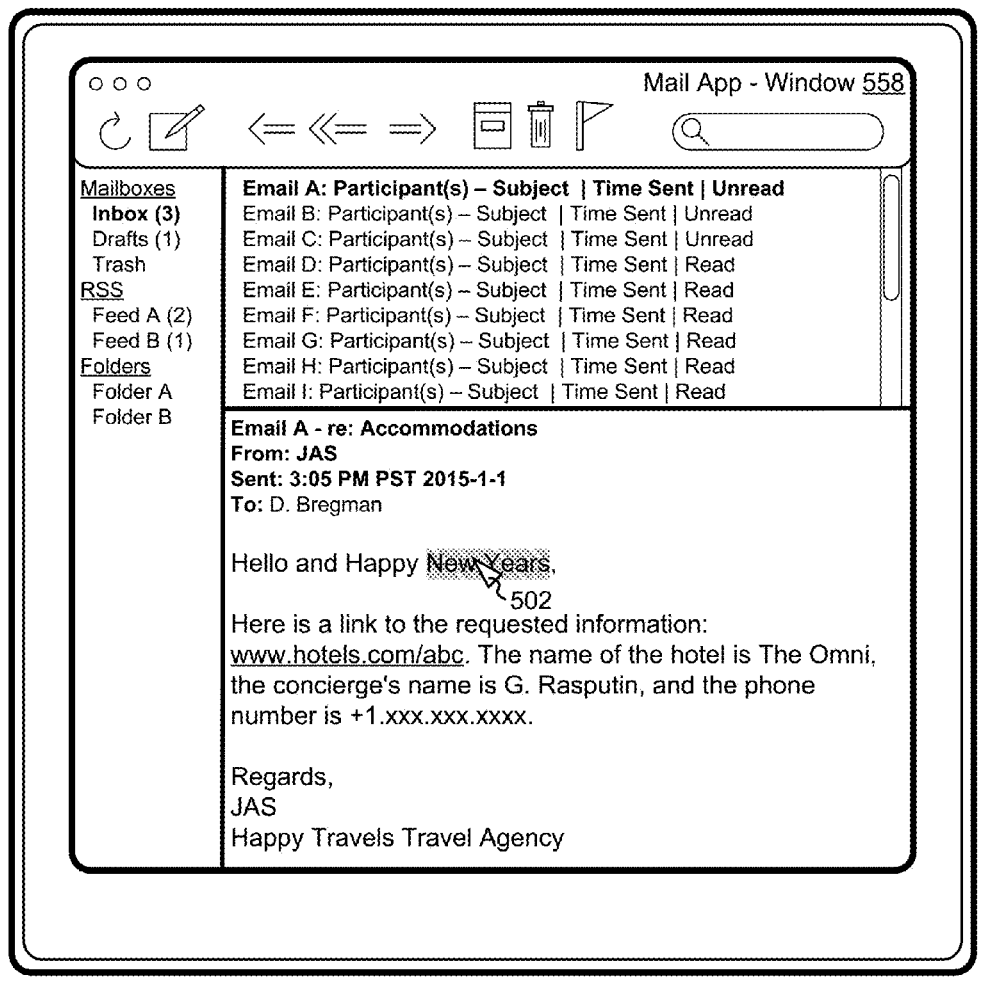
Figure 5U:
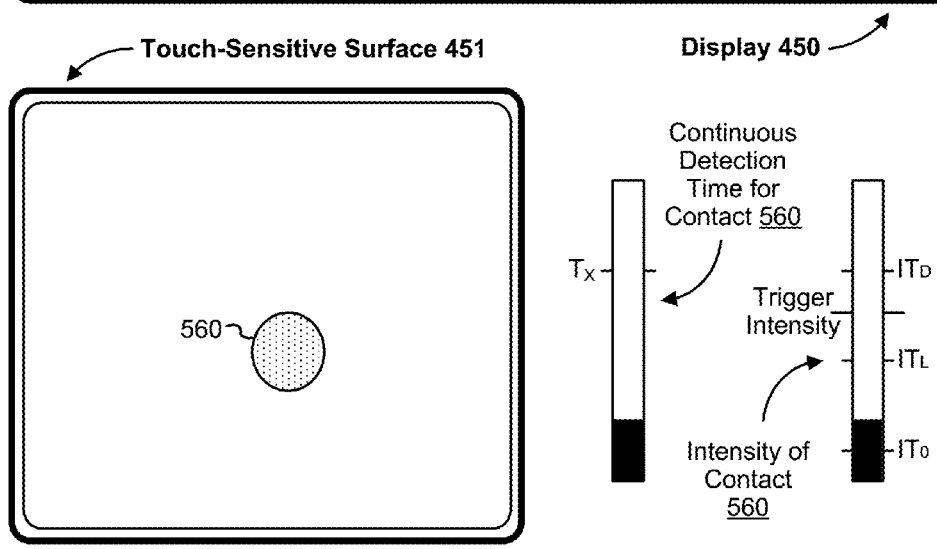

FIGS. 5U-5Z show a sequence in which a reduced menu is dismissed upon detecting lift-off in accordance with a determination that predefined timing criteria is satisfied. FIG. 5U illustrates a window 558 for an email application displayed on display 450. In FIG. 5U, the window 558 displays a list of a plurality of emails (e.g., emails A-I) in a user's inbox and the contents of selected "Email A." In some embodiments, a newest or the most urgent email is displayed at the top of the list of the plurality of emails in the user's inbox and the email at the top of the list is automatically selected. In FIG. 5U, a portion of the text (e.g., "New Years") of "Email A" is highlighted. For example, the words "New Years" were previously selected or highlighted with a click and drag gesture performed with the cursor 502 or the like by the user. FIG. 5U also illustrates a contact 560 detected on touch-sensitive surface 451 and a displayed representation of a focus selector (e.g., the cursor 502) corresponding to contact 560 at a location on the display 450 that corresponds to the highlighted portion of the text (e.g., "New Years") within the window 558. In this example, the intensity of the contact 560 is between $IT_0$ and $IT_L$ (e.g., a contact detection intensity threshold). Furthermore, FIG. 5U further illustrates that a time of continuous detection of the contact 560 is less than a predefined time period $T_X$ (e.g., 0.25 s, 0.5 s, 0.75 s, etc.).

Figure 5V:
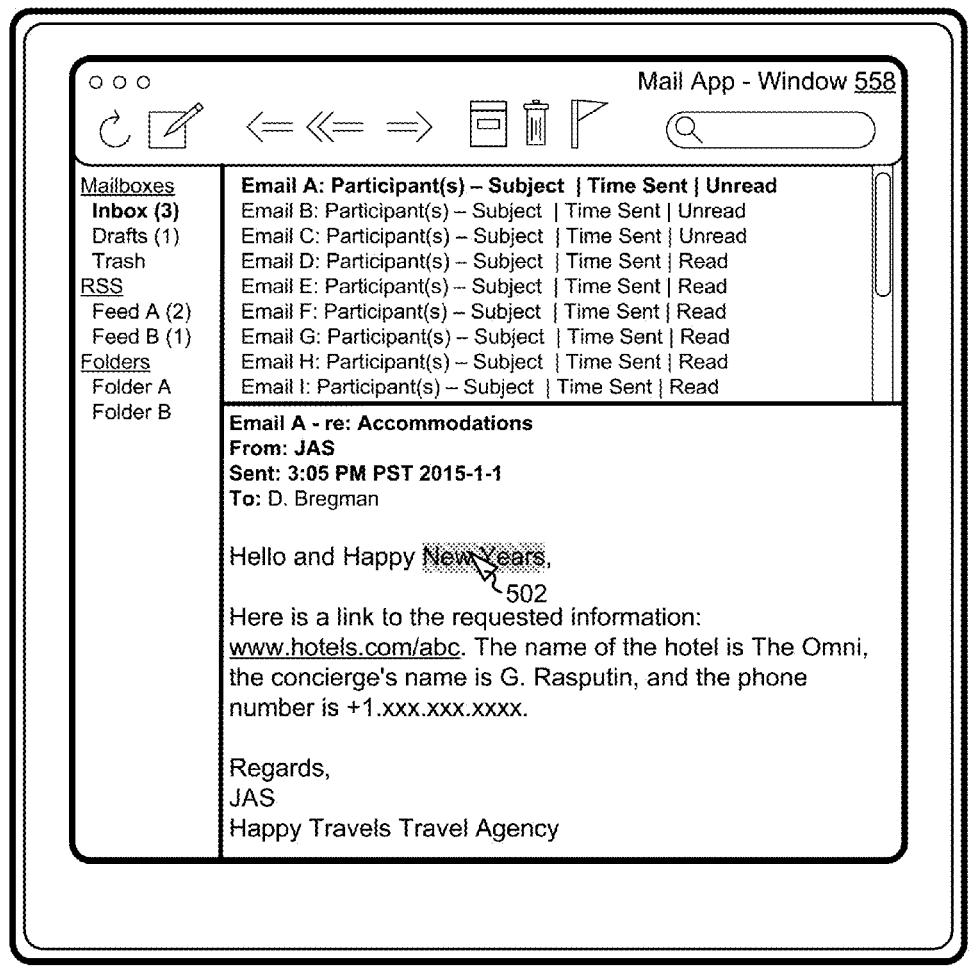
Figure 5V:
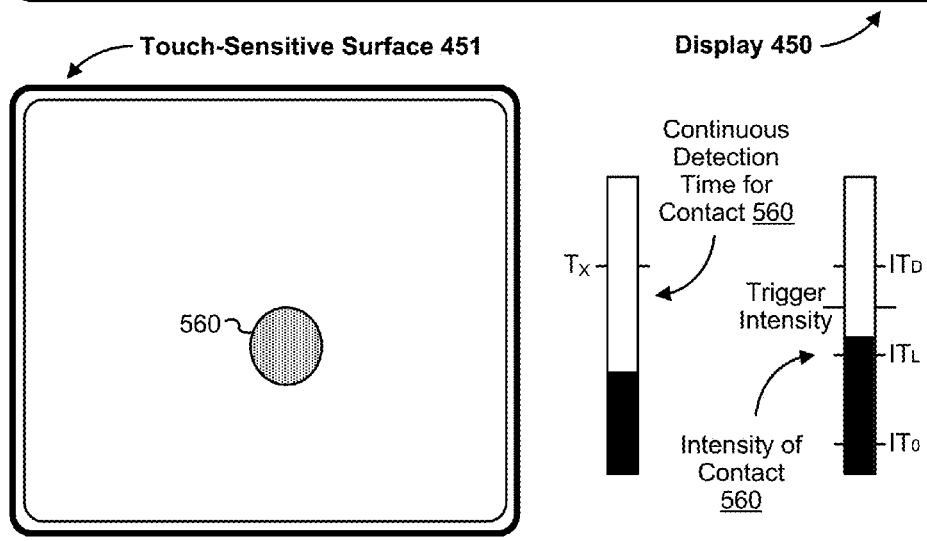
Figure 5W:
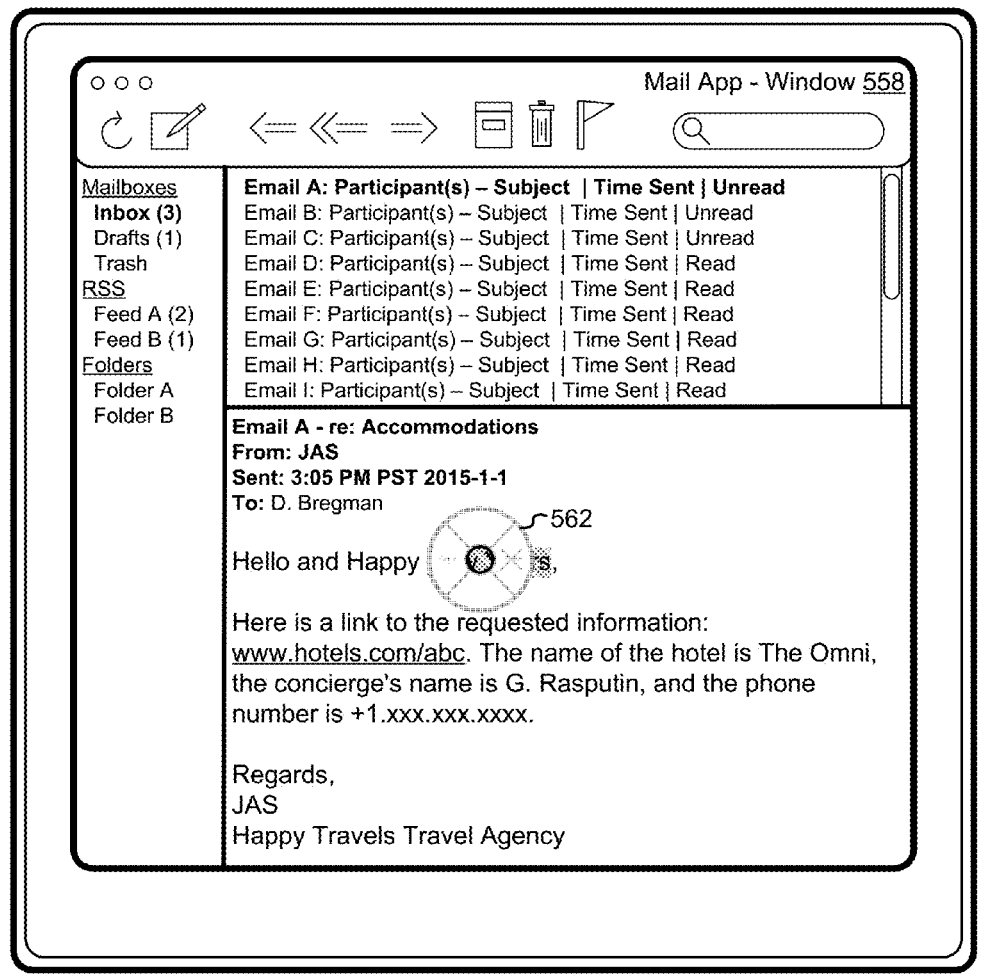
Figure 5W:
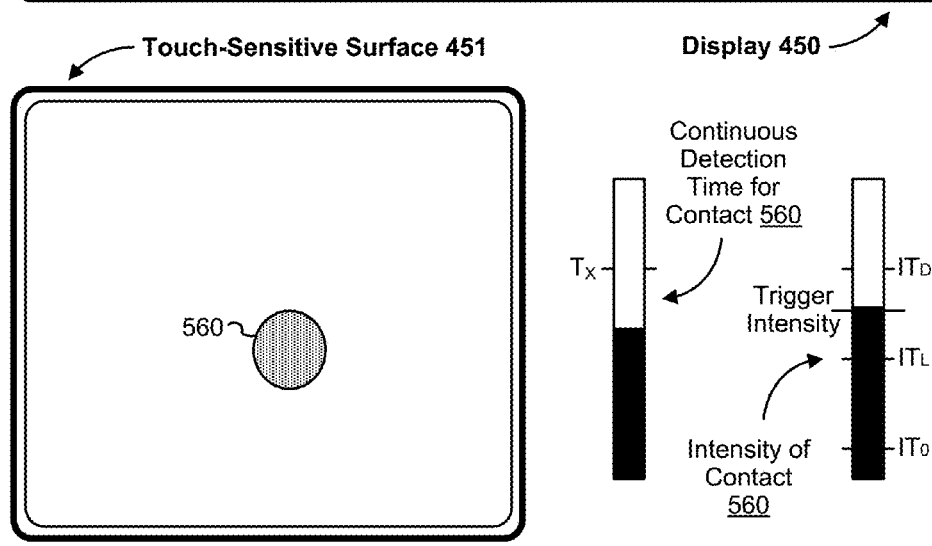

In FIG. 5V, the intensity of the contact 560 is between $IT_L$ and $IT_D$ (e.g., the light press intensity level). In this example, the intensity of contact 560 is also below a predetermined trigger intensity that triggers display of a reduced menu and also ceases to display the cursor 502. In FIG. 5W, the cursor 502 ceases to be displayed and a first intermediate representation of a reduced menu 562 is displayed on display 450 in response to detecting that the intensity of the contact 560 is above the predetermined trigger intensity. In this example, the intensity of the contact 560 is between $IT_L$ and $IT_D$ (e.g., the light press intensity level) and is also above the predetermined trigger intensity. A first intermediate representation of the reduced menu 562 is displayed, in FIG. 5W, at a first size and a first translucency level and includes selectable options associated with the highlighted portion of the text (e.g., "New Years") of "Email A." In this example, the first intermediate representation of the reduced menu 562 is centered at the location cursor 502 was displayed in FIG. 5V when the intensity of the contact 518 exceeded the predetermined trigger intensity.

Figure 5X:
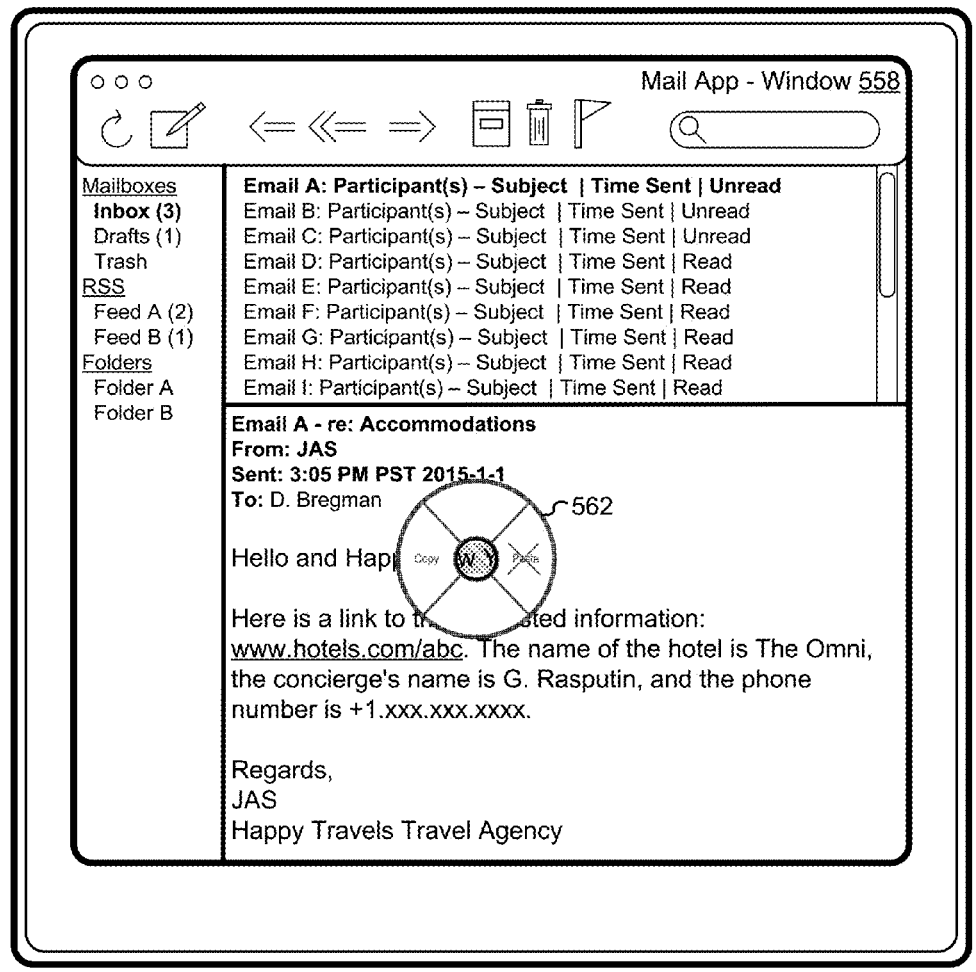
Figure 5X:
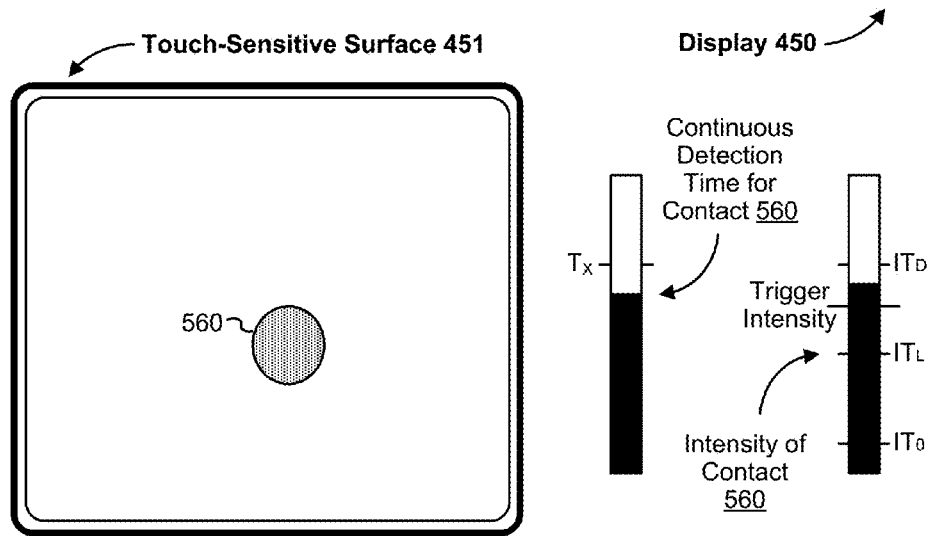

In FIG. 5X, a second intermediate representation of the reduced menu 562 is displayed on display 450 in response to the increase of the intensity of the contact 560, which is still less than $IT_D$, as compared to FIG. 5W. Furthermore, FIG. 5X illustrates that the time of continuous detection of the contact 560 is less than the predefined time period $T_X$. The second intermediate representation of the reduced menu 562, in FIG. 5X, is displayed at a second size that is bigger than the first size and a second translucency level that is lower than the first translucency level.

Figure 5Y:
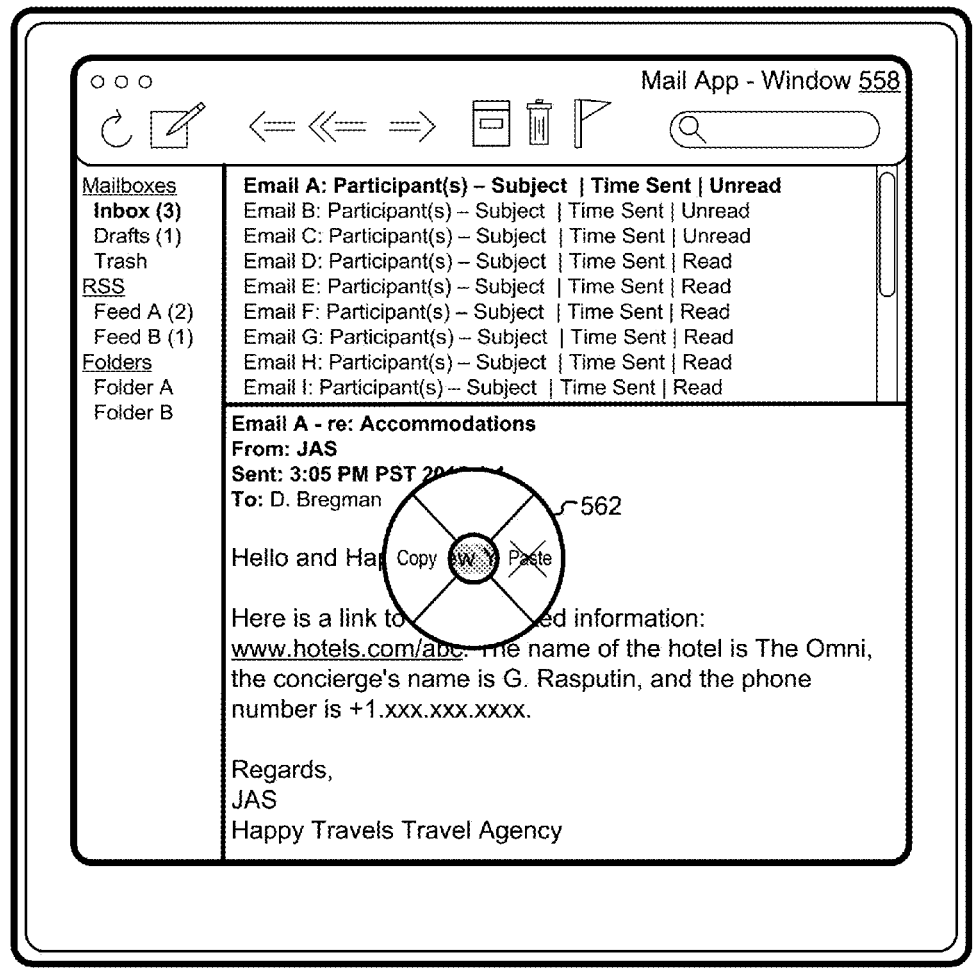
Figure 5Y:
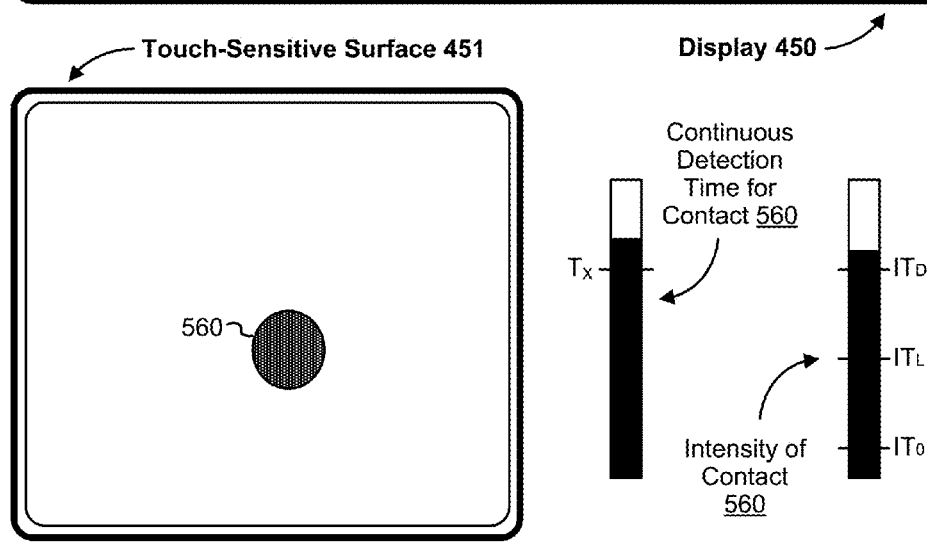

In FIG. 5Y, a final representation of the reduced menu 562 is displayed on display 450 in response to detecting that the intensity of the contact 560 is above $IT_D$ (e.g., the deep press intensity level). Furthermore, FIG. 5Y illustrates that the time of continuous detection of the contact 560 is greater than the predefined time period $T_X$. The final intermediate representation of the reduced menu 562, in FIG. 5Y, is displayed at a third size that is bigger than the second size and a third translucency level that is lower than the second translucency level. For example, the final representation of the reduced menu 562 is displayed at a normal size and a normal translucency level as compared to the first and second representations of the reduced menu 562 in FIGS. 5W and 5X, respectively. In FIG. 5Y, the final representation of the reduced menu 562 is associated with selectable options, including a copy action and a disabled paste action. The left quadrant, when activated (e.g., with a tap gesture at a location on the touch-sensitive surface 451 that corresponds to the left quadrant or a gross swipe gesture in the direction of the left quadrant), causes the words "New Years" to be copied to the clipboard. The right quadrant, which is typically associated with a paste action, is inactive or disabled due to the lack of a currently copied item (e.g., the clipboard is empty). The top and bottom quadrants of the reduced menu 562 are empty.

Figure 5Z:
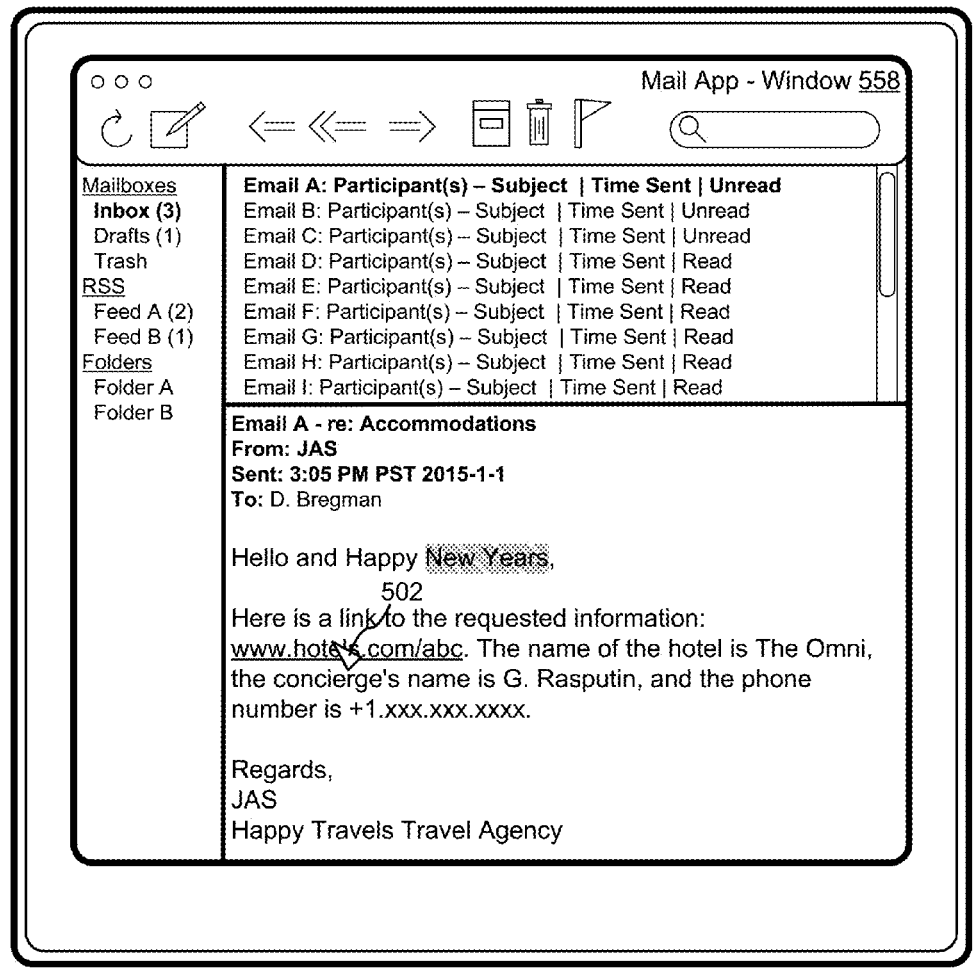
Figure 5Z:
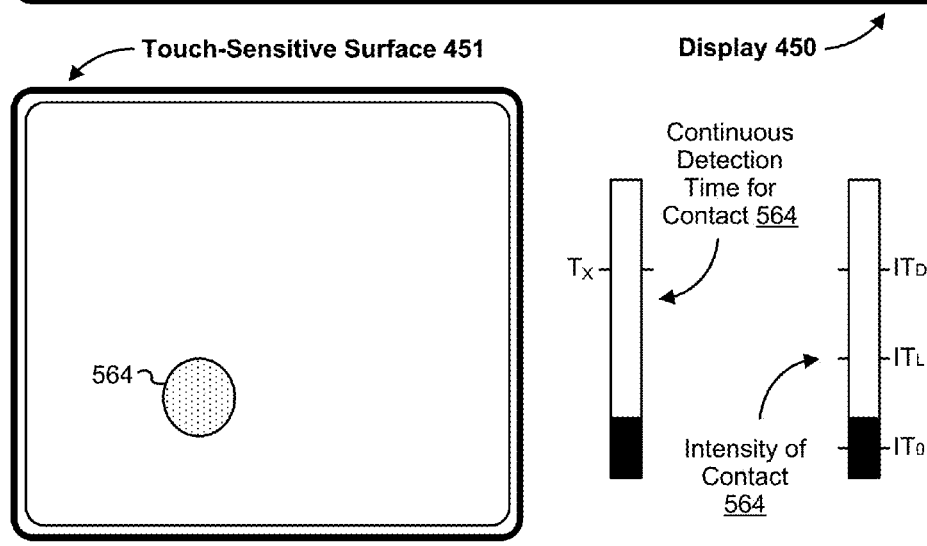
Figure 5A:
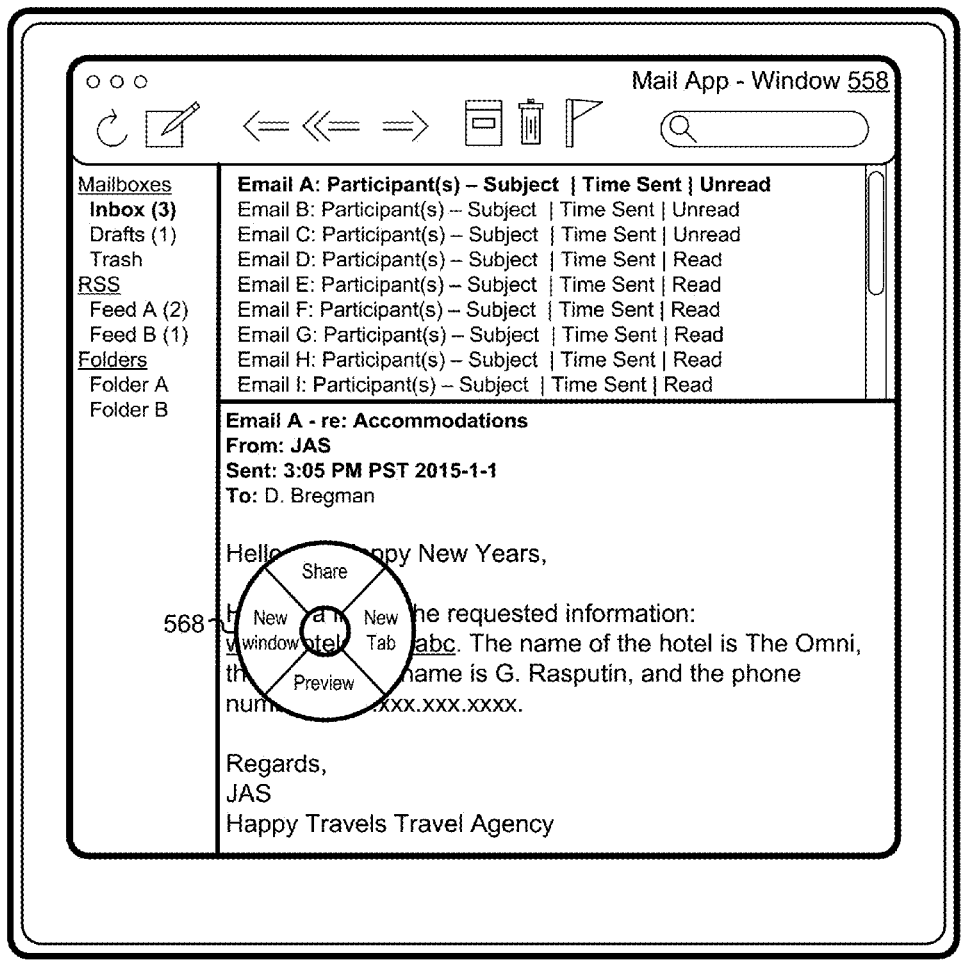
Figure 5A:
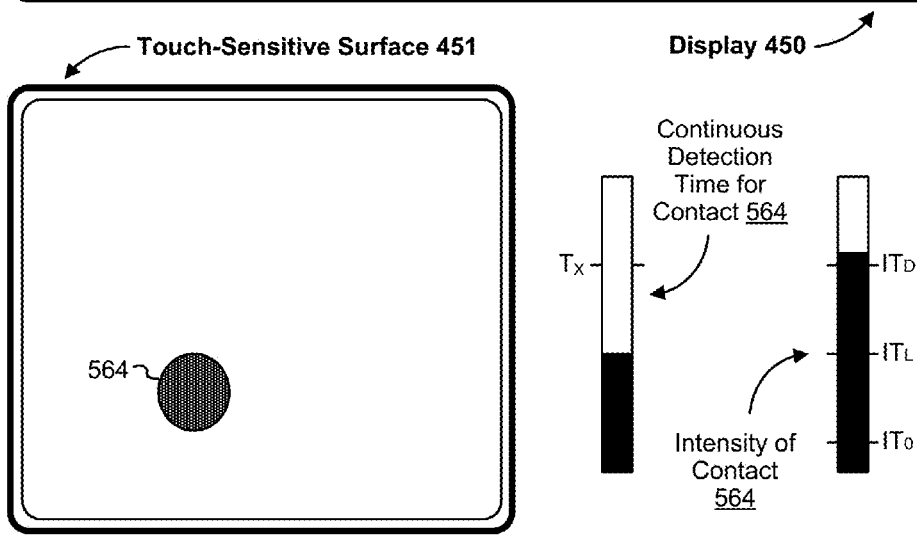
Figure 5B:
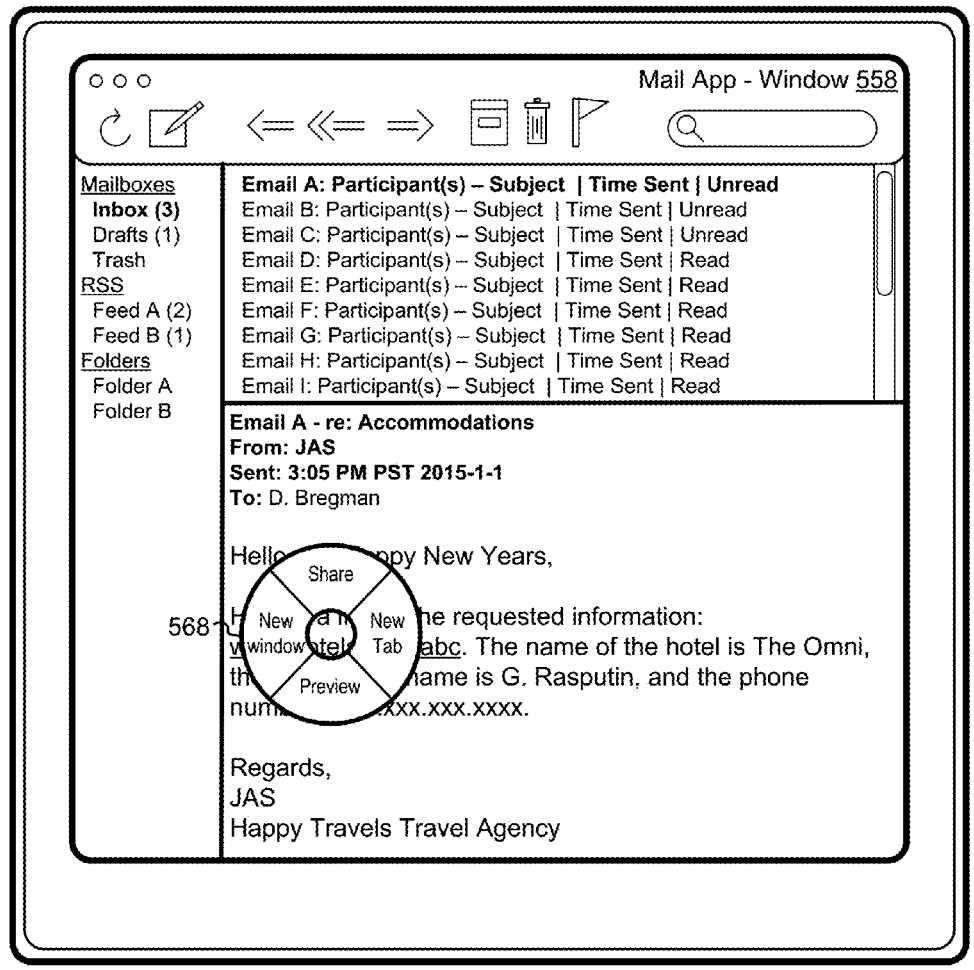
Figure 5B:
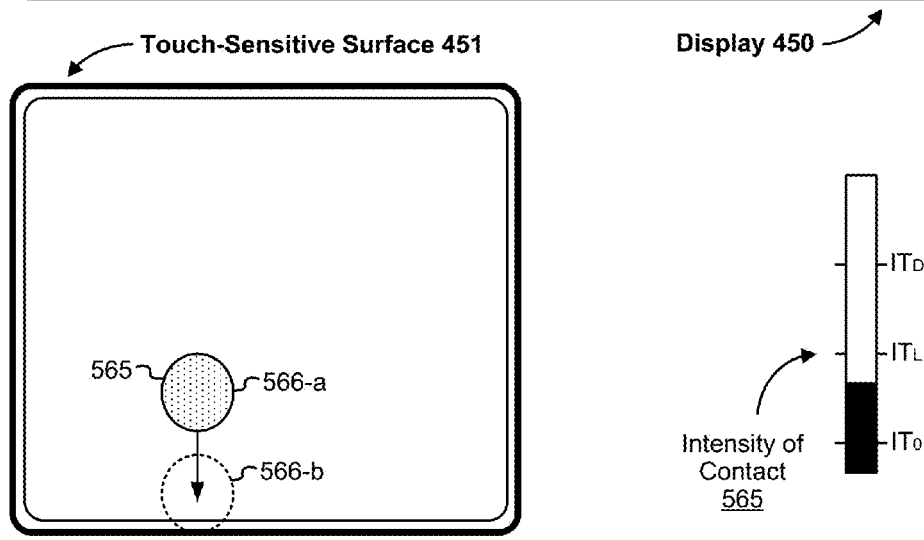
Figure 5C:
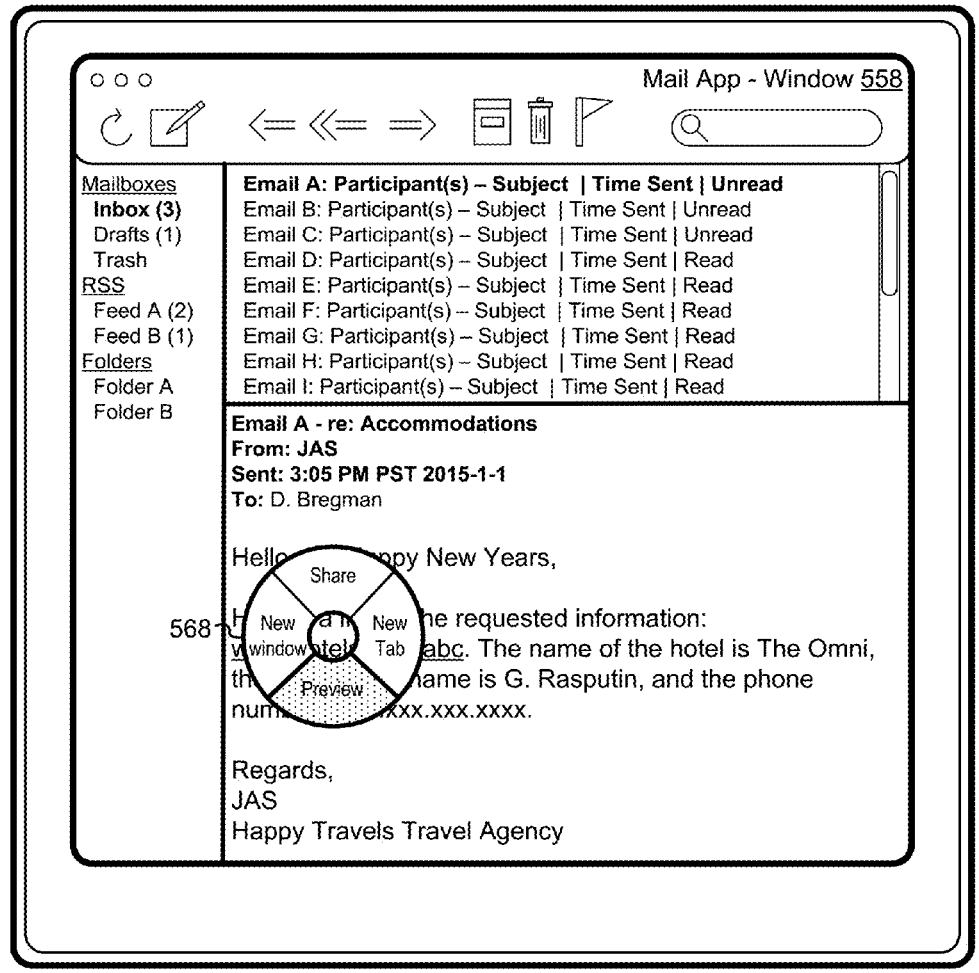
Figure 5C:
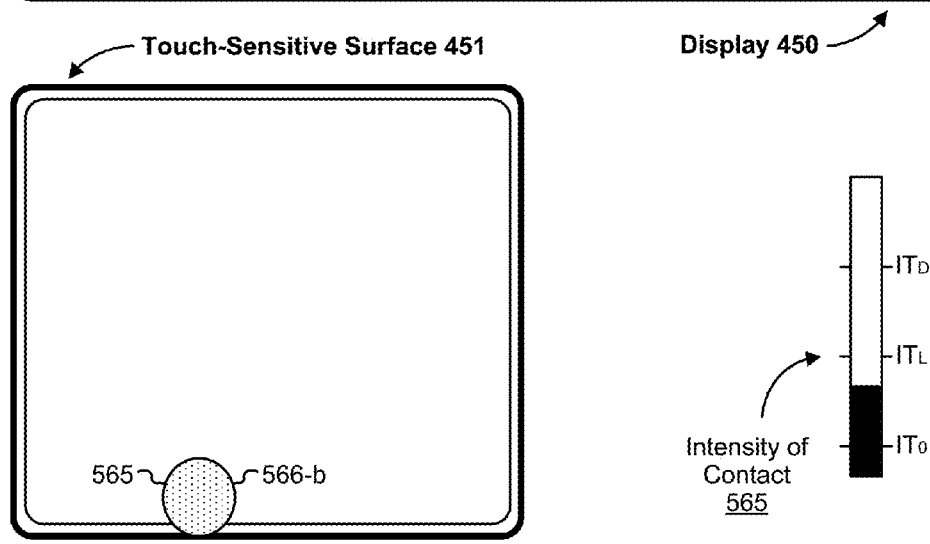
Figure 5D:
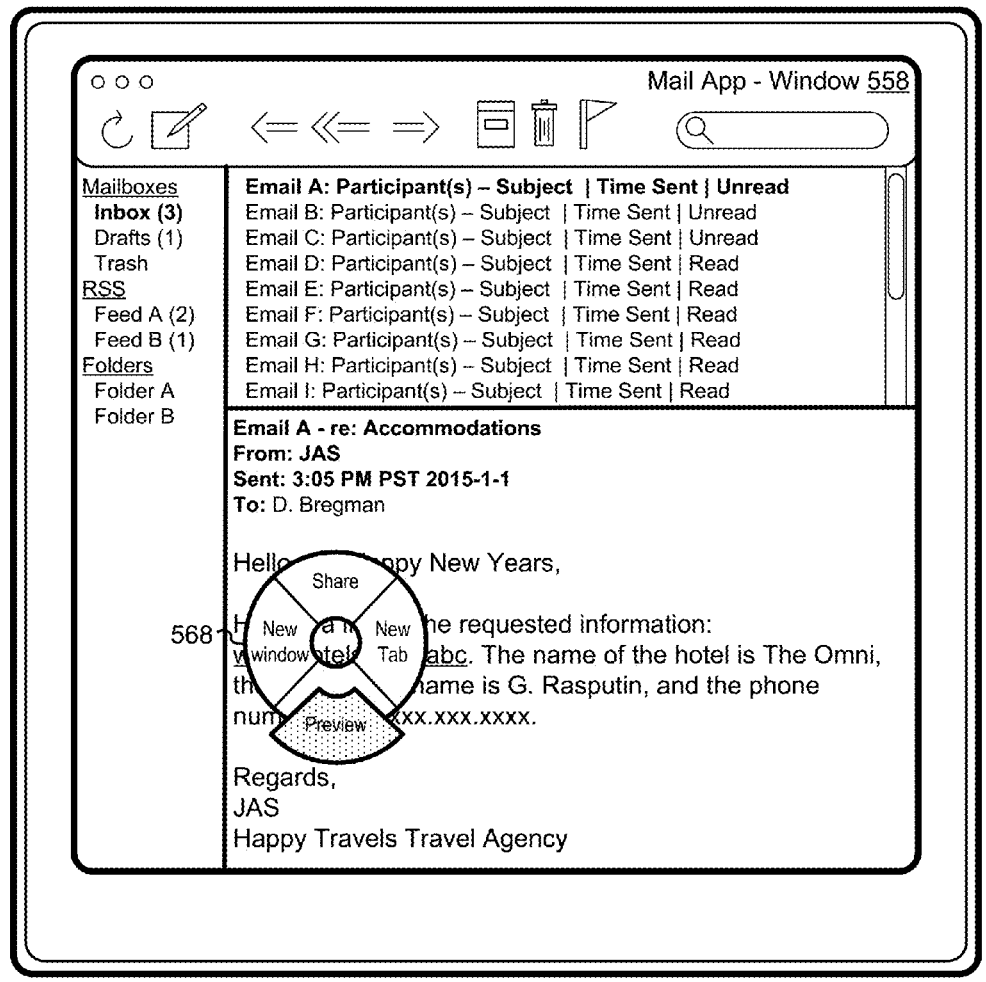
Figure 5D:
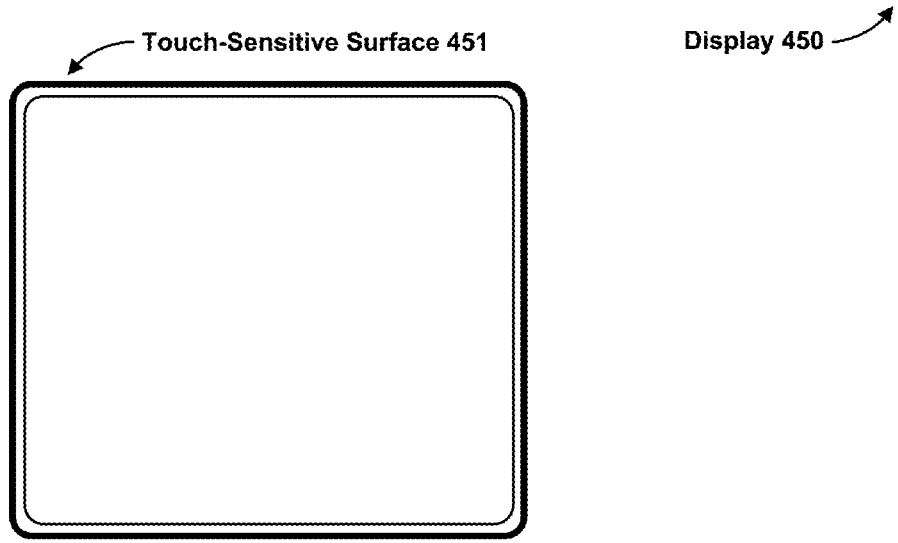
Figure 5E:
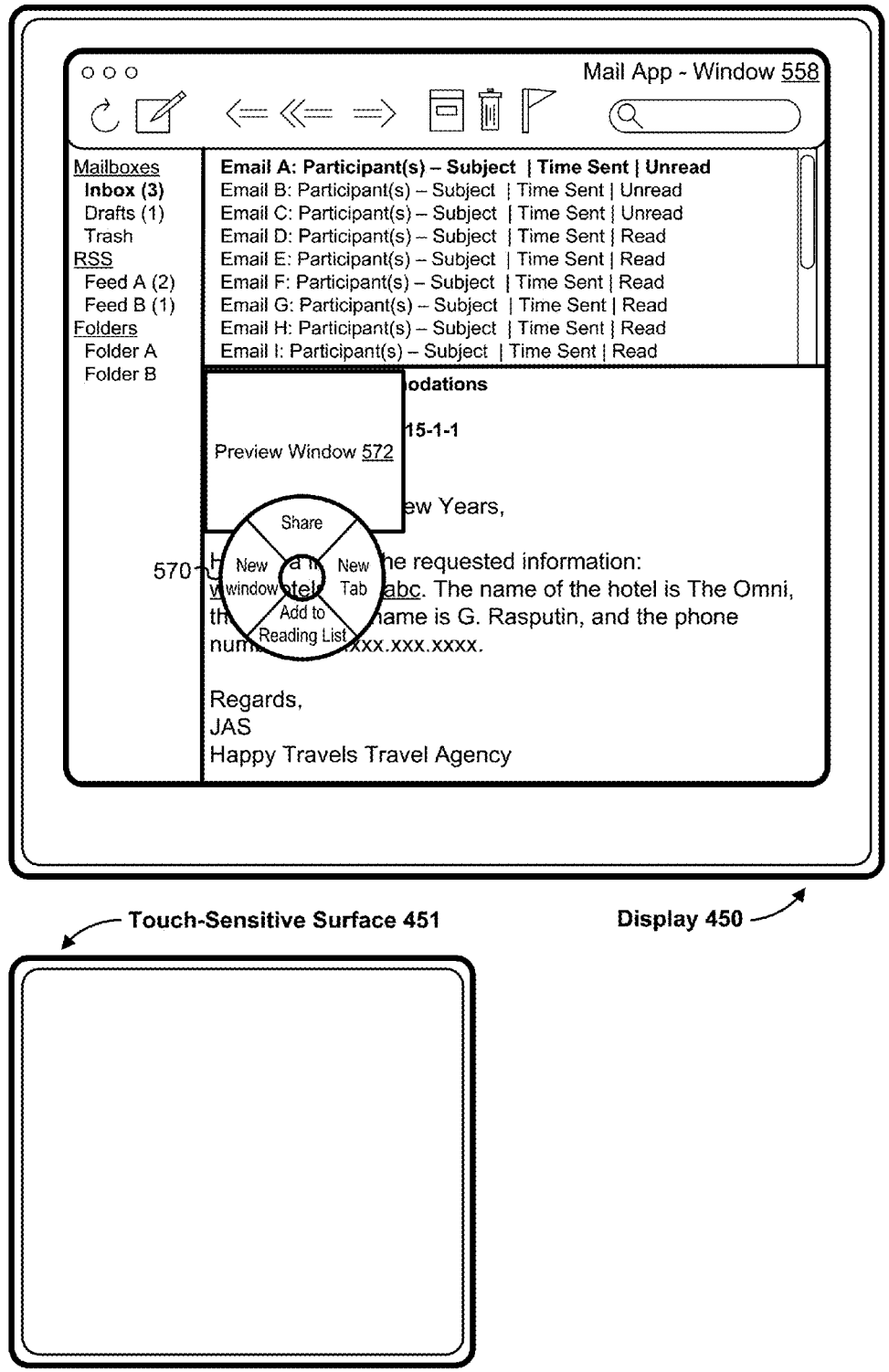
Figure 5F:
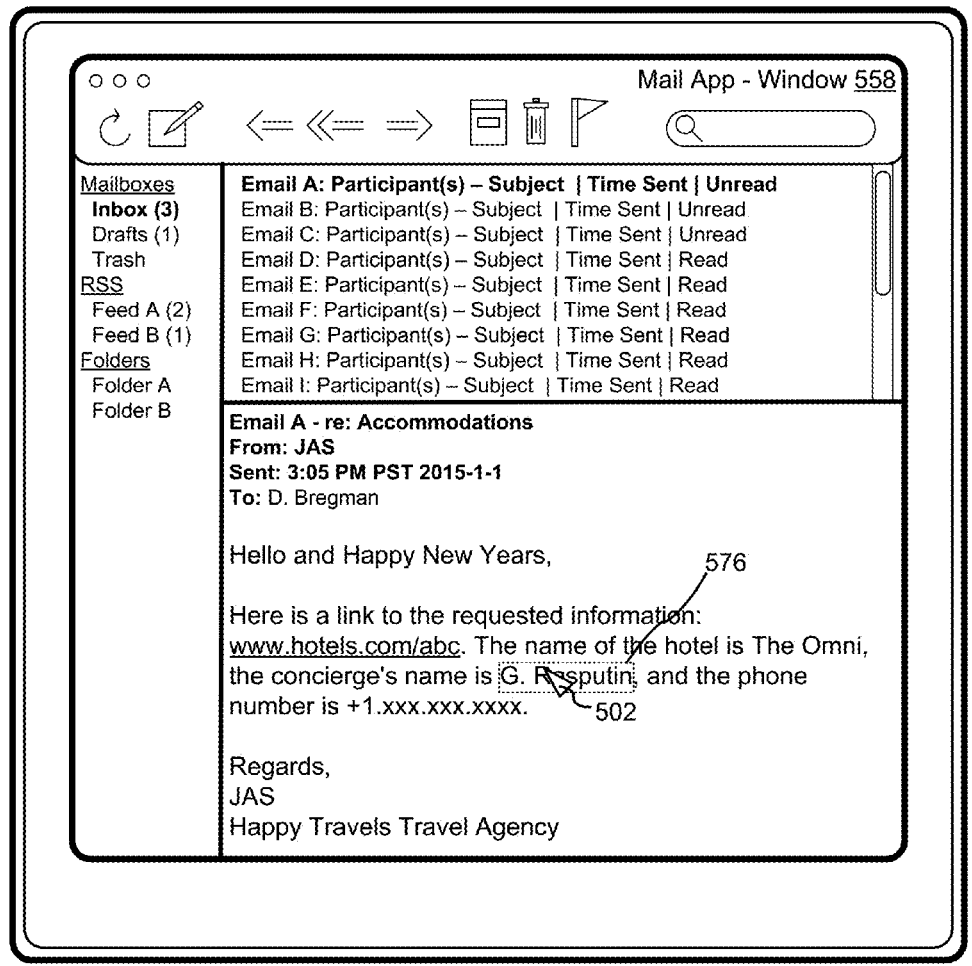
Figure 5F:
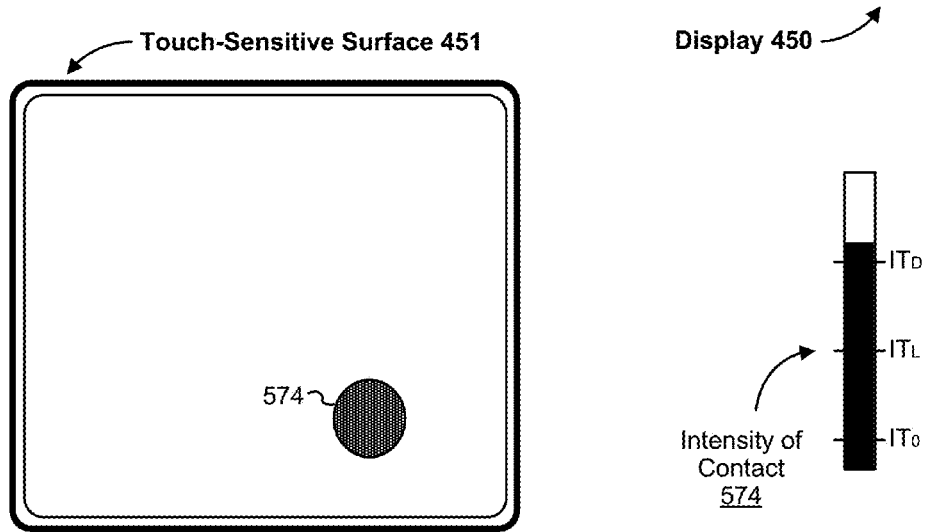
Figure 5G:
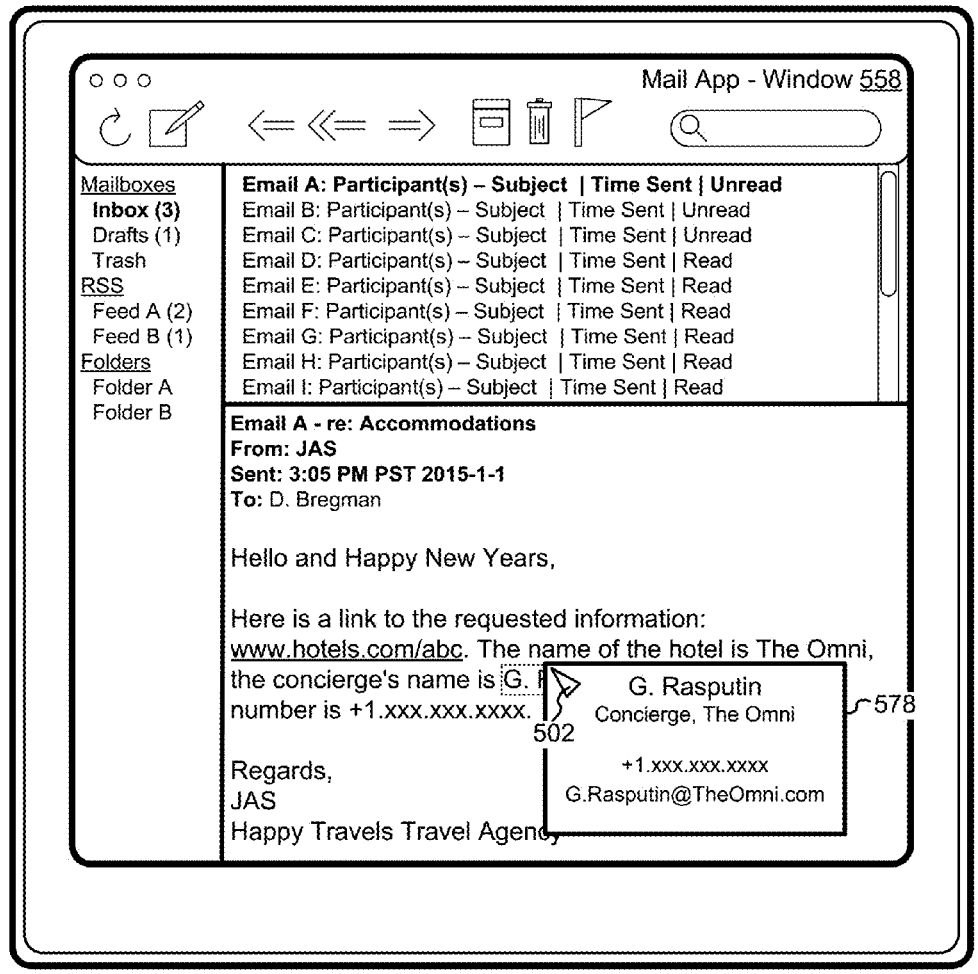
Figure 5G:
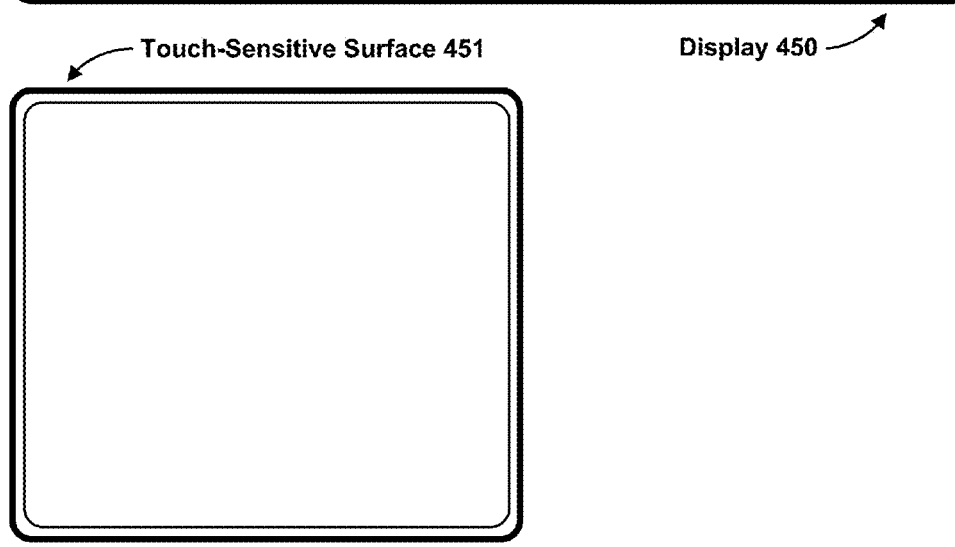
Figure 5H:
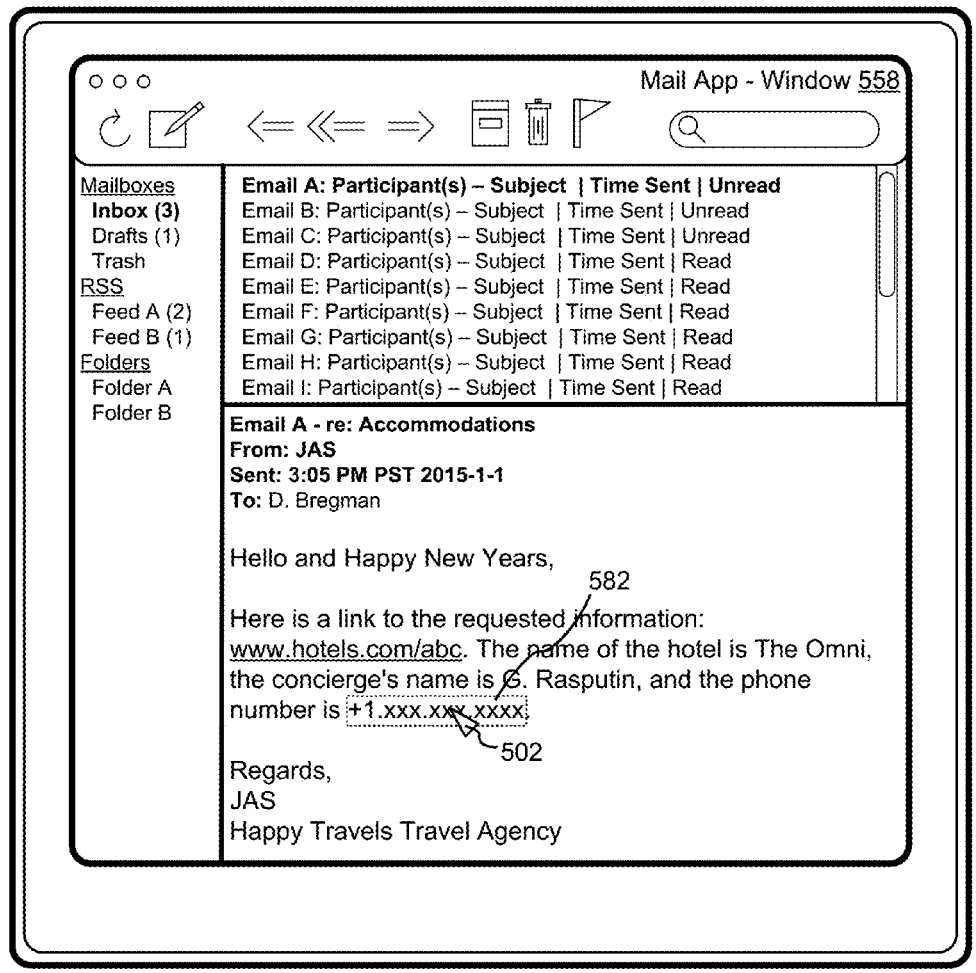
Figure 5H:
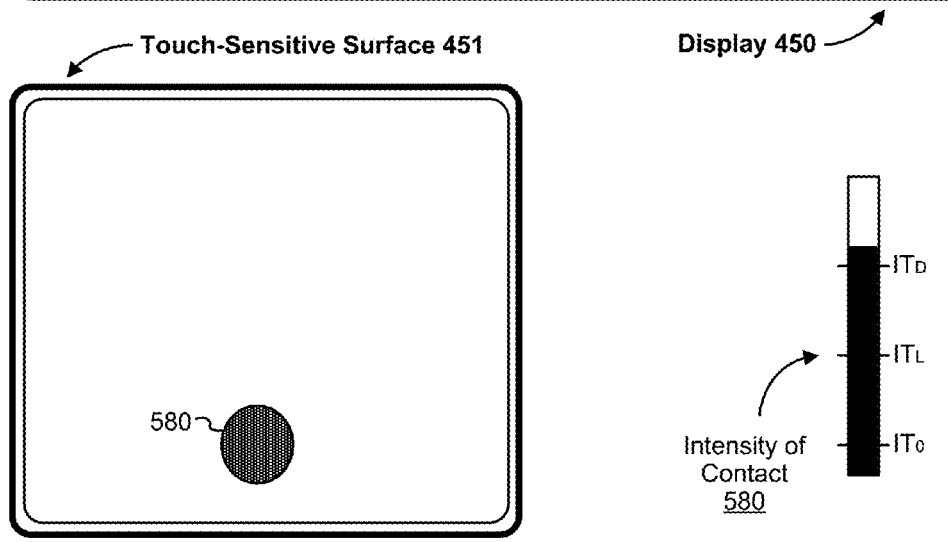
Figure 5I:
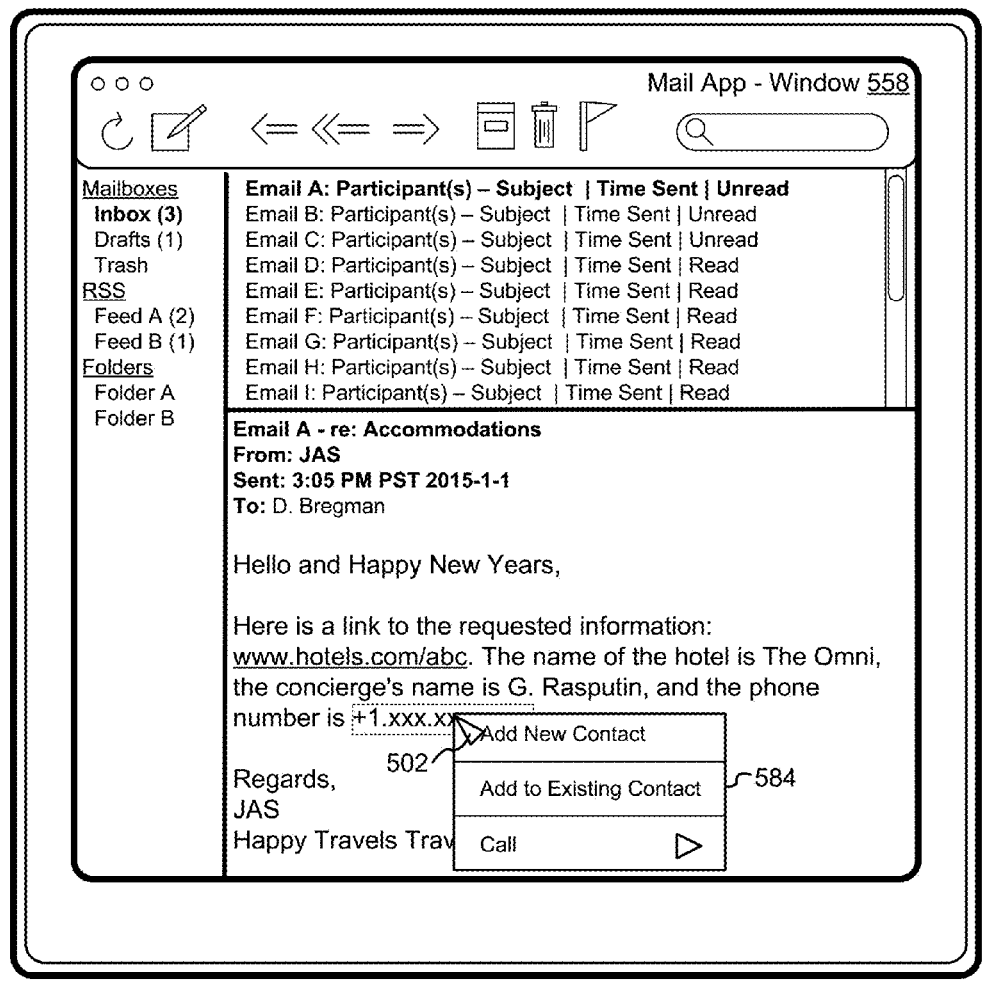
Figure 5I:
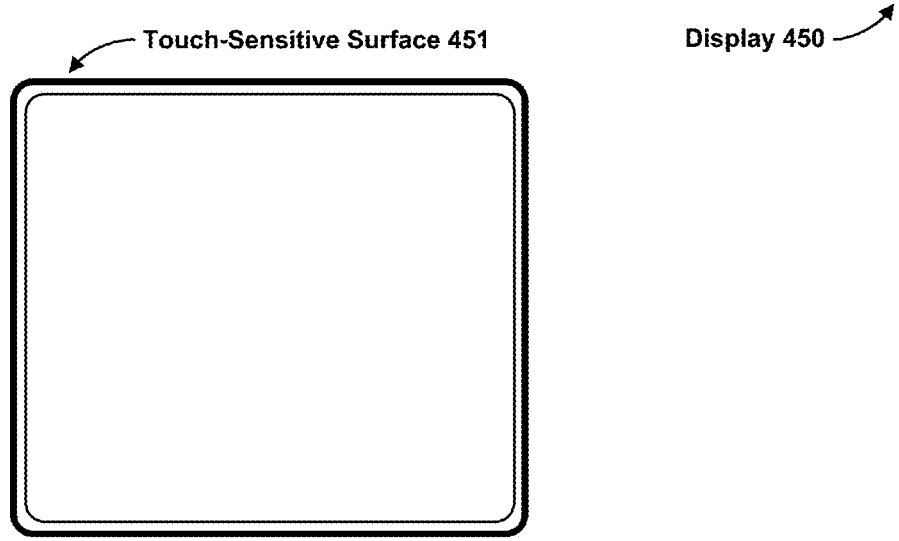
Figure 5J:
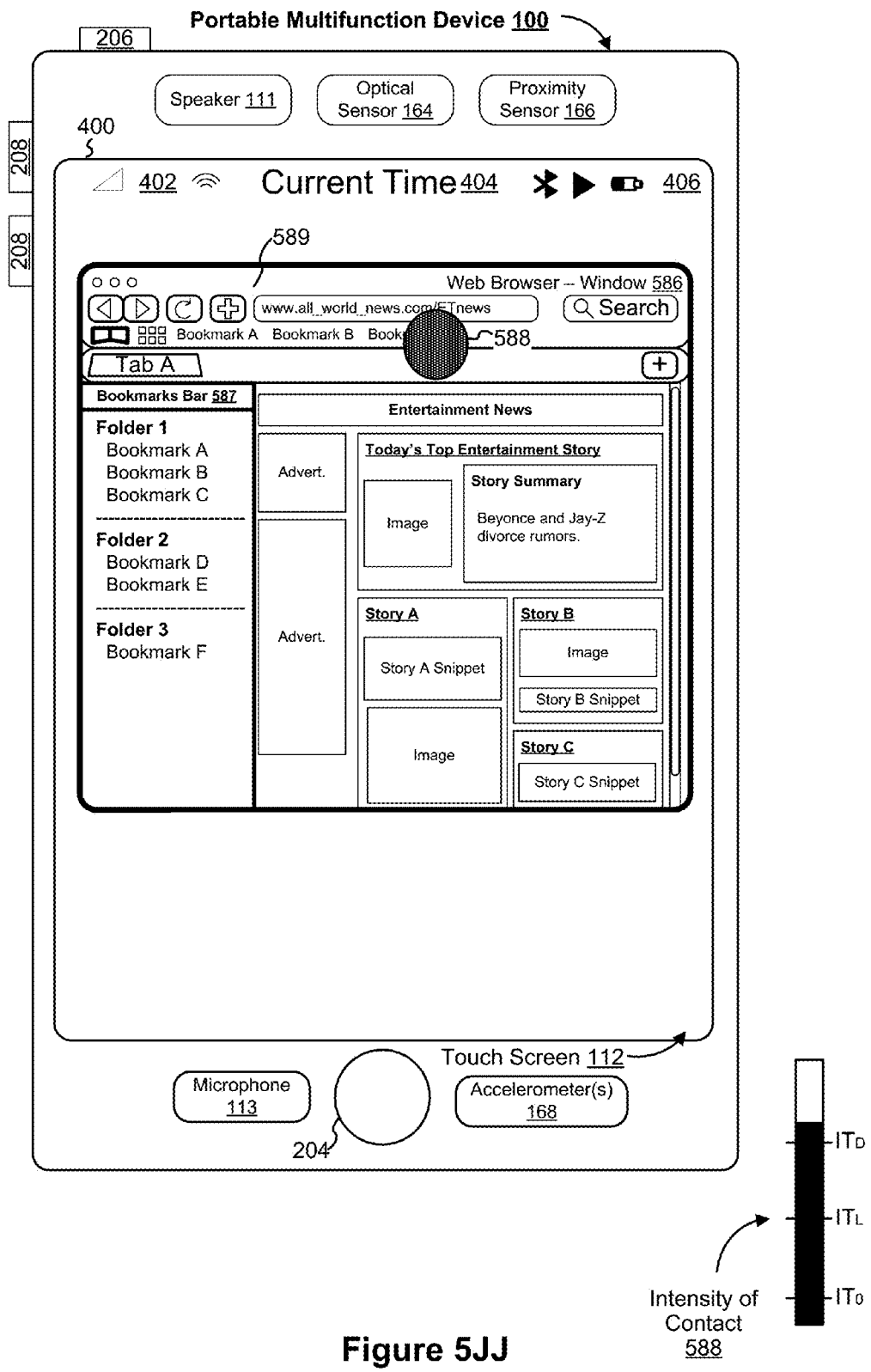
Figure 5K:
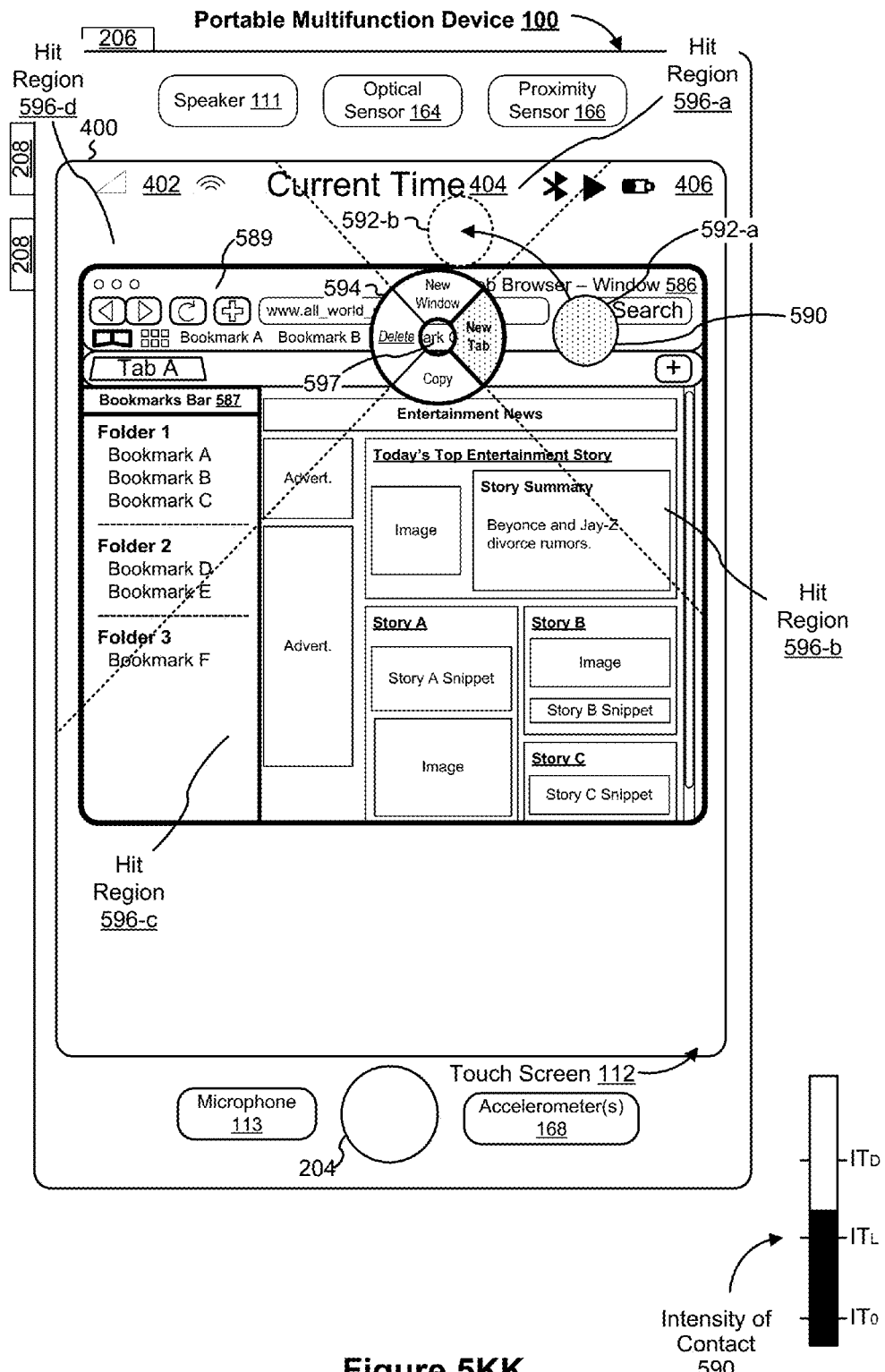
Figure 5L:
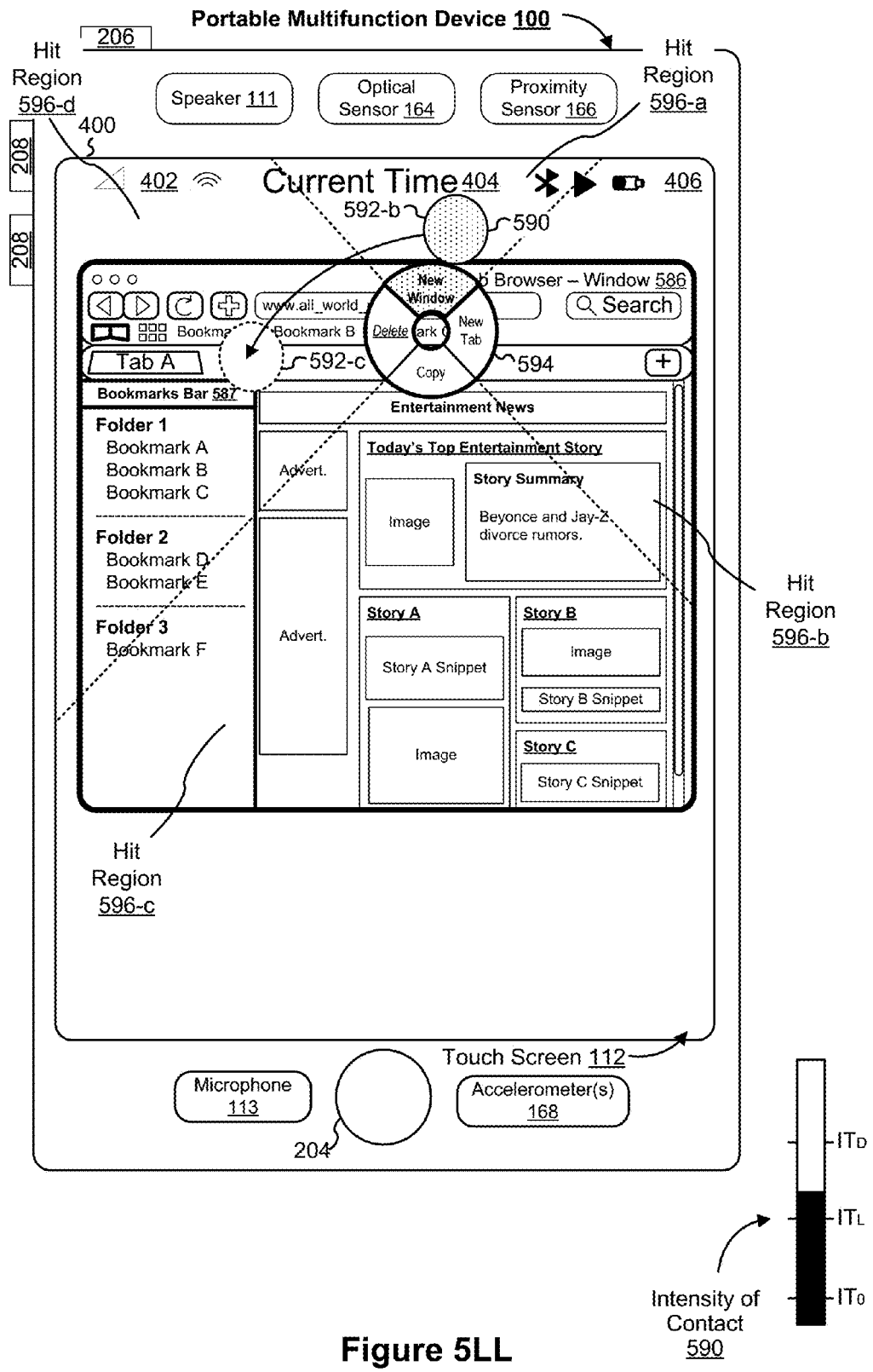
Figure 5M:
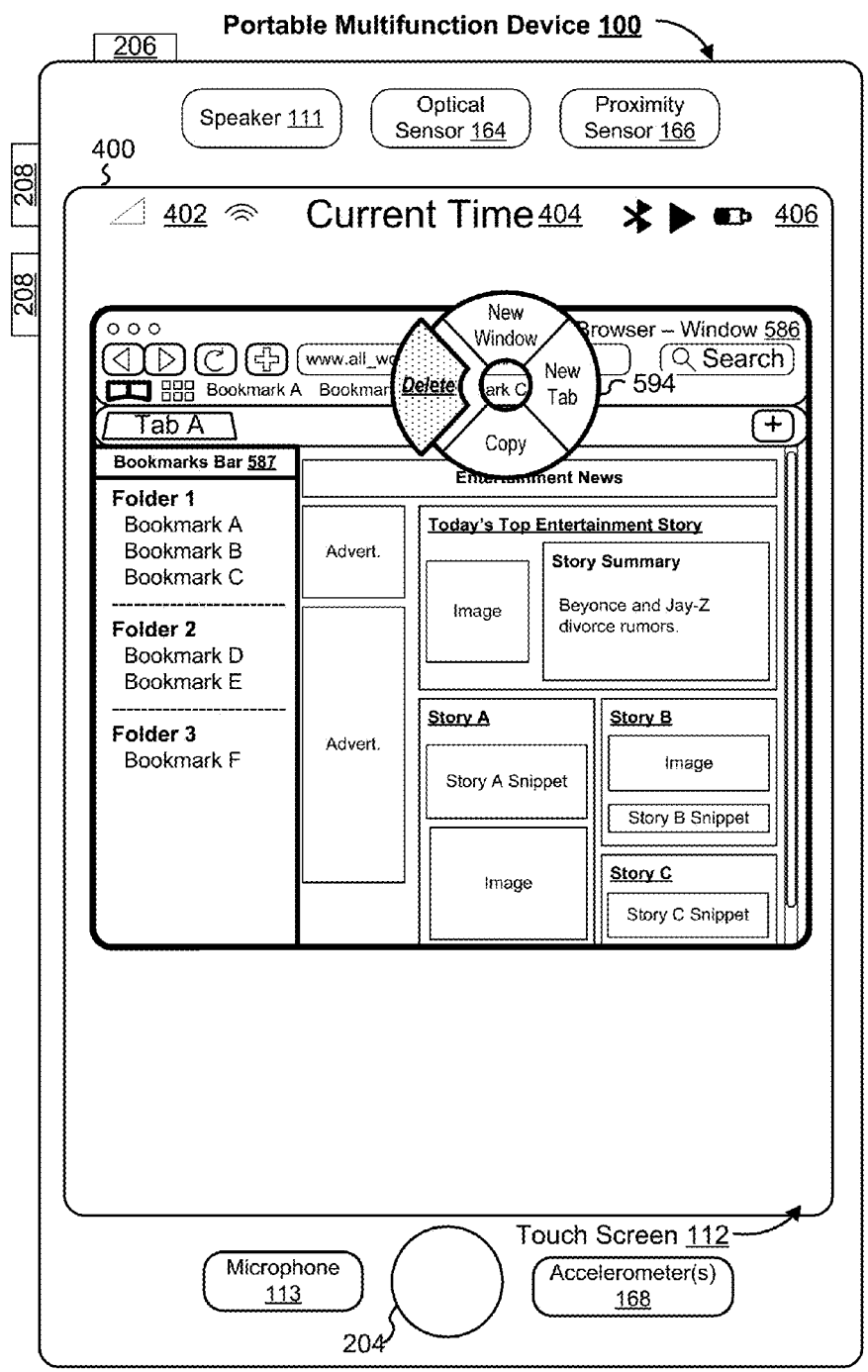
Figure 5N:
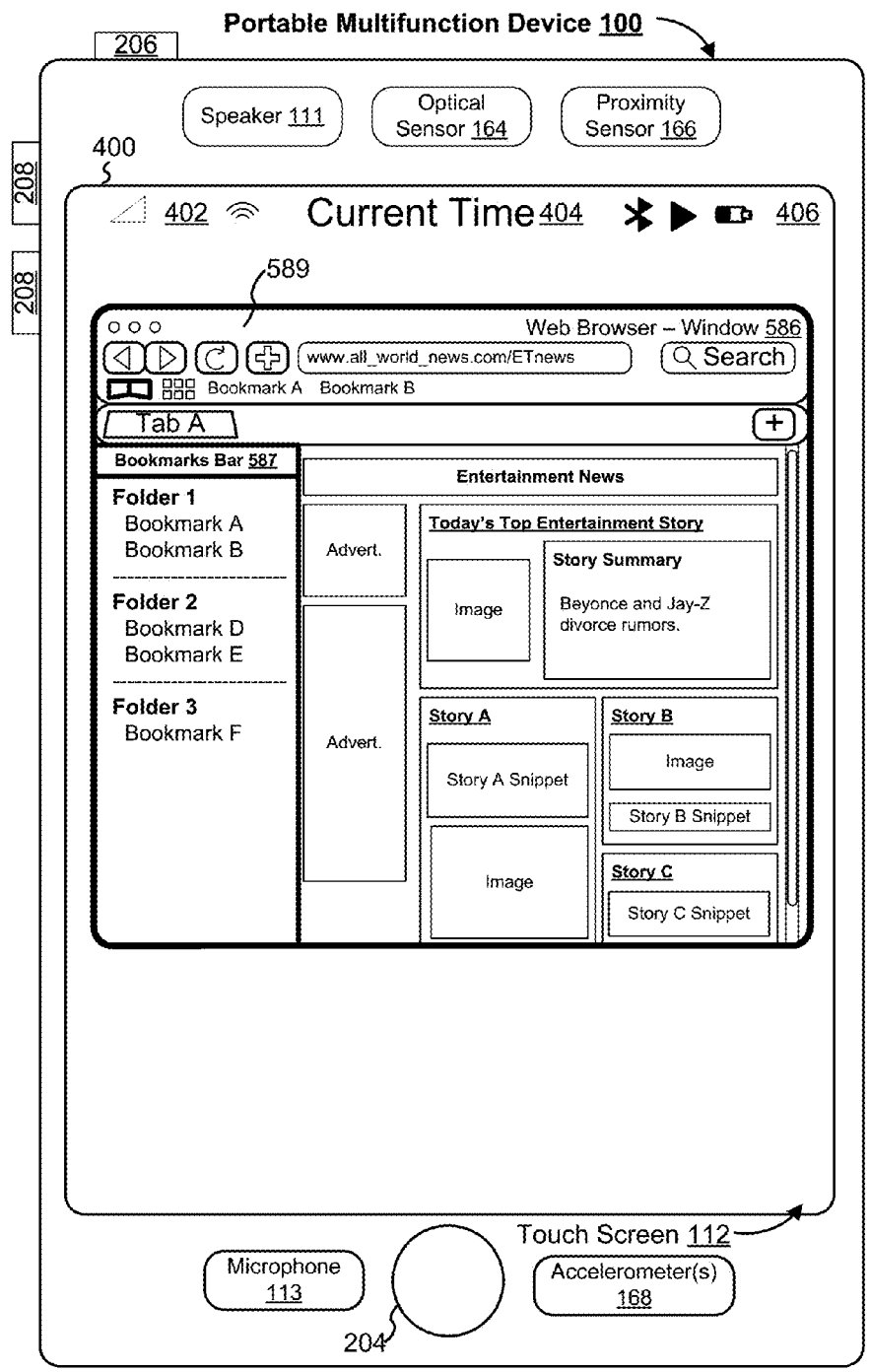

In FIG. 5Z, the reduced menu ceases to be displayed and the cursor 502 is re-displayed on display 450 in response to detecting lift-off of contact 560 and in accordance with a determination that the time of continuous detection of the contact 560 was greater than the predefined time period $T_X$. The portion of the text (e.g., "New Years") of "Email A" is still highlighted in FIG. 5Z.

FIGS. 5Z-5BB show a sequence in which a reduced menu is maintained upon detecting lift-off in accordance with a determination that predefined timing criteria are not satisfied. FIG. 5Z illustrates a contact 564 detected on touch-sensitive surface 451 and a displayed representation of a focus selector (e.g., the cursor 502) corresponding to contact 564 at a location on the display 450 that corresponds to a link (e.g., associated with the URL www.hotels.com/abc) within the window 558. In this example, the intensity of the contact 564 is between $IT_0$ and $IT_L$ (e.g., the contact detection intensity threshold). FIG. 5Z further illustrates that a time of continuous detection of the contact 564 is less than a predefined time period $T_X$ (e.g., 0.25 s, 0.5 s, 0.75 s, etc.). In FIG. 5AA, the cursor 502 ceases to be displayed and reduced menu 568 is displayed on display 450 in response to detecting that the intensity of the contact 564 is above $IT_D$. Furthermore, FIG. 5AA illustrates that the time of continuous detection of the contact 564 is less than the predefined time period $T_X$. In FIG. 5AA, the reduced menu 568 is associated with a plurality of selectable options that correspond to the link (e.g., associated with the URL www.hotels.com/abc), including: a new window action, a share action, a new tab action, and a preview action.

The left quadrant of the reduced menu 568, when activated (e.g., with a tap gesture at a location on the touch-sensitive surface 451 that corresponds to the left quadrant or a gross swipe gesture in the direction of the left quadrant), causes the web page that corresponds to the link (e.g., www.hotels.com/abc) to be opened in a new window of the web browser application. In some embodiments, the web page in the new window is prefetched. The top quadrant of the reduced menu 568, when activated (e.g., with a tap gesture at a location on the touch-sensitive surface 451 that corresponds to the top quadrant or a gross swipe gesture in the direction of the top quadrant), causes share options to be displayed in a separate reduced menu or other menu. The right quadrant of the reduced menu 568, when activated (e.g., with a tap gesture at a location on the touch-sensitive surface 451 that corresponds to the right quadrant or a gross swipe gesture in the direction of the right quadrant), causes the web page that corresponds to the link (e.g., www.hotels.com/abc) to be opened in a new tab of the web browser application. The bottom quadrant of the reduced menu 568, when activated (e.g., with a tap gesture at a location on the touch-sensitive surface 451 that corresponds to the bottom quadrant or a gross swipe gesture in the direction of the bottom quadrant), causes a preview window for the web page that corresponds to the link (e.g., www.hotels.com/abc) to be displayed.

In FIG. 5BB, contact 564 is no longer detected on touch-sensitive surface 451. FIG. 5BB illustrates maintaining display of the reduced menu 568 after detecting lift-off of contact 564 and in accordance with a determination that the time of continuous detection of the contact 564 was less than the predefined time period $T_X$.

FIGS. 5BB-5EE show a sequence in which a preview area is concurrently displayed with a reduced menu in response to selecting a preview option of a reduced menu. FIG. 5BB illustrates detection of a swipe gesture corresponding to the movement of contact 565 from the first location 566-a to a second location 566-b in the direction of the bottom quadrant of the reduced menu 568 associated with the preview action. In FIG. 5CC, the contact 565 is detected on touch-sensitive surface 451 at the second location 566-b and a visual characteristic of the bottom quadrant of the reduced menu 568 is changed in response to detecting contact 565 at the second location 566-b within a hit region corresponding to the bottom quadrant.

FIG. 5DD shows an animation in which the bottom quadrant is torn away from the reduced menu 568 to indicate that it was selected in response to detecting lift-off of contact 565 at the second location 566-b within a hit region corresponding to the bottom quadrant of the reduced menu 568. In FIG. 5EE, a reduced menu 570 is concurrently displayed along with preview window 572 on display 450 in response to detecting lift-off of contact 565 at the second location 566-b within a hit region corresponding to the bottom quadrant of the reduced menu 568 in FIGS. 5CC-5DD. The reduced menu 570 is associated with a plurality of selectable options that correspond to the link (e.g., www.hotels.com/abc), including: a new window action, a share action, a new tab action, and an add to reading list action. The preview window 572 displays at least a portion of the web page that corresponds to the link (e.g., www.hotels.com/abc).

The left quadrant of the reduced menu 570, when activated (e.g., with a tap gesture at a location on the touch-sensitive surface 451 that corresponds to the left quadrant or a gross swipe gesture in the direction of the left quadrant), causes the web page that corresponds to the link (e.g., www.hotels.com/abc) to be opened in a new window of the web browser application. In some embodiments, the web page in the new window is prefetched. The top quadrant of the reduced menu 570, when activated (e.g., with a tap gesture at a location on the touch-sensitive surface 451 that corresponds to the top quadrant or a gross swipe gesture in the direction of the top quadrant), causes share options to be displayed in a separate reduced menu or other menu. The right quadrant of the reduced menu 570, when activated (e.g., with a tap gesture at a location on the touch-sensitive surface 451 that corresponds to the right quadrant or a gross swipe gesture in the direction of the right quadrant), causes the web page that corresponds to the link (e.g., www.hotels.com/abc) to be opened in a new tab of the web browser application. The bottom quadrant of the reduced menu 570, when activated (e.g., with a tap gesture at a location on the touch-sensitive surface 451 that corresponds to the bottom quadrant or a gross swipe gesture in the direction of the bottom quadrant), causes the web page that corresponds to the link (e.g., www.hotels.com/abc) to be added to the user's reading list for future access and perusal. Alternatively, in some embodiments, the device maintains display of the reduced menu 568 and also displays preview window 572 in response to detecting lift-off of contact 565 at the second location 566-b within a hit region corresponding to the bottom quadrant of the reduced menu 568 in FIGS. 5CC-5DD. In these embodiments, the bottom quadrant corresponding to the preview action is either disabled or, when activated again, causes the preview window to be dismissed.

FIGS. 5FF-5II show a sequence in which a one-finger deep press gesture causes display of additional user interface elements for data detected links. FIG. 5FF illustrates a contact 574 detected on touch-sensitive surface 451 and a displayed representation of a focus selector (e.g., the cursor 502) corresponding to contact 574 at a location on the display 450 that corresponds to data detected link 576 (e.g., the name "G. Rasputin") within the window 558. In this example, the intensity of the contact 574 is above $IT_D$ (e.g., the deep press intensity level). In FIG. 5GG, a first additional user interface element 578 (e.g., a contact card) that corresponds to G. Rasputin" is overlaid on window 558 in response to detecting the one-finger deep press gesture at the location corresponding to the data detected link 576 in FIG. 5FF.

FIG. 5HH illustrates a contact 580 detected on touch-sensitive surface 451 and a displayed representation of a focus selector (e.g., the cursor 502) corresponding to contact 580 at a location on the display 450 that corresponds to data detected link 582 (e.g., the phone number "+1.xxx.xxx.xxxx") within the window 558. In this example, the intensity of the contact 580 is above $IT_D$ (e.g., the deep press intensity level). In FIG. 5II, a second additional user interface element 584 (e.g., a menu) is displayed on display 450 in response to detecting the one-finger deep press gesture at the location corresponding to the data detected link 582 in FIG. 5HH. The second additional user interface element 584, in FIG. 5II, includes options associated with the phone number, including: adding the phone number as a new contact, adding the phone number to an existing contact, or calling the phone number via one of multiple possible options (e.g., VoIP, cellular service, Face-Time, etc.).

For convenience of explanation, the embodiments described with reference to FIGS. 5JJ-5NN will be discussed with reference to a device with a touch-sensitive display system 112; however, analogous operations are, optionally, performed on a device with a display 450 and a separate touch-sensitive surface 451.

FIGS. 5JJ-5NN show a sequence in which a one-finger deep press gesture is performed on a bookmark within a navigation bar. FIG. 5JJ illustrates a window 586 for a web browser application displayed on touch screen 112. In FIG. 5JJ, the window 586 shows an "Entertainment News" section (e.g., corresponding to the URL www.all_world_news.com/ETnews) for a website (e.g., the "All World News" website) along with bookmarks bar 587 and a navigation bar 589. FIG. 5JJ also illustrates contact 588 detected on touch screen at a location that corresponds to a "Bookmark C" within the navigation bar 589. In this example, the intensity of the contact 588 is above $IT_D$ (e.g., the deep press intensity level).

In FIG. 5KK, a reduced menu 594 is displayed on the touch screen 112 in response to detecting the one-finger deep press gesture in FIG. 5JJ. In this example, the reduced menu 594 is centered at the location where contact 588 was detected in FIG. 5JJ. In FIG. 5KK, the reduced menu 594 is associated with a plurality of selectable options associated with "Bookmark C," including: a delete action, a new window action, a new tab action, and a copy action.

The left quadrant of the reduced menu 594, when activated (e.g., with a tap gesture at a location on the touch screen 112 that corresponds to the left quadrant or a gross swipe gesture in the direction of the left quadrant), causes the "Bookmark C" to be deleted from the bookmarks bar 587 and also from the navigation bar 589. For example, the left quadrant is associated with hit region 596-d, and detection of a contact within hit region 596-d causes the left quadrant to be selected and lift-off of a contact within hit region 596-d activates the deletion action associated with the left quadrant. The top quadrant of the reduced menu 594, when activated (e.g., with a tap gesture at a location on the touch screen 112 that corresponds to the top quadrant or a gross swipe gesture in the direction of the top quadrant), causes a web page associated with "Bookmark C" to be displayed within a new window of the web browser application. In some embodiments, the web page in the new window is prefetched. For example, the top quadrant is associated with hit region 596-a, and detection of a contact within hit region 596-a causes the top quadrant to be selected and lift-off of a contact within hit region 596-a activates the new window action associated with the top quadrant.

The right quadrant of the reduced menu 594, when activated (e.g., with a tap gesture at a location on the touch screen 112 that corresponds to the right quadrant or a gross swipe gesture in the direction of the right quadrant), causes the "web page associated with "Bookmark C" to be opened in a new tab within window 586 of the web browser application. For example, the right quadrant is associated with hit region 596-b, and detection of a contact within hit region 596-b causes the right quadrant to be selected and lift-off of a contact within hit region 596-b activates the new tab action associated with the right quadrant. The bottom quadrant of the reduced menu 594, when activated (e.g., with a tap gesture at a location on the touch screen 112 that corresponds to the bottom quadrant or a gross swipe gesture in the direction of the bottom quadrant), causes the URL associated with "Bookmark C" to be copied to the clipboard. For example, the bottom quadrant is associated with hit region 596-c, and detection of a contact within hit region 596-c causes the bottom quadrant to be selected and lift-off of a contact within hit region 596-c activates the copy action associated with the bottom quadrant. In FIG. 5KK, the center of the reduced menu 594 is associated with a center "dead-zone" 597 of the hit regions 596. For example, lift-off of a contact within the center "dead-zone" 597 causes dismissal of the reduced menu 594 while forgoing actions associated with the quadrants of the reduced menu 594.

In FIG. 5KK, a visual characteristic of the right quadrant of the reduced menu 594 is changed in response to detecting contact 590 at a first location 592-a within the hit region 596-b. FIG. 5KK also illustrates detection of a swipe gesture corresponding to the movement of contact 590 from the first location 592-a (e.g., corresponding to hit region 596-b) to a second location 592-b (e.g., corresponding to hit region 596-a) in the direction of the top quadrant associated with the new window action. In this example, the intensity of the contact 590 is between $IT_L$ and $IT_D$ (e.g., the light press intensity level).

In FIG. 5LL, a visual characteristic of the top quadrant of the reduced menu 594 is changed in response to detecting contact 590 at the second location 592-b within the hit region 596-a. FIG. 5LL also illustrates detection of a swipe gesture corresponding to the movement of contact 590 from the second location 592-b (e.g., corresponding to hit region 596-a) to a third location 592-c (e.g., corresponding to hit region 596-d) in the direction of the left quadrant associated with the deletion action. In this example, the intensity of the contact 590 is between $IT_L$ and $IT_D$ (e.g., the light press intensity level). In some embodiments, these responses also occur provided the intensity of the contact is above $IT_0$.

FIG. 5MM shows an animation in which the left quadrant is torn away from the reduced menu 594 and a visual characteristic of the left quadrant of the reduced menu 594 is changed in response to detecting lift-off of contact 590 at the third location 592-c within the hit region 596-d. In FIG.

5NN, "Bookmark C" is no longer displayed within the bookmark bar 587 and the navigation bar 589 in response to detecting lift-off of contact 590 at the third location 592-c within the hit region 596-d.

Figure 6A:
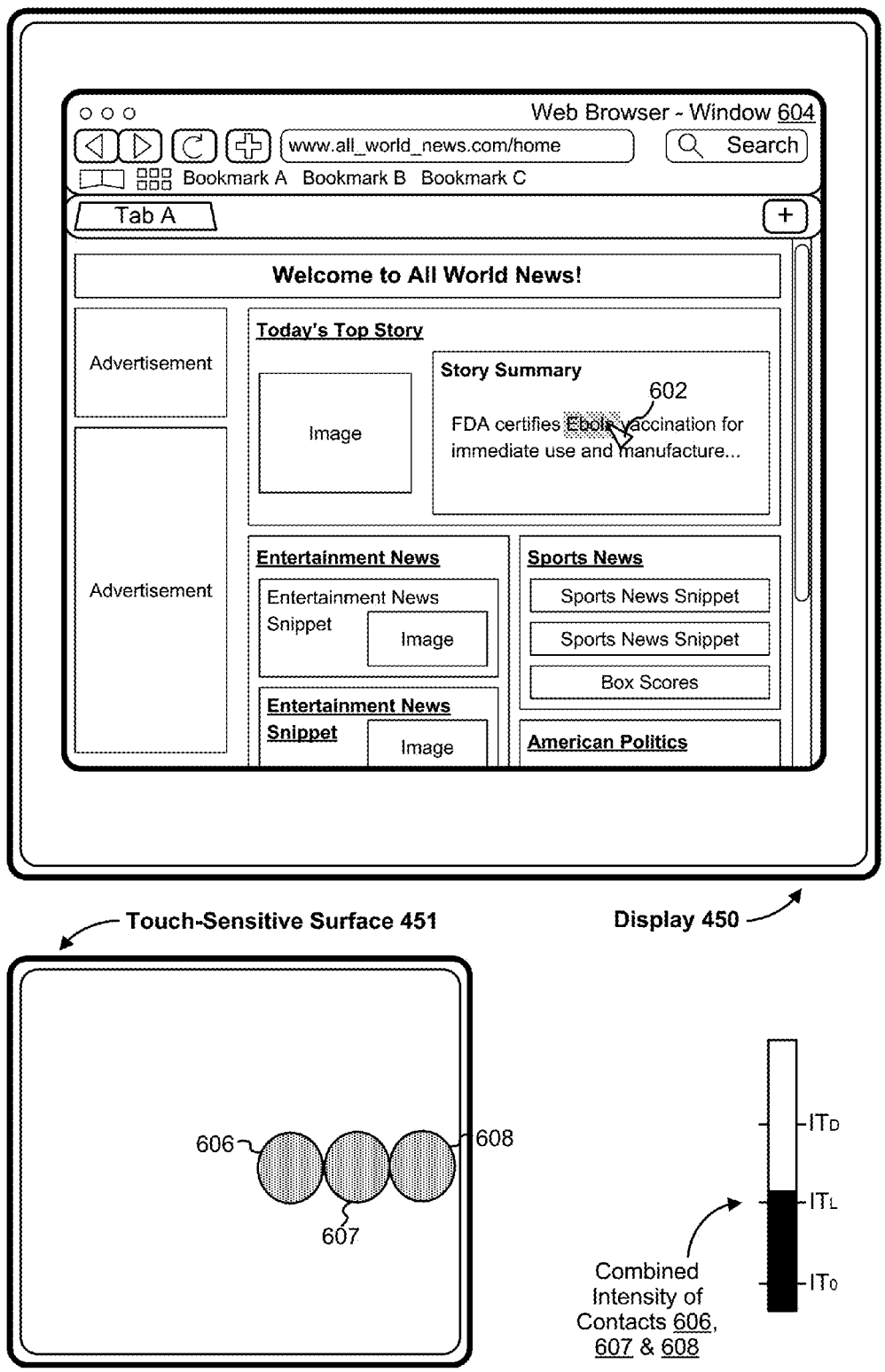
FIGS. 6A-6X illustrate exemplary user interfaces for displaying and using menus in accordance with some embodiments.
Figure 6B:
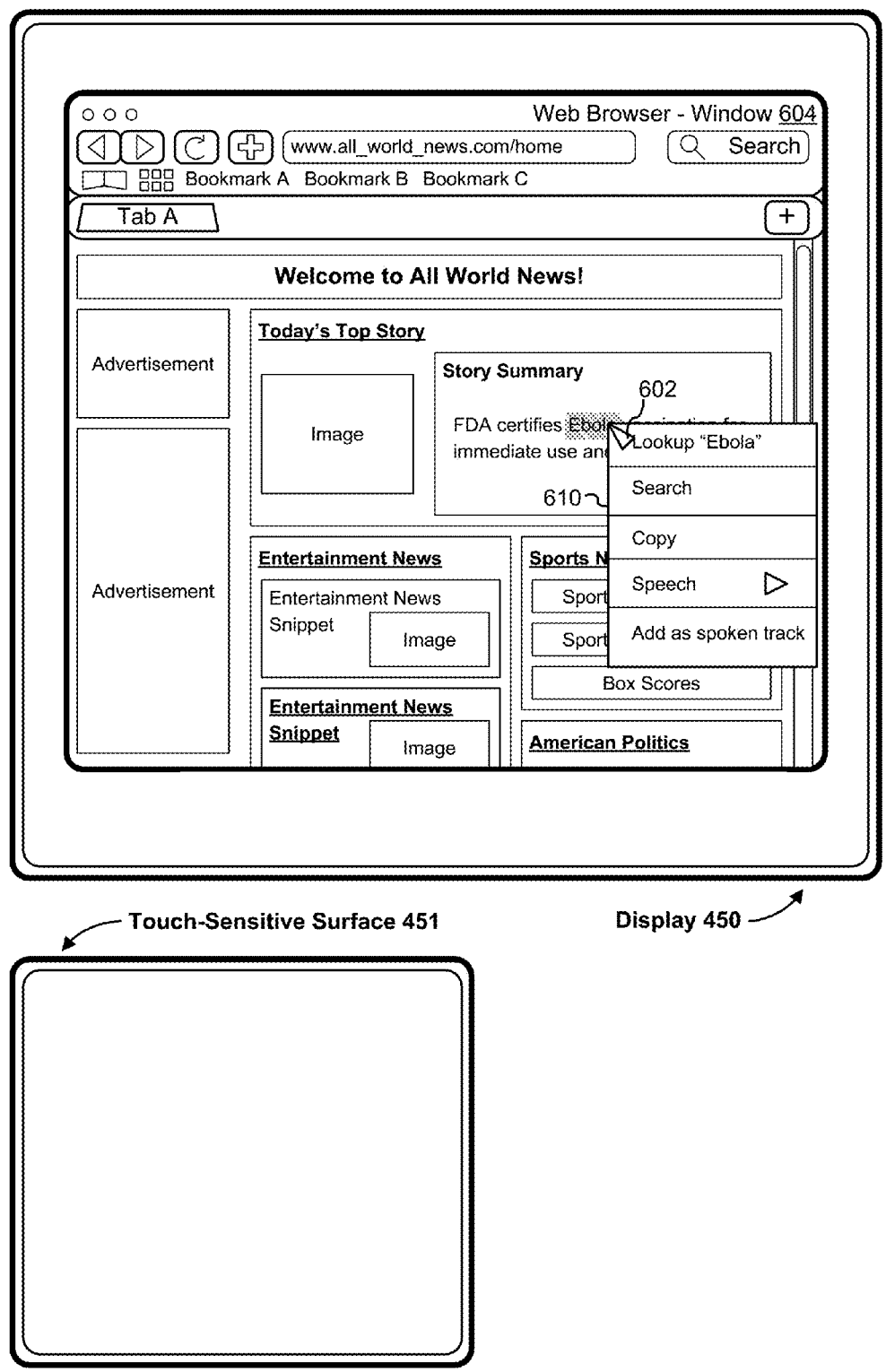
Figure 6C:
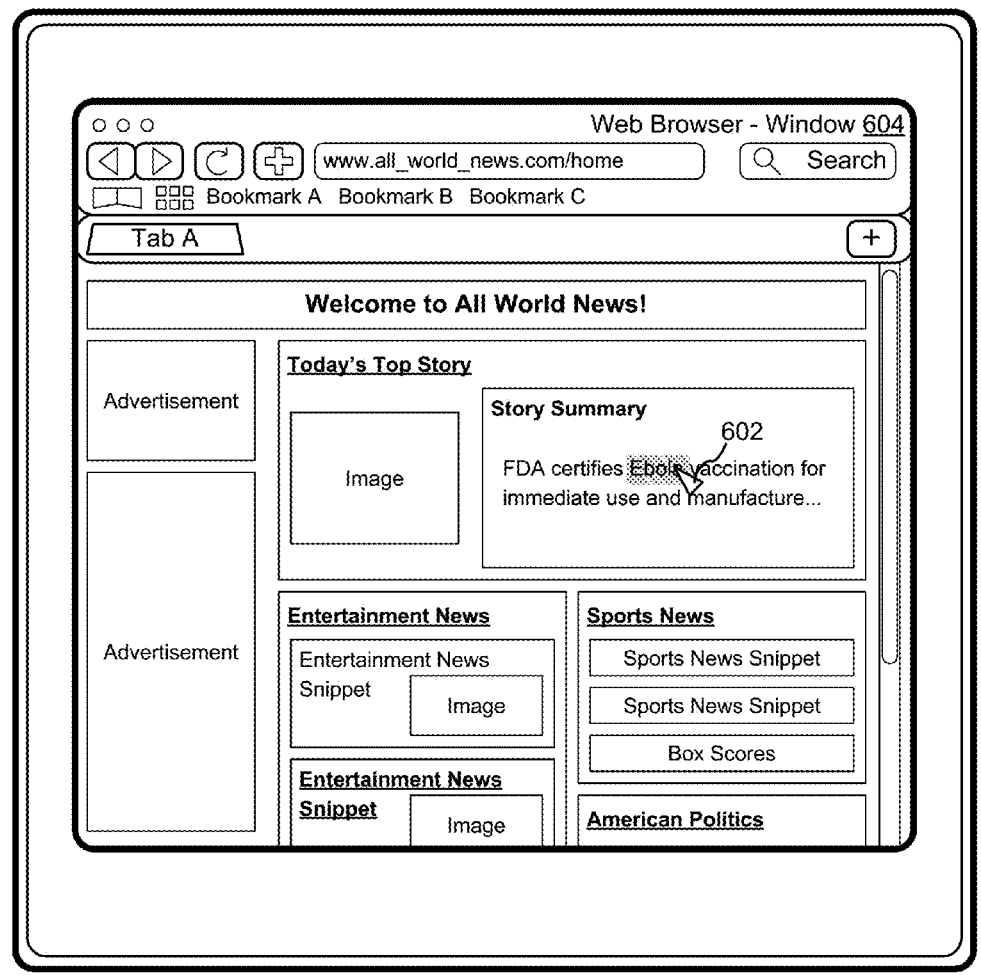
Figure 6C:
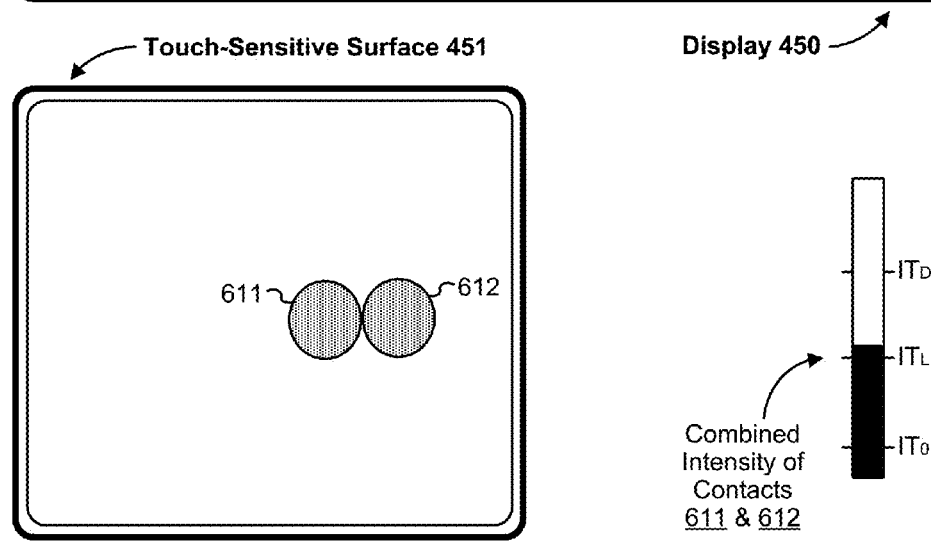
Figure 6D:
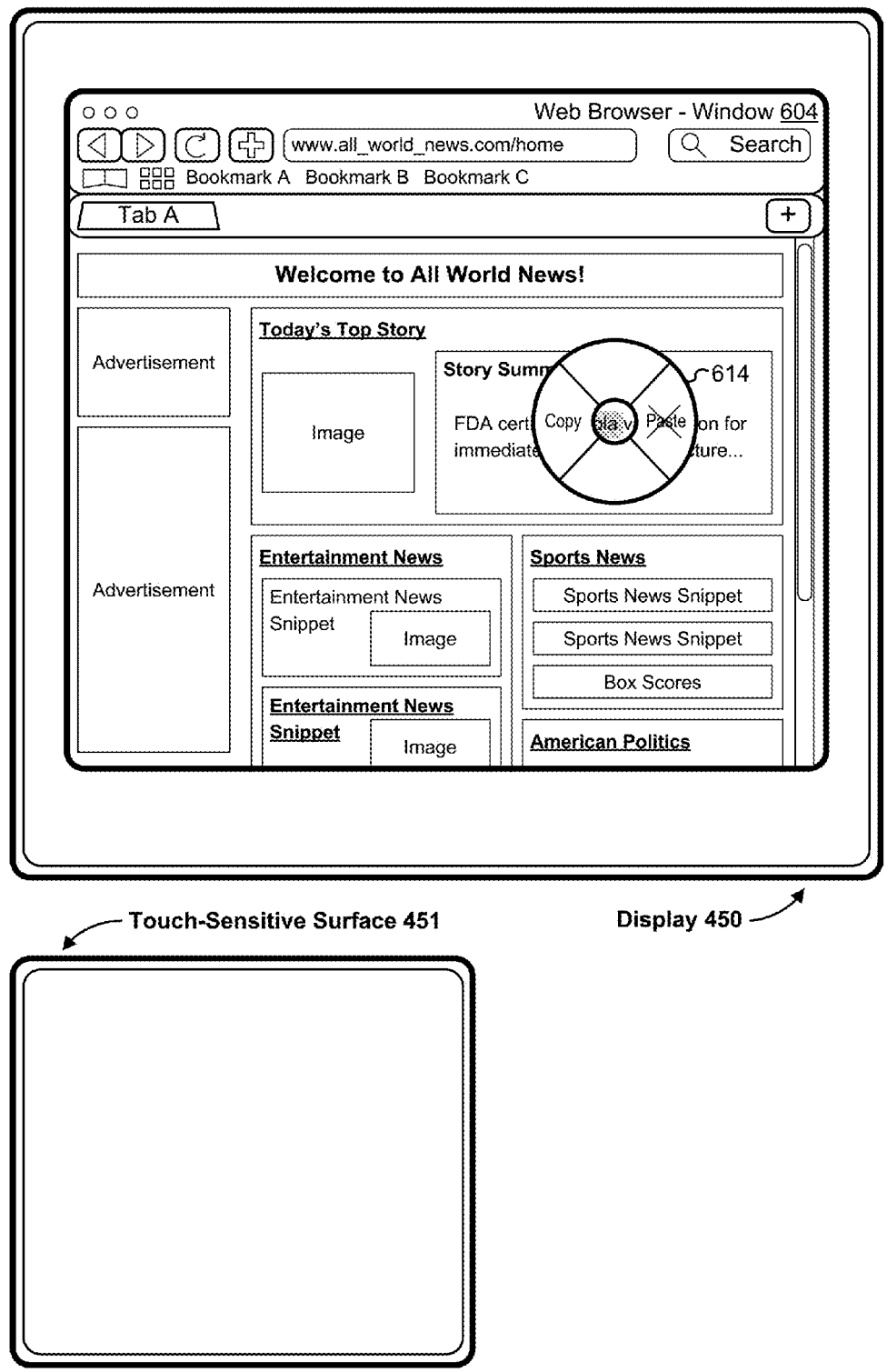
Figure 6E:
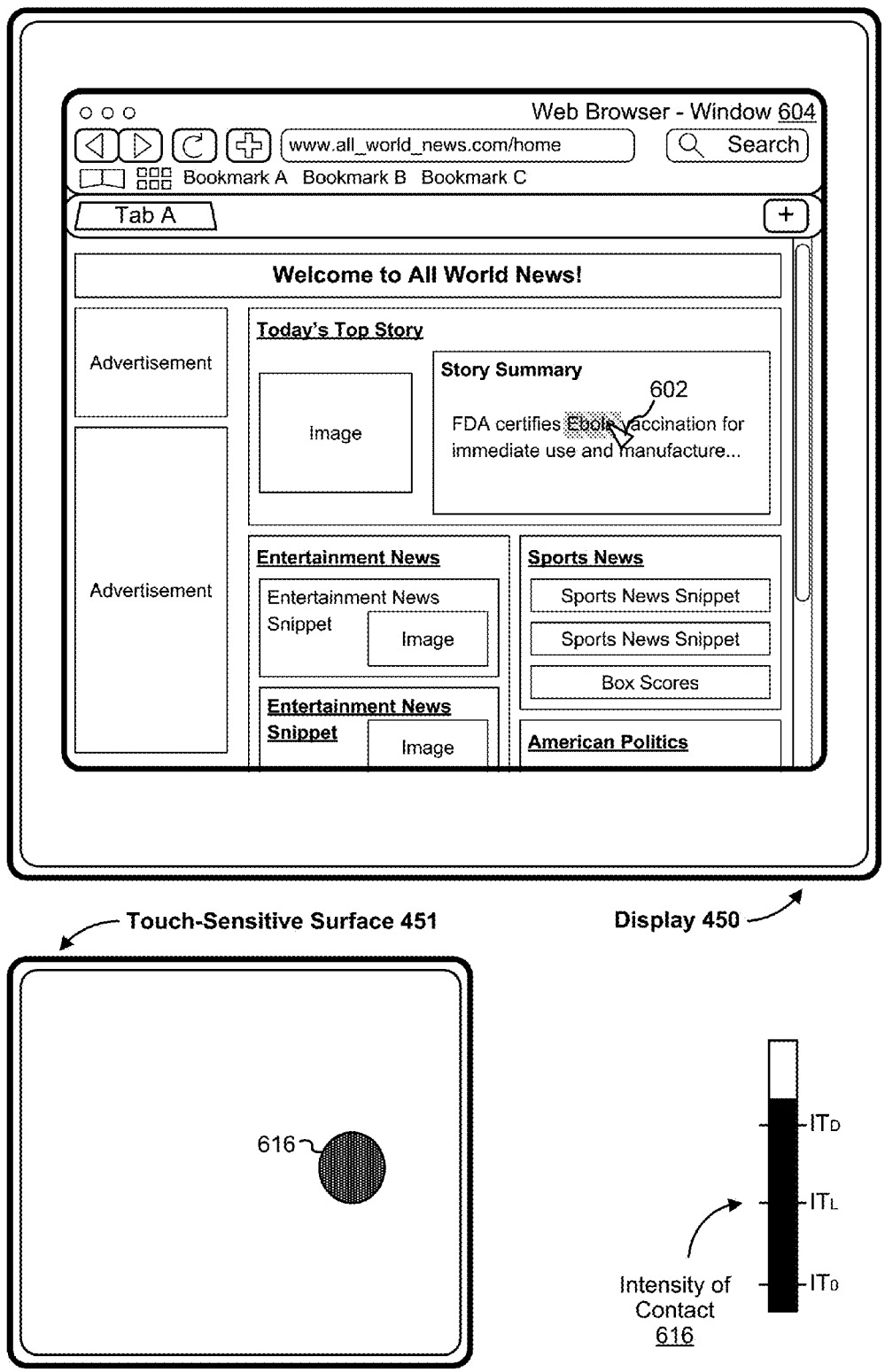
Figure 6F:
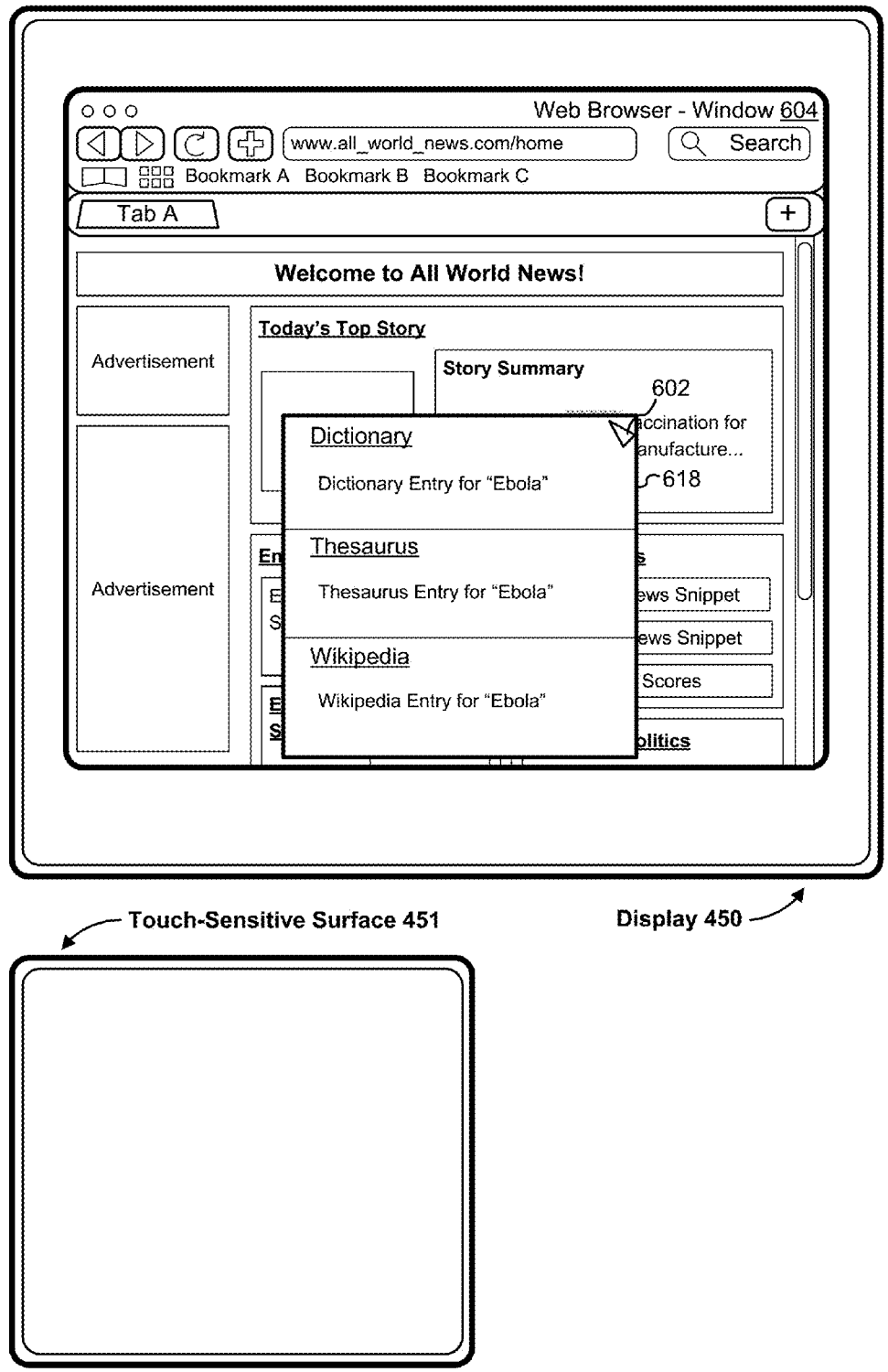
Figure 6G:
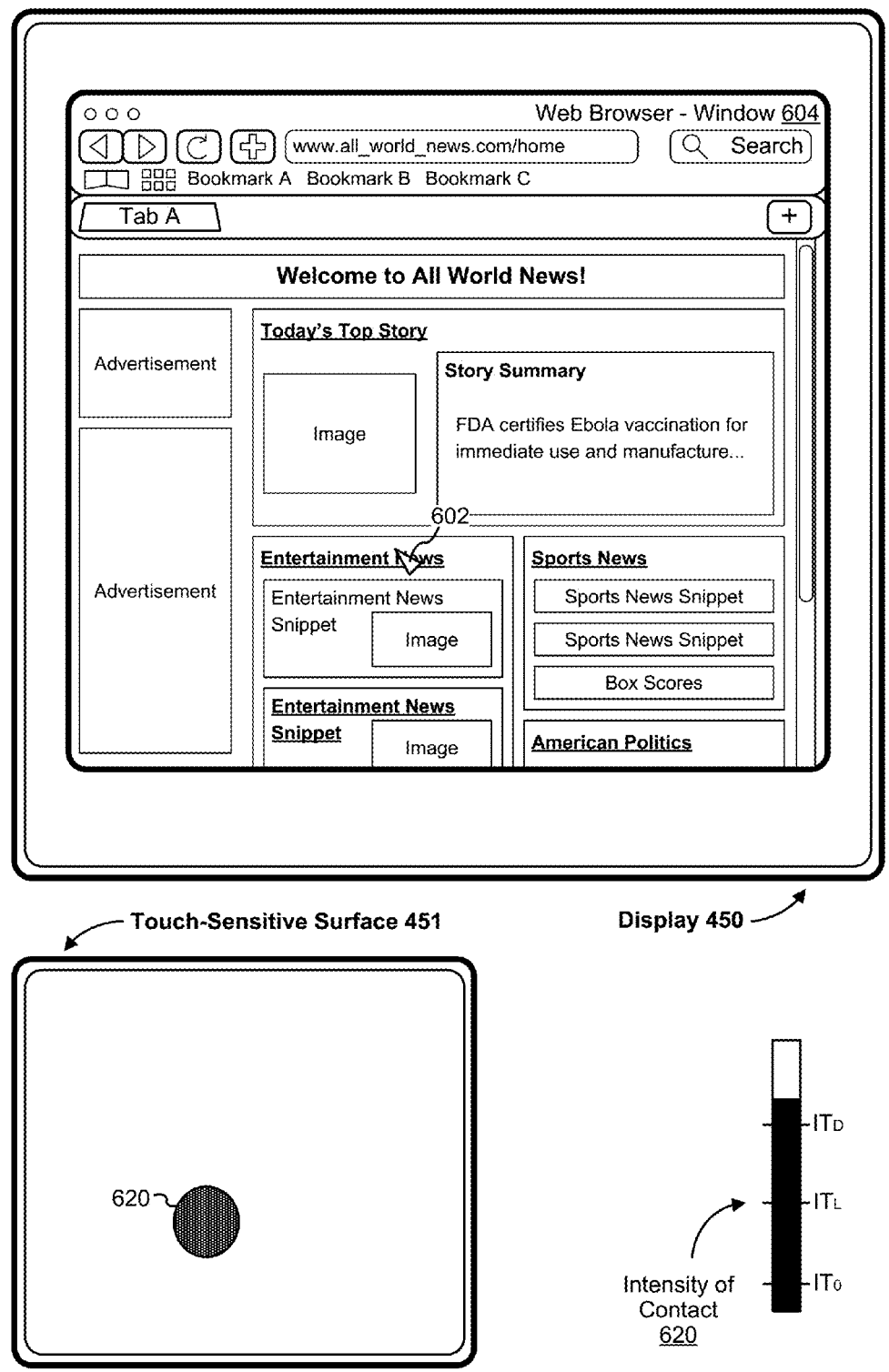
Figure 6H:
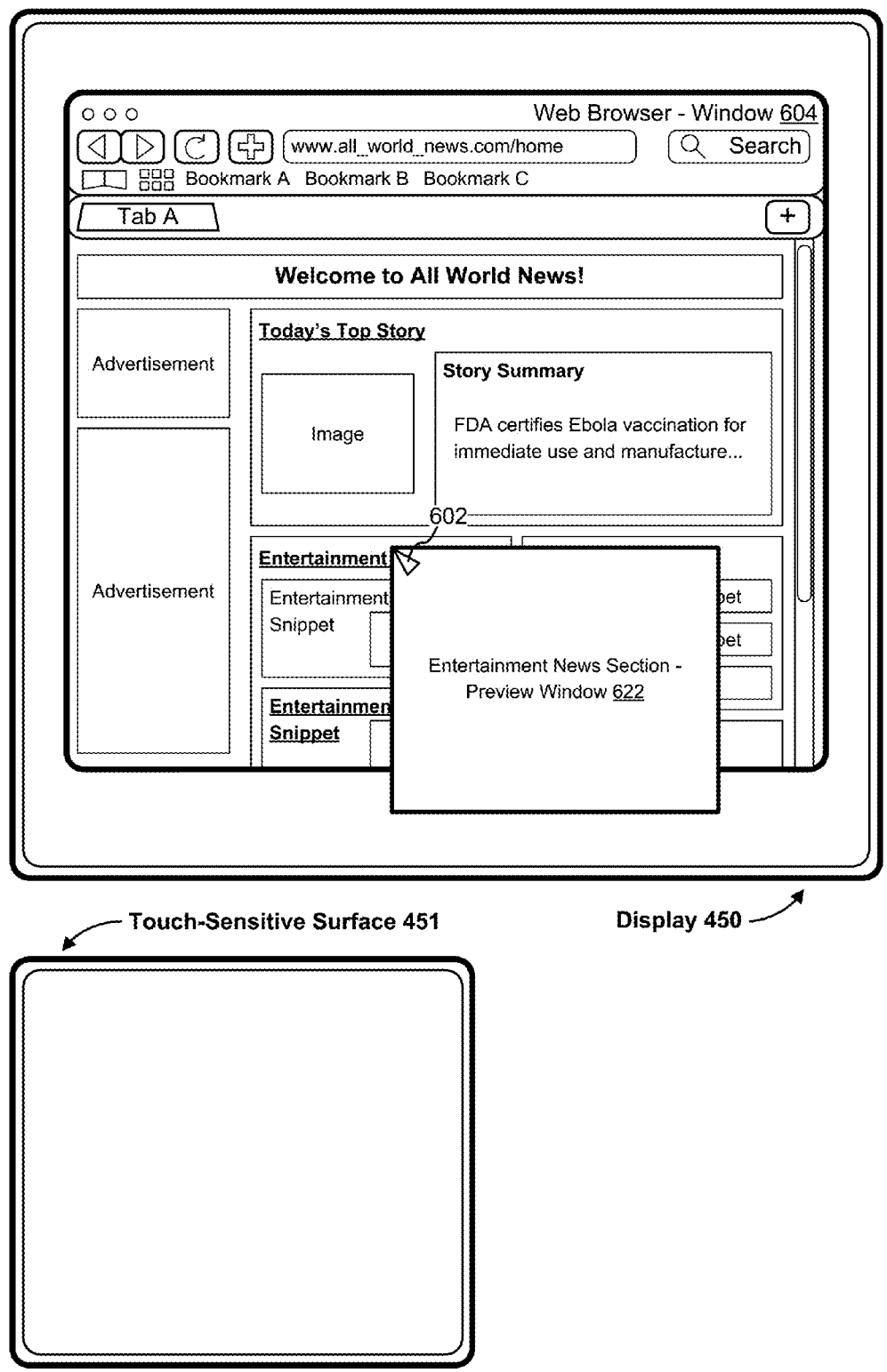
Figure 6I:
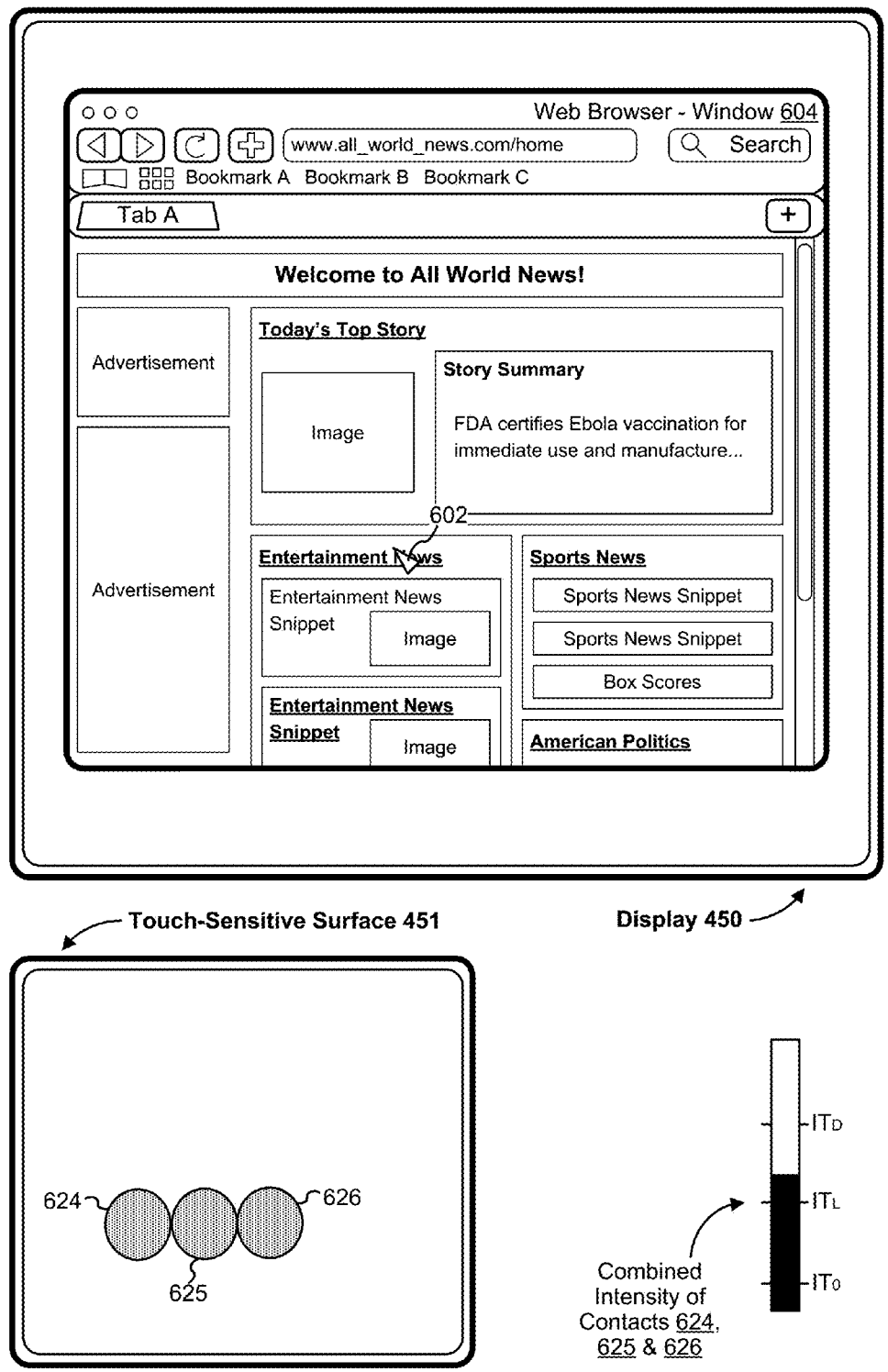
Figure 6J:
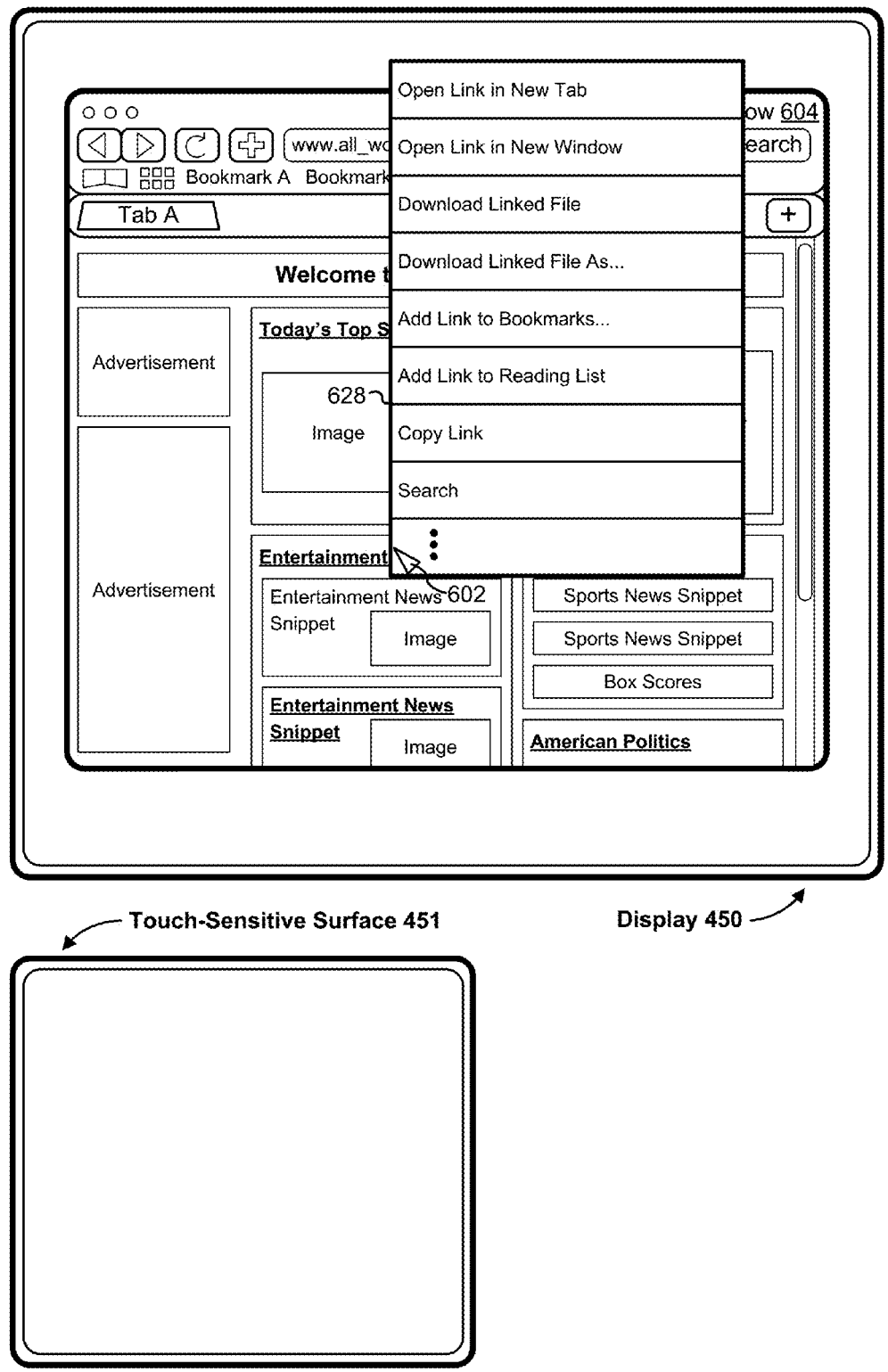
Figure 6K:
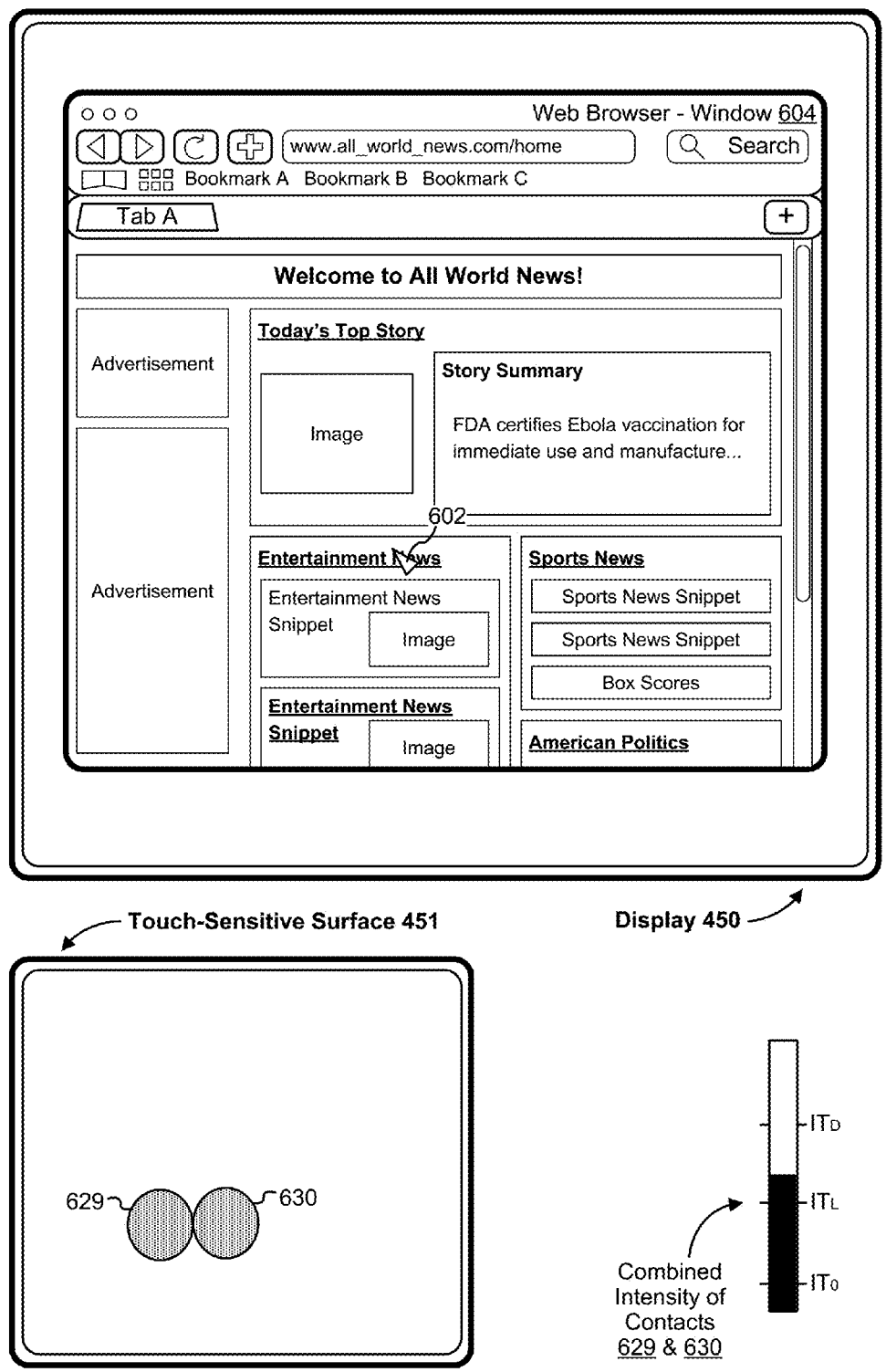
Figure 6L:
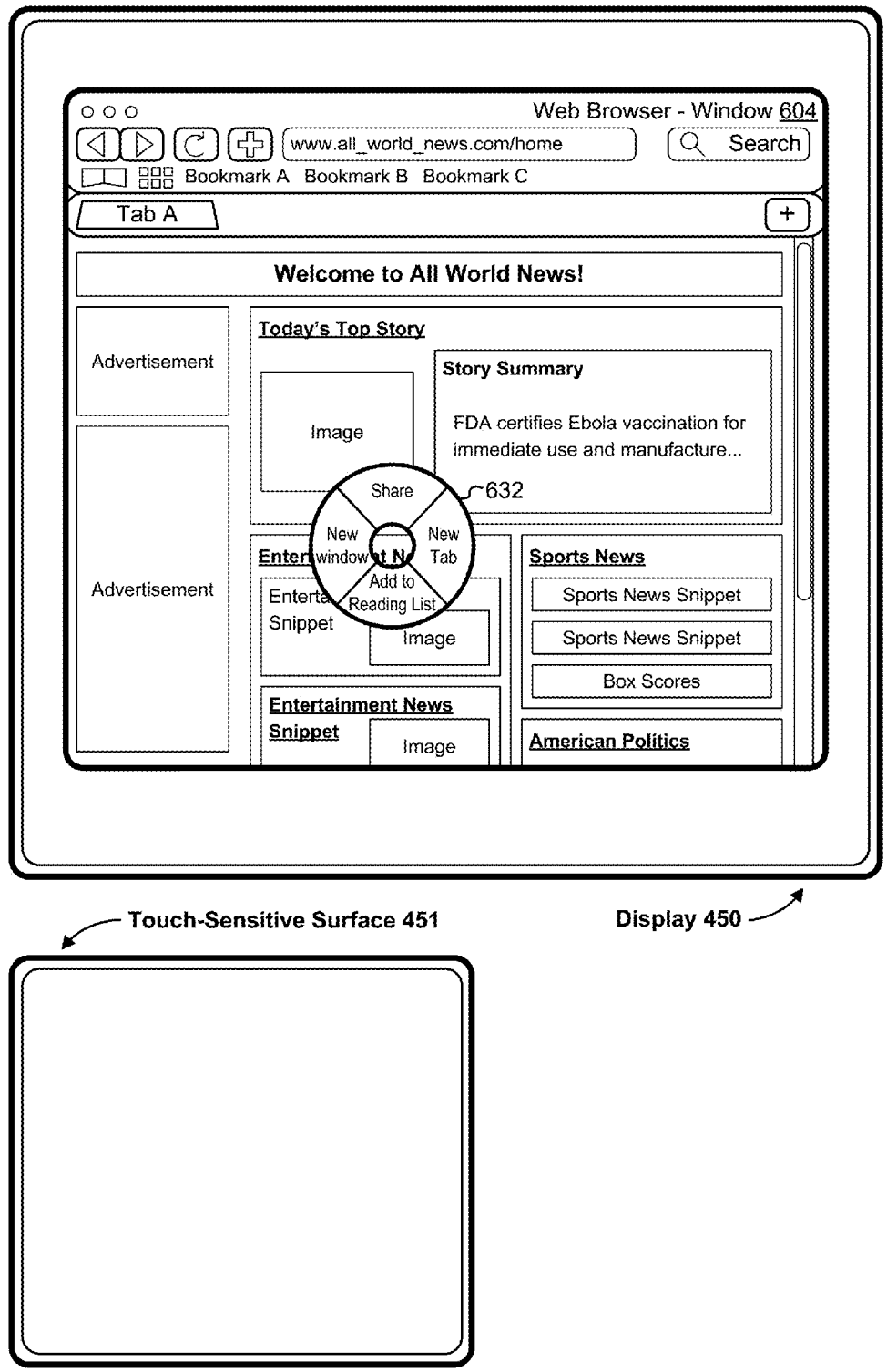
Figure 6M:
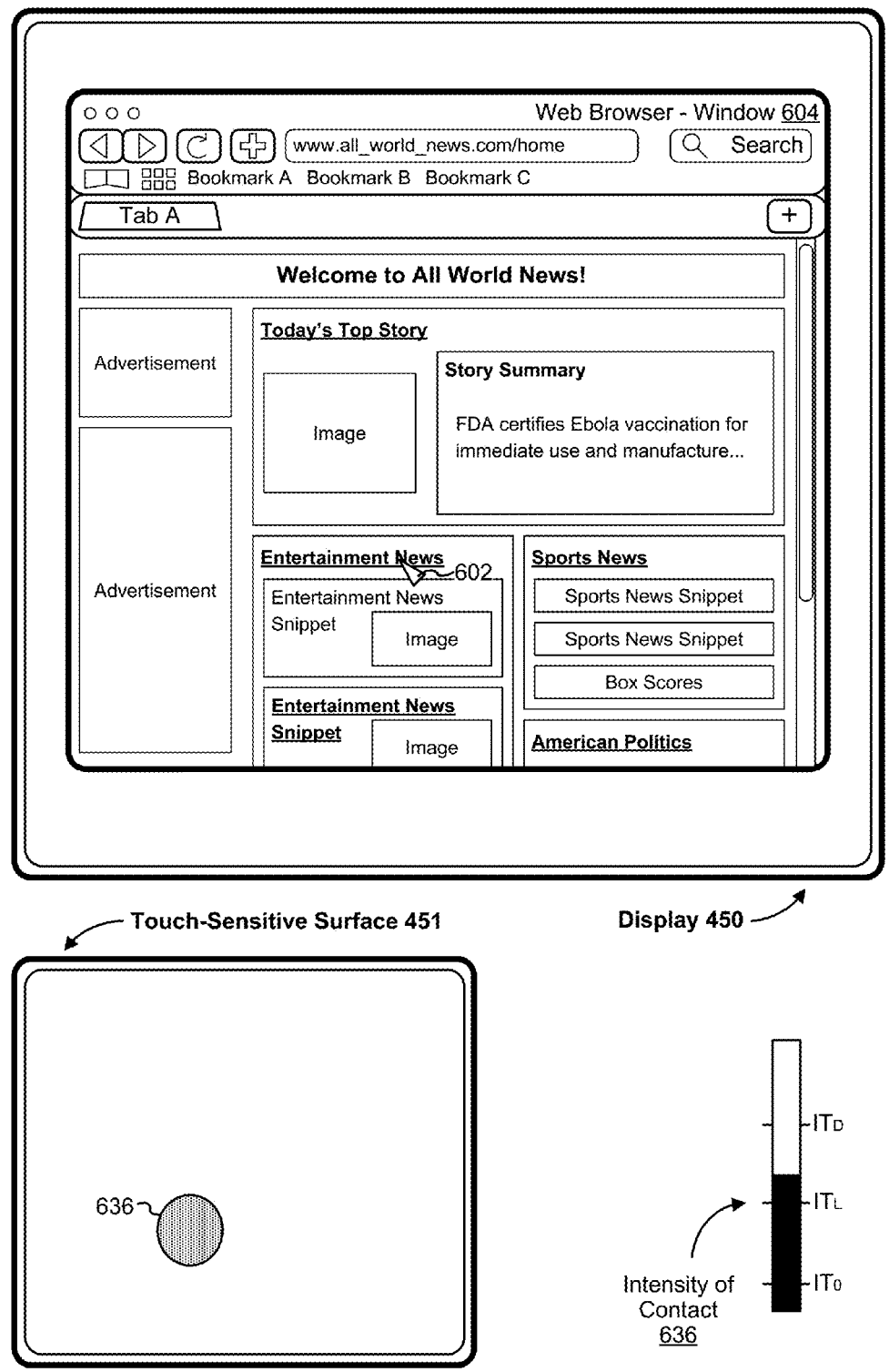
Figure 6N:
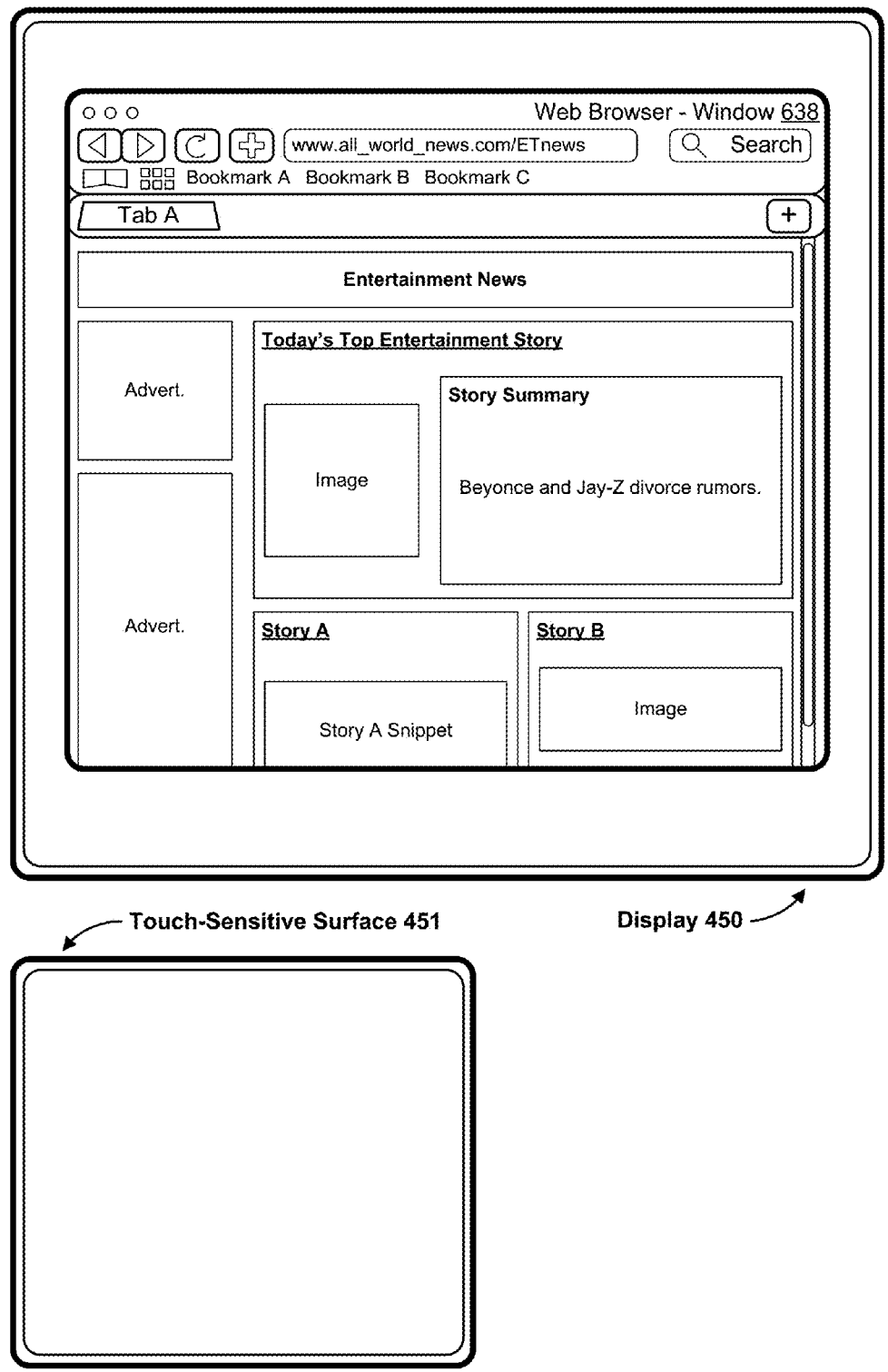
Figure 6O:
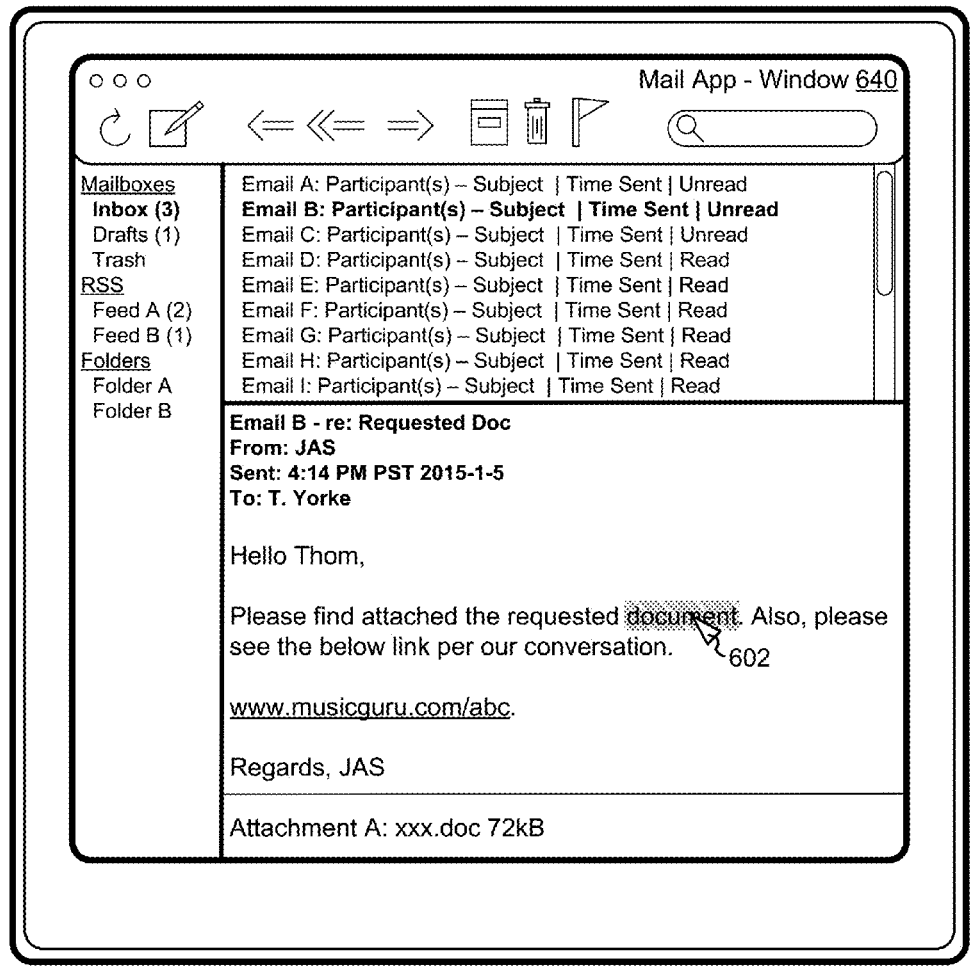
Figure 6O:
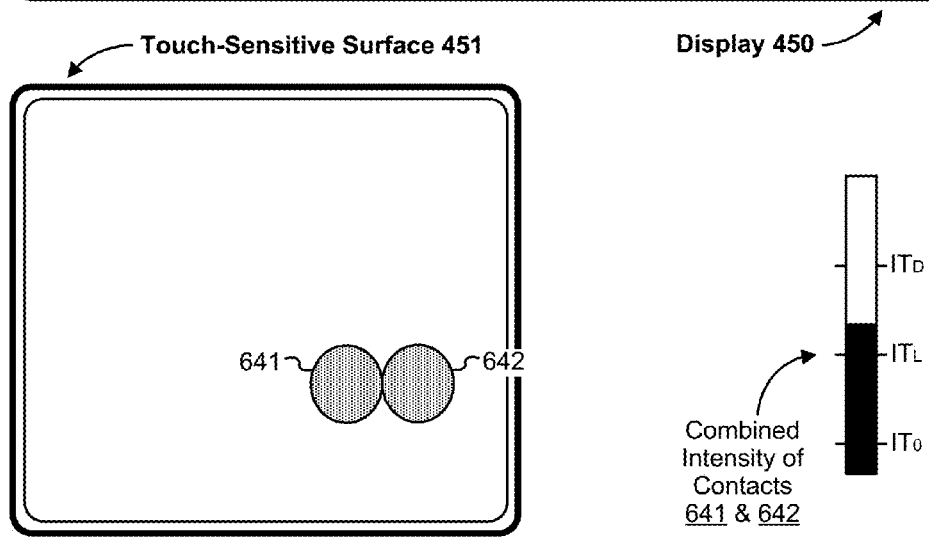
Figure 6P:
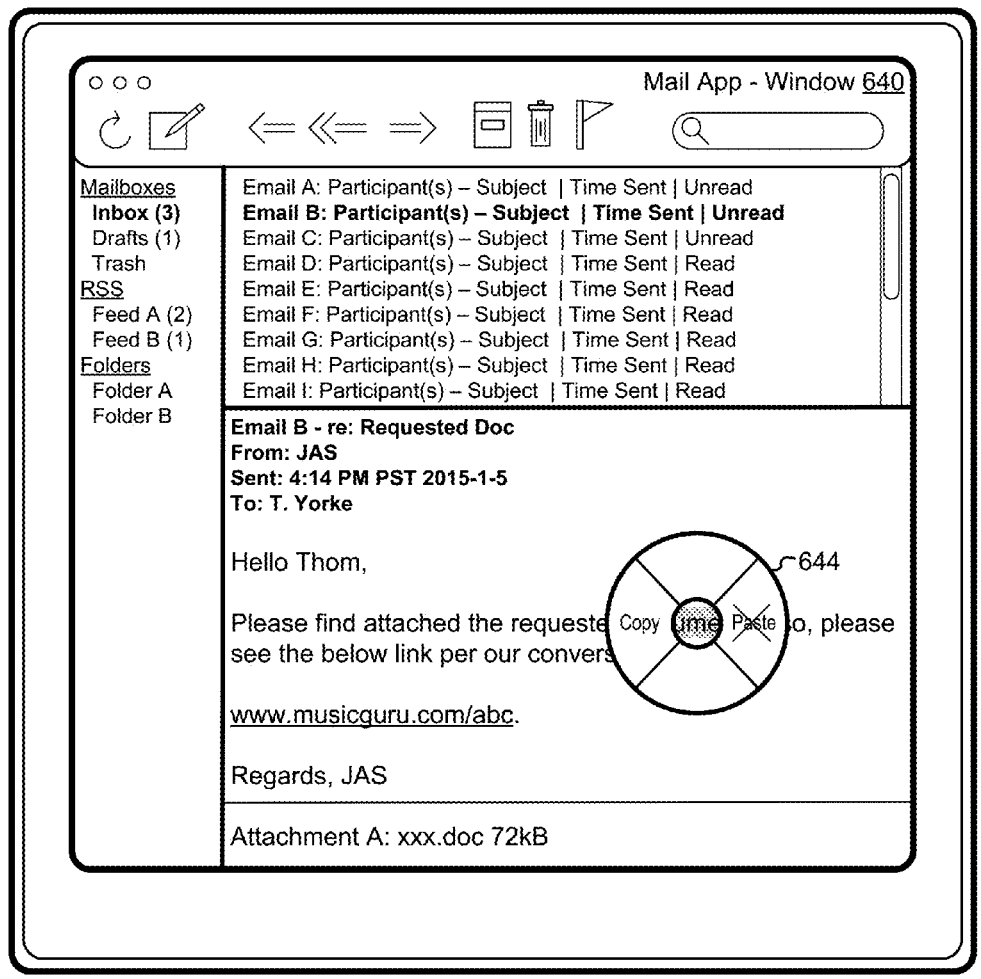
Figure 6P:
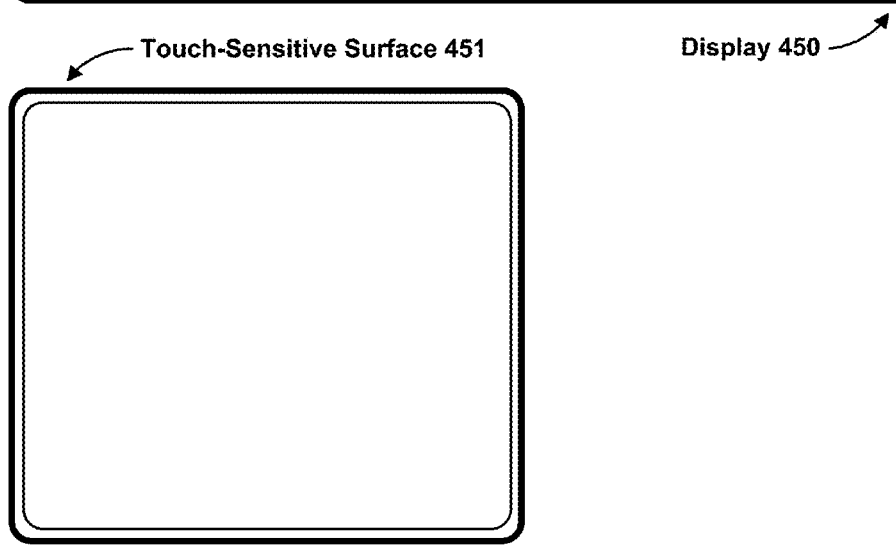
Figure 6Q:
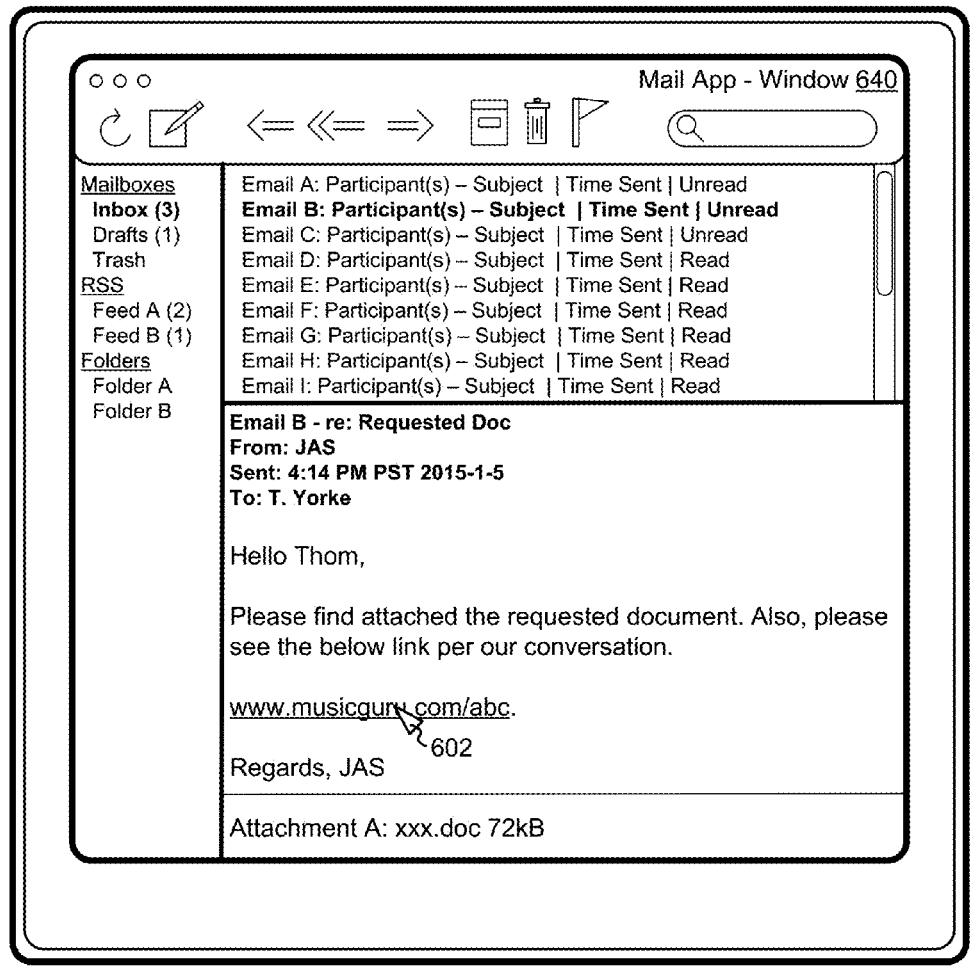
Figure 6Q:
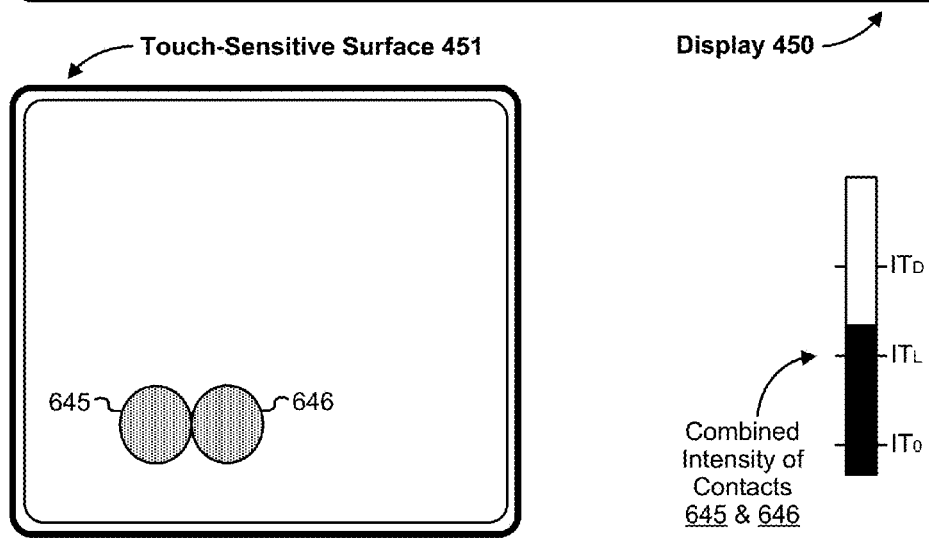
Figure 6R:
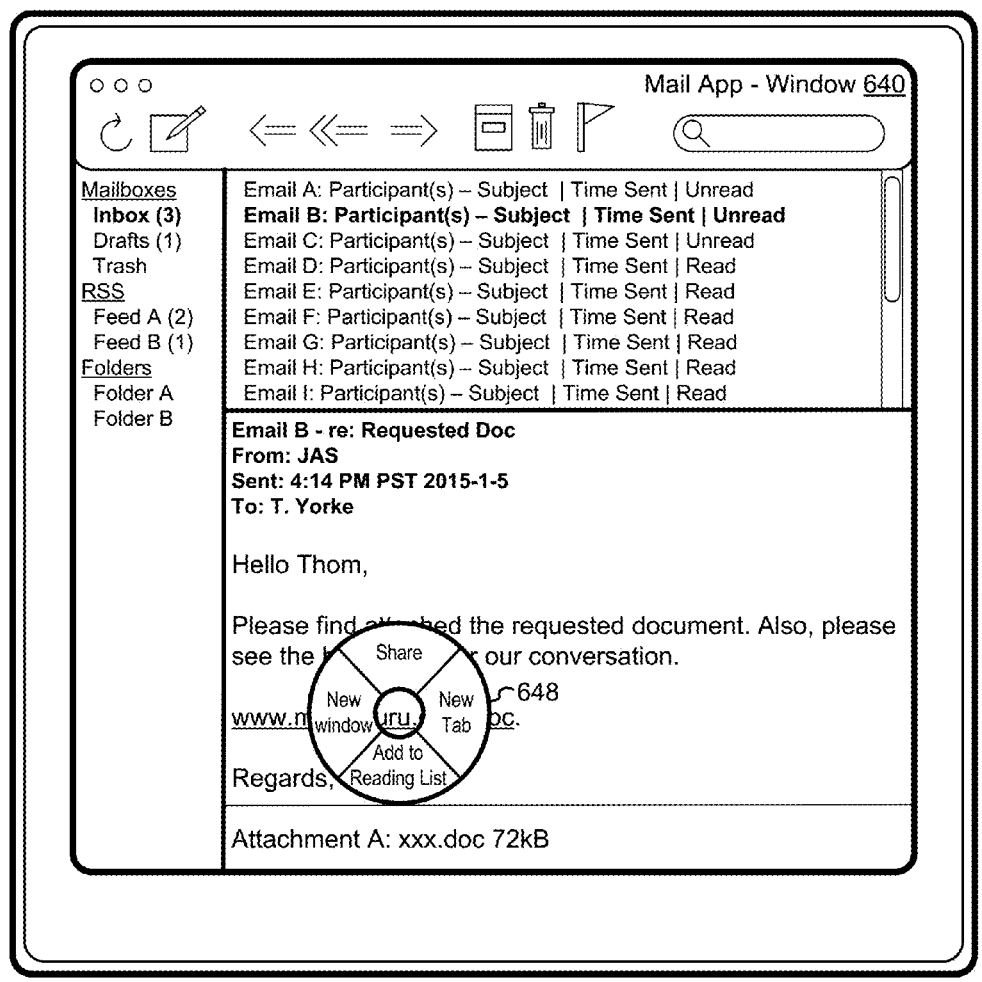
Figure 6R:
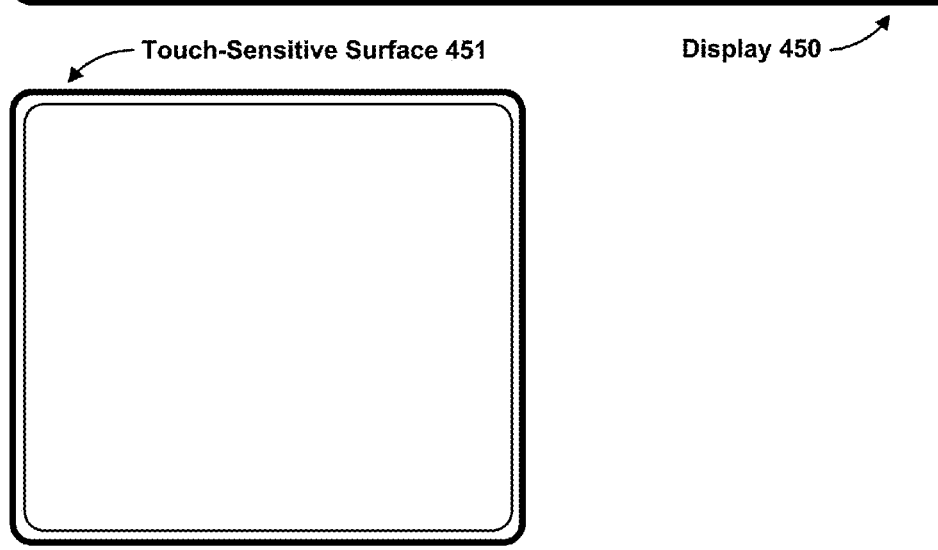
Figure 6S:
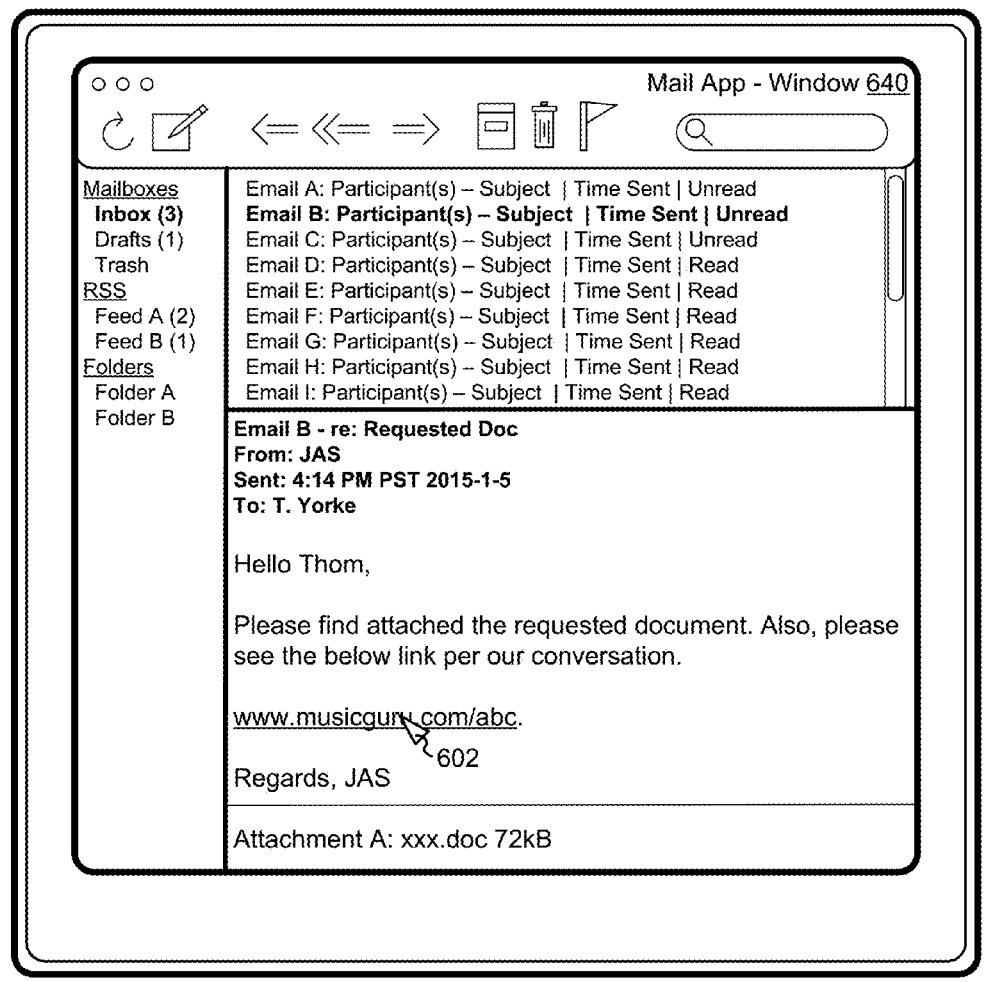
Figure 6S:
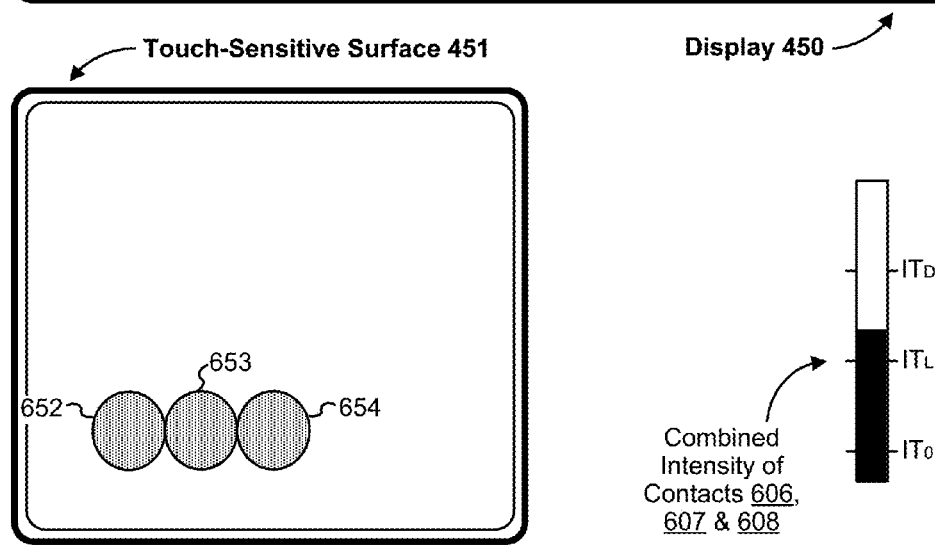
Figure 6T:
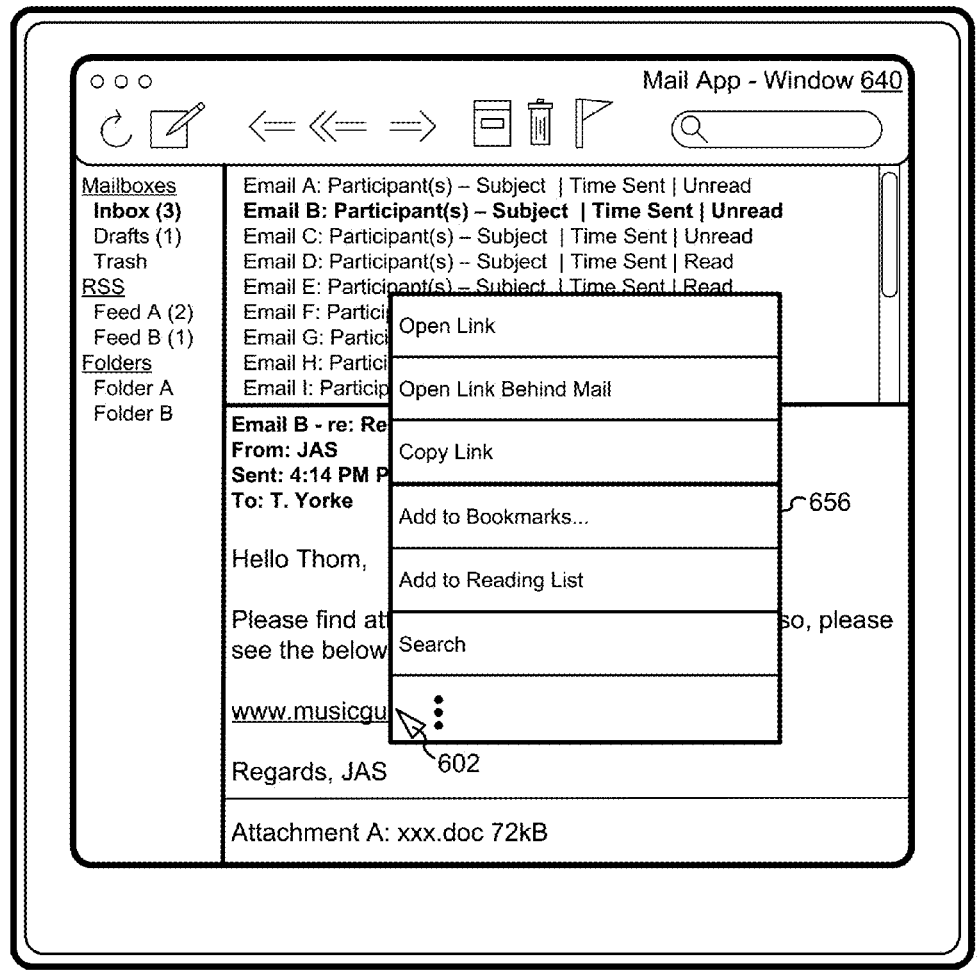
Figure 6T:
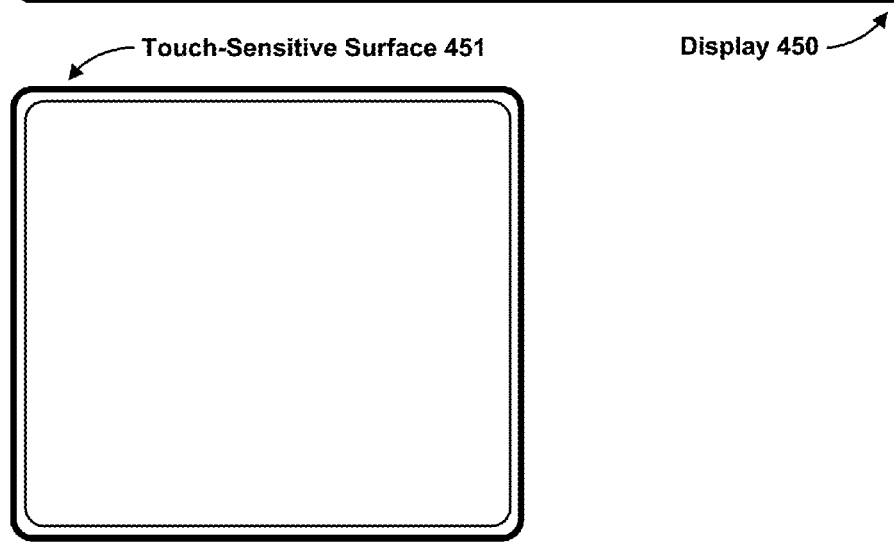
Figure 6U:
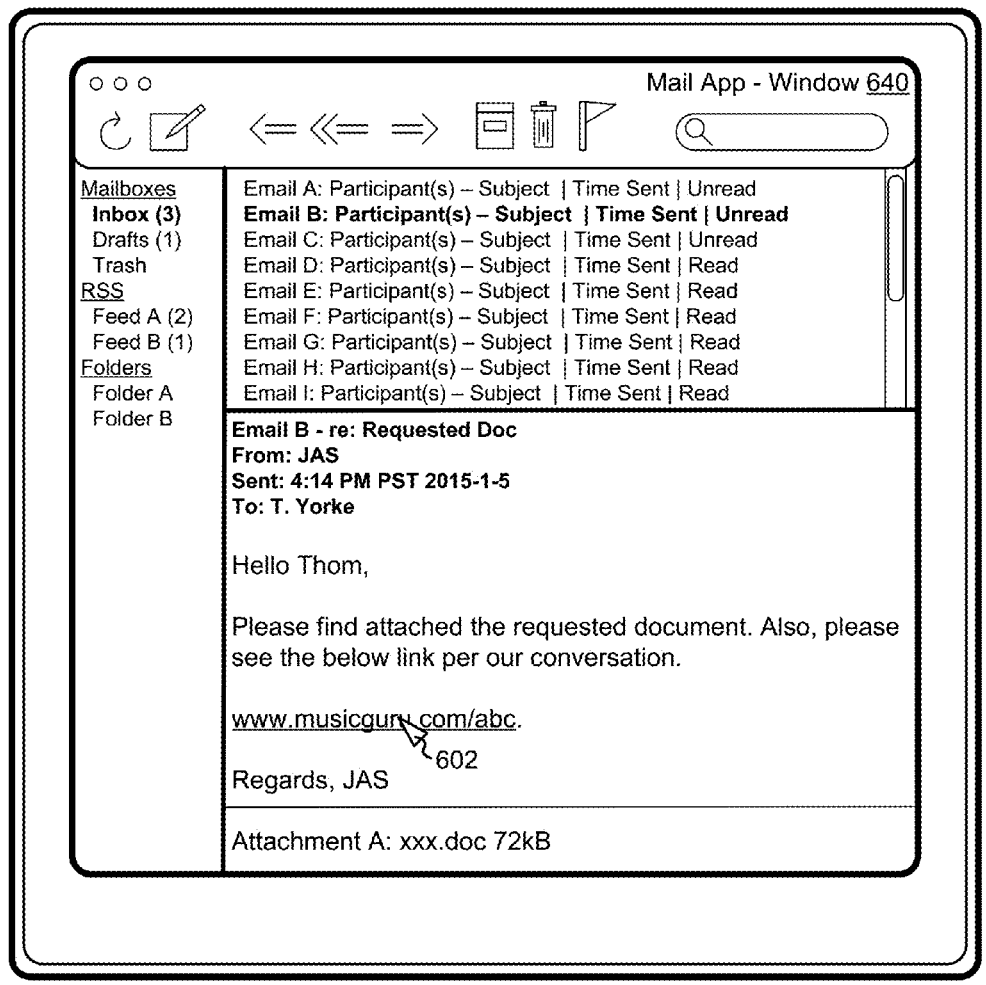
Figure 6U:
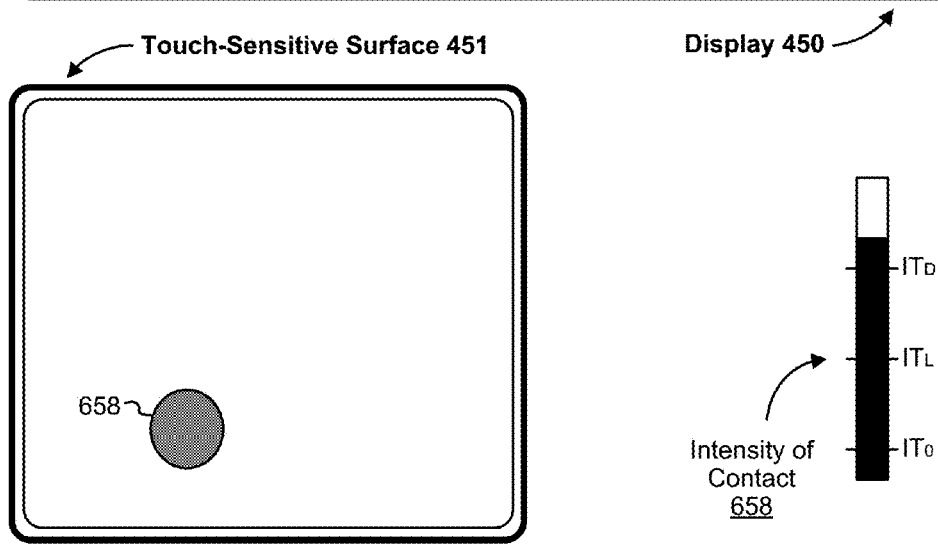
Figure 6V:
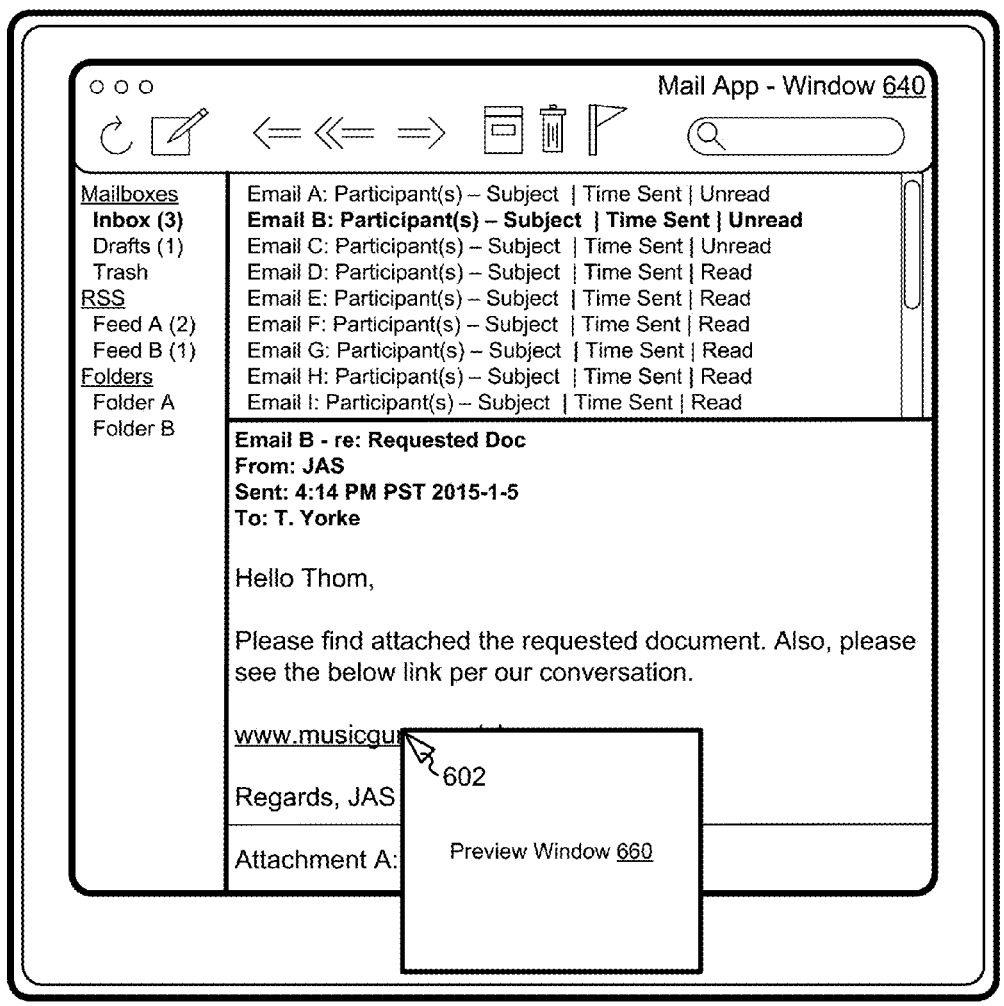
Figure 6W:
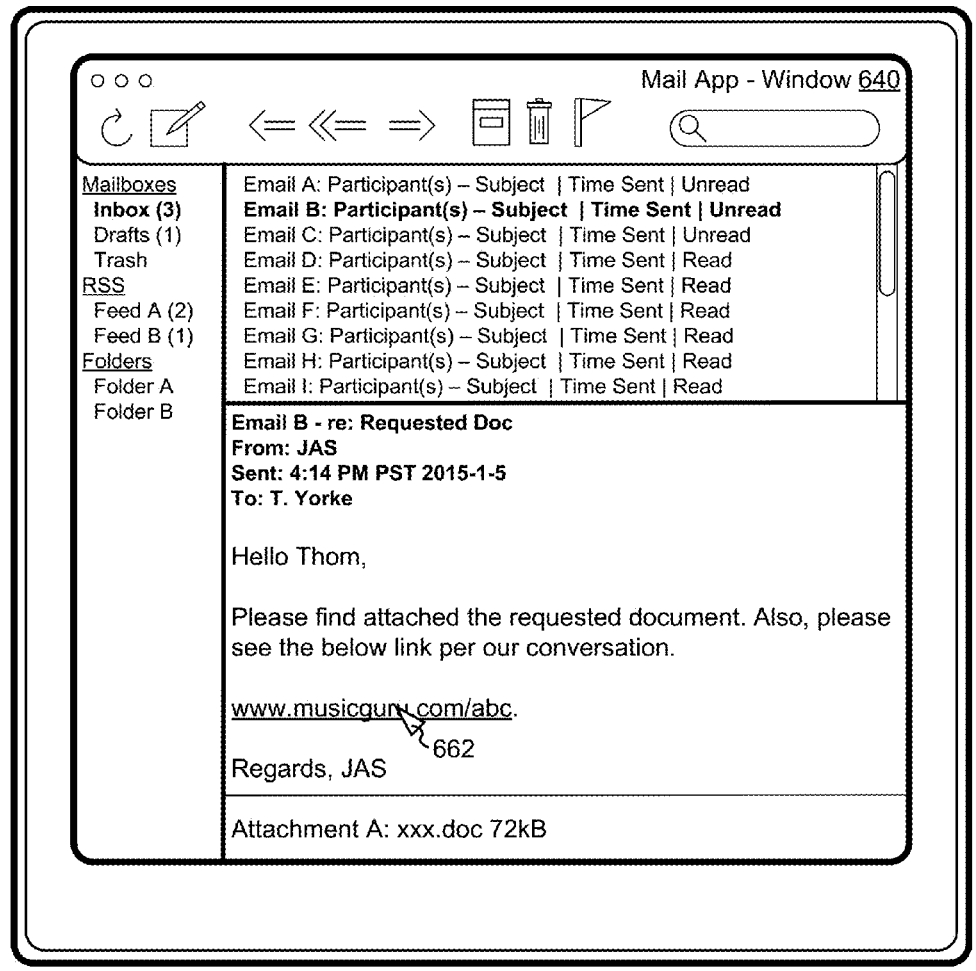
Figure 6W:
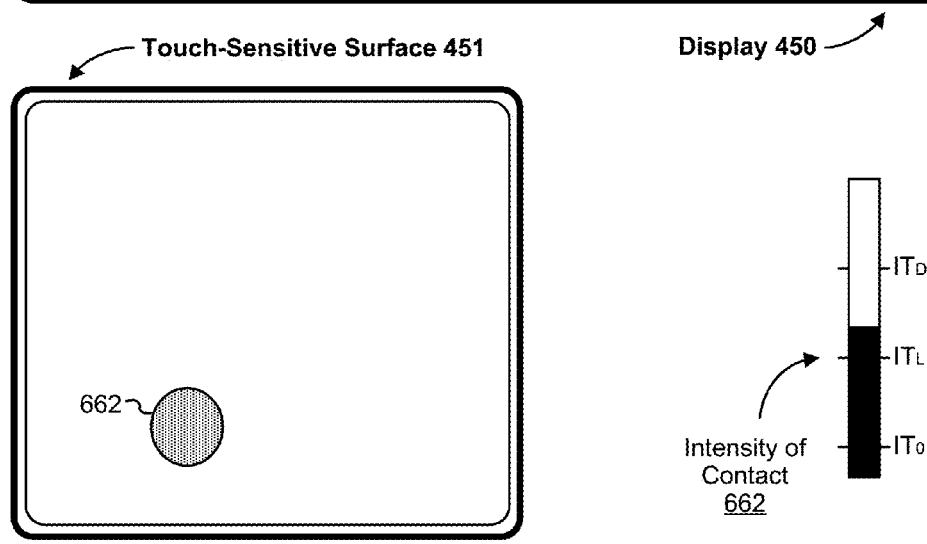
Figure 6X:
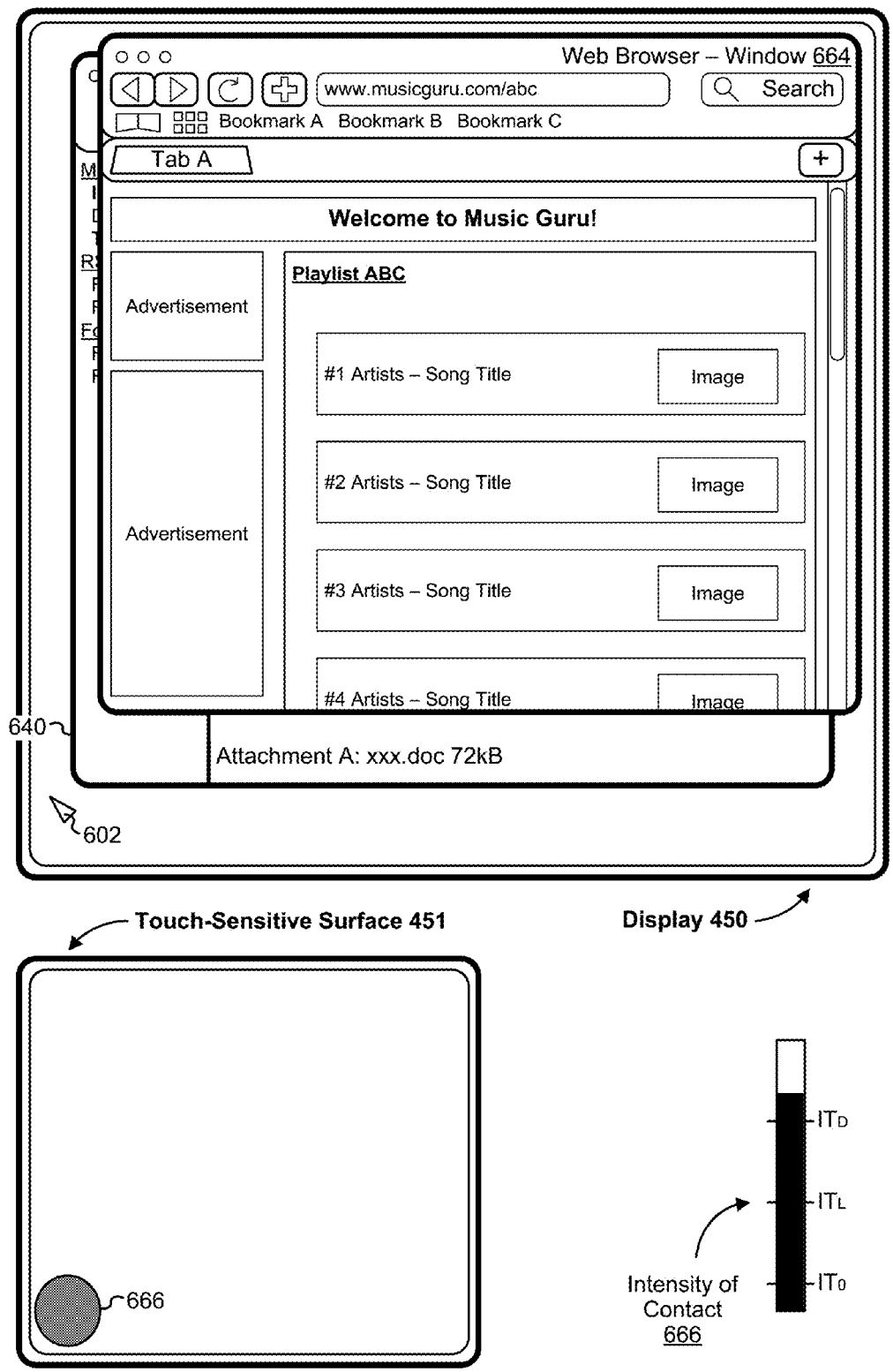
Figure 7A:
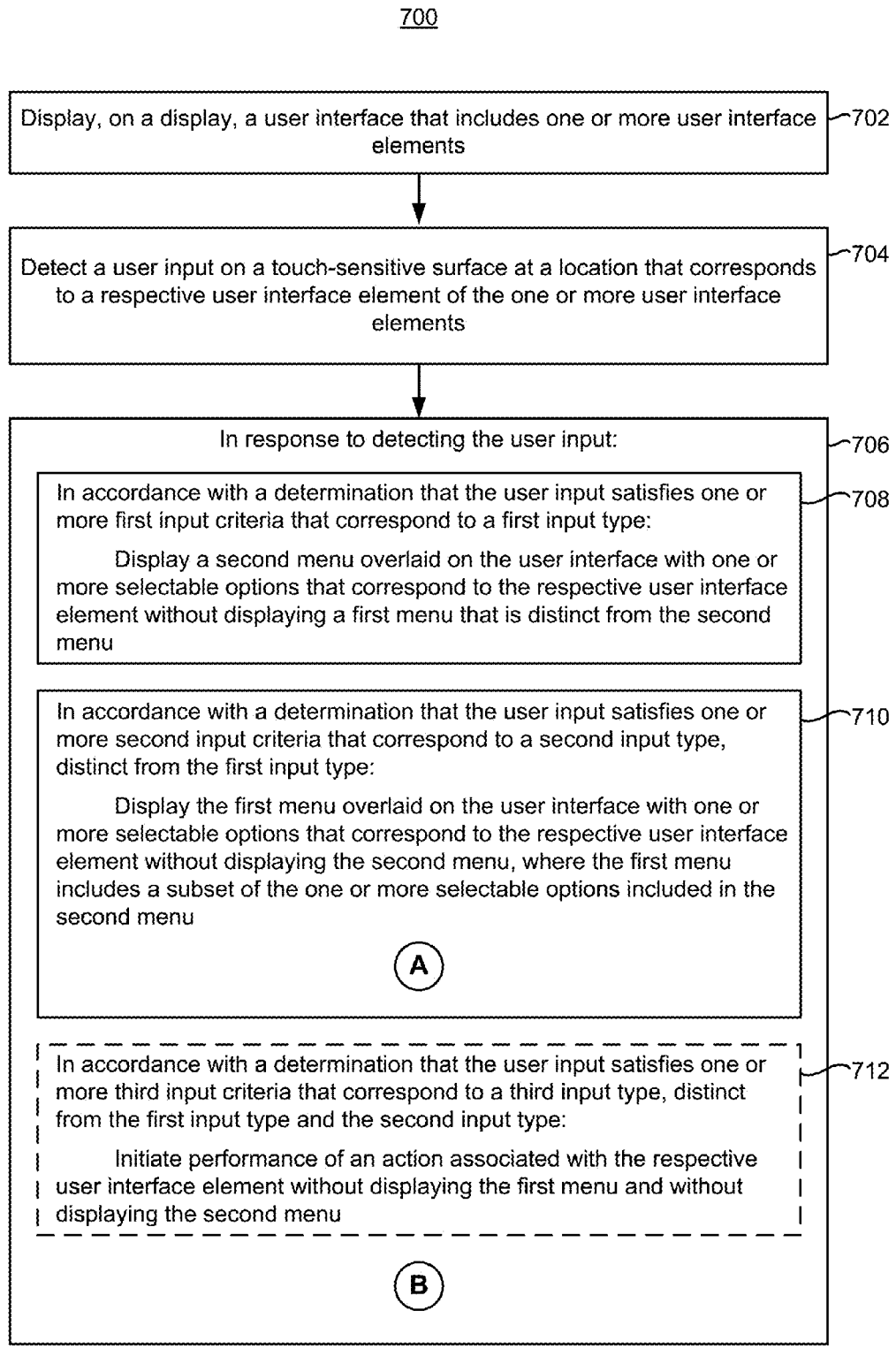
Figure 7B:
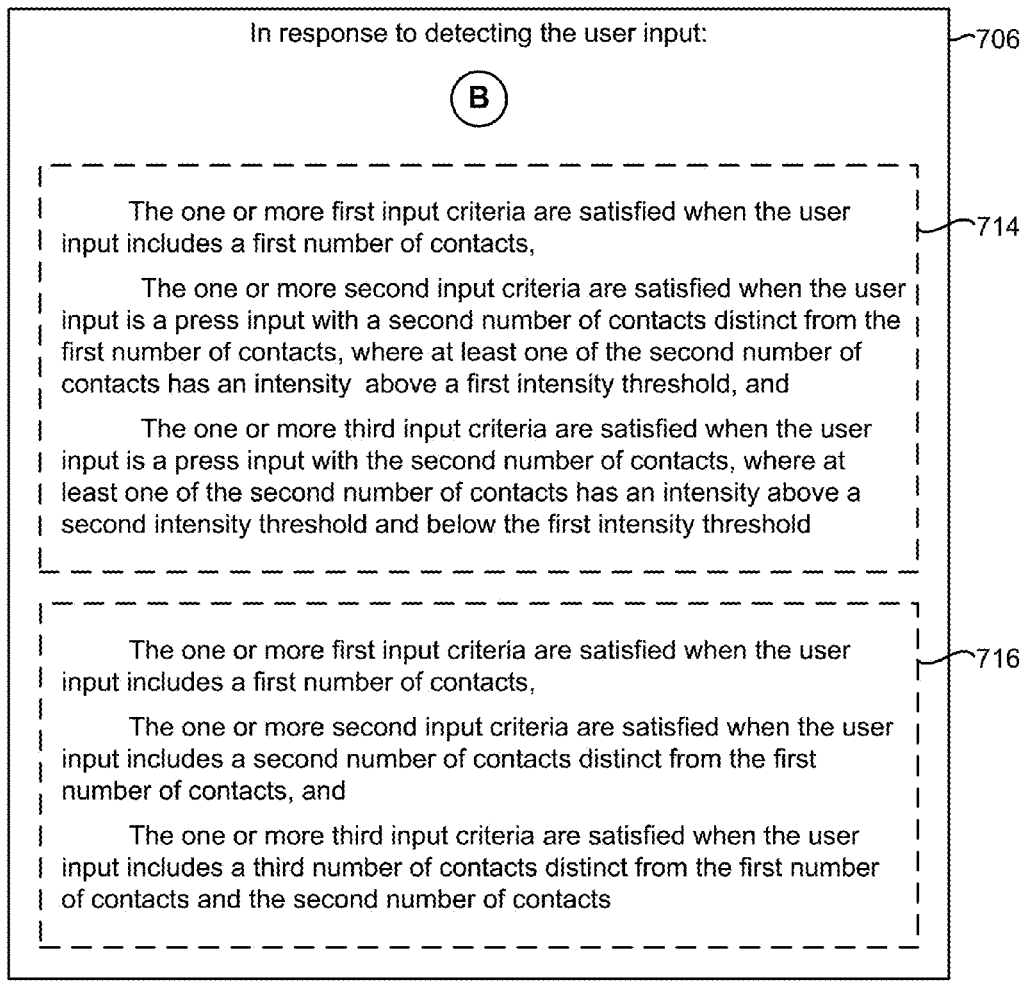
Figure 7D:
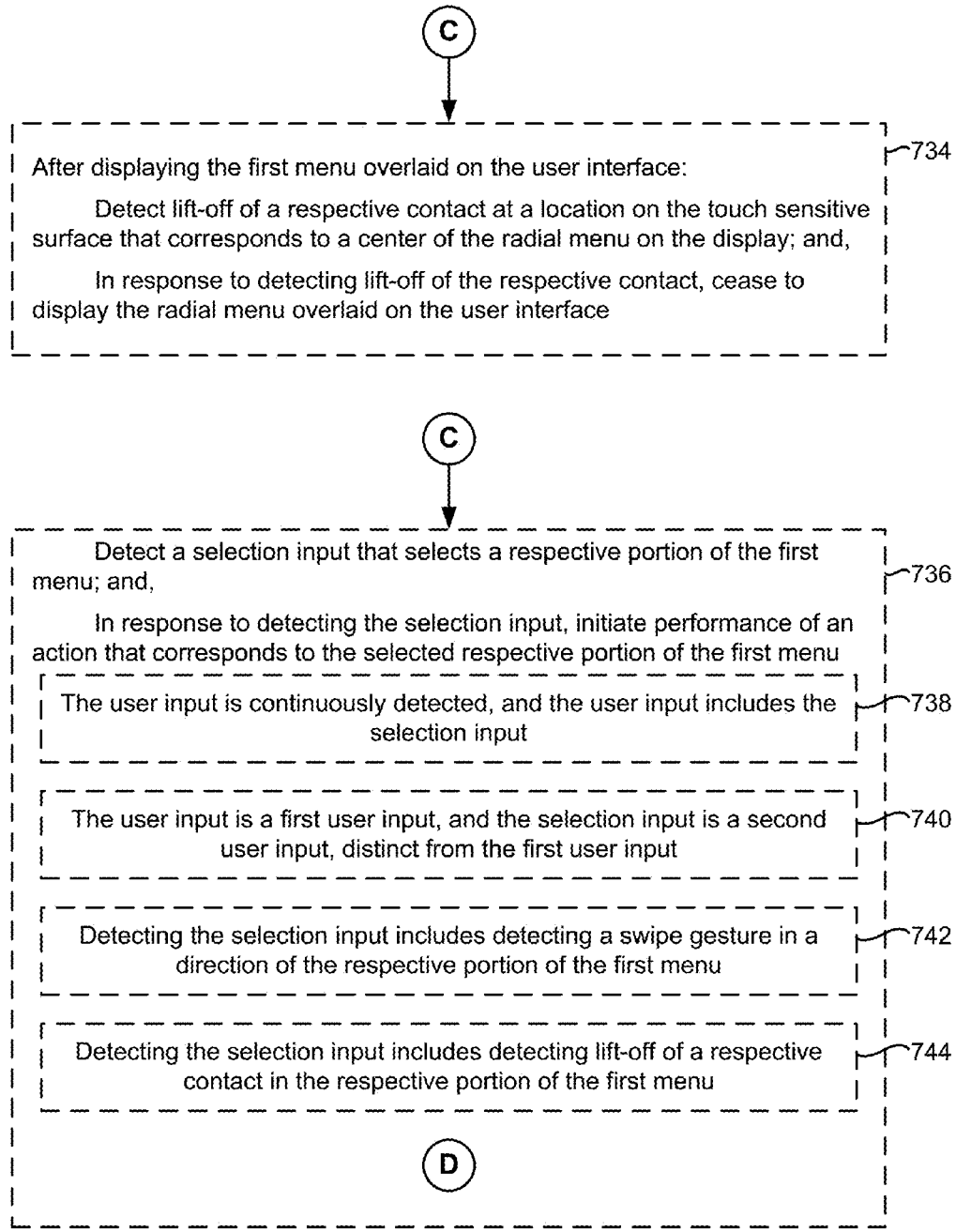
Figure 7E:
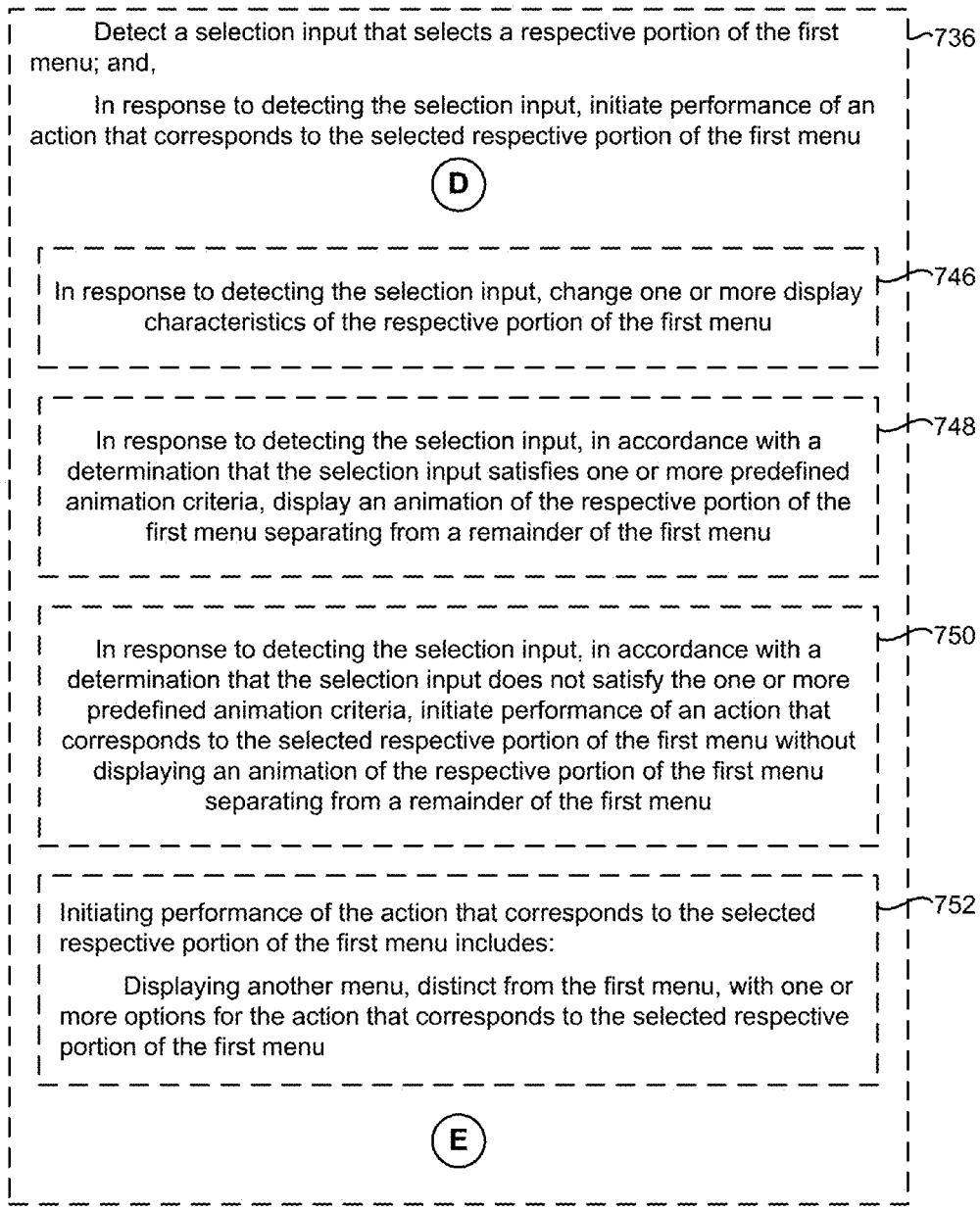
Figure 7F:
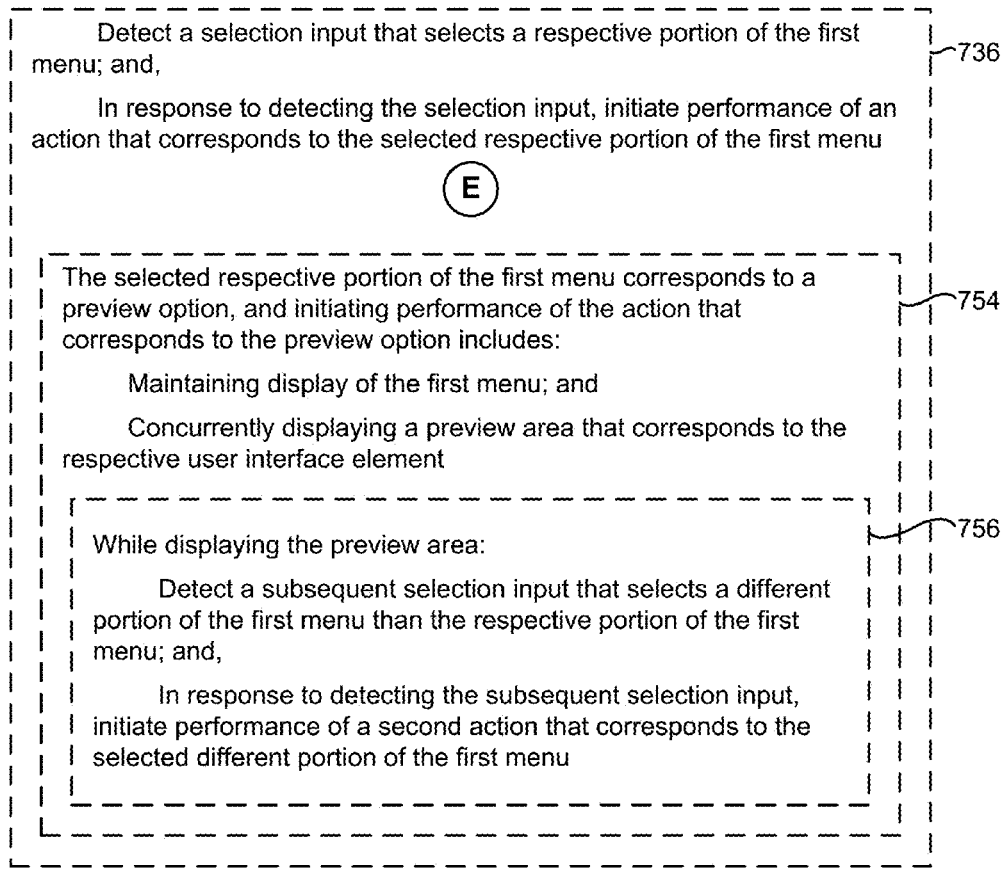

FIGS. 6A-6X illustrate exemplary user interfaces for displaying and using menus in accordance with some embodiments. The user interfaces in these figures are used to illustrate the processes described below, including the processes in FIGS. 7A-7F, 8A-8B, 9A-9C, 10A-10D, and 16A-16B. At least some of FIGS. 6A-6X include intensity diagrams that show the current intensity of the contact on the touch-sensitive surface relative to a plurality of intensity thresholds including $IT_0$, $IT_L$, and $IT_D$. In some embodiments, operations similar to those described below with reference to $IT_D$ are performed with reference to a different intensity threshold (e.g., "$IT_L$"). In some embodiments, operations similar to those described below with reference to $IT_L$ are performed with reference to a different intensity threshold (e.g., "$IT_0$").

For convenience of explanation, the embodiments described with reference to FIGS. 6A-6X will be discussed with reference to a device with a display 450 and a separate touch-sensitive surface 451; however, analogous operations are, optionally, performed on a device with a touch-sensitive display system 112 in response to detecting the contacts described in FIGS. 6A-6X on the touch-sensitive display system 112 while displaying the user interfaces shown in FIGS. 6A-6X on the touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on the touch-sensitive display system 112, in place of cursor 602.

FIGS. 6A-6B show a sequence in which a three-finger light press gesture is performed on highlighted text within a web page. FIG. 6A illustrates a window 604 for a web browser application displayed on display 450. In FIG. 6A, the window 604 shows a home page (e.g., corresponding to the URL www.all_world_news.com/home) for a website (e.g., the "All World News" website) where a portion of the text (e.g., "Ebola") is highlighted. For example, the word "Ebola" was previously selected or highlighted via a click and drag gesture performed with the cursor 602 or the like by the user. FIG. 6A further illustrates contacts 606, 607, and 608 detected on touch-sensitive surface 451 and a displayed representation of a focus selector (e.g., a cursor 602) corresponding to contacts 606, 607, and 608 at a location on the display 450 that corresponds to the highlighted portion of text (e.g., "Ebola") within the window 604. In this example, the combined intensity of the contacts 606, 607, and 608 is between $IT_L$ and $IT_D$ (e.g., the light press intensity level). In this example, the combined intensity is: the average of the intensities of contacts 606, 607, and 608; the sum of the intensities of contacts 606, 607, and 608; a total intensity detected by one or more intensity sensors associated with touch-sensitive surface 451; the maximum intensity among the intensity of contact 606, the intensity of contact 607, and the intensity of contact 608; or the like.

In FIG. 6B, an expanded menu 610 is displayed in response to detecting the three-finger light press gesture in FIG. 6A. In this example, the expanded menu 610 includes a plurality of selectable options associated with the highlighted portion of the text (e.g., "Ebola") of the web page, including: performing a lookup on the word "Ebola," performing a web search using the word "Ebola" with a search engine, copying the word "Ebola" to the clipboard, performing speech-related options associated with the word "Ebola," and adding the word "Ebola" as spoken track. One of ordinary skill in the art will appreciate that a greater or lesser number of options may be included in the expanded menu 610.

FIGS. 6C-6D show a sequence in which a two-finger light press gesture is performed on highlighted text within a web page. FIG. 6C illustrates contacts 611 and 612 detected on touch-sensitive surface 451 and a displayed representation of a focus selector (e.g., the cursor 602) corresponding to contacts 611 and 612 at a location on the display 450 that corresponds to the highlighted portion of text (e.g., "Ebola") within the window 604. In this example, the combined intensity of the contacts 611 and 612 is between $IT_L$ and $IT_D$ (e.g., the light press intensity level). In this example, the combined intensity is the average of the intensities of contacts 611 and 612, the sum of the intensities of contacts 611 and 612, a total intensity detected by one or more intensity sensors associated with touch-sensitive surface 451, the maximum intensity between the intensity of contact 611 and the intensity of contact 612, or the like.

In FIG. 6D, the cursor 602 ceases to be displayed and a reduced menu 614 is displayed on display 450 in response to detecting the two-finger light press gesture in FIG. 6C. In this example, the reduced menu 614 is centered at the location cursor 602 was displayed in FIG. 6C when the combined intensity exceeded $IT_L$. In FIG. 6D, the reduced menu 614 includes four distinct selectable quadrants oriented in the cardinal directions. The left quadrant of the reduced menu 614, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 614, which is typically associated with a paste action, is inactive or disabled due to the lack of a currently copied item (e.g., the clipboard is empty). The top and bottom quadrants of the reduced menu 614 are empty. In some embodiments, the reduced menu 614, in FIG. 6D, includes a subset of the selectable options included in the expanded menu 610 in FIG. 6B. In other embodiments, the reduced menu 614, in FIG. 6D, includes a set of selectable options that are distinct from the set of selectable options in the expanded menu 610 in FIG. 6B. One of ordinary skill in the art will appreciate that different selectable options may be included in the reduced menu 614.

FIGS. 6E-6F show a sequence in which a one-finger deep press gesture is performed on highlighted text within a web page. FIG. 6E illustrates contact 616 detected on touch-sensitive surface 451 and a displayed representation of a focus selector (e.g., the cursor 602) corresponding to contact 616 at a location on the display 450 that corresponds to the highlighted portion of text (e.g., "Ebola") within the window 604. In this example, the intensity of the contact 616 is above $IT_D$ (e.g., sometimes called a deep press intensity level).

In FIG. 6F, the cursor 602 continues to be displayed and a look-up menu 618 is displayed on display 450 in response to detecting the one-finger deep press gesture in FIG. 6E. The look-up menu 618 includes dictionary, thesaurus, and WIKIPEDIA entries corresponding to the word "Ebola." For example, if the user clicks on the WIKIPEDIA entry within the look-up menu 618 with cursor 602, a new tab is displayed within the window 604 or a new window of the web browser application is displayed that shows the complete WIKIPEDIA page for the word "Ebola." In some embodiments, the web page in the new window is prefetched.

FIGS. 6G-6H show a sequence in which a one-finger deep press gesture is performed on a link within a web page. FIG. 6G illustrates contact 620 detected on touch-sensitive surface 451 and a displayed representation of a focus selector (e.g., the cursor 602) corresponding to contact 620 at a location on the display 450 that corresponds to a link (e.g., associated with an "Entertainment News" section of the website) within the window 604. In this example, the intensity of the contact 620 is above $IT_D$ (e.g., the deep press intensity level). In FIG. 6H, the cursor 602 continues to be displayed and a preview window 622 is displayed on display 450 in response to detecting the one-finger deep press gesture in FIG. 6G. The preview window 622 displays at least a portion of the web page that corresponds to an "Entertainment News" section of the website.

FIGS. 6I-6J show a sequence in which a three-finger light press gesture is performed on a link within a web page. FIG. 6I further illustrates contacts 624, 625, and 626 detected on touch-sensitive surface 451 and a displayed representation of a focus selector (e.g., the cursor 602) corresponding to contacts 624, 625, and 626 at a location on the display 450 that corresponds to a link (e.g., associated with an "Entertainment News" section of the website) within the window 604. In this example, the combined intensity of the contacts 624, 625, and 626 is between $IT_L$ and $IT_D$ (e.g., the light press intensity level). In this example, the combined intensity is: the average of the intensities of contacts 624, 625, and 626; the sum of the intensities of contacts 624, 625, and 626; a total intensity detected by one or more intensity sensors associated with touch-sensitive surface 451; the maximum intensity among the intensity of contact 624, the intensity of contact 625, and the intensity of contact 626; or the like.

In FIG. 6J, an expanded menu 628 is displayed in response to detecting the three-finger light press gesture in FIG. 6I. In this example, the expanded menu 628 includes a plurality of selectable options associated with the link (e.g., associated with the "Entertainment News" section of the website), including: opening the "Entertainment News" section of the website in a new tab of the window 604, opening the "Entertainment News" section of the website in a new window of the web browser application, downloading a linked file associated with the "Entertainment News" section of the website, downloading a linked file associated with the "Entertainment News" section of the website with a specified file name and/or file type, adding the "Entertainment News" section of the website to the user's bookmarks, adding the link to add the "Entertainment News" section of the website to the user's bookmarks, adding the "Entertainment News" section of the website to the user's reading list, copying the link to the clipboard, performing a web search with a search engine based on the link, and the like. One of ordinary skill in the art will appreciate that a greater or lesser number of options may be included in the expanded menu 628.

FIGS. 6K-6L show a sequence in which a two-finger light press gesture is performed on a link within a web page. FIG. 6K illustrates contacts 629 and 630 detected on touch-sensitive surface 451 and a displayed representation of a focus selector (e.g., the cursor 602) corresponding to contacts 629 and 630 at a location on the display 450 that corresponds to a link (e.g., associated with an "Entertainment News" section of the website) within the window 604. In this example, the combined intensity of the contacts 629 and 630 is between $IT_L$ and $IT_D$ (e.g., the light press intensity level). In this example, the combined intensity is the average of the intensities of contacts 629 and 630, the sum of the intensities of contacts 629 and 630, a total intensity detected by one or more intensity sensors associated with touch-sensitive surface 451, the maximum intensity between the intensity of contact 629 and the intensity of contact 620, or the like.

In FIG. 6L, the cursor 602 ceases to be displayed and a reduced menu 632 is concurrently displayed on the display 450 in response to detecting the two-finger light press gesture in FIG. 6K. In this example, the reduced menu 632 is centered at the location cursor 602 was displayed in FIG. 6K when the combined intensity exceeded $IT_D$.

In FIG. 6L, the reduced menu 632 is associated with a plurality of selectable options that correspond to the link (e.g., to the "Entertainment News" section of the website) within the window 604, including: a new window action, a share action, a new tab action, and an add to reading list action. The left quadrant of the reduced menu 632, when activated (e.g., with a tap gesture at a location on the touch-sensitive surface 451 that corresponds to the left quadrant or a gross swipe gesture in the direction of the left quadrant), causes the "Entertainment News" section of the website to be opened in a new window of the web browser application. In some embodiments, the web page in the new window is prefetched. The top quadrant of the reduced menu 632, when activated (e.g., with a tap gesture at a location on the touch-sensitive surface 451 that corresponds to the top quadrant or a gross swipe gesture in the direction of the top quadrant), causes share options to be displayed in a separate reduced menu or other menu. The right quadrant of the reduced menu 632, when activated (e.g., with a tap gesture at a location on the touch-sensitive surface 451 that corresponds to the right quadrant or a gross swipe gesture in the direction of the right quadrant), causes the "Entertainment News" section of the website to be opened in a new tab within window 604 of the web browser application. The bottom quadrant of the reduced menu 632, when activated (e.g., with a tap gesture at a location on the touch-sensitive surface 451 that corresponds to the bottom quadrant or a gross swipe gesture in the direction of the bottom quadrant), causes the "Entertainment News" section of the website to be added to the user's reading list for future access and perusal.

FIGS. 6M-6N show a sequence in which a one-finger light press gesture is performed on a link within a web page. FIG. 6M illustrates a contact 636 detected on touch-sensitive surface 451 and a displayed representation of a focus selector (e.g., the cursor 602) corresponding to contact 636 at a location on the display 450 that corresponds to a link (e.g., associated with the "Entertainment News" section of the website) within the window 604. In this example, the intensity of the contact 636 is between $IT_L$ and $IT_D$ (e.g., sometimes called a light press intensity level). In FIG. 6N, a window 638 for a web browser application is displayed on display 450 in response to detecting the one-finger light press gesture in FIG. 6M. In FIG. 6N, the window 638 shows the "Entertainment News" section (e.g., corresponding to the URL www.all_world_news.com/ETnews) for the website (e.g., the "All World News" website).

FIGS. 6O-6P show a sequence in which a two-finger light press gesture is performed on highlighted text within an email. FIG. 6O illustrates a window 640 for an email application displayed on display 450. In FIG. 6O, the window 640 displays a list of a plurality of emails (e.g., emails A-I) in a user's inbox and the contents of selected "Email B." In FIG. 6O, a portion of the text (e.g., "document") of "Email B" is highlighted. For example, the word "document" was previously selected or highlighted via a click and drag gesture performed with the cursor 602 or the like by the user. FIG. 6O also illustrates contacts 641 and 642 detected on touch-sensitive surface 451 and a displayed representation of a focus selector (e.g., the cursor 602) corresponding to contacts 641 and 642 at a location on the display 450 that corresponds to the highlighted portion of the text (e.g., "document") within the window 640. In this example, the combined intensity of the contacts 641 and 642 is between $IT_L$ and $IT_D$ (e.g., the light press intensity level). In this example, the combined intensity is the average of the intensities of contacts 641 and 642, the sum of the intensities of contacts 641 and 642, a total intensity detected by one or more intensity sensors associated with touch-sensitive surface 451, the maximum intensity between the intensity of contact 641 and the intensity of contact 642, or the like.

In FIG. 6P, the cursor 602 ceases to be displayed and a reduced menu 644 is displayed on display 450 in response to detecting the two-finger light press gesture in FIG. 6O. In this example, the reduced menu 644 is centered at the location cursor 602 was displayed in FIG. 6O when the combined intensity exceeded $IT_D$. The left quadrant of the reduced menu 644, when activated (e.g., with a tap gesture at a location on the touch-sensitive surface 451 that corresponds to the left quadrant or a gross swipe gesture in the direction of the left quadrant), causes the word "document" to be copied to the clipboard. The right quadrant of the reduced menu 644, which is typically associated with a paste action, is inactive or disabled due to the lack of a currently copied item (e.g., the clipboard is empty). The top and bottom quadrants of the reduced menu 644 are empty. One of ordinary skill in the art will appreciate that greater or lesser number of options may be included in the reduced menu 644.

FIGS. 6Q-6R show a sequence in which a two-finger light press gesture is performed on a link within an email. FIG. 6Q illustrates contacts 645 and 646 detected on touch-sensitive surface 451 and a displayed representation of a focus selector (e.g., the cursor 602) corresponding to contacts 645 and 646 at a location on the display 450 that corresponds to a link (e.g., associated with the URL www-.musicguru.com/abc) within the window 640. In this example, the combined intensity of the contacts 645 and 646 is between $IT_L$ and $IT_D$ (e.g., the light press intensity level). In this example, the combined intensity is the average of the intensities of contacts 645 and 646, the sum of the intensities of contacts 645 and 646, a total intensity detected by one or more intensity sensors associated with touch-sensitive surface 451, the maximum intensity between the intensity of contact 645 and the intensity of contact 646, or the like.

In FIG. 6R, the cursor 602 ceases to be displayed and a reduced menu 648 is concurrently displayed on the display 450 in response to detecting the two-finger light press gesture in FIG. 6Q. In this example, the reduced menu 648 is centered at the location cursor 602 was displayed in FIG. 6Q when the combined intensity exceeded $IT_D$.

In FIG. 6R, the reduced menu 648 is associated with a plurality of selectable options that correspond to the link (e.g., associated with the URL www.musicguru.com/abc) within the window 640, including: a new window action, a share action, a new tab action, and an add to reading list action. The left quadrant of the reduced menu 648, when activated (e.g., with a tap gesture at a location on the touch-sensitive surface 451 that corresponds to the left quadrant or a gross swipe gesture in the direction of the left quadrant), causes the web page that corresponds to the link (e.g., associated with the URL www.musicguru.com/abc) to be opened in a new window of the web browser application. In some embodiments, the web page in the new window is prefetched. The top quadrant of the reduced menu 648, when activated (e.g., with a tap gesture at a location on the touch-sensitive surface 451 that corresponds to the top quadrant or a gross swipe gesture in the direction of the top quadrant), causes share options to be displayed in a separate reduced menu or other menu. The right quadrant of the reduced menu 648, when activated (e.g., with a tap gesture at a location on the touch-sensitive surface 451 that corresponds to the right quadrant or a gross swipe gesture in the direction of the right quadrant), causes the web page that corresponds to the link (e.g., associated with the URL www.musicguru.com/abc) to be opened in a new tab within the web browser application. The bottom quadrant of the reduced menu 648, when activated (e.g., with a tap gesture at a location on the touch-sensitive surface 451 that corresponds to the bottom quadrant or a gross swipe gesture in the direction of the bottom quadrant), causes the web page that corresponds to the link (e.g., associated with the URL www.musicguru.com/abc) to be added to the user's reading list for future access and perusal.

FIGS. 6S-6T show a sequence in which a three-finger light press gesture is performed on a link within an email. FIG. 6S illustrates contacts 652, 653, and 654 detected on touch-sensitive surface 451 and a displayed representation of a focus selector (e.g., the cursor 602) corresponding to contacts 652, 653, and 654 at a location on the display 450 that corresponds to a link (e.g., associated with the URL www.musicguru.com/abc) within the window 640. In this example, the combined intensity of the contacts 652, 653, and 654 is between $IT_L$ and $IT_D$ (e.g., the light press intensity level). In this example, the combined intensity is: the average of the intensities of contacts 652, 653, and 654 6; the sum of the intensities of contacts 652, 653, and 654; a total intensity detected by one or more intensity sensors associated with touch-sensitive surface 451; the maximum intensity among the intensity of contact 652, the intensity of contact 653, and the intensity of contact 654; or the like.

In FIG. 6T, an expanded menu 656 is displayed in response to detecting the three-finger light press gesture in FIG. 6S. In this example, the expanded menu 656 includes a plurality of selectable options associated with the link (e.g., associated with the URL www.musicguru.com/abc), including" opening the web page that corresponds to the link within a window of the web browser application overlaid on window 640, opening the web page that corresponds to the link within a new window of the web browser application behind window 640, copying the link to the clipboard, adding the link to the user's bookmarks, adding the web page associated with the link to the user's reading list, performing a web search with GOOGLE search engine based on the link, and the like. One of ordinary skill in the art will appreciate that a greater or lesser number of options may be included in the expanded menu 656.

FIGS. 6U-6V show a sequence in which a one-finger deep press gesture is performed on a link within an email. FIG. 6U illustrates contact 658 detected on touch-sensitive surface 451 and a displayed representation of a focus selector (e.g., the cursor 602) corresponding to contact 658 at a location on the display 450 that corresponds to a link (e.g., associated with the URL www.musicguru.com/abc) within the window 640. In this example, the intensity of the contact 658 is above $IT_D$ (e.g., the deep press intensity level). In FIG. 6V, the cursor 602 continues to be displayed and a preview window 660 is displayed on display 450 in response to detecting the one-finger deep press gesture in FIG. 6U. The preview window 660 displays at least a portion of the web page that corresponds to the link (e.g., associated with the URL www.musicguru.com/abc).

FIGS. 6W-6X show a sequence in which a one-finger light press gesture is performed on a link within an email. FIG. 6W illustrates a contact 662 detected on touch-sensitive surface 451 and a displayed representation of a focus selector (e.g., the cursor 602) corresponding to contact 662 at a location on the display 450 that corresponds to a link (e.g., associated with the URL www.musicguru.com/abc) within the window 640. In this example, the intensity of the contact 662 is between $IT_L$ and $IT_D$ (e.g., the light press intensity level). In FIG. 6X, a window 664 for the web browser application is displayed on display 450 in response to detecting the one-finger light press gesture in FIG. 6W. In FIG. 6X, the window 664, which is overlaid on the window 640, shows the web page that corresponds to the selected link in FIG. 6W (e.g., associated with the URL www.musicguru.com/abc).

FIG. 6X also illustrates contact 666 detected on touch-sensitive surface 451 and a displayed representation of a focus selector (e.g., the cursor 602) corresponding to contact 666 at a location on the display 450 that corresponds to the background of display 450 (e.g., neither within window 640 nor window 664). In this example, the intensity of the contact 666 is above $IT_D$ (e.g., sometimes called a deep press intensity level). In some embodiments, in response to detecting the one-finger deep press gesture at the location corresponding to the background of display 450, windows 640 and 664 are dismissed or minimized so that the user may view his/her desktop.

FIGS. 7A-7F illustrate a flow diagram of a method 700 of displaying and using menus in accordance with some embodiments. The method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to display and use menus. The method reduces the number, extent, and/or nature of the inputs from a user when displaying and using menus, thereby creating a more efficient human-machine interface. For battery-operated electronic devices, enabling a user to display and use menus faster and more efficiently conserves power and increases the time between battery charges.

The device displays (702), on the display, a user interface that includes one or more user interface elements. For example, the one or more user interface elements are electronic documents, URLs, media items, content items, affordances, text, and/or the like. In a first example, FIG. 5A shows a window 504 for a web browser application displayed on display 450. In FIG. 5A, the window 504 shows a home page (e.g., corresponding to the URL www.all_world_news.com/home) for a website (e.g., the "All World News" website) where a portion of the text (e.g., "Ebola") is highlighted. In another example, FIG. 5L shows the window 534 for the "Entertainment News" section (e.g., corresponding to the URL www.all_world_news.com/ET-news) of the website (e.g., the "All World News" website) displayed on display 450 along with the bookmarks bar 532. In yet another example, FIG. 5U shows a window 558 for an email application displayed on display 450. In FIG. 5U, the window 558 displays a list of a plurality of emails (e.g., emails A-I) in a user's inbox and the contents of selected "Email A." In FIG. 5U, a portion of the text (e.g., "New Years") of "Email A" is highlighted.

The device detects (704) a user input on the touch-sensitive surface at a location that corresponds to a respective user interface element of the one or more user interface elements. For example, the user input is a gesture, such as a swipe or tap gesture, with one or more finger contacts.

In response to detecting (706) the user input, and in accordance with a determination that the user input satisfies one or more first input criteria that correspond to a first input type (e.g., a two-finger tap gesture associated with a right-click operation or a three finger tap/click gesture), the device displays (708) a second menu (e.g., an expanded menu) overlaid on the user interface with one or more selectable options that correspond to the respective user interface element without displaying a first menu (e.g., a reduced menu) that is distinct from the second menu. When one of the options is selected, a corresponding action is initiated with respect to the respective user interface element, such as delete, share, copy, save, bookmark, and the like.

In one example, FIGS. 5C-5D show a sequence in which an expanded menu corresponding to highlighted text within a web page is displayed in response to detecting a two-finger light press gesture that is performed on highlighted text within a web page. FIG. 5C shows contacts 508 and 510 detected on touch-sensitive surface 451 and a displayed representation of a focus selector (e.g., the cursor 502) corresponding to contacts 508 and 510 at a location on the display 450 that corresponds to the highlighted portion of text (e.g., "Ebola") within the window 504. In this example, the combined intensity of the contacts 508 and 510 is between $IT_L$ and $IT_D$ (e.g., the light press intensity level). In FIG. 5D, an expanded menu 512 is displayed in response to detecting the two-finger light press gesture in FIG. 5C. In this example, the expanded menu 512 includes a plurality of selectable options associated with the highlighted portion of the text (e.g., "Ebola") of the web page, including: performing a lookup on the word "Ebola," performing a web search on the word "Ebola" with a search engine, copying the word "Ebola" (e.g., to the clipboard), performing speech-related options associated with the word "Ebola," and adding the word "Ebola" as spoken track.

In another example, FIGS. 6A-6B show a sequence in which an expanded menu corresponding to highlighted text within a web page is displayed in response to detecting a three-finger light press gesture. FIG. 6A shows contacts 606, 607, and 608 detected on touch-sensitive surface 451 and a displayed representation of a focus selector (e.g., a cursor 602) corresponding to contacts 606, 607, and 608 at a location on the display 450 that corresponds to the highlighted portion of text (e.g., "Ebola") within the window 604. In this example, the combined intensity of the contacts 606, 607, and 608 is between $IT_L$ and $IT_D$ (e.g., the light press intensity level). In FIG. 6B, an expanded menu 610 is displayed in response to detecting the three-finger light press gesture in FIG. 6A. In this example, the expanded menu 610 includes a plurality of selectable options associated with the highlighted portion of the text (e.g., "Ebola") of the web page, including: performing a lookup on the word "Ebola," performing a web search using the word "Ebola" with a search engine, copying the word "Ebola" to the clipboard, performing speech-related options associated with the word "Ebola," and adding the word "Ebola" as spoken track.

In response to detecting (706) the user input, and in accordance with a determination that the user input satisfies one or more second input criteria that correspond to a second input type, distinct from the first input type, the device displays (710) the first menu overlaid on the user interface with one or more selectable options that correspond to the respective user interface element without displaying the second menu, where the first menu (e.g., the reduced menu) includes a subset of the one or more selectable options included in the second menu (e.g., the expanded menu). In some embodiments, the first menu is a radial menu or a list menu. In some embodiments, the first menu is centered about the user input or a centroid of two or more contacts associated with the user input. In some embodiments, the first menu includes only a subset of the options in the second menu. In some embodiments, the first menu includes a subset of the options in the second menu and other additional options not in the second menu. In some embodiments, the first menu includes less than all of the options in the second menu. In some embodiments, the first menu is displayed after the intensity threshold is reached. In some embodiments, the first menu is displayed after detecting liftoff of the one or more contacts corresponding to the user input.

In one example, FIGS. 5E-5F show a sequence in which a reduced menu corresponding to highlighted text within a web page is displayed in response to detecting a one-finger deep press gesture. FIG. 5E shows contact 514 detected on touch-sensitive surface 451 and a displayed representation of a focus selector (e.g., the cursor 502) corresponding to contact 514 at a location on the display 450 that corresponds to the highlighted portion of text (e.g., "Ebola") within the window 504. In this example, the intensity of the contact 514 is above $IT_D$ (e.g., sometimes called a deep press intensity level). In FIG. 5F, the cursor 502 ceases to be displayed and a reduced menu 516 is displayed on display 450 in response to detecting the one-finger deep press gesture in FIG. 5E. In this example, the reduced menu 516 is centered at the location cursor 502 was displayed in FIG. 5E when the intensity of the contact 514 exceeded $IT_D$. In FIG. 5F, the reduced menu 516 includes four distinct selectable quadrants oriented in the cardinal directions. The left quadrant of the reduced menu 516, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 516, which is typically associated with a paste action, is inactive or disabled due to the lack of a currently copied item (e.g., the clipboard is empty). The top and bottom quadrants of the reduced menu 516 are empty.

In another example, FIGS. 6C-6D show a sequence in which a reduced menu corresponding to highlighted text within a web page is displayed in response to detecting a two-finger light press gesture. FIG. 6C shows contacts 611 and 612 detected on touch-sensitive surface 451 and a displayed representation of a focus selector (e.g., the cursor 602) corresponding to contacts 611 and 612 at a location on the display 450 that corresponds to the highlighted portion of text (e.g., "Ebola") within the window 604. In this example, the combined intensity of the contacts 611 and 612 is between $IT_L$ and $IT_D$ (e.g., the light press intensity level). In FIG. 6D, the cursor 602 ceases to be displayed and a reduced menu 614 is displayed on display 450 in response to detecting the two-finger light press gesture in FIG. 6C. In this example, the reduced menu 614 is centered at the location cursor 602 was displayed in FIG. 6C when the combined intensity exceeded $IT_D$. In FIG. 6D, the reduced menu 614 includes four distinct selectable quadrants oriented in the cardinal directions. The left quadrant of the reduced menu 614, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 614, which is typically associated with a paste action, is inactive or disabled due to the lack of a currently copied item (e.g., the clipboard is empty). The top and bottom quadrants of the reduced menu 614 are empty. Appendix A lists exemplary scenarios in which reduced menus are optionally displayed with up to 4 selectable quadrants (e.g., Left, Up, Right, and Down in Appendix A) and/or an immediate action is taken (e.g., in response to detecting a deep press input) for: data detected links, a browser application 147 (e.g., Safari from Apple Inc. of Cupertino, Calif.), a calendar application 148 (e.g., Calendar from Apple Inc. of Cupertino, Calif.), an email application 140 (e.g., Mail from Apple Inc. of Cupertino, Calif.), a notes application 153 (e.g., Notes from Apple Inc. of Cupertino, Calif.), an instant messaging application 141 (e.g., Messages from Apple Inc. of Cupertino, Calif.), a video conferencing application 139 (e.g., FaceTime from Apple Inc. of Cupertino, Calif.), a contact list application 137 (e.g., Contacts from Apple Inc. of Cupertino, Calif.), a file manager application (e.g., Finder from Apple Inc. of Cupertino, Calif.), a PDF viewer application (e.g., Preview from Apple Inc. of Cupertino, Calif.), an image management application 144 (e.g., Photos from Apple Inc. of Cupertino, Calif.), a reminders application (e.g., Reminders from Apple Inc. of Cupertino, Calif.), a map application 154 (e.g., Maps from Apple Inc. of Cupertino, Calif.), and a photo application (e.g., Photo Booth from Apple Inc. of Cupertino, Calif.).

In some embodiments, the reduced menu includes a subset of the selectable options included in the expanded menu. For example, the reduced menu 516, in FIG. 5F, includes a subset of the selectable options included in the expanded menu 512 in FIG. 5D. In another example, the reduced menu 614, in FIG. 6D, includes a subset of the selectable options included in the expanded menu 610 in FIG. 6B. In other embodiments, the reduced menu includes a set of selectable options that are distinct from the set of selectable options in the expanded menu.

In some embodiments, in response to detecting (706) the user input, and in accordance with a determination that the user input satisfies one or more third input criteria that correspond to a third input type, distinct from the first input type and the second input type, the device initiates (712) performance of an action associated with the respective user interface element without displaying the first menu and without displaying the second menu. For example, the respective user interface element is highlighted, selected, or the like.

In a first example, FIGS. 5A-5B show a sequence in which highlighted text within a web page is un-highlighted in response to detecting a one-finger light press gesture. FIG. 5A shows a contact 506 detected on touch-sensitive surface 451 and a displayed representation of a focus selector (e.g., cursor 502) corresponding to contact 506 at a location on the display 450 that corresponds to the highlighted portion of text (e.g., "Ebola") within the window 504. In this example, the intensity of the contact 506 is between $IT_L$ and $IT_D$ (e.g., the light press intensity level). In FIG. 5B, the portion of the text (e.g., "Ebola") of the home page is no longer highlighted in response to detecting the one-finger light press gesture in FIG. 5A.

In another example, FIGS. 6M-6N show a sequence in which a link within a first web page is resolved to open a second web page in response to detecting a one-finger light press gesture. FIG. 6M shows a contact 636 detected on touch-sensitive surface 451 and a displayed representation of a focus selector (e.g., the cursor 602) corresponding to contact 636 at a location on the display 450 that corresponds to a link (e.g., associated with an "Entertainment News" section of the website) within the window 604. In this example, the intensity of the contact 636 is between $IT_L$ and $IT_D$ (e.g., the light press intensity level). In FIG. 6N, a window 638 for a web browser application is displayed on display 450 in response to detecting the one-finger light press gesture in FIG. 6M. In FIG. 6N, the window 638 shows an "Entertainment News" section (e.g., corresponding to the URL www.all_world_news.com/ETnews) for the website (e.g., the "All World News" website).

In some embodiments, the one or more first input criteria are satisfied (714) when the user input includes a first number of contacts (e.g., a two finger tap/click gesture), the one or more second input criteria are satisfied when the user input is a press input with a second number of contacts distinct from the first number of contacts, where at least one of the second number of contacts has an intensity (e.g., a characteristic intensity) above a first intensity threshold (e.g., a one finger deep press gesture), and the one or more third input criteria are satisfied when the user input is a press input with the second number of contacts, where at least one of the second number of contacts has an intensity above a second intensity threshold and below the first intensity threshold (e.g., a one finger light press gesture).

In FIGS. 5A-5II, a two-finger gesture at a location on touch-sensitive surface 451 that corresponds to a user interface element causes display of an expanded menu with selectable options that correspond to the user interface element. For example, FIGS. 5C-5D show a sequence in which a two-finger light press gesture at a location corresponding to highlighted text within a web page causes display of expanded menu 512 with selectable options corresponding to the highlighted text.

In FIGS. 5A-5II, a one-finger deep press gesture at a location on touch-sensitive surface 451 that corresponds to a user interface element causes display of a reduced menu with selectable options that correspond to the user interface element. In one example, FIGS. 5L-5M show a sequence in which a one-finger deep press gesture at a location corresponding to "Bookmark F" within bookmark bar 532 causes display of reduced menu 538 with selectable options corresponding to "Bookmark F." In another example, FIGS. 5P-5Q show a sequence in which a one-finger deep press gesture at a location corresponding to "Bookmark C" within navigation bar 539 causes display of reduced menu 548 with selectable options corresponding to "Bookmark C."

In FIGS. 5A-5II, a one-finger light press gesture at a location on touch-sensitive surface 451 that corresponds to a user interface element causes an action associated with the user interface element to occur. For example, FIGS. 5A-5B show a sequence in which a one-finger light press gesture at a location corresponding to highlighted text within a web page causes the text to be un-highlighted.

In some embodiments, the one or more first input criteria are satisfied (716) when the user input includes a first number of contacts (e.g., a three finger tap/click gesture), the one or more second input criteria are satisfied when the user input includes a second number of contacts distinct from the first number of contacts (e.g., a two finger tap/click gesture), and the one or more third input criteria are satisfied when the user input includes a third number of contacts distinct from the first number of contacts and the second number of contacts (e.g., a one finger tap/click gesture).

In FIGS. 6A-6X, a three-finger gesture at a location on touch-sensitive surface 451 that corresponds to a user interface element causes display of an expanded menu with selectable options that correspond to the user interface element. For example, FIGS. 6I-6J show a sequence in which a three-finger gesture at a location corresponding to a link within a web page causes display of expanded menu 628 with selectable options corresponding to the link.

In FIGS. 6A-6X, a two-finger deep press gesture at a location on touch-sensitive surface 451 that corresponds to a user interface element causes display of a reduced menu with selectable options that correspond to the user interface element. For example, FIGS. 6K-6L show a sequence in which a two-finger gesture at a location corresponding to a link within a web page causes display of reduced menu 632 with selectable options corresponding to the link.

In FIGS. 6A-6X, a one-finger light press gesture at a location on touch-sensitive surface 451 that corresponds to a user interface element causes an action associated with the user interface element to occur. For example, FIGS. 6K-6L show a sequence in which a two-finger gesture at a location corresponding to a link within a first web page (e.g., associated with the URL www.all_world_news.com/home) causes display of a second web page (e.g., associated with the URL www.all_world_news.com/ETnews) corresponding to the link.

In some embodiments, a contact in the user input corresponds to a cursor displayed on the display, and, in response to detecting the user input, the device, in accordance with the determination that the user input corresponds to the second input type, ceases display of (718) the cursor on the display. In a first example, in FIG. 5F, the cursor 502 ceases to be displayed and a reduced menu 516 is displayed on display 450 in response to detecting the one-finger deep press gesture in FIG. 5E. In a second example, in FIG. 6D, the cursor 602 ceases to be displayed and a reduced menu 614 is displayed on display 450 in response to detecting the two-finger light press gesture in FIG. 6C.

In some embodiments, the first menu is (720) a radial menu with two or more distinct portions that is located on the display at a (relative or absolute) location that corresponds to a location of a contact in the user input on the touch sensitive surface. In some embodiments, the first menu is displayed on the display using an absolute positioning scheme, in which there is a one-to-one correspondence between a point on the touch-sensitive surface and the display. For example, the first menu is the reduced menu 516 in FIG. 5F with a radial menu form that includes four distinct selectable quadrants oriented in the cardinal directions. In some embodiments, the first menu is displayed on the display using a relative positioning scheme. In some embodiments, the first menu is a list menu, a grid menu, a segmented control, or the like.

In some embodiments, the radial menu includes (722) two halves each comprising a distinct, unitary (e.g., contiguous and non-segmented) region forming half of the radial menu.

In some embodiments, the radial menu includes (724) four quadrants each comprising a distinct, unitary (e.g., contiguous and non-segmented) region forming a quarter of the radial menu. For example, the reduced menu 516 in FIG. 5F is a radial menu with four distinct selectable quadrants, including the empty top and bottom quadrants, the left quadrant corresponding to a copy operation, and the right quadrant corresponding to a disabled paste operation.

In some embodiments, the four quadrants are oriented (726) within the first menu in the cardinal directions. In some embodiments, the four quadrants correspond to north, south, east, and west within the radial menu: in other words, up, down, right, and left within the radial menu. For example, the reduced menu 516 in FIG. 5F includes four distinct selectable quadrants oriented in the cardinal directions (i.e., north, east, south, and west or top, right, bottom, and left).

In some embodiments, one or more of the quadrants are (728) empty. For example, the reduced menu 516 in FIG. 5F includes the empty top or bottom quadrants. As such, a selection gesture in the top and bottom quadrants of the reduced menu 516 will not cause an operation to occur.

In some embodiments, one or more of the quadrants is disabled (730) (i.e., not selectable or inactive). For example, the reduced menu 516 in FIG. 5F includes the right quadrant corresponding to a disabled paste operation. As such, a selection gesture in the right quadrant of the reduced menu 516 will not cause the paste to occur. Nonetheless, the label for the paste operation is shown in the right quadrant of the reduced menu 516 to indicate that the paste operation will be active after something (e.g., text, an image, or the like) is copied to the clipboard.

In some embodiments, selectable options in the first menu that correspond to destructive actions are (732) visually distinguished from selectable options that correspond to nondestructive actions. For example, the label text and/or the background for quadrants associated with destructive actions (e.g., delete, cut, etc.) is a different color, font, or the like as compared to quadrants associated with non-destructive actions. For example, the left quadrant of the reduced menu 538 in FIG. 5M is visually distinct from the other quadrants (e.g., the label text is italicized and underlined) to indicate that the deletion action associated with the left quadrant is a destructive one.

In some embodiments, after displaying the first menu overlaid on the user interface, the device (734): detects lift-off of a respective contact at a location on the touch sensitive surface that corresponds to a center of the radial menu on the display; and, in response to detecting lift-off of the respective contact, ceases to display the radial menu overlaid on the user interface. For example, the user dismisses the first menu by selecting one of the quadrants and then moving back to the center. In another example, the user dismisses the first menu by navigating to one of the quadrants (without selecting it) and then moving back to the center of the radial menu. In some embodiments, the respective contact is a continuous contact associated with the user input causing display of the first menu. In some embodiments, the respective contact is a separate, non-continuous contact after selecting an action or causing display of the first menu.

For example, FIGS. 5M-5P show a sequence in which a user navigates into a respective quadrant of a reduced menu, and, subsequently, the user navigates back into the center of the reduced menu to dismiss the reduced menu and to forgo performance of the action associated with the respective quadrant. In this example, each of the quadrants of reduced menu 538 is associated with a hit region 540 on the touch-sensitive surface 451 that is larger than its displayed area on the display 450. The top quadrant corresponding to the new window action is associated hit region 540-a, the right quadrant corresponding to the new tab operation is associated with hit region 540-b, the bottom quadrant corresponding to the copy operation is associated with hit region 540-c, and the left quadrant corresponding to the delete operation is associated with hit region 540-d. For example, lift-off of a contact within a center "dead-zone" of the hit regions 540 (e.g., shown in FIGS. 5Q-5R as center "dead-zone" 556) causes dismissal of the reduced menu 538 while forgoing actions associated with the quadrants of the reduced menu 538.

Continuing with the example above, FIG. 5M illustrates detection of a swipe gesture corresponding to the movement of contact 542 from a first location 544-a to a second location 544-b (e.g., corresponding to hit region 540-b) in the direction of the right quadrant associated with the new tab action of reduced menu 538. In FIG. 5N, a visual characteristic of the right quadrant of the reduced menu 538 is changed in response to detecting the contact 542 within the hit region 540-b at the second location 544-b. FIG. 5N illustrates detection of a swipe gesture corresponding to the movement of the contact 542 from the second location 544-b to a third location 544-c (e.g., corresponding to center of the reduced menu 538 and a center "dead-zone" of the hit regions 540). In FIG. 5O, the visual characteristic of the right quadrant of the reduced menu 538 is no longer changed in response to detecting contact 542 at the third location 544-c (e.g., corresponding to center of the reduced menu 538 and a center "dead-zone" of the hit regions 540). In FIG. 5P, the reduced menu 538 ceases to be displayed and the cursor 502 is re-displayed on the display 450 in response to detecting lift-off of contact 542 from the third location 544-c (e.g., corresponding to center of the reduced menu 538 and a center "dead-zone" of the hit regions 540).

In some embodiments, the device (736): detects a selection input that selects a respective portion (e.g., a quadrant or half) of the first menu; and, in response to detecting the selection input, initiates performance of an action that corresponds to the selected respective portion of the first menu. In some embodiments, the selection input corresponds to detecting lift-off within the respective portion of the first menu or within a hit region that corresponds to the respective portion of the first menu. In some embodiments, the selection input corresponds to a swipe gesture in the direction of the respective portion of the first menu. In some embodiments, prior to selecting the respective portion, the user navigates to the respective portion of the first menu and the portion of the first menu is visibly changed to show that it will be selected. For example, a quadrant in the first menu is highlighted, the quadrant flashes or blinks, a tooltip (e.g., the name of the action) associated with the action corresponding to the quadrant is overlaid on, or adjacent to, the quadrant, a color of the quadrant is changed, a border of the quadrant is thickened, or the like.

For example, FIGS. 5Q-5T show a sequence in which a user navigates to various quadrants of a reduced menu and causes a deletion action to be performed on a bookmark. In FIG. 5Q, a visual characteristic of the right quadrant of reduced menu 548 is changed in response to detecting contact 550 at a first location 552-a within the hit region 554-b. FIG. 5Q also illustrates detection of a swipe gesture corresponding to the movement of contact 550 from the first location 544-a (e.g., corresponding to hit region 554-b) to a second location 552-b (e.g., corresponding to hit region 554-a) in the direction of the top quadrant associated with the new window action. In FIG. 5R, a visual characteristic of the top quadrant of the reduced menu 548 is changed in response to detecting contact 550 at the second location 552-b within the hit region 554-a. FIG. 5R also illustrates detection of a swipe gesture corresponding to the movement of contact 550 from the second location 552-*b* (e.g., corresponding to hit region 554-*a*) to a third location 552-*c* (e.g., corresponding to hit region 554-*d*) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-*c* within the hit region 554-*d*. In FIG. 5T, "Bookmark C" is no longer displayed within the bookmark bar 532 and the navigation bar 539 in response to detecting lift-off of contact 550 at the third location 552-*c* within the hit region 554-*d*.

In some embodiments, the user input is continuously detected (738), and the user input includes the selection input. For example, the user input is a continuous gesture with a press input portion to display the first menu and a selection gesture portion, such as a swipe, to select an option within the first menu. For example, a reduced menu is displayed in response to detecting that the intensity of the contact is above $IT_D$, and the contact continues to be detected on a touch-sensitive surface. Continuing with this example, the user navigates into, or performs a swipe gesture, into one of the portions of the reduced menu (or a corresponding hit region) without lifting the contact and subsequently lifts-off the contact. In this example, the continuously detected contact is used both to display the reduced menu and to select a portion of the reduced menu.

In some embodiments, the user input is (740) a first user input, and the selection input is a second user input, distinct from the first user input. For example, a first gesture with a press input causes display of the first menu and a second selection gesture, such as a tap on an option in the first menu, causes selection of an option within the first menu. For example, FIGS. 5P-5T show a sequence in which a reduced menu is displayed in response to a first gesture satisfying predetermined criteria and, subsequently, a quadrant of the reduced menu is selected with a second gesture distinct from the first gesture. FIG. 5P illustrates contact 546 detected on touch-sensitive surface 451 and a displayed representation of a focus selector (e.g., the cursor 502) corresponding to contact 546 at a location on the display 450 that corresponds to "Bookmark C" within the navigation bar 539. In this example, the intensity of the contact 546 is above $IT_D$ (e.g., the deep press intensity level). In FIG. 5Q, the cursor 502 ceases to be displayed and a reduced menu 548 is displayed on the display 450 in response to detecting the one-finger deep press gesture in FIG. 5P.

Continuing with the example above, in FIG. 5Q, a visual characteristic of the right quadrant of the reduced menu 548 is changed in response to detecting contact 550 at a first location 552-*a* within the hit region 554-*b*. FIG. 5Q also illustrates detection of a swipe gesture corresponding to the movement of contact 550 from the first location 544-*a* (e.g., corresponding to hit region 554-*b*) to a second location 552-*b* (e.g., corresponding to hit region 554-*a*) in the direction of the top quadrant associated with the new window action. In FIG. 5R, a visual characteristic of the top quadrant of the reduced menu 548 is changed in response to detecting contact 550 at the second location 552-*b* within the hit region 554-*a*. FIG. 5R also illustrates detection of a swipe gesture corresponding to the movement of contact 550 from the second location 552-*b* (e.g., corresponding to hit region 554-*a*) to a third location 552-*c* (e.g., corresponding to hit region 554-*d*) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-*c* within the hit region 554-*d*. In FIG. 5T, "Bookmark C" is no longer displayed within the bookmark bar 532 and the navigation bar 539 in response to detecting lift-off of contact 550 at the third location 552-*c* within the hit region 554-*d*.

In some embodiments, detecting the selection input includes (742) detecting a swipe gesture in a direction of the respective portion of the first menu. For example, the selection input is a quick swipe gesture in a direction (e.g., a gross up, down, right, or left swipe) that corresponds to the respective portion of the first menu that causes the respective portion to be selected and/or an action associated with the respective portion to be performed. For example, FIGS. 5BB-5EE show a sequence in which a swipe gesture causes a respective quadrant of a reduced menu to be selected and an action corresponding to the respective quadrant to be performed. FIG. 5BB illustrates detection of a swipe gesture corresponding to the movement of contact 565 from the first location 566-*a* to a second location 566-*b* in the direction of the bottom quadrant of reduced menu 568 associated with the preview action. In FIG. 5CC, the contact 565 is detected on touch-sensitive surface 451 at the second location 566-*b* and a visual characteristic of the bottom quadrant of the reduced menu 568 is changed in response to detecting contact 565 at the second location 566-*b* within a hit region corresponding to the bottom quadrant. FIG. 5DD shows an animation in which the bottom quadrant is torn away from the reduced menu 568 to indicate that it was selected in response to detecting lift-off of contact 565 at the second location 566-*b* within a hit region corresponding to the bottom quadrant of the reduced menu 568. In FIG. 5EE, a reduced menu 570 is concurrently displayed along with preview window 572 on display 450 in response to detecting lift-off of contact 565 at the second location 566-*b* within a hit region corresponding to the bottom quadrant of the reduced menu 568 in FIGS. 5CC-5DD. The preview window 572 displays at least a portion of the web page that corresponds to the link (e.g., www.hotels.com/abc).

In some embodiments, detecting the selection input includes (744) detecting lift-off of a respective contact in the respective portion of the first menu. For example, lift-off of the respective contact on the touch-sensitive surface at a location that corresponds to the respective portion of the first menu causes the action associated with the respective portion to be performed. For example, FIGS. 5R-5T show a sequence in which lift-off of a contact within a respective quadrant (or its corresponding hit region) causes the action associated with the respective quadrant to be selected and also causes an action corresponding to the respective quadrant to be performed. FIG. 5R illustrates detection of a swipe gesture corresponding to the movement of contact 550 from the second location 552-*b* (e.g., corresponding to hit region 554-*a*) to a third location 552-*c* (e.g., corresponding to hit region 554-*d*) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-*c* within the hit region 554-*d*. In FIG. 5T, "Bookmark C" is no longer displayed within the bookmark bar 532 and the navigation bar 539 in response to detecting lift-off of contact 550 at the third location 552-*c* within the hit region 554-*d*.

In some embodiments, in response to detecting the selection input, the device changes (746) one or more display characteristics of the respective portion of the first menu (e.g., changing a respective quadrant's color, enlarging the quadrant, flashing/blinking, or the like, prior to or concurrent with performing the action that corresponds to the respective portion of the first menu). For example, FIGS. 5Q-5R show a sequence in which detection of a contact within a respective quadrant (or its corresponding hit region) causes the respective quadrant of a reduced menu to be selected and a display characteristic of the respective quadrant is changed. FIG. 5Q illustrates detection of a swipe gesture corresponding to the movement of contact 550 from the first location 544-*a* (e.g., corresponding to hit region 554-*b*) to a second location 552-*b* (e.g., corresponding to hit region 554-*a*) in the direction of the top quadrant associated with the new window action of reduced menu 548. In FIG. 5R, a visual characteristic of the top quadrant of the reduced menu 548 is changed in response to detecting contact 550 at the second location 552-*b* within the hit region 554-*a*.

In some embodiments, in response to detecting the selection input, in accordance with a determination that the selection input satisfies one or more predefined animation criteria (e.g., swipe gesture with X velocity or within Y time), the device displays (748) an animation of the respective portion of the first menu separating from a remainder of the first menu. For example, a quadrant separates from the radial menu and subsequently returns to (e.g., snaps back into) the radial menu and blinks/flashes. In some embodiments, the animation occurs just prior to performing the action that corresponds to the respective portion of the first menu. For example, FIGS. 5CC-5DD show a sequence in which a separation or tear-off animation of a respective quadrant of a reduced menu is performed in response to selection of the respective quadrant. In FIG. 5CC, the contact 565 is detected on touch-sensitive surface 451 at the second location 566-*b* and a visual characteristic of the bottom quadrant of reduced menu 568 is changed in response to detecting contact 565 at the second location 566-*b* within a hit region corresponding to the bottom quadrant. FIG. 5DD shows an animation in which the bottom quadrant is torn away from the reduced menu 568 to indicate that it was selected in response to detecting lift-off of contact 565 at the second location 566-*b* within a hit region corresponding to the bottom quadrant of the reduced menu 568. Alternatively, in some embodiments, a different animation, such as a blinking or fade-out animation, is displayed in accordance with a determination that the selection input satisfies the one or more predefined animation criteria.

In some embodiments, in response to detecting the selection input, in accordance with a determination that the selection input does not satisfy the one or more predefined animation criteria (e.g., swipe gesture with X velocity or within Y time), the device initiates (750) performance of an action that corresponds to the selected respective portion of the first menu without displaying an animation of the respective portion of the first menu separating from a remainder of the first menu. For example, FIGS. 5H-5J show a sequence in which a respective quadrant of a reduced menu is selected and the action associated with the respective quadrant (e.g., displaying a share menu) is performed without displaying an animation. FIG. 5H illustrates detection of a swipe gesture corresponding to the movement of contact 524 from a first location 526-*a* to a second location 526-*b* in the direction of the top quadrant associated with the share action. In FIG. 5I, a visual characteristic of the top quadrant of the reduced menu 520 is changed in response to detecting the swipe gesture in the direction of the top quadrant in FIG. 5H. In FIG. 5J, a reduced menu 528 is displayed on the display 450 in response to detecting the swipe gesture in FIG. 5H and lift-off of contact 524 within the top quadrant or its corresponding hit region. In some embodiments, reduced menu 528 is displayed concurrently with preview window 522.

In some embodiments, initiating performance of the action that corresponds to the selected respective portion of the first menu includes (752): displaying another menu, distinct from the first menu, with one or more options for the action that corresponds to the selected respective portion of the first menu (e.g., the subsequent menu is a second radial menu or a list menu). For example, the option associated with a respective quadrant in the first menu corresponds to a sharing action and the subsequent menu includes options for sharing (e.g., via one or more social networks, SMS, email, etc.). For example, FIGS. 5H-5J show a sequence in which a second reduced menu is displayed in response to selecting a respective quadrant of a first reduced menu. In FIG. 5H, reduced menu 520 is displayed on the display 450. In this example, the reduced menu 520 is associated with a plurality of selectable options that correspond to the link (e.g., to the "Entertainment News" section of the website) within the window 504, including: a new window action, a share action, a new tab action, and an add to reading list action. FIG. 5H also illustrates detection of a swipe gesture corresponding to the movement of contact 524 from a first location 526-*a* to a second location 526-*b* in the direction of the top quadrant associated with the share action. In FIG. 5I, a visual characteristic of the top quadrant of the reduced menu 520 is changed in response to detecting the swipe gesture in the direction of the top quadrant in FIG. 5H. In FIG. 5J, a reduced menu 528 is displayed on the display 450 in response to detecting the swipe gesture in FIG. 5H and lift-off of contact 524 within the top quadrant or its corresponding hit region. In FIG. 5J, the reduced menu 528 is associated with a plurality of selectable options associated with the share action including: an email option, an SMS (short message service) option, Social Network A option, and Social Network B option.

In some embodiments, the selected respective portion of the first menu corresponds (754) to a preview option, and initiating performance of the action that corresponds to the preview option includes: maintaining display of the first menu; and concurrently displaying a preview area that corresponds to the respective user interface element. In some embodiments, the preview area is concurrently displayed with the first menu in response to detecting selection of the preview option of the first menu. For example, FIGS. 5BB-5EE show a sequence in which a preview area is concurrently displayed with a reduced menu in response to selecting a preview option of a reduced menu. FIG. 5BB illustrates detection of a swipe gesture corresponding to the movement of contact 565 from the first location 566-*a* to a second location 566-*b* in the direction of the bottom quadrant of the reduced menu 568 associated with the preview action. In FIG. 5CC, the contact 565 is detected on touch-sensitive surface 451 at the second location 566-*b* and a visual characteristic of the bottom quadrant of the reduced menu 568 is changed in response to detecting contact 565 at the second location 566-*b* within a hit region corresponding to the bottom quadrant. FIG. 5DD shows an animation in which the bottom quadrant is torn away from the reduced menu 568 to indicate that it was selected in response to detecting lift-off of contact 565 at the second location 566-*b* within a hit region corresponding to the bottom quadrant of the reduced menu 568. In FIG. 5EE, a reduced menu 570 is concurrently displayed along with preview window 572 on display 450 in response to detecting lift-off of contact 565 at the second location 566-*b* within a hit region corresponding to the bottom quadrant of the reduced menu 568 in FIGS. 5CC-5DD. The reduced menu 570 is associated with a plurality of selectable options that correspond to the link (e.g., www.hotels.com/abc), including: a new window action, a share action, a new tab action, and an add to reading list action. In some embodiments, the preview window 572 displays at least a portion of the web page that corresponds to the link (e.g., www.hotels.com/abc). In some embodiments, the preview window 572 displays a cleaned up representation of the web page that corresponds to the link, such as the representation seen in the Reader Mode in the Safari browser from Apple Inc. of Cupertino, Calif.

Alternatively, in some embodiments, the preview area is automatically displayed concurrently with the first menu when the press input is detected at a location, for example, corresponding to a hyperlink. For example, FIGS. 5G-5H show a sequence in which a reduced menu is concurrently displayed along with a preview window in response to a contact meeting predefined criteria. FIG. 5G illustrates contact 518 detected on touch-sensitive surface 451 and a displayed representation of a focus selector (e.g., the cursor 502) corresponding to contact 518 at a location on the display 450 that corresponds to a link (e.g., to an "Entertainment News" section of the website) within the window 504. In this example, the intensity of the contact 518 is above $IT_D$ (e.g., sometimes called a deep press intensity level). In FIG. 5H, the cursor 502 ceases to be displayed and a reduced menu 520 is concurrently displayed on the display 450 along with a preview window 522 in response to detecting the one-finger deep press gesture in FIG. 5G. The preview window 522 displays at least a portion of the web page that corresponds to an "Entertainment News" section of the website.

In some embodiments, while displaying the preview area, the device (756): detects a subsequent selection input that selects a different portion of the first menu than the respective portion of the first menu; and, in response to detecting the subsequent selection input, initiates performance of a second action that corresponds to the selected different portion of the first menu. For example, as shown in FIGS. 5H-5J, the device maintains display of the preview window 522 as the user selects the top quadrant of the reduced menu 520 and a subsequent reduced menu 528 is shown in response to selection of the top quadrant.

In some embodiments, the user interface is a first user interface associated with a first application executed by the electronic device, and the one or more selectable options that correspond to the respective user interface element include a first selectable option displayed at a first location within the first menu. While displaying a second user interface on the display for a second application, distinct from the first application, the second user interface including a second set of one or more user interface elements, the device: detects a second user input on the touch-sensitive surface at a location that corresponds to a second user interface element in the second set of one or more user interface elements; and, in response to detecting the second user input: in accordance with a determination that the second user input corresponds to the first input type (e.g., a two-finger tap gesture associated with a right-click operation), displays a fourth menu (e.g., an expanded menu) overlaid on the second user interface with one or more selectable options that correspond to the second user interface element without displaying a third menu (e.g., a reduced menu) that is distinct from the fourth menu; and, in accordance with a determination that the second user input corresponds to the second input type, distinct from the first input type, displaying the third menu overlaid on the second user interface with one or more selectable options that correspond to the second user interface element without displaying the fourth menu, where the one or more selectable options that correspond to the second user interface element include a same option as the first selectable option in the first menu displayed at a same location in the third menu as the first location in the first menu. In some embodiments, just as the delete option is displayed in the left quadrant of the first menu of the first application, the delete option is displayed in the left quadrant of the second menu in the second application, along with one or more other options associated with the second user interface element displayed in the remainder of the second menu. In some embodiments, the same option in the third menu overlaid on the second user interface is disabled (i.e., not selectable or inactive).

For example, FIGS. 5E-5F show a sequence in which a reduced menu is displayed in response to detecting a one-finger deep press gesture at a location corresponding to highlighted text within a web browser window. In FIG. 5F, reduced menu 516 is displayed on display 450 in response to detecting the one-finger deep press gesture in FIG. 5E. In FIG. 5F, the reduced menu 516 includes selectable options associated with the highlighted text (e.g., "Ebola") within the window 504. The left quadrant of the reduced menu 516, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 516, which is typically associated with a paste action, is inactive or disabled due to the lack of a currently copied item (e.g., the clipboard is empty). The top and bottom quadrants of the reduced menu 516 are empty.

In another example, FIGS. 5V-5Y show a sequence—similar to the one described above with reference to FIGS. 5E-5F—in which a reduced menu is displayed in response to detecting a one-finger deep press gesture at a location corresponding to highlighted text within an email application window. In FIG. 5Y, a final representation of the reduced menu 562 is displayed on display 450 in response to detecting that the intensity of the contact 560 is above $IT_D$ (e.g., the deep press intensity level). In FIG. 5Y, the final representation of the reduced menu 562 includes selectable options associated with the highlighted text (e.g., "New Years) within the window 558. The left quadrant, when activated (e.g., with a tap gesture at a location on the touch-sensitive surface 451 that corresponds to the left quadrant or a gross swipe gesture in the direction of the left quadrant), causes the words "New Years" to be copied to the clipboard. The right quadrant, which is typically associated with a paste action, is inactive or disabled due to the lack of a currently copied item (e.g., the clipboard is empty). The top and bottom quadrants of the reduced menu 562 are empty.

It should be understood that the particular order in which the operations in FIGS. 7A-7F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900, 1000, and 1600)

are also applicable in an analogous manner to method 700 described above with respect to FIGS. 7A-7F. For example, the contacts, gestures, user interface objects, tactile outputs, intensity thresholds, focus selectors, and animations described above with reference to method 700 optionally have one or more of the characteristics of the contacts, gestures, user interface objects, tactile outputs, intensity thresholds, focus selectors, and animations described herein with reference to other methods described herein (e.g., methods 800, 900, 1000, and 1600). For brevity, these details are not repeated here.

FIGS. 8A-8B illustrate a flow diagram of a method 800 of displaying and using menus in accordance with some embodiments. The method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to display and use menus. The method reduces the number, extent, and/or nature of the inputs from a user when displaying and using menus, thereby creating a more efficient human-machine interface. For battery-operated electronic devices, enabling a user to display and use menus faster and more efficiently conserves power and increases the time between battery charges.

The device displays (802), on the display: a user interface that includes one or more user interface elements, and a cursor. For example, the one or more user interface elements are electronic documents, URLs, media items, content items, affordances, text, and/or the like. In a first example, FIG. 5A shows a window 504 for a web browser application displayed on display 450. In FIG. 5A, the window 504 shows a home page (e.g., corresponding to the URL www.all_world_news.com/home) for a website (e.g., the "All World News" website) where a portion of the text (e.g., "Ebola") is highlighted and a cursor 502 is displayed over the highlighted text. In another example, FIG. 5L shows the window 534 for the "Entertainment News" section (e.g., corresponding to the URL www.all_world_news.com/ETnews) of the website (e.g., the "All World News" website) displayed on display 450 along with the bookmarks bar 532. In FIG. 5L, the cursor 502 is displayed over "Bookmark F" within the bookmarks bar 532. In yet another example, FIG. 5U shows a window 558 for an email application displayed on display 450. In FIG. 5U, the window 558 displays a list of a plurality of emails (e.g., emails A-I) in a user's inbox and the contents of selected "Email A." In FIG. 5U, a portion of the text (e.g., "New Years") of "Email A" is highlighted and the cursor 502 is displayed over the highlighted text.

The device detects (804) a user input on the touch-sensitive surface while the cursor is displayed on the display at a location over a respective user interface element of the one or more user interface elements. For example, the user input is a gesture, such as a swipe or tap gesture, with one or more finger contacts.

In response to detecting (806) the user input, and in accordance with a determination that the user input satisfies one or more first input criteria that correspond to a first input type (e.g., a one-finger deep press gesture or a two finger tap/click gesture), the device (808): displays a first menu overlaid on the user interface with one or more selectable options that correspond to the respective interface element; and ceases to display the cursor on the display. In one example, FIGS. 5E-5F show a sequence in which a reduced menu corresponding to highlighted text within a web page is displayed and a cursor ceases to be displayed in response to detecting a one-finger deep press gesture. FIG. 5E shows contact 514 detected on touch-sensitive surface 451 and a displayed representation of a focus selector (e.g., the cursor 502) corresponding to contact 514 at a location on the display 450 that corresponds to the highlighted portion of text (e.g., "Ebola") within the window 504. In this example, the intensity of the contact 514 is above $IT_D$ (e.g., sometimes called a deep press intensity level). In FIG. 5F, the cursor 502 ceases to be displayed and a reduced menu 516 is displayed on display 450 in response to detecting the one-finger deep press gesture in FIG. 5E. In this example, the reduced menu 516 is centered at the location cursor 502 was displayed in FIG. 5E when the intensity of the contact 514 exceeded $IT_D$. In FIG. 5F, the reduced menu 516 includes four distinct selectable quadrants oriented in the cardinal directions. The left quadrant of the reduced menu 516, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 516, which is typically associated with a paste action, is inactive or disabled due to the lack of a currently copied item (e.g., the clipboard is empty). The top and bottom quadrants of the reduced menu 516 are empty.

In another example, FIGS. 6C-6D show a sequence in which a reduced menu corresponding to highlighted text within a web page is displayed and a cursor ceases to be displayed in response to detecting a two-finger light press gesture. FIG. 6C shows contacts 611 and 612 detected on touch-sensitive surface 451 and a displayed representation of a focus selector (e.g., the cursor 602) corresponding to contacts 611 and 612 at a location on the display 450 that corresponds to the highlighted portion of text (e.g., "Ebola") within the window 604. In this example, the combined intensity of the contacts 611 and 612 is between $IT_L$ and $IT_D$ (e.g., the light press intensity level). In FIG. 6D, the cursor 602 ceases to be displayed and a reduced menu 614 is displayed on display 450 in response to detecting the two-finger light press gesture in FIG. 6C. In this example, the reduced menu 614 is centered at the location cursor 602 was displayed in FIG. 6C when the combined intensity exceeded $IT_D$. In FIG. 6D, the reduced menu 614 includes four distinct selectable quadrants oriented in the cardinal directions. The left quadrant of the reduced menu 614, when activated (e.g., with a tap gesture at a location on the touch-sensitive surface 451 that corresponds to the left quadrant or a gross swipe gesture in the direction of the left quadrant), causes the word "Ebola" to be copied to the clipboard. The right quadrant of the reduced menu 614, which is typically associated with a paste action, is inactive or disabled due to the lack of a currently copied item (e.g., the clipboard is empty). The top and bottom quadrants of the reduced menu 614 are empty.

In some embodiments, the first menu is (810) a radial menu with two or more distinct portions that is located on the display at a (relative or absolute) location that corresponds to a location of a contact in the user input on the touch sensitive surface. In some embodiments, the first menu is displayed on the display using an absolute positioning scheme, in which there is a one-to-one correspondence between a point on the touch-sensitive surface and the display. For example, the first menu is the reduced menu 516 in FIG. 5F with a radial menu form that includes four distinct selectable quadrants oriented in the cardinal directions. In some embodiments, the first menu is displayed on the display using a relative positioning scheme. In some embodiments, the first menu is a list menu, a grid menu, a segmented control, or the like.

In some embodiments, the radial menu includes (812) two halves each comprising a distinct, unitary (e.g., contiguous and non-segmented) region forming half of the radial menu.

In some embodiments, the radial menu includes (814) four quadrants each comprising a distinct, unitary (e.g., contiguous and non-segmented) region forming a quarter of the radial menu. For example, the reduced menu 516 in FIG. 5F is a radial menu with four distinct selectable quadrants, including the empty top and bottom quadrants, the left quadrant corresponding to a copy operation, and the right quadrant corresponding to a disabled paste operation.

In some embodiments, the device detects (816) a selection input that selects a respective portion (e.g., a quadrant or half) of the first menu; and, in response to detecting the selection input, initiates performance of an action that corresponds to the selected respective portion of the first menu. In some embodiments, the selection input corresponds to detecting lift-off within the respective portion of the first menu or within a hit region that corresponds to the respective portion of the first menu. In some embodiments, the selection input corresponds to a swipe gesture in the direction of the respective portion of the first menu. In some embodiments, prior to selecting the respective portion, the user navigates to the respective portion of the first menu and the portion of the first menu is visibly changed to show that it will be selected. For example, a quadrant in the first menu is highlighted, the quadrant flashes or blinks, a tooltip (e.g., the name of the action) associated with the action corresponding to the quadrant is overlaid on, or adjacent to, the quadrant, a color of the quadrant is changed, a border of the quadrant is thickened, or the like.

For example, FIGS. 5Q-5T show a sequence in which a user navigates to various quadrants of a reduced menu and causes a deletion action to be performed on a bookmark. In FIG. 5Q, a visual characteristic of the right quadrant of reduced menu 548 is changed in response to detecting contact 550 at a first location 552-a within the hit region 554-b. FIG. 5Q also illustrates detection of a swipe gesture corresponding to the movement of contact 550 from the first location 544-a (e.g., corresponding to hit region 554-b) to a second location 552-b (e.g., corresponding to hit region 554-a) in the direction of the top quadrant associated with the new window action. In FIG. 5R, a visual characteristic of the top quadrant of the reduced menu 548 is changed in response to detecting contact 550 at the second location 552-b within the hit region 554-a. FIG. 5R also illustrates detection of a swipe gesture corresponding to the movement of contact 550 from the second location 552-b (e.g., corresponding to hit region 554-a) to a third location 552-c (e.g., corresponding to hit region 554-d) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-c within the hit region 554-d. In FIG. 5T, "Bookmark C" is no longer displayed within the bookmark bar 532 and the navigation bar 539 in response to detecting lift-off of contact 550 at the third location 552-c within the hit region 554-d.

In some embodiments, in response to detecting the user input, the device, in accordance with a determination that the user input satisfies one or more second input criteria that correspond to a second input type distinct from the first input type (e.g., a one-finger light press gesture): initiates performance of (818) an action associated with the respective user interface element; and maintains display of the cursor. For example, the respective user interface element is highlighted, selected, or the like. In a first example, FIGS. 5A-5B show a sequence in which highlighted text within a web page is un-highlighted and display of a cursor is maintained in response to detecting a one-finger light press gesture. FIG. 5A shows a contact 506 detected on touch-sensitive surface 451 and a displayed representation of a focus selector (e.g., cursor 502) corresponding to contact 506 at a location on the display 450 that corresponds to the highlighted portion of text (e.g., "Ebola") within the window 504. In this example, the intensity of the contact 506 is between $IT_L$ and $IT_D$ (e.g., the light press intensity level). In FIG. 5B, the portion of the text (e.g., "Ebola") of the home page is no longer highlighted in response to detecting the one-finger light press gesture in FIG. 5A.

In another example, FIGS. 6M-6N show a sequence in which a link within a first web page is followed to a second web page and display of a cursor is maintained in response to detecting a one-finger light press gesture. FIG. 6M shows a contact 636 detected on touch-sensitive surface 451 and a displayed representation of a focus selector (e.g., the cursor 602) corresponding to contact 636 at a location on the display 450 that corresponds to a link (e.g., associated with an "Entertainment News" section of the website) within the window 604. In this example, the intensity of the contact 636 is between $IT_L$ and $IT_D$ (e.g., the light press intensity level). In FIG. 6N, a window 638 for a web browser application is displayed on display 450 in response to detecting the one-finger light press gesture in FIG. 6M. In FIG. 6N, the window 638 shows an "Entertainment News" section (e.g., corresponding to the URL www.all_world_news.com/ET-news) for the website (e.g., the "All World News" website).

In some embodiments, the one or more first input criteria are satisfied (820) when the user input is a press input with a contact with an intensity (e.g., a characteristic intensity) above a first intensity threshold (e.g., a one finger deep press gesture press), and the one or more second input criteria are satisfied when the user input is a press input with a contact with an intensity above a second intensity threshold and below the first intensity threshold (e.g., a one finger light press gesture).

In FIGS. 5A-5II, a one-finger deep press gesture at a location on touch-sensitive surface 451 that corresponds to a user interface element causes display of a reduced menu with selectable options that correspond to the user interface element. In one example, FIGS. 5L-5M show a sequence in which a one-finger deep press gesture at a location corresponding to "Bookmark F" within bookmark bar 532 causes display of reduced menu 538 with selectable options corresponding to "Bookmark F." In another example, FIGS. 5P-5Q show a sequence in which a one-finger deep press gesture at a location corresponding to "Bookmark C" within navigation bar 539 causes display of reduced menu 548 with selectable options corresponding to "Bookmark C."

In FIGS. 5A-5II, a one-finger light press gesture at a location on touch-sensitive surface 451 that corresponds to a user interface element causes an action associated with the user interface element to occur. For example, FIGS. 5A-5B show a sequence in which a one-finger light press gesture at a location corresponding to highlighted text within a web page causes the text to be un-highlighted.

In some embodiments, the one or more first input criteria are satisfied (822) when the user input includes a first number of contacts (e.g., a two finger tap/click gesture), and the one or more second first input criteria are satisfied when the user input includes a second number of contacts distinct from the first number of contacts (e.g., a one finger tap/click gesture).

In FIGS. 6A-6X, a two-finger deep press gesture at a location on touch-sensitive surface 451 that corresponds to a user interface element causes display of a reduced menu with selectable options that correspond to the user interface element. For example, FIGS. 6K-6L show a sequence in which a two-finger gesture at a location corresponding to a link within a web page causes display of reduced menu 632 with selectable options corresponding to the link.

In FIGS. 6A-6X, a one-finger light press gesture at a location on touch-sensitive surface 451 that corresponds to a user interface element causes an action associated with the user interface element to occur. For example, FIGS. 6K-6L show a sequence in which a two-finger gesture at a location corresponding to a link within a first web page (e.g., associated with the URL www.all_world_news.com/home) causes display of a second web page (e.g., associated with the URL www.all_world_news.com/ETnews) corresponding to the link.

It should be understood that the particular order in which the operations in FIGS. 8A-8B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1000, and 1600) are also applicable in an analogous manner to method 800 described above with respect to FIGS. 8A-8B. For example, the contacts, gestures, user interface objects, tactile outputs, intensity thresholds, and focus selectors described above with reference to method 800 optionally have one or more of the characteristics of the contacts, gestures, user interface objects, tactile outputs, intensity thresholds, and focus selectors described herein with reference to other methods described herein (e.g., methods 700, 900, 1000, and 1600). For brevity, these details are not repeated here.

FIGS. 9A-9C illustrate a flow diagram of a method 900 of displaying and using menus in accordance with some embodiments. The method 900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to display and use menus. The method reduces the number, extent, and/or nature of the inputs from a user when displaying and using menus, thereby creating a more efficient human-machine interface. For battery-operated electronic devices, enabling a user to display and use menus faster and more efficiently conserves power and increases the time between battery charges.

The device displays (902), on the display, a user interface that includes one or more user interface elements. For example, the one or more user interface elements are electronic documents, URLs, media items, content items, affordances, text, and/or the like. In a first example, FIG. 5A shows a window 504 for a web browser application displayed on display 450. In FIG. 5A, the window 504 shows a home page (e.g., corresponding to the URL www.all_world_news.com/home) for a website (e.g., the "All World News" website) where a portion of the text (e.g., "Ebola") is highlighted. In another example, FIG. 5L shows the window 534 for the "Entertainment News" section (e.g., corresponding to the URL www.all_world_news.com/ETnews) of the website (e.g., the "All World News" website) displayed on display 450 along with the bookmarks bar 532. In yet another example, FIG. 5U shows a window 558 for an email application displayed on display 450. In FIG. 5U, the window 558 displays a list of a plurality of emails (e.g., emails A-I) in a user's inbox and the contents of selected "Email A." In FIG. 5U, a portion of the text (e.g., "New Years") of "Email A" is highlighted.

The device detects (904) a press input by a contact on the touch-sensitive surface at a location that corresponds to a respective user interface element of the one or more user interface elements. For example, the user input is a gesture, such as a swipe or tap gesture, with one or more finger contacts.

In response to detecting (906) the press input, and in accordance with a determination that the respective user interface meets first action criteria, the first action criteria including a criterion that the user interface element is associated with a single option associated with the press input the device, the device initiates performance of (908) an action that corresponds to the single option (e.g., resolving a URL or hyperlink within a web browser window to open a new web page associated with the URL). In some embodiments, the single option is associated with the press input of a first type (e.g., a deep press gesture). In some embodiments, the single option is a "preferred option" for the input type that is set in software (e.g., set as the default by the software developer or user selected).

In some embodiments, the device: displays, on the display, a user interface that includes one or more user interface elements; detects a press input by a contact on the touch-sensitive surface at a location that corresponds to a respective user interface element of the one or more user interface elements; and, in response to detecting the press input and in accordance with a determination that the respective user interface meets first action criteria, the first action criteria including a criterion that the respective user interface element is associated with a single option associated with the press input, initiates performance of an action that corresponds to the single option.

In some embodiments, the respective user interface element corresponds to (910) a portion of an electronic document, and performing the action that corresponds to the single option includes: in accordance with a determination that the portion of the electronic document (e.g., a text portion) does not include data detected links, displaying a first additional user interface element overlaid on the electronic document with one or more selectable options (e.g., a menu with options such as copy, paste, dictionary look-up, etc.) that correspond to the portion of the electronic document (e.g., the text portion); and, in accordance with a determination that the portion of the electronic document (e.g., the text portion) includes a data detected link, displaying a second additional user interface element, distinct from the first additional user interface element, for the data detected link. In some embodiments, if the portion of the electronic document does not correspond to a data detected link (e.g., a word or ordinary text), a first additional user interface element, such as a list menu, is displayed. Conversely, in some embodiments, if the portion of the electronic document corresponds to a data detected link (e.g., a phone number, name of a person or business, address, etc.), a second additional user interface element, such as a contact card or a menu with calling options, is displayed.

For example, FIGS. 5FF-5GG show a sequence in which a deep-press gesture on a data detected link corresponding to a name causes display of a contact card (e.g., the second additional user interface element). FIG. 5FF illustrates a contact 574 detected on touch-sensitive surface 451 and a displayed representation of a focus selector (e.g., the cursor 502) corresponding to contact 574 at a location on the display 450 that corresponds to data detected link 576 (e.g., the name "G. Rasputin") within the window 558. In this example, the intensity of the contact 574 is above $IT_D$ (e.g., the deep press intensity level). In FIG. 5GG, a first additional user interface element 578 (i.e., a contact card) that corresponds to G. Rasputin" is overlaid on window 558 in response to detecting the one-finger deep press gesture at the location corresponding to the data detected link 576 in FIG. 5FF.

In another example, FIGS. 5HH-5II show a sequence in which a deep-press gesture on a data detected link corresponding to a phone number causes display of a customized menu (e.g., the second additional user interface element). FIG. 5HH illustrates a contact 580 detected on touch-sensitive surface 451 and a displayed representation of a focus selector (e.g., the cursor 502) corresponding to contact 580 at a location on the display 450 that corresponds to data detected link 582 (e.g., the phone number "+1.xxx.xxx.xxxx") within the window 558. In this example, the intensity of the contact 580 is above $IT_D$ (e.g., the deep press intensity level). In FIG. 5II, a second additional user interface element 584 (i.e., a menu) is displayed on display 450 in response to detecting the one-finger deep press gesture at the location corresponding to the data detected link 582 in FIG. 5HH. The second additional user interface element 584, in FIG. 5II, includes options associated with the phone number, including: adding the phone number as a new contact, adding the phone number to an existing contact, or calling the phone number via multiple potential options (e.g., VoIP, cellular service, FaceTime, etc.).

In response to detecting (906) the press input, and in accordance with a determination that the respective user interface element meets second action criteria, the second action criteria including a criterion that the user interface element is associated with a first number of (selectable) options associated with the press input, where the first number is greater than one, the device displays (912) a first menu overlaid on the user interface, where the first menu includes a first set of selectable options (e.g., selectable options that are part of the first number of selectable options). In some embodiments, the first set of selectable options includes the first number of selectable options. For example, the respective user interface element is a bookmark in a bookmark bar or navigation bar within a window of a web browser application, which is associated with four options. In this example, when the respective user interface element is selected a first menu (e.g., a reduced menu) is displayed. As an example scenario, in FIGS. 5L-5M, the respective user interface element is "Bookmark F" in bookmarks bar 532, which is associated with four options. In this example, the first menu is reduced menu 538, in FIG. 5M, with four selectable options, including a new window action in the top quadrant, a new tab action in the right quadrant, the copy action in the bottom quadrant, and the delete action in the left quadrant.

In some embodiments, the second action criteria include (914) a criterion that the user interface element is associated with a first number of (selectable) options associated with the press input, where the first number is greater than one and less than a first threshold number of (selectable) options (e.g., less than 5 selectable options). For example, with reference to FIGS. 5L-5M, the respective user interface element (e.g., "Bookmark F" in bookmarks bar 532) is associated with four options.

In some embodiments, the first menu is (916) a radial menu with two or more distinct portions that is located on the display at a (relative or absolute) location that corresponds to a location of the contact in the press input on the touch sensitive surface. In some embodiments, the first menu is displayed on the display using an absolute positioning scheme, in which there is a one-to-one correspondence between a point on the touch-sensitive surface and the display. For example, the first menu is the reduced menu 516 in FIG. 5F with a radial menu form that includes four distinct selectable quadrants oriented in the cardinal directions. In some embodiments, the first menu is displayed on the display using a relative positioning scheme. In some embodiments, the first menu is a list menu, a grid menu, a segmented control, or the like.

In some embodiments, the radial menu includes (918) two halves each comprising a distinct, unitary (e.g., contiguous and non-segmented) region forming half of the radial menu.

In some embodiments, the radial menu includes (920) four quadrants each comprising a distinct, unitary (e.g., contiguous and non-segmented) region forming a quarter of the radial menu. For example, the reduced menu 516 in FIG. 5F is a radial menu with four distinct selectable quadrants, including the empty top and bottom quadrants, the left quadrant corresponding to a copy operation, and the right quadrant corresponding to a disabled paste operation.

In some embodiments, the device detects (922) a selection input that selects a respective portion (e.g., a quadrant or half) of the first menu; and, in response to detecting the selection input, initiating performance of an action that corresponds to the selected respective portion of the first menu. In some embodiments, the selection input corresponds to detecting lift-off within the respective portion of the first menu or within a hit region that corresponds to the respective portion of the first menu. In some embodiments, the selection input corresponds to a swipe gesture in the direction of the respective portion of the first menu. In some embodiments, prior to selecting the respective portion, the user navigates to the respective portion of the first menu and the portion of the first menu is visibly changed to show that it will be selected. For example, a quadrant in the first menu is highlighted, the quadrant flashes or blinks, a tooltip (e.g., the name of the action) associated with the action corresponding to the quadrant is overlaid on, or adjacent to, the quadrant, a color of the quadrant is changed, a border of the quadrant is thickened, or the like.

For example, FIGS. 5Q-5T show a sequence in which a user navigates to various quadrants of a reduced menu and causes a deletion action to be performed on a bookmark. In FIG. 5Q, a visual characteristic of the right quadrant of reduced menu 548 is changed in response to detecting contact 550 at a first location 552-a within the hit region 554-b. FIG. 5Q also illustrates detection of a swipe gesture corresponding to the movement of contact 550 from the first location 544-a (e.g., corresponding to hit region 554-b) to a second location 552-b (e.g., corresponding to hit region 554-a) in the direction of the top quadrant associated with the new window action. In FIG. 5R, a visual characteristic of the top quadrant of the reduced menu 548 is changed in response to detecting contact 550 at the second location 552-b within the hit region 554-a. FIG. 5R also illustrates detection of a swipe gesture corresponding to the movement of contact 550 from the second location 552-b (e.g., corresponding to hit region 554-a) to a third location 552-c (e.g., corresponding to hit region 554-d) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-c within the hit region 554-d. In FIG. 5T, "Bookmark C" is no longer displayed within the bookmark bar 532 and the navigation bar 539 in response to detecting lift-off of contact 550 at the third location 552-c within the hit region 554-d.

In some embodiments, in response to detecting (906) the press input, and in accordance with a determination that the respective user interface element meets third action criteria, the third action criteria including a criterion that the user interface element is associated with a second number of (selectable) options associated with the press input, where the second number is greater than a second threshold number of (selectable) options (e.g., 5 or more selectable options), the device displays (924) a second menu, distinct from the first menu, overlaid on the user interface, where the second menu includes a second set of selectable options (e.g., selectable options that are part of the second number of selectable options). In some embodiments, the second set of selectable options includes the second number of selectable options. In some embodiments, the second set of selectable options includes more selectable options than the first set of selectable options. For example, the respective user interface element is a hyperlink within a web page which is associated with five or more options. In this example, when the respective user interface element is selected a second menu (e.g., an expanded menu) is displayed. As an example scenario, in FIGS. 6I-6J, the respective user interface element is a link (e.g., associated with an "Entertainment News" section of the website) within the window 604, which is associated with more than four options. In this example, the second menu is expanded menu 628, in FIG. 6J, with eight selectable options, including: opening the "Entertainment News" section of the website in a new tab of the window 604, opening the "Entertainment News" section of the website in a new window of the web browser application, downloading a linked file associated with the "Entertainment News" section of the website, downloading a linked file associated with the "Entertainment News" section of the website with a specified file name and/or file type, adding the "Entertainment News" section of the website to the user's bookmarks, adding the link to add the "Entertainment News" section of the website to the user's bookmarks, adding the "Entertainment News" section of the website to the user's reading list, copying the link to the clipboard, performing a web search with a search engine based on the link, and the like.

In some embodiments, the first set of selectable options in the first menu is (926) a subset of the second set of selectable options in the second menu. In some embodiments, the first set of selectable options includes less than all of the selectable options in the second set of selectable options. In some embodiments, the first set of selectable options includes at least one of the selectable options in the second set of selectable options.

It should be understood that the particular order in which the operations in FIGS. 9A-9C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 1000, and 1600) are also applicable in an analogous manner to method 900 described above with respect to FIGS. 9A-9C. For example, the contacts, gestures, user interface objects, tactile outputs, intensity thresholds, and focus selectors described above with reference to method 900 optionally have one or more of the characteristics of the contacts, gestures, user interface objects, tactile outputs, intensity thresholds, and focus selectors described herein with reference to other methods described herein (e.g., methods 700, 800, 1000, and 1600). For brevity, these details are not repeated here.

FIGS. 10A-10D illustrate a flow diagram of a method 1000 of displaying and using menus in accordance with some embodiments. The method 1000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, the method 1000 provides an intuitive way to display and use menus. The method reduces the number, extent, and/or nature of the inputs from a user when displaying and using menus, thereby creating a more efficient human-machine interface. For battery-operated electronic devices, enabling a user to display and use menus faster and more efficiently conserves power and increases the time between battery charges.

The device displays (1002), on the display, a user interface that includes one or more user interface elements. For example, the one or more user interface elements are electronic documents, URLs, media items, content items, affordances, text, and/or the like. In a first example, FIG. 5A shows a window 504 for a web browser application displayed on display 450. In FIG. 5A, the window 504 shows a home page (e.g., corresponding to the URL www.all_world_news.com/home) for a website (e.g., the "All World News" website) where a portion of the text (e.g., "Ebola") is highlighted. In another example, FIG. 5L shows the window 534 for the "Entertainment News" section (e.g., corresponding to the URL www.all_world_news.com/ETnews) of the website (e.g., the "All World News" website) displayed on display 450 along with the bookmarks bar 532. In yet another example, FIG. 5U shows a window 558 for an email application displayed on display 450. In FIG. 5U, the window 558 displays a list of a plurality of emails (e.g., emails A-I) in a user's inbox and the contents of selected "Email A." In FIG. 5U, a portion of the text (e.g., "New Years") of "Email A" is highlighted.

The device detects (1004) a press input by a contact on the touch-sensitive surface at a location that corresponds to a respective user interface element of the one or more user interface elements. For example, the press input is a gesture, such as a swipe or tap gesture, with one or more finger contacts.

In some embodiments, after detecting the press input by the contact and prior to detecting that the intensity of the contact is above the first intensity threshold (e.g., where the first menu is displayed at its full size and minimum translucency), the device displays (1006) the additional user interface element at a reduced size. For example, as the intensity of the contact increases the size of the first menu increases and its translucency decreases until it is displayed at its maximum size and minimum translucency when the intensity of the contact reaches the first intensity threshold.

For example, FIGS. 5U-5Y show a sequence in which a reduced menu 562 is displayed at various sizes and translucency levels as the intensity of continuously detected contact 560 increases. In FIGS. 5U-5V, contact 560 is detected on the touch-sensitive surface 451 at a location that corresponds to the highlighted text window the window 558. The intensity of contact 560, in FIGS. 5U-5V, is below a predetermined trigger intensity, which triggers display of the reduced menu 562, and also ceases to display the cursor 502. In FIG. 5W, the cursor 502 ceases to be displayed and a first intermediate representation of a reduced menu 562 is displayed on display 450 in response to detecting that the intensity of the contact 560 is above the predetermined trigger intensity and below $IT_D$. The first intermediate representation of the reduced menu 562, in FIG. 5W, is displayed at a first size and a first translucency level and includes selectable options associated with the highlighted portion of the text (e.g., "New Years") of "Email A." In FIG. 5X, a second intermediate representation of the reduced menu 562 is displayed on display 450 in response to the increase of the intensity of the contact 560, which is still less than $IT_D$, as compared to FIG. 5W. The second intermediate representation of the reduced menu 562, in FIG. 5X, is displayed at a second size that is bigger than the first size and a second translucency level that is lower than the first translucency level. In FIG. 5Y, a final representation of the reduced menu 562 is displayed on display 450 in response to detecting that the intensity of the contact 560 is above $IT_D$ (e.g., the deep press intensity level). The final intermediate representation of the reduced menu 562, in FIG. 5Y, is displayed at a third size that is bigger than the second size and a third translucency level that is lower than the second translucency level. For example, the final representation of the reduced menu 562 is displayed at its normal size and normal translucency as compared to the first and second representations of the reduced menu 562 in FIGS. 5W and 5X, respectively.

In response to detecting the press input, and in accordance with a determination that the contact in the press input has an intensity (e.g., a characteristic intensity) above a first intensity threshold (e.g., a one-finger deep press gesture), the device displays (1008) an additional user interface element (e.g., a quick look interface or a reduced menu) overlaid on the user interface with one or more selectable options that correspond to the respective interface element. For example, FIGS. 5Z-5AA show a sequence in which a reduced menu with selectable options is overlaid on a window for a mail application in response to detecting a one-finger deep press gesture. FIG. 5Z illustrates a contact 564 detected on touch-sensitive surface 451 and a displayed representation of a focus selector (e.g., the cursor 502) corresponding to contact 564 at a location on the display 450 that corresponds to a link (e.g., associated with the URL www.hotels.com/abc) within the window 558. In this example, the intensity of the contact 564 is between $IT_0$ and $IT_L$ (e.g., the contact detection intensity threshold). In FIG. 5AA, the cursor 502 ceases to be displayed and reduced menu 568 is displayed on display 450 in response to detecting that the intensity of the contact 564 is above $IT_D$.

In some embodiments, the additional user interface element is (1010) a radial menu with two or more distinct portions that is located on the display at a (relative or absolute) location that corresponds to a location of the contact in the press input on the touch sensitive surface. In some embodiments, the first menu is displayed on the display using an absolute positioning scheme, in which there is a one-to-one correspondence between a point on the touch-sensitive surface and the display. For example, the first menu is the reduced menu 516 in FIG. 5F with a radial menu form that includes four distinct selectable quadrants oriented in the cardinal directions. In some embodiments, the first menu is displayed on the display using a relative positioning scheme. In some embodiments, the first menu is a list menu, a grid menu, a segmented control, or the like.

In some embodiments, the radial menu includes (1012) two halves each comprising a distinct, unitary (e.g., contiguous and non-segmented) region forming half of the radial menu.

In some embodiments, the radial menu includes (1014) four quadrants each comprising a distinct, unitary (e.g., contiguous and non-segmented) region forming a quarter of the radial menu. For example, the reduced menu 516 in FIG. 5F is a radial menu with four distinct selectable quadrants, including the empty top and bottom quadrants, the left quadrant corresponding to a copy operation, and the right quadrant corresponding to a disabled paste operation.

While displaying the additional user interface element overlaid on the user interface, the device detects (1016) that the intensity of the contact in the press input is below a second intensity threshold. In some embodiments, the second intensity threshold corresponds to the first intensity threshold (e.g., $IT_D$). In some embodiments, the second intensity threshold is distinct from the first intensity threshold (e.g., the second intensity threshold is lower than the first intensity threshold such at $IT_L$ or $IT_0$).

In response to detecting that the intensity of the contact in the press input is below the second intensity threshold, and in accordance with a determination that the press input (e.g., a slow deep press gesture) meets (1018) predefined timing criteria, the device, in accordance with a determination (1020) that a respective location of the contact in the press input satisfies predetermined location criteria: initiates performance of an action associated with the respective user interface element; and ceases to display the additional user interface element overlaid on the user interface. In some embodiments, the determination as to the location/action criteria is made at the time of the intensity of the contact in the press input is detected to be below the second intensity threshold.

For example, FIGS. 5U-5Z show a sequence in which a reduced menu (e.g., the additional user interface element) is dismissed upon detecting lift-off in accordance with a determination that the predefined timing criteria are satisfied. In some embodiments, after determining that the predefined timing criteria is satisfied (e.g., the time of continuous detection of a contact exceeds a predefined time period $T_x$), a location of the contact on the touch-sensitive surface at lift-off corresponds to a respective option within the additional user interface element on the display such as a respective quadrant when the additional user interface element is a radial menu with four portions. For example, with reference to FIG. 5Y, after determining that contact 560 has been continuously detected for a time greater than the predefined time period $T_X$, if contact 560 is detected at location associated with the left quadrant of reduced menu 562 (or its corresponding hit region) when lift-off of contact 560 is detected, the copy action associated with the left quadrant is performed on the highlighted text (e.g., "New Years"), the reduced menu 562 ceases to be displayed, and the cursor 502 is re-displayed. In some embodiments, the device ceases to display the additional user interface element concurrent with performing the action.

In response to detecting that the intensity of the contact in the press input is below the second intensity threshold, and in accordance with a determination that the press input (e.g., a slow deep press gesture) meets (1018) predefined timing criteria, the device, in accordance with a determination that the respective location of the contact in the press input does not satisfy the predetermined location criteria, the device ceases (1022) to display the additional user interface element overlaid on the user interface while forgoing performance of the action associated with the respective user interface element.

For example, FIGS. 5U-5Z show a sequence in which a reduced menu (e.g., the additional user interface element) is dismissed upon detecting lift-off in accordance with a determination that the predefined timing criteria are satisfied. In some embodiments, after determining that the predefined timing criteria is satisfied (e.g., the time of continuous detection of a contact exceeds a predefined time period $T_X$), a location of the contact on the touch-sensitive surface at lift-off does not correspond to a respective option within the additional user interface element on the display. For example, FIGS. 5Y-5Z show a sequence in which the reduced menu 562 ceases to be displayed, the cursor 502 is re-displayed, and actions associated with the reduced menu 562 are forgone in accordance with a first determination that the contact 560 has been continuously detected for a time greater than the predefined time period $T_X$ and in accordance with a second determination that the location of contact 560 at the time of lift-off is not associated with any of the quadrants of reduced menu 562 (or their corresponding hit regions).

In some embodiments, the predefined timing criteria is satisfied (1024) in accordance with a determination that a time interval that the contact in the press input remains above the first intensity threshold is more than a predefined time period.

In some embodiments, the predefined timing criteria is satisfied (1026) in accordance with a determination that a time interval between the first intensity threshold being reached by the contact and the intensity of the contact falling below the second intensity threshold is more than a predefined time period.

In some embodiments, the predefined timing criteria is satisfied (1028) in accordance with a determination that a time interval between initial touch-down by the contact in the press input and the first intensity threshold being reached by the contact is more than a predefined time period.

In some embodiments, the predefined timing criteria is satisfied (1030) in accordance with a determination that a time interval between initial touch-down by the contact in the press input and the first intensity threshold no longer being exceeded by the contact is more than a predefined time period.

In some embodiments, the predefined timing criteria is satisfied (1032) in accordance with a determination that a time interval between the first intensity threshold no longer being exceeded by the contact and the intensity of the contact falling below the second intensity threshold is more than a predefined time period.

In some embodiments, the predefined timing criteria is satisfied (1034) in accordance with a determination that a time interval between initial touch-down and the intensity of the contact falling below the second intensity threshold is more than a predefined time period. For example, FIGS. 5U-5Z show a sequence in which the predefined time period (e.g., $T_X$) corresponds to the time interval between detecting of initial touch-down of contact 560 and detecting that the intensity of the contact 560 is below the second intensity threshold (e.g., $IT_0$).

In some embodiments, the predefined timing criteria is satisfied (1036) in accordance with a determination that a rate of increase of the intensity of the contact in the press input (e.g., the time between touch-down and reaching the threshold intensity is above a time threshold, or the time between reaching a first (animation preview) intensity threshold and reaching a second (menu display) intensity threshold is above a time threshold) is below a predetermined threshold.

In some embodiments, in response to detecting that the intensity of the contact in the press input is below the second intensity threshold, and in accordance with a determination that the press input (e.g., a quick deep press gesture) does not meet (1038) the predefined timing criteria, the device maintains (1040) display of the additional user interface element overlaid on the user interface. For example, FIGS. 5Z-5BB show a sequence in which a reduced menu is maintained upon detecting lift-off in accordance with a determination that predefined timing criteria are not satisfied. FIG. 5Z illustrates a contact 564 detected on touch-sensitive surface 451 and a displayed representation of a focus selector (e.g., the cursor 502) corresponding to contact 564 at a location on the display 450 that corresponds to a link (e.g., associated with the URL www.hotels.com/abc) within the window 558. In FIG. 5AA, the cursor 502 ceases to be displayed and reduced menu 568 is displayed on display 450 in response to detecting that the intensity of the contact 564 is above $IT_D$. Furthermore, FIG. 5AA illustrates that the time of continuous detection of the contact 564 that is below a predefined time period $T_X$. In FIG. 5AA, the reduced menu 568 is associated with a plurality of selectable options that correspond to the link (e.g., associated with the URL www.hotels.com/abc), including: a new window action, a share action, a new tab action, and a preview action. In FIG. 5BB, contact 564 is no longer detected on touch-sensitive surface 451. FIG. 5BB illustrates maintaining display of the reduced menu 568 after detecting lift-off of contact 564 and in accordance with a determination that the time of continuous detection of the contact 564 was below a predefined time period $T_X$.

In some embodiments, while maintaining display (1042) of the additional user interface element overlaid on the user interface, the device (1044): detects lift-off of the contact in the press input at a location corresponding to a center of the additional user interface element on the display; and, in response to detecting lift-off of the contact in the press input at the location corresponding to the center of the additional user interface element on the display, ceases display of the additional user interface element. For example, FIGS. 5M-5P show a sequence in which a user navigates into a respective quadrant of a reduced menu (e.g., the additional user interface element) and subsequently navigates back into the center of the reduced menu to dismiss the reduced menu and forgo performing the action associated with the respective quadrant. In this example, each of the quadrants of reduced menu 538 is associated with a hit region 540 on the touch-sensitive surface 451 that is larger than its displayed area on the display 450. The top quadrant corresponding to the new window action is associated hit region 540-*a*, the right quadrant corresponding to the new tab operation is associated with hit region 540-*b*, the bottom quadrant corresponding to the copy operation is associated with hit region 540-*c*, and the left quadrant corresponding to the delete operation is associated with hit region 540-*d*. For example, lift-off of a contact within a center "dead-zone" of the hit regions 540 (e.g., shown in FIGS. 5Q-5R as center "dead-zone" 556) causes dismissal of the reduced menu 538 while forgoing actions associated with the quadrants of the reduced menu 538.

In some embodiments, while maintaining display (1042) of the additional user interface element overlaid on the user interface, the device (1046): detects a selection input that selects a respective one of the one or more selectable options of the additional user interface element; and, in response to detecting the selection input, initiates performance of an action that corresponds to the selected respective one of the one or more selectable options of the additional user interface element. For example, FIGS. 5BB-5EE show a sequence in which a preview area is concurrently displayed with a reduced menu in response to selecting a preview option of a reduced menu. FIG. 5BB illustrates detection of a swipe gesture corresponding to the movement of contact 565 from the first location 566-*a* to a second location 566-*b* in the direction of the bottom quadrant of the reduced menu 568 associated with the preview action. In FIG. 5CC, the contact 565 is detected on touch-sensitive surface 451 at the second location 566-*b* and a visual characteristic of the bottom quadrant of the reduced menu 568 is changed in response to detecting contact 565 at the second location 566-*b* within a hit region corresponding to the bottom quadrant. FIG. 5DD shows an animation in which the bottom quadrant is torn away from the reduced menu 568 to indicate that it was selected in response to detecting lift-off of contact 565 at the second location 566-*b* within a hit region corresponding to the bottom quadrant of the reduced menu 568. In FIG. 5EE, a reduced menu 570 is concurrently displayed along with preview window 572 on display 450 in response to detecting lift-off of contact 565 at the second location 566-*b* within a hit region corresponding to the bottom quadrant of the reduced menu 568 in FIGS. 5CC-5DD. The reduced menu 570 is associated with a plurality of selectable options that correspond to the link (e.g., www.hotels.com/abc), including: a new window action, a share action, a new tab action, and an add to reading list action. The preview window 572 displays at least a portion of the web page that corresponds to the link (e.g., www.hotels.com/abc).

In some embodiments, the press input is (1048) a first user input, and the selection input is a second user input, distinct from the first user input. For example, a first gesture with a press input causes display of the first menu and a second selection gesture, such as a tap on an option in the additional user interface element, selects an option within the additional user interface element. For example, FIGS. 5P-5T show a sequence in which a reduced menu is displayed in response to a first gesture satisfying predetermined criteria and a quadrant of the reduced menu is selected with a second gesture distinct from the first gesture. FIG. 5P illustrates contact 546 detected on touch-sensitive surface 451 and a displayed representation of a focus selector (e.g., the cursor 502) corresponding to contact 546 at a location on the display 450 that corresponds to a "Bookmark C" within the navigation bar 539. In this example, the intensity of the contact 546 is above IT$_D$ (e.g., the deep press intensity level). In FIG. 5Q, the cursor 502 ceases to be displayed and a reduced menu 548 is displayed on the display 450 in response to detecting the one-finger deep press gesture in FIG. 5P. Alternatively, in some embodiments, the selection input is a continuous gesture with a press input to display the additional user interface element and a selection gesture, such as a swipe, to select an option within the additional user interface element.

In some embodiments, detecting the selection input includes (1050) detecting a swipe gesture in a direction on the touch-sensitive surface that corresponds to a direction on the display that corresponds to the respective one of the one or more selectable options of the additional user interface element. For example, a quick swipe gesture in a direction (e.g., a gross up, down, right, or left swipe) that corresponds to the respective portion of the first menu causes the respective portion to be selected and/or an action associated with the respective portion to be performed. For example, FIGS. 5BB-5DD show a sequence in which a swipe gesture causes a respective quadrant of a reduced menu to be selected and an action corresponding to the respective quadrant to be performed. FIG. 5BB illustrates detection of a swipe gesture corresponding to the movement of contact 565 from the first location 566-*a* to a second location 566-*b* in the direction of the bottom quadrant of reduced menu 568 associated with the preview action. In FIG. 5CC, the contact 565 is detected on touch-sensitive surface 451 at the second location 566-*b* and a visual characteristic of the bottom quadrant of the reduced menu 568 is changed in response to detecting contact 565 at the second location 566-*b* within a hit region corresponding to the bottom quadrant. FIG. 5DD also shows an animation in which the bottom quadrant is torn away from the reduced menu 568 to indicate that it was selected in response to detecting lift-off of contact 565 at the second location 566-*b* within a hit region corresponding to the bottom quadrant of the reduced menu 568. In FIG. 5EE, a reduced menu 570 is concurrently displayed along with preview window 572 on display 450 in response to detecting lift-off of contact 565 at the second location 566-*b* within a hit region corresponding to the bottom quadrant of the reduced menu 568 in FIGS. 5CC-5DD. The preview window 572 displays at least a portion of the web page that corresponds to the link (e.g., www.hotels.com/abc).

In some embodiments, detecting the selection input includes (1052) detecting lift-off of a respective contact at a location that corresponds to the respective one of the one or more selectable options of the additional user interface element on the display. For example, lift-off of the respective contact on the touch-sensitive surface at a location that corresponds to the respective portion of the first menu causes the action associated with the respective portion to be performed. For example, FIGS. 5R-5T show a sequence in which lift-off of a contact within a respective quadrant (or its corresponding hit region) causes the action associated with the respective quadrant to be selected and also causes the action to be performed. FIG. 5R illustrates detection of a swipe gesture corresponding to the movement of contact 550 from the second location 552-*b* (e.g., corresponding to hit region 554-*a*) to a third location 552-*c* (e.g., corresponding to hit region 554-*d*) in the direction of the left quadrant associated with the deletion action. FIG. 5S shows an animation in which the left quadrant is torn away from the reduced menu 548 and a visual characteristic of the left quadrant of the reduced menu 548 is changed in response to detecting lift-off of contact 550 at the third location 552-*c* within the hit region 554-*d*. In FIG. 5T, "Bookmark C" is no longer displayed within the bookmark bar 532 and the navigation bar 539 in response to detecting lift-off of contact 550 at the third location 552-*c* within the hit region 554-*d*.

It should be understood that the particular order in which the operations in FIGS. 10A-10D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1600) are also applicable in an analogous manner to method 1000 described above with respect to FIGS. 10A-10D. For example, the contacts, gestures, user interface objects, tactile outputs, intensity thresholds, and focus selectors described above with reference to method 1000 optionally have one or more of the characteristics of the contacts, gestures, user interface objects, tactile outputs, intensity thresholds, and focus selectors described herein with reference to other methods described herein (e.g., methods 700, 800, 900, and 1600). For brevity, these details are not repeated here.

Figure 11:
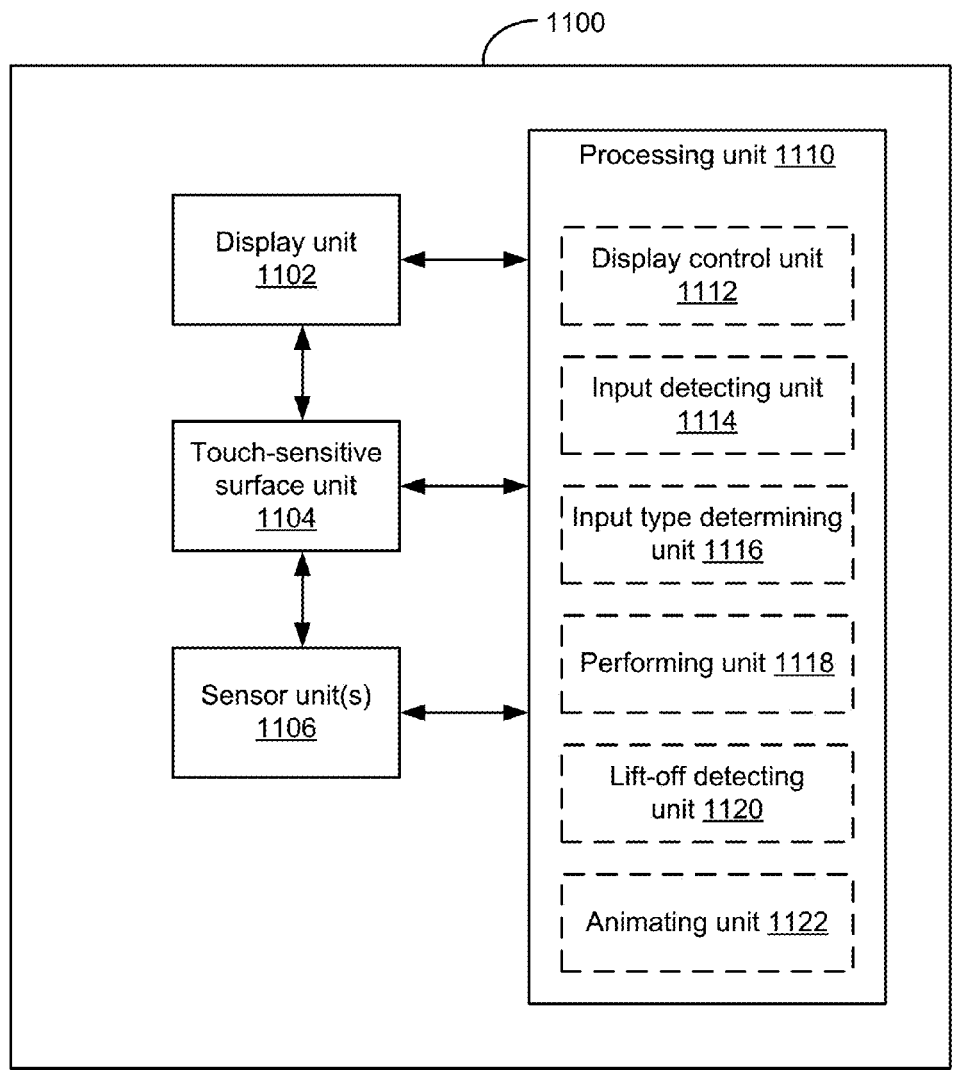
FIGS. 11-14 are functional block diagrams of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device 1100 includes a display unit 1102 configured to display a user interface, a touch-sensitive surface unit 1104 configured to receive contacts, one or more sensor units 1106 configured to detect intensity of contacts with the touch-sensitive surface unit 1104; and a processing unit 1110 coupled with the display unit 1102, the touch-sensitive surface unit 1104 and the one or more sensor units 1106. In some embodiments, the processing unit 1110 includes: a display control unit 1112, an input detecting unit 1114, an input type determining unit 1116, a performing unit 1118, a lift-off detecting unit 1120, and an animating unit 1122.

The processing unit 1110 is configured to: enable display of (e.g., with the display control unit 1112), on the display unit 1102, a user interface that includes one or more user interface elements; and detect (e.g., with the input detecting unit 1114) a user input on the touch-sensitive surface unit 1104 at a location that corresponds to a respective user interface element of the one or more user interface elements. In response to detecting the user input, the processing unit 1110 is configured to: in accordance with a determination (e.g., with the input type determining unit 1114) that the user input satisfies one or more first input criteria that correspond to a first input type, enable display of (e.g., with the display control unit 1112) a second menu overlaid on the user interface with one or more selectable options that correspond to the respective user interface element without enabling display of a first menu that is distinct from the second menu; and in accordance with a determination (e.g., with the input type determining unit 1114) that the user input satisfies one or more second input criteria that correspond to a second input type, distinct from the first input type, enable display of (e.g., with the display control unit 1112) the first menu overlaid on the user interface with one or more selectable options that correspond to the respective user interface element without displaying the second menu, where the first menu includes a subset of the one or more selectable options included in the second menu.

In some embodiments, in response to detecting the user input, and in accordance with a determination (e.g., with the input type determining unit 1114) that the user input satisfies one or more third input criteria that correspond to a third input type, distinct from the first input type and the second input type, the processing unit 1110 is configured to initiate performance (e.g., with the performing unit 1118) of an action associated with the respective user interface element without displaying the first menu and without enabling display of the second menu.

In some embodiments, the one or more first input criteria are satisfied when the user input includes a first number of contacts, the one or more second input criteria are satisfied when the user input is a press input with a second number of contacts distinct from the first number of contacts, where at least one of the second number of contacts has an intensity above a first intensity threshold, and the one or more third input criteria are satisfied when the user input is a press input with the second number of contacts, where at least one of the second number of contacts has an intensity above a second intensity threshold and below the first intensity threshold.

In some embodiments, the one or more first input criteria are satisfied when the user input includes a first number of contacts, the one or more second first input criteria are satisfied when the user input includes a second number of contacts distinct from the first number of contacts, and the one or more third input criteria are satisfied when the user input includes a third number of contacts distinct from the first number of contacts and the second number of contacts.

In some embodiments, a contact in the user input corresponds to a cursor displayed on the display unit 1102, and the processing unit 1110 is configured to: in response to detecting the user input, and in accordance with the determination that the user input corresponds to the second input type, cease display of the cursor on the display unit 1102.

In some embodiments, the first menu is a radial menu with two or more distinct portions that is located on the display unit 1102 at a location that corresponds to a location of a contact in the user input on the touch sensitive surface unit 1104.

In some embodiments, the radial menu includes two halves each comprising a distinct, unitary region forming half of the radial menu.

In some embodiments, the radial menu includes four quadrants each comprising a distinct, unitary region forming a quarter of the radial menu.

In some embodiments, the four quadrants are oriented within the first menu in the cardinal directions.

In some embodiments, one or more of the quadrants are empty.

In some embodiments, one or more of the quadrants are disabled.

In some embodiments, after enabling display of the first menu overlaid on the user interface, the processing unit 1110 is configured to: detect lift-off (e.g., with the lift-off detecting unit 1120) of a respective contact at a location on the touch sensitive surface unit 1104 that corresponds to a center of the radial menu on the display unit 1102; and, in response to detecting lift-off of the respective contact, cease display of (e.g., with the display control unit 1112) the radial menu overlaid on the user interface.

In some embodiments, the processing unit 1110 is configured to: detect (e.g., with the input detecting unit 1114) a selection input that selects a respective portion of the first menu; and, in response to detecting the selection input, initiate performance of (e.g., with the performing unit 1118) an action that corresponds to the selected respective portion of the first menu.

In some embodiments, the user input is continuously detected, and the user input includes the selection input.

In some embodiments, the user input is a first user input, and where the selection input is a second user input, distinct from the first user input.

In some embodiments, the processing unit 1110 is configured to the selection input by detecting (e.g., with the input detecting unit 1114) a swipe gesture in a direction of the respective portion of the first menu.

In some embodiments, the processing unit 1110 is configured to detect the selection input by detecting lift-off (e.g., with the lift-off detecting unit 1120) of a respective contact in the respective portion of the first menu.

In some embodiments, in response to detecting the selection input, the processing unit 1110 is configured to change (e.g., with the animating unit 1122) one or more display characteristics of the respective portion of the first menu.

In some embodiments, in response to detecting the selection input, and in accordance with a determination that the selection input satisfies one or more predefined animation criteria, the processing unit 1110 is configured to enable display of (e.g., with the animating unit 1122) an animation of the respective portion of the first menu separating from a remainder of the first menu.

In some embodiments, in response to detecting the selection input, and in accordance with a determination that the selection input does not satisfy the one or more predefined animation criteria, the processing unit 1110 is configured to initiate performance of (e.g., with the performing unit 1118) an action that corresponds to the selected respective portion of the first menu without enabling display of an animation of the respective portion of the first menu separating from a remainder of the first menu.

In some embodiments, the processing unit 1110 is configured to initiate performance of the action that corresponds to the selected respective portion of the first menu by enabling display of (e.g., with the display control unit 1112) another menu, distinct from the first menu, with one or more options for the action that corresponds to the selected respective portion of the first menu.

In some embodiments, the selected respective portion of the first menu corresponds to a preview option, and the processing unit 1110 is configured to initiate performance of the action that corresponds to the preview option by: maintaining display of (e.g., with the display control unit 1112) the first menu; and concurrently enabling display of (e.g., with the display control unit 1112) a preview area that corresponds to the respective user interface element.

In some embodiments, while enabling display of the preview area, the processing unit 1110 is configured to: detect (e.g., with the input detecting unit 1114) a subsequent selection input that selects a different portion of the first menu than the respective portion of the first menu; and, in response to detecting the subsequent selection input, initiate performance of (e.g., with the performing unit 1118) a second action that corresponds to the selected different portion of the first menu.

In some embodiments, the user interface is a first user interface associated with a first application executed by the electronic device 1100, and the one or more selectable options that correspond to the respective user interface element include a first selectable option displayed at a first location within the first menu. While enabling display of a second user interface on the display for a second application, distinct from the first application, the second user interface including a second set of one or more user interface elements, the processing unit 1110 is configured to detect (e.g., with the input detecting unit 1114) a second user input on the touch-sensitive surface unit 1104 at a location that corresponds to a second user interface element in the second set of one or more user interface elements. In response to detecting the second user input, the processing unit 1110 is configured to: in accordance with a determination (e.g., with the input type determining unit 1116) that the second user input corresponds to the first input type, enable display of (e.g., with the display control unit 1112) a fourth menu overlaid on the second user interface with one or more selectable options that correspond to the second user interface element without enabling display of a third menu that is distinct from the fourth menu; and, in accordance with a determination (e.g., with the input type determining unit 1116) that the second user input corresponds to the second input type, distinct from the first input type, enable display of (e.g., with the display control unit 1112) the third menu overlaid on the second user interface with one or more selectable options that correspond to the second user interface element without enabling display of the fourth menu, where the one or more selectable options that correspond to the second user interface element include a same option as the first selectable option in the first menu displayed at a same location in the third menu as the first location in the first menu.

In some embodiments, the same option in the third menu overlaid on the second user interface is disabled.

In some embodiments, selectable options in the first menu that correspond to destructive actions are visually distinguished from selectable options that correspond to nondestructive actions.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7F are, optionally, implemented by components depicted in FIGS. 1A-1B or FIG. 11. For example, detection operations 704, performance operation 712, and animation operations 746 and 748 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
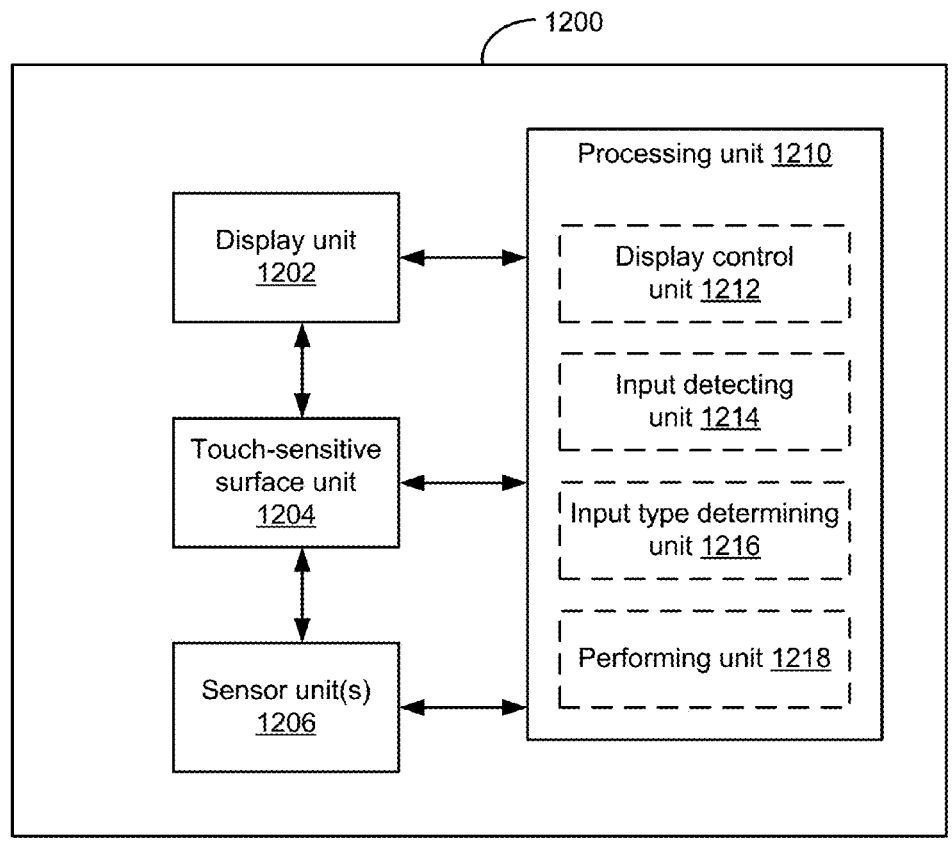

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, a touch-sensitive surface unit 1204 configured to receive contacts, one or more sensor units 1206 configured to detect intensity of contacts with the touch-sensitive surface unit 1204; and a processing unit 1210 coupled with the display unit 1202, the touch-sensitive surface unit 1204 and the one or more sensor units 1206. In some embodiments, the processing unit 1210 includes: a display control unit 1212, an input detecting unit 1214, an input type determining unit 1216, and a performing unit 1218.

The processing unit 1210 is configured to: enable display of (e.g., with the display control unit 1212), on the display unit 1202, a user interface that includes one or more user interface elements and a cursor; and detect (e.g., with the input detecting unit 1214) a user input on the touch-sensitive surface unit 1204 while the cursor is displayed on the display unit 1202 at a location over a respective user interface element of the one or more user interface elements. In response to detecting the user input, and in accordance with a determination (e.g., with the input type determining unit 1216) that the user input satisfies one or more first input criteria that correspond to a first input type, the processing unit 1210 is configured to: enable display of (e.g., with the display control unit 1212) a first menu overlaid on the user interface with one or more selectable options that correspond to the respective interface element; and cease display of (e.g., with the display control unit 1212) the cursor on the display unit 1202.

In some embodiments, in response to detecting the user input, and in accordance with a determination that the user input satisfies one or more second input criteria that correspond to a second input type distinct from the first input type, the processing unit 1210 is configured to: initiate performance perform of (e.g., with the performing unit 1218) an action associated with the respective user interface element; and maintain display of (e.g., with the display control unit 1212) the cursor.

In some embodiments, the one or more first input criteria are satisfied when the user input is a press input with a contact with an intensity above a first intensity threshold, and the one or more second input criteria are satisfied when the user input is a press input with a contact with an intensity above a second intensity threshold and below the first intensity threshold.

In some embodiments, the one or more first input criteria are satisfied when the user input includes a first number of contacts, and the one or more second first input criteria are satisfied when the user input includes a second number of contacts distinct from the first number of contacts.

In some embodiments, the first menu is a radial menu with two or more distinct portions that is located on the display unit 1202 at a location that corresponds to a location of a contact in the user input on the touch sensitive surface unit 1204.

In some embodiments, the radial menu includes two halves each comprising a distinct, unitary region forming half of the radial menu.

In some embodiments, the radial menu includes four quadrants each comprising a distinct, unitary region forming a quarter of the radial menu.

In some embodiments, the processing unit 1210 is configured to: detect (e.g., with the input detecting unit 1214) a selection input that selects a respective portion of the first menu; and, in response to detecting the selection input, initiate performance (e.g., with the performing unit 1218) of an action that corresponds to the selected respective portion of the first menu.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8B are, optionally, implemented by components depicted in FIGS. 1A-1B or FIG. 12. For example, detection operation 804 and performance operation 816 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
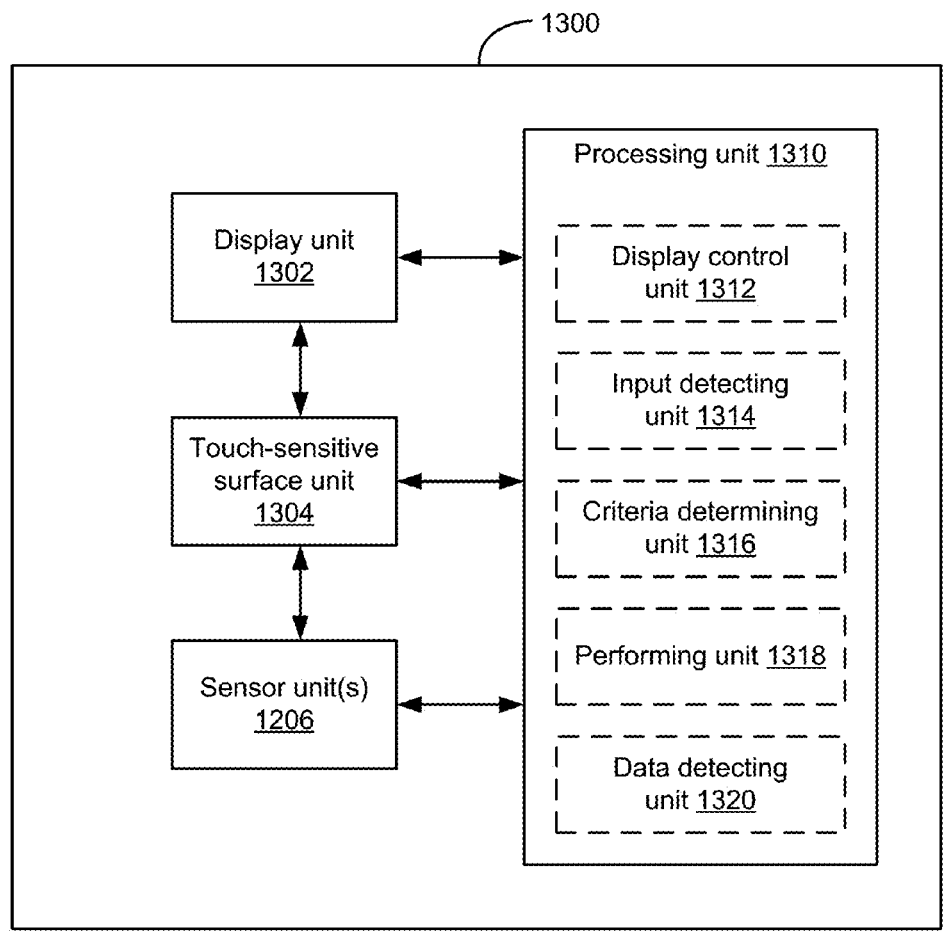

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts, one or more sensor units 1306 configured to detect intensity of contacts with the touch-sensitive surface unit 1304; and a processing unit 1310 coupled with the display unit 1302, the touch-sensitive surface unit 1304 and the one or more sensor units 1306. In some embodiments, the processing unit 1310 includes: a display control unit 1312, an input detecting unit 1314, a criteria determining unit 1316, a performing unit 1318, and a data detecting unit 1320.

The processing unit 1310 is configured to: enable display of (e.g., with the display control unit 1312), on the display unit 1302, a user interface that includes one or more user interface elements; and detect (e.g., with the input detecting unit 1314) a press input by a contact on the touch-sensitive surface unit 1304 at a location that corresponds to a respective user interface element of the one or more user interface elements. In response to detecting the press input, the processing unit 1310 is configured to: in accordance with a determination (e.g., with the criteria determining unit 1316) that the respective user interface meets first action criteria, the first action criteria including a criterion that the respective user interface element is associated with a single option associated with the press input, initiate performance of (e.g., with the performing unit 1318) an action that corresponds to the single option; and, in accordance with a determination (e.g., with the criteria determining unit 1316) that the respective user interface element meets second action criteria, the second action criteria including a criterion that the respective user interface element is associated with a first number of options associated with the press input, where the first number is greater than one, enable display of (e.g., with the display control unit 1312) a first menu overlaid on the user interface, where the first menu includes a first set of selectable options.

In some embodiments, second action criteria include a criterion that the user interface element is associated with a first number of options associated with the press input, where the first number is greater than one and less than a first threshold number of options.

In some embodiments, in response to detecting the press input, and in accordance with a determination (e.g., with the criteria determining unit 1316) that the respective user interface element meets third action criteria, the third action criteria including a criterion that the user interface element is associated with a second number of options associated with the press input, where the second number is greater than a second threshold number of, the processing unit 1310 is configured to enable display of (e.g., with the display control unit 1312) a second menu, distinct from the first menu, overlaid on the user interface, where the second menu includes a second set of selectable options.

In some embodiments, the first set of selectable options in the first menu is a subset of the second set of selectable options in the second menu.

In some embodiments, the respective user interface element corresponds to a portion of an electronic document, and the processing unit 1310 is configured to initiate performance of the action that corresponds to the single option by: in accordance with a determination (e.g., with the data detecting unit 1320) that the portion of the electronic document does not include data detected links, enable display of (e.g., with the display control unit 1312) a first additional user interface element overlaid on the electronic document with one or more selectable options that correspond to the portion of the electronic document; and, in accordance with a determination (e.g., with the data detecting unit 1320) that the portion of the electronic document includes a data detected link, enable display of (e.g., with the display control unit 1312) a second additional user interface element, distinct from the first additional user interface element, for the data detected link.

In some embodiments, the first menu is a radial menu with two or more distinct portions that is located on the display unit 1302 at location that corresponds to a location of the contact in the press input on the touch sensitive surface unit 1304.

In some embodiments, the radial menu includes two halves each comprising a distinct, unitary region forming half of the radial menu.

In some embodiments, the radial menu includes four quadrants each comprising a distinct, unitary region forming a quarter of the radial menu.

In some embodiments, the processing unit 1310 is configured to: detect (e.g., with the input detecting unit 1314) a selection input that selects a respective portion (of the first menu; and, in response to detecting the selection input, initiate performance of (e.g., with the performing unit 1318) an action that corresponds to the selected respective portion of the first menu.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9C are, optionally, implemented by components depicted in FIGS. 1A-1B or FIG. 13. For example, detection operation 904 and performance operation 908 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
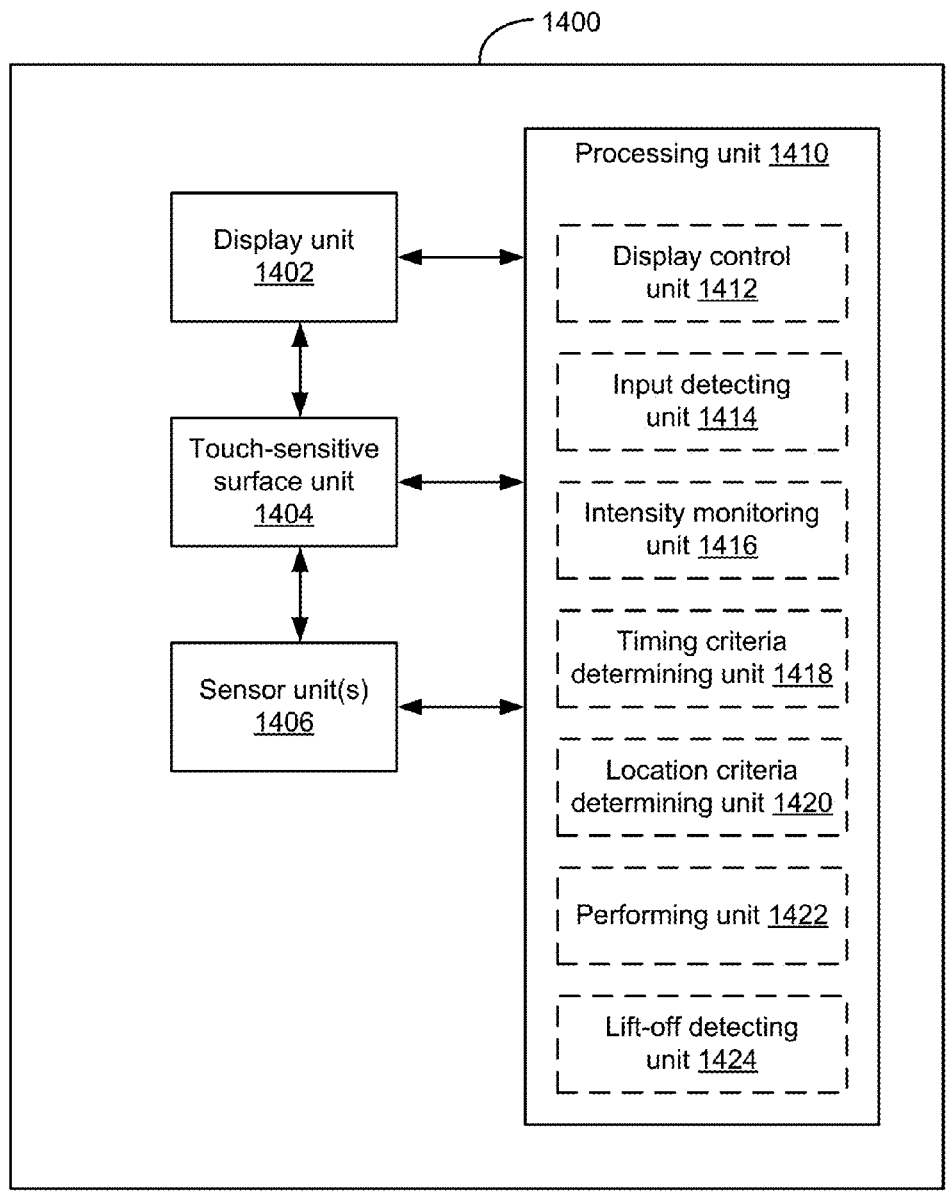

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a user interface, a touch-sensitive surface unit 1404 configured to receive contacts, one or more sensor units 1406 configured to detect intensity of contacts with the touch-sensitive surface unit 1404; and a processing unit 1410 coupled with the display unit 1402, the touch-sensitive surface unit 1404 and the one or more sensor units 1406. In some embodiments, the processing unit 1410 includes: a display control unit 1412, an input detecting unit 1414, an intensity monitoring unit 1416, a timing criteria determining unit 1418, a location criteria determining unit 1420, a performing unit 1422, and a lift-off detecting unit 1424.

The processing unit 1410 is configured to: enable display of (e.g., with the display control unit 1412), on the display unit 1402, a user interface that includes one or more user interface elements; and detect (e.g., with the input detecting unit 1414) a press input by a contact on the touch-sensitive surface unit 1404 at a location that corresponds to a respective user interface element of the one or more user interface elements. In response to detecting the press input, and in accordance with a determination (e.g., with the intensity monitoring unit 1416) that the contact in the press input has an intensity above a first intensity threshold, enable display of (e.g., with the display control unit 1412) an additional user interface element overlaid on the user interface with one or more selectable options that correspond to the respective interface element. While enabling display of the additional user interface element overlaid on the user interface, the processing unit 1410 is configured to detect (e.g., with the intensity monitoring unit 1416) that the intensity of the contact in the press input is below a second intensity threshold. In response to detecting that the intensity of the contact in the press input is below the second intensity threshold, and in accordance with a determination (e.g., with the timing criteria determining unit 1418) that the press input meets predefined timing criteria, the processing unit 1410 is configured to: in accordance with a determination (e.g., with the location criteria determining unit 1420) that a respective location of the contact in the press input satisfies predetermined location criteria: initiate performance of (e.g., with the performing unit 1422) an action associated with the respective user interface element; and cease display of (e.g., with the display control unit 1412) the additional user interface element overlaid on the user interface. In response to detecting that the intensity of the contact in the press input is below the second intensity threshold, and in accordance with a determination (e.g., with the timing criteria determining unit 1418) that the press input meets predefined timing criteria, the processing unit 1410 is configured to: in accordance with a determination (e.g., with the location criteria determining unit 1420) that a respective location of the contact in the press input does not satisfy the predetermined location criteria, cease display of (e.g., with the display control unit 1412) the additional user interface element overlaid on the user interface while forgoing performance of the action associated with the respective user interface element.

In some embodiments, in response to detecting that the intensity of the contact in the press input is below the second intensity threshold, and in accordance with a determination (e.g., with the timing criteria determining unit 1418) that the press input does not meet the predefined timing criteria, the processing unit 1410 is configured to maintain display of (e.g., with the display control unit 1412) the additional user interface element overlaid on the user interface.

In some embodiments, while maintaining display of the additional user interface element overlaid on the user interface, the processing unit 1410 is configured to: detect lift-off (e.g., with the lift-off detecting unit 1424) of the contact in the press input at a location corresponding to a center of the additional user interface element on the display unit 1402; and, in response to detecting lift-off of the contact in the press input at the location corresponding to the center of the additional user interface element on the display unit 1402, cease display of (e.g., with the display control unit 1412) the additional user interface element.

In some embodiments, the press input is a first user input, and the selection input is a second user input, distinct from the first user input.

In some embodiments, the processing unit 1410 is configured to detect the selection input by detecting (e.g., with the input detecting unit 1414) a swipe gesture in a direction on the touch-sensitive surface unit 1404 that corresponds to a direction on the display unit 1402 that corresponds to the respective one of the one or more selectable options of the additional user interface element.

In some embodiments, the processing unit 1410 is configured to detect the selection input by detecting lift-off (e.g., with the lift-off detecting unit 1424) of a respective contact at a location that corresponds to the respective one of the one or more selectable options of the additional user interface element on the display unit 1402.

In some embodiments, after detecting the press input by the contact and prior to detecting that the intensity of the contact is above the first intensity threshold, the processing unit 1410 is configured to enable display of (e.g., with the display control unit 1412) the additional user interface element at a reduced size.

In some embodiments, the predefined timing criteria is satisfied in accordance with a determination that a time interval that the contact in the press input remains above the first intensity threshold is more than a predefined time period.

In some embodiments, the predefined timing criteria is satisfied in accordance with a determination that a time interval between the first intensity threshold being reached by the contact and the intensity of the contact falling below the second intensity threshold is more than a predefined time period.

In some embodiments, the predefined timing criteria is satisfied in accordance with a determination that a time interval between initial touch-down by the contact in the press input and the first intensity threshold being reached by the contact is more than a predefined time period.

In some embodiments, the predefined timing criteria is satisfied in accordance with a determination that a time interval between initial touch-down by the contact in the press input and the first intensity threshold no longer being exceeded by the contact is more than a predefined time period.

In some embodiments, the predefined timing criteria is satisfied in accordance with a determination that a time interval between the first intensity threshold no longer being exceeded by the contact and the intensity of the contact falling below the second intensity threshold is more than a predefined time period.

In some embodiments, the predefined timing criteria is satisfied in accordance with a determination that a time interval between initial touch-down and the intensity of the contact falling below the second intensity threshold is more than a predefined time period.

In some embodiments, the predefined timing criteria is satisfied in accordance with a determination that a rate of increase of the intensity of the contact in the press input is below a predetermined threshold.

In some embodiments, the additional user interface element is a radial menu with two or more distinct portions that is located on the display unit 1402 at a location that corresponds to a location of the contact in the press input on the touch sensitive surface unit 1404.

In some embodiments, the radial menu includes two halves each comprising a distinct, unitary region forming half of the radial menu.

In some embodiments, the radial menu includes four quadrants each comprising a distinct, unitary region forming a quarter of the radial menu.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10D are, optionally, implemented by components depicted in FIGS. 1A-1B or FIG. 14. For example, detection operation 1004 and maintaining operation 1040 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 15A-15S illustrate exemplary user for interacting with a map in accordance with some embodiments. The user interfaces in these figures are used to illustrate the processes described herein, including the processes in FIGS. 7A-7F, 8A-8B, 9A-9C, 10A-10D, and 16A-16B. Some of FIGS. 15A-15S include intensity diagrams 550 that show a current intensity of the contact on the touch-sensitive surface relative to a plurality of intensity thresholds including $IT_0$, $IT_L$, and $IT_D$. In some embodiments, operations similar to those described below with reference to $IT_D$ are performed with reference to a different intensity threshold (e.g., "$IT_L$"). In some embodiments, operations similar to those described below with reference to $IT_L$ are performed with reference to a different intensity threshold (e.g., "$IT_0$").

For convenience of explanation, the embodiments described with reference to FIGS. 15A-15S will be discussed with reference to a device with display 450 and separate touch-sensitive surface 451; however, analogous operations are, optionally, performed on a device with touch-sensitive display system 112 in response to detecting the contacts described in FIGS. 15A-15S on touch-sensitive display system 112 while displaying the user interfaces shown in FIGS. 15A-15S on touch-sensitive display system 112; in such embodiments, the focus selector is, optionally: a respective contact, a representative point corresponding to a contact (e.g., a centroid of a respective contact or a point associated with a respective contact), or a centroid of two or more contacts detected on touch-sensitive display system 112, in place of cursor 1510.

FIG. 15A illustrates map view user interface 1500 displayed on display 450. Map view user interface 1500 displays map 1502 (e.g., showing a map region of the San Francisco Bay Area). Map view user interface 1500 also provides zoom-in affordance 1504, zoom-out affordance 1506, and compass 1508 that indicates the displayed orientation of map 1502 (e.g., in the example shown, map 1502 is oriented along true north as indicated by compass 1508). A cursor 1510 is positioned over a respective location of map 1502.

In some embodiments, the device receives a touch input 1512. In accordance with a determination that touch input 512 meets first intensity criteria, the device performs a first operation with respect to map 1502. In some embodiments, in accordance with a determination that touch input 1512 does not meet the first intensity criteria, the device forgoes performing the first operation with respect to map 1502. In some embodiments, in accordance with a determination that touch input 1512 does not meet the first intensity criteria, the device performs a second operation with respect to the map. In some embodiments, the first intensity criteria include a determination that touch input 1512 is above a respective intensity threshold (e.g., touch input 1512 has an intensity greater than $IT_D$ as shown in intensity diagram 550, so that touch input 1512 is considered a deep press). In some embodiments, as shown in FIG. 15B, the first operation includes dropping (e.g., placing/displaying) a marker/pin/point-of-interest (POI) 1514 at the location of cursor 1510.

In some embodiments, the first operation is performed in response to determining that touch input 512 meets first intensity criteria (e.g., the first operation is performed without waiting for a predetermined amount of time after determining that that touch input 512 meets the first intensity criteria, thereby allowing more rapid and efficient interaction with the map).

In some embodiments, the second operation (e.g., when the touch input does not meet the first intensity criteria) includes moving cursor 1510 in accordance with the position of the touch input. In some embodiments, the second operation includes re-displaying a different map region in accordance with the position of the touch input (e.g., scrolling the map).

Figure 15C:
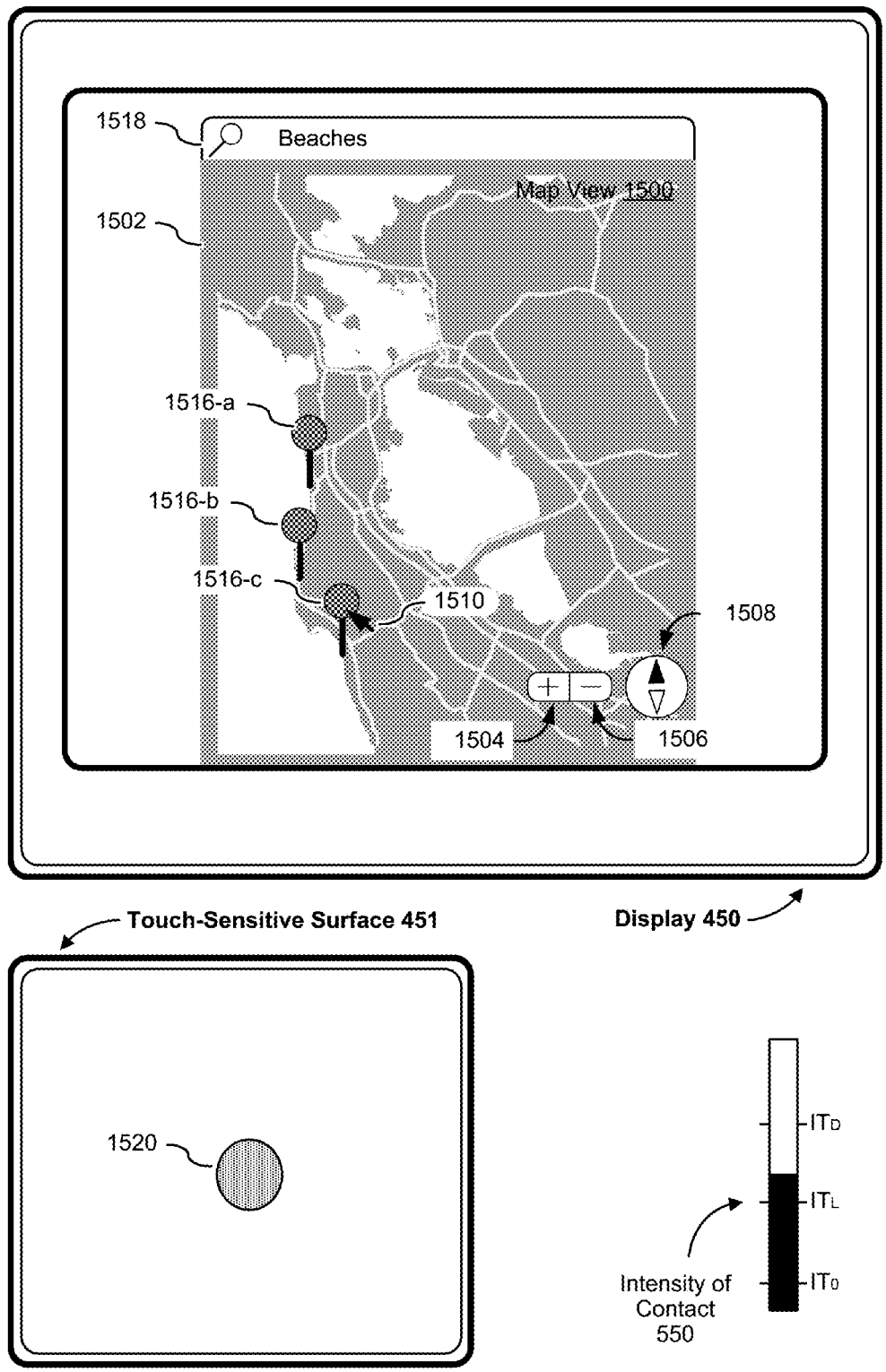
Figure 15D:
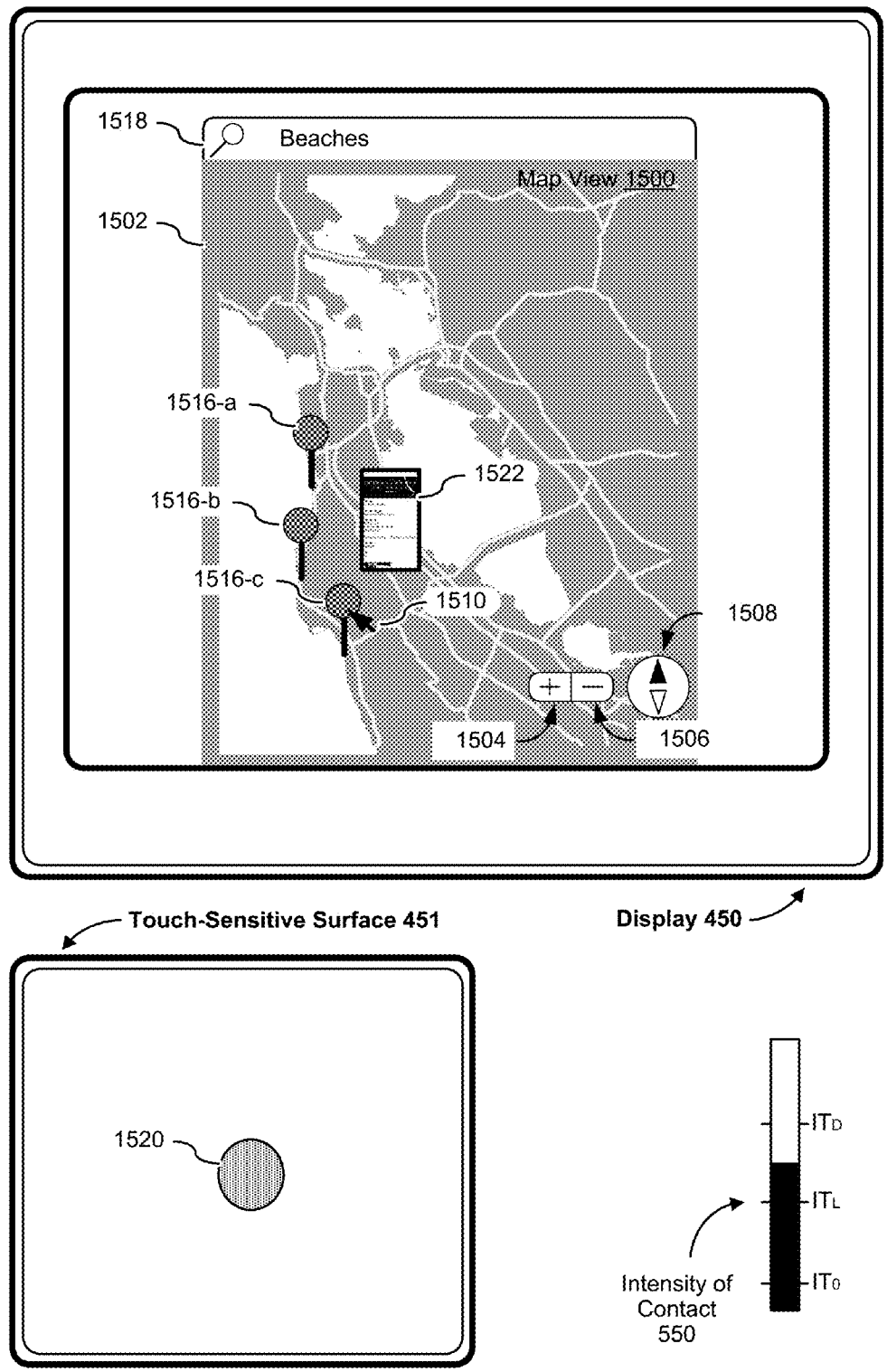
Figure 15E:
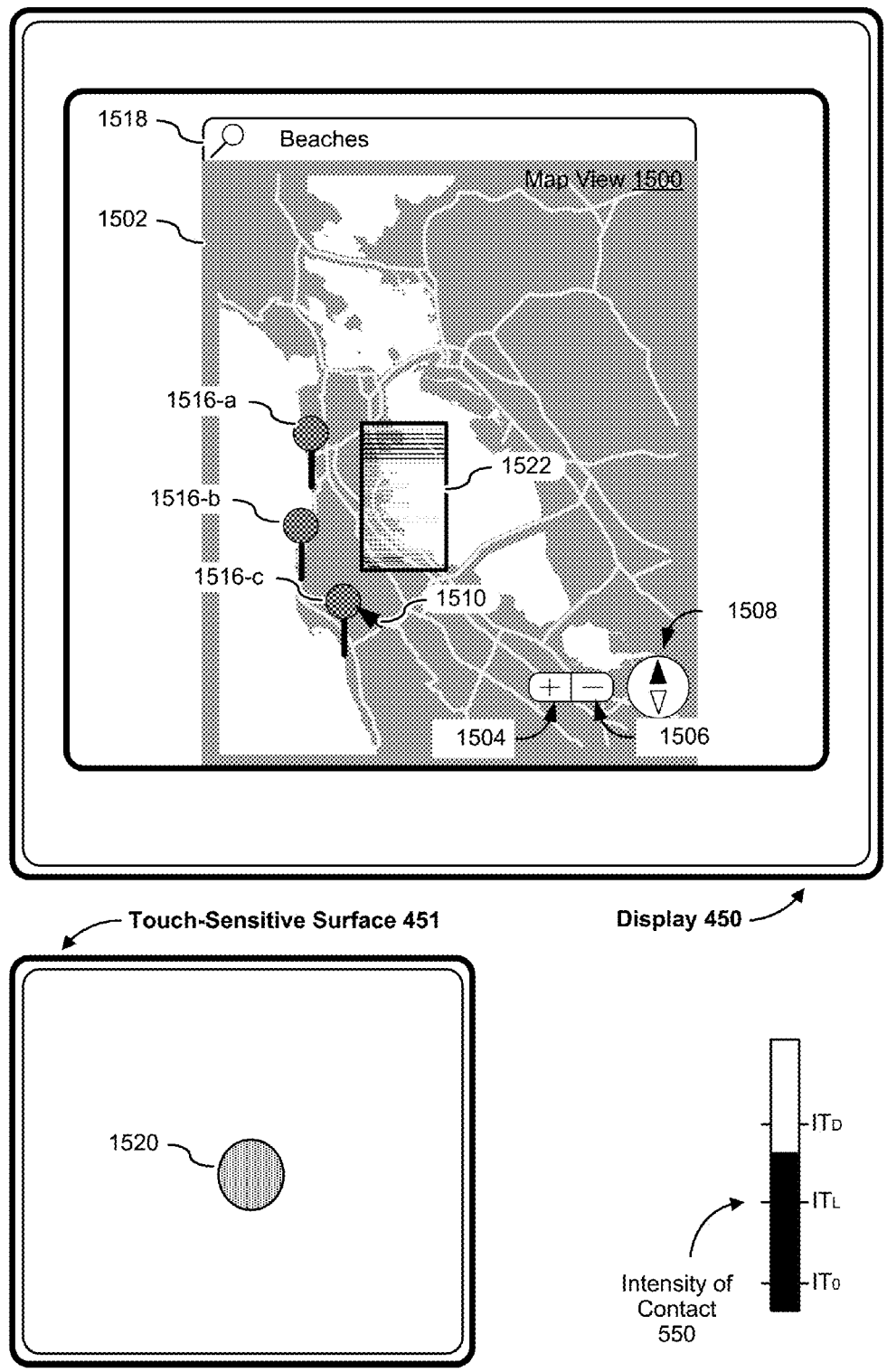
Figure 15F:
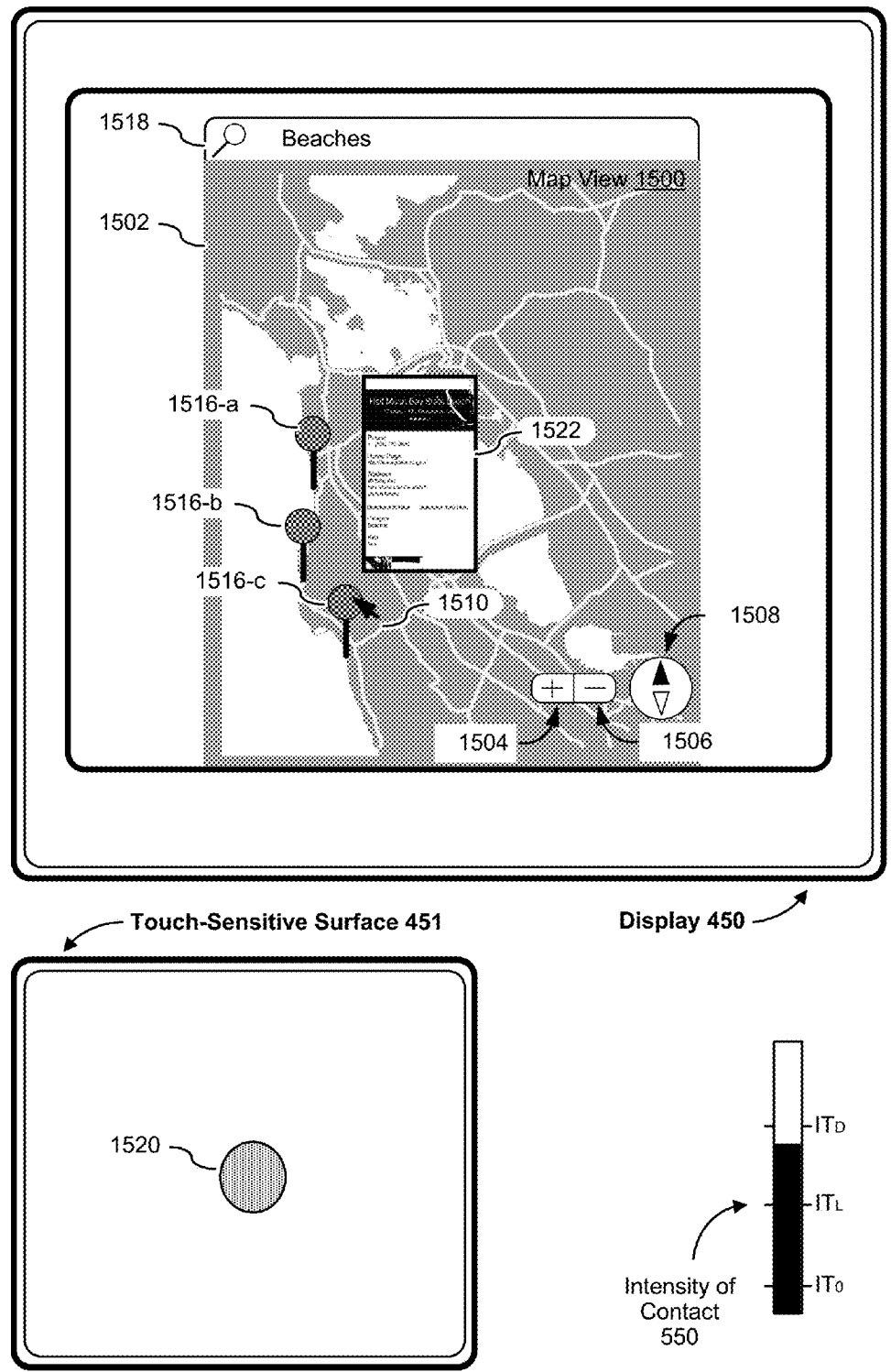
Figure 15G:
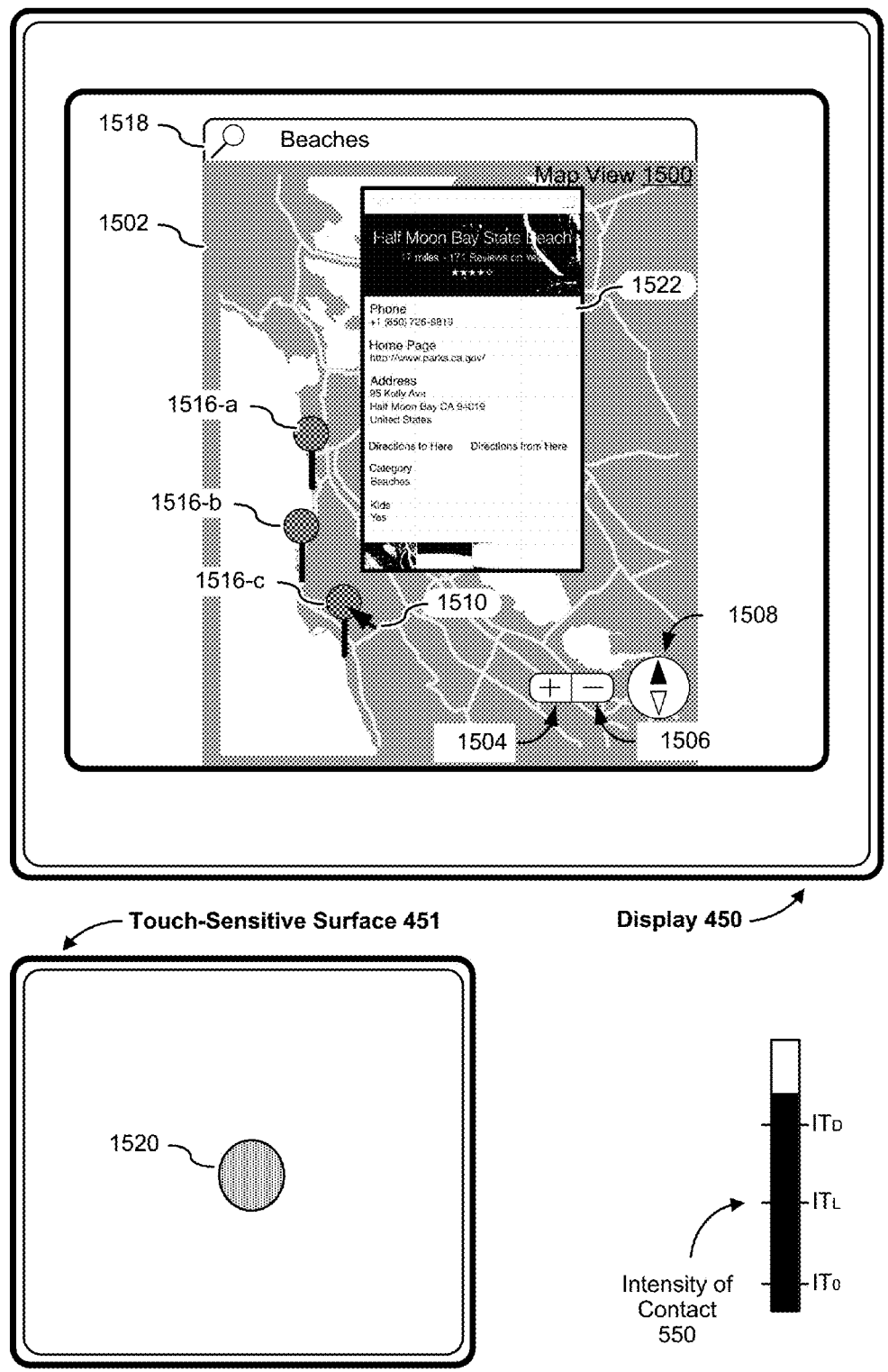

FIG. 15C illustrates points-of-interest (POIs) 1516 (e.g., POI 1516-*a*; POI 1516-*b*; and POI 1516-*c*) displayed in response to a search query 1518. For example, in response to a search query for "Beaches" the device displays a plurality of POIs 1516 each corresponding to a beach on map 1502. The device receives a touch input 1520 (e.g., a light or deep press) while cursor 1510 is over a respective POI 1516 (e.g., as shown in FIG. 15C, cursor 1510 is over POI 1516-*c*). In response to detecting touch input 1520 while cursor 1510 is displayed over the respective POI 1516, and in accordance with a determination that touch input 1520 meets second intensity criteria (e.g., the same intensity criteria as the first intensity criteria, or different intensity criteria), the device performs a first operation with respect to the POI 1516. For example, as shown in FIG. 15G, in some embodiments, upon detecting touch input 1520 with an intensity over $IT_D$, the device displays a user interface region 1522 that includes descriptive information about POI 1516-*c* (e.g., a place card). In some embodiments, as shown in FIGS. 15C-15G, the device displays an animated transition of user interface region 1522 appearing (e.g., as shown in FIGS. 15C-15G, user interface region 1522 grows larger). In some embodiments, at least a portion of the animated transition is directly controllable by the intensity of touch input 1520. For example, the animated transition is initiated when the intensity of touch input 1520 exceeds $IT_L$. In some embodiments, at least a portion (e.g., the beginning) of the animated transition progresses as the intensity of touch input 1520 increases. In some embodiments, user interface region 1522, once fully displayed, remains on display 450 regardless of subsequent changes to the intensity of touch input 1520 (e.g., display of user interface region 1522 is "sticky" after it is fully displayed). In some embodiments, when the intensity of touch input 1520 drops below $IT_D$ the animated transition reverses, and the device discontinues display of user interface region 1522 (e.g., display of user interface region 1522 is not "sticky" and the first operation is an operation to "peek" at user interface region 1522).

Figure 15H:
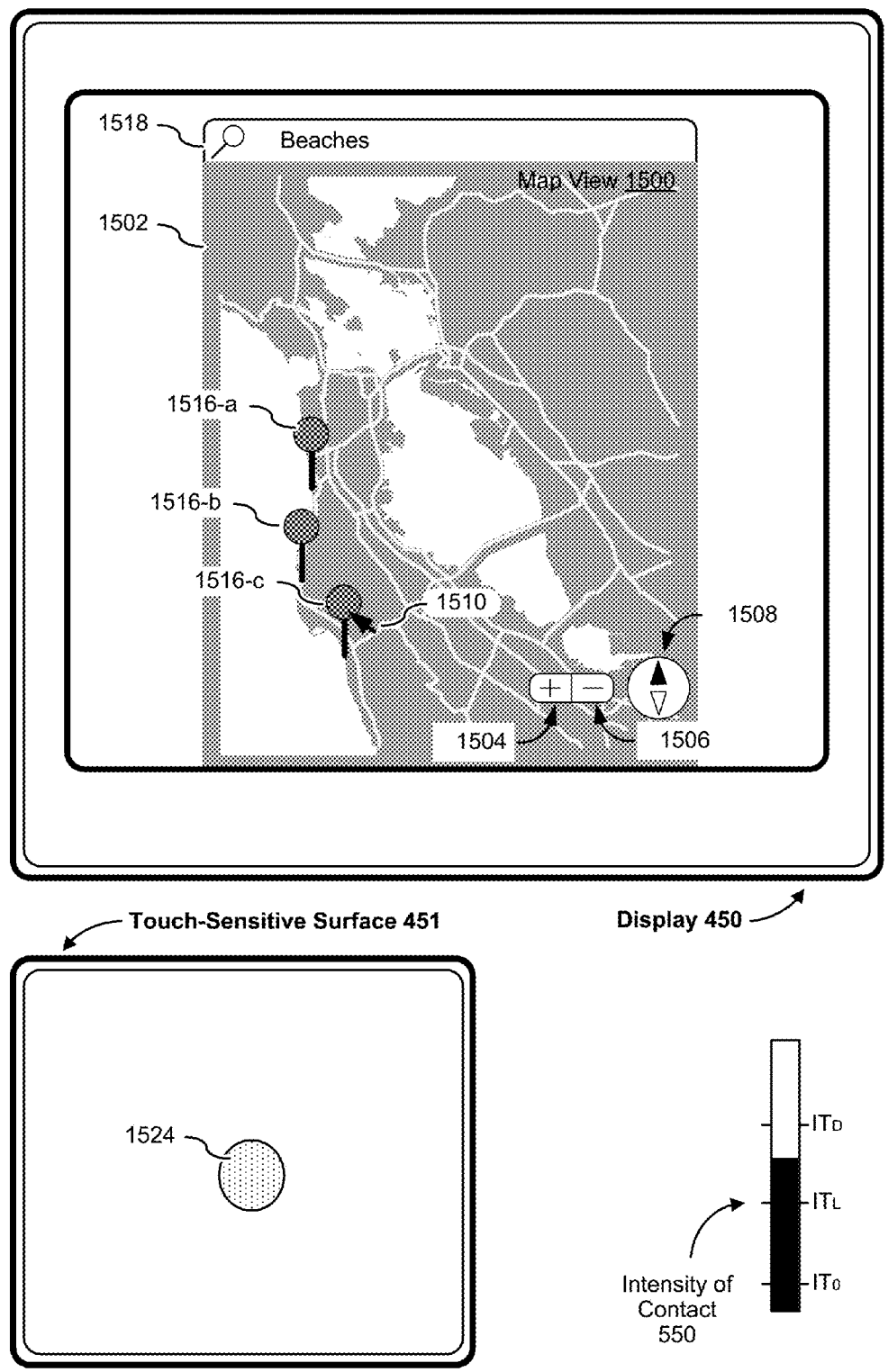
Figure 15I:
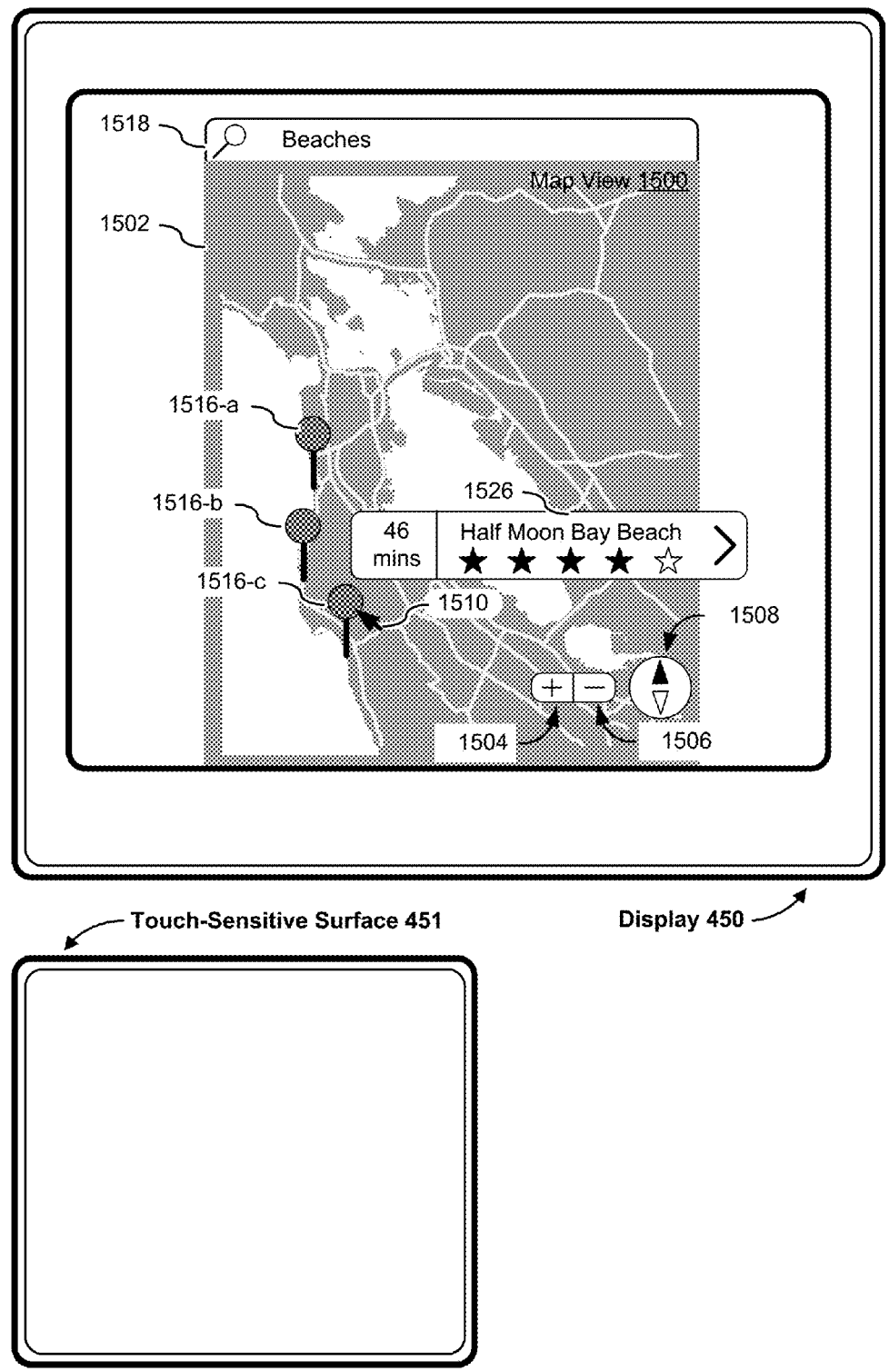

In some embodiments, as shown in FIGS. 15H-15I, the device receives a touch input 1524 (e.g., a tap gesture) while cursor 1510 is over a respective POI 1516. In response to detecting touch input 1524 while cursor 1510 is over the respective POI 1516, in accordance with a determination that touch input 1524 does not meet the second intensity criteria (e.g., $IT_D$), the device performs a second operation with respect to the POI 1516. For example, as shown in FIGS. 15H-15I, in some embodiments, upon detecting touch input 1524 (e.g., a tap gesture) with an intensity above $IT_L$, the device displays a user interface region 1526 that includes a quick menu corresponding to POI 1516-*c* (e.g., showing a rating, driving time, etc.). In some embodiments, as shown in FIG. 15I, when the device detects termination (e.g., discontinuation) of touch input 1524, the device maintains display of user interface region 1526 (e.g., user interface region 1526 is sticky, allowing the user to interact with user interface region 1526 via separate, distinct, touch inputs). In some embodiments, a subsequent separate touch input (e.g., a tap gesture) on the display of driving time (e.g., "46 mins") initiates displaying directions to the POI 1516-*c*.

Figure 15J:
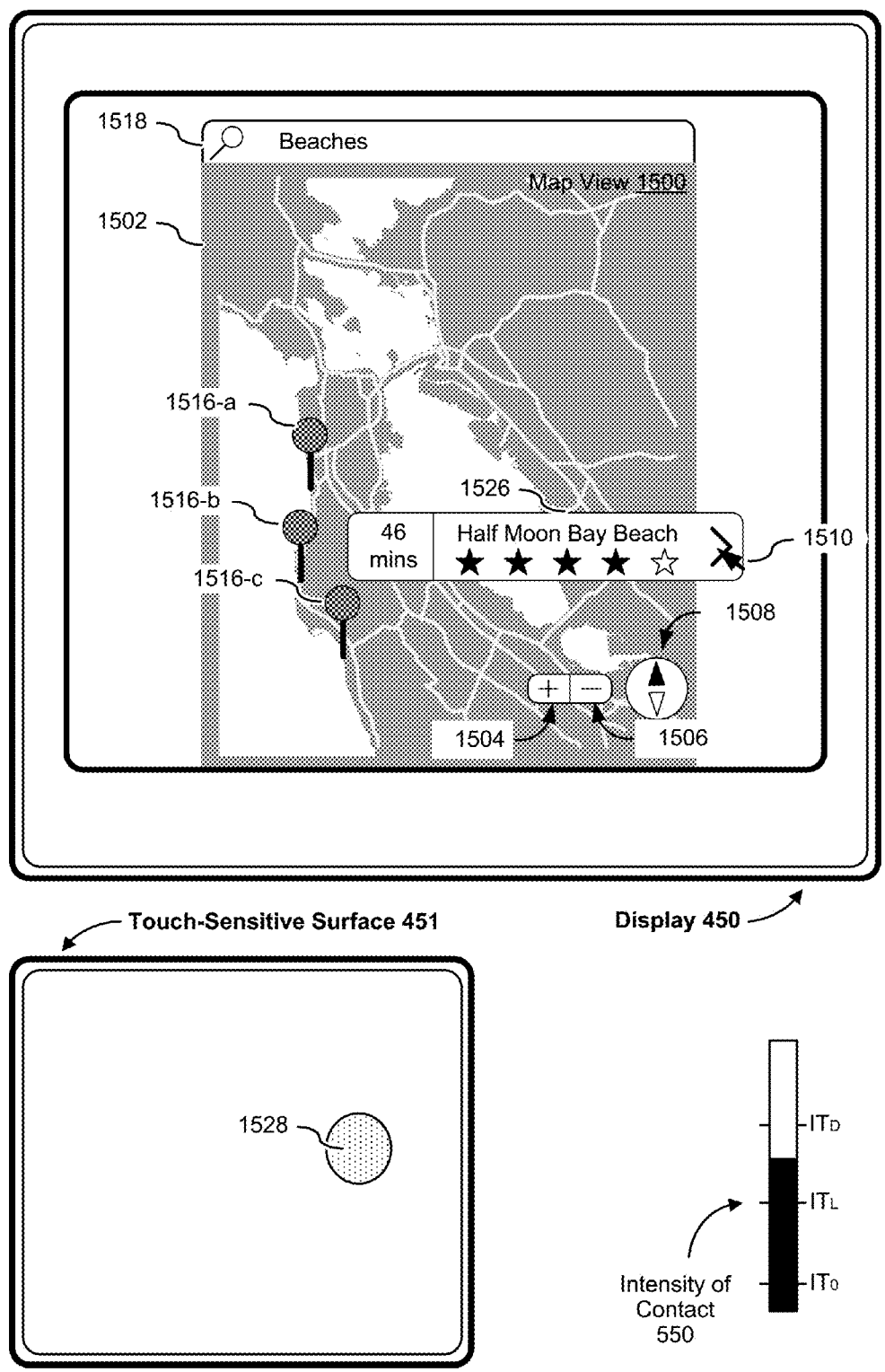
Figure 15K:
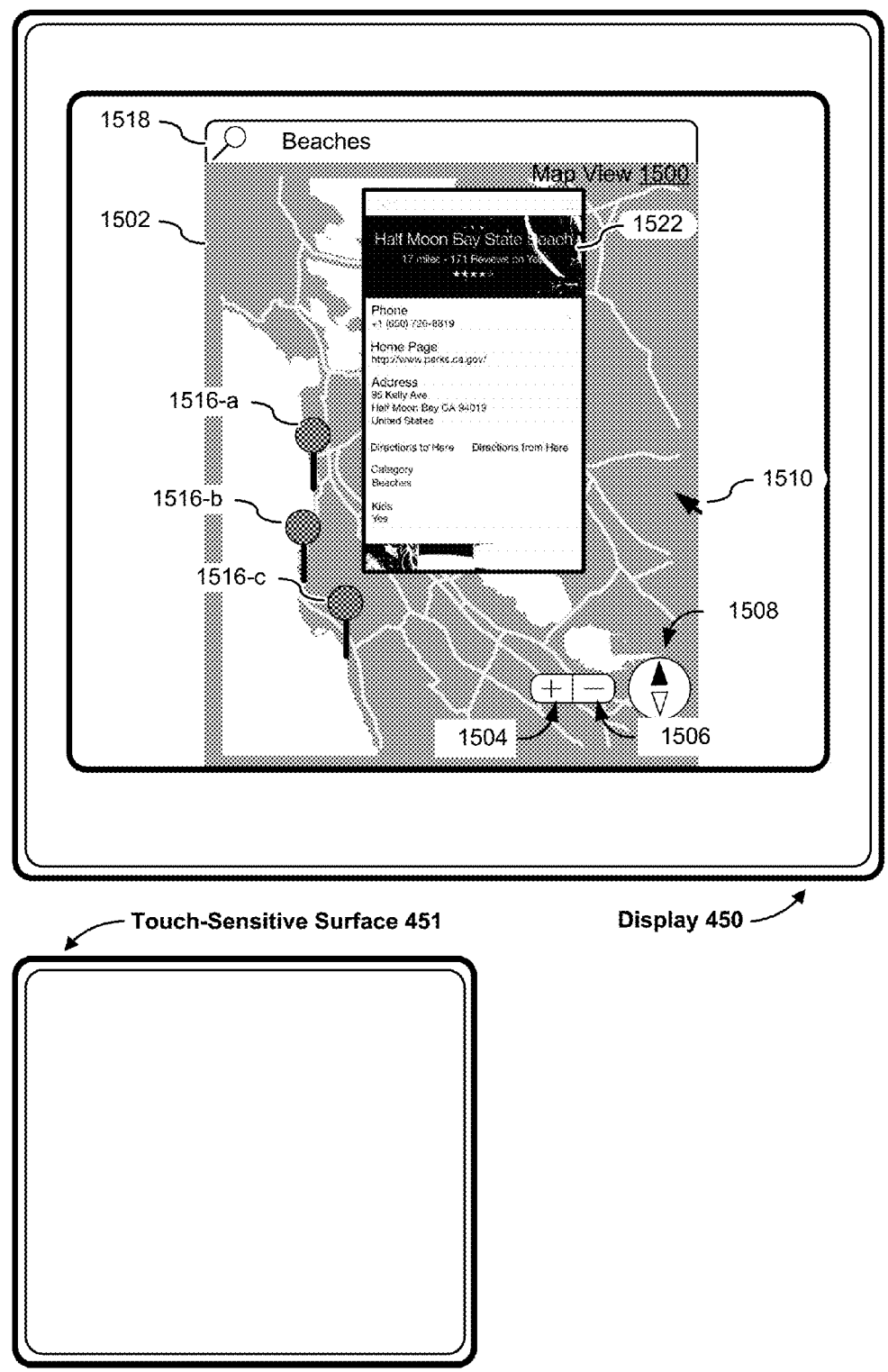

In some embodiments, as shown in FIG. 15J, the device detects a touch input 1528 (e.g., a tap gesture) while cursor 1510 is over an affordance (e.g., a place-card affordance represented by the symbol ">") within user interface region 1526. In some embodiments, the device responds to touch input 1528 (e.g., a tap gesture) while cursor 1510 is over the affordance by displaying user interface region 1522 as shown in FIG. 15K. In some embodiments, when user interface region 1522 is displayed in response to touch input 1528 (e.g., a tap gesture on the affordance within user interface region 1526), the device maintains display of user interface region 1522 after touch input 1528 has been discontinued (e.g., when reached via user interface region 1526, user interface region 1522 is "sticky").

Thus, in accordance with some embodiments, FIGS. 15C-15G provide a shortcut (e.g., using a single light press) to preview (e.g., "peek at") user interface region 1522, while FIGS. 15H-15K provide functionality to add user interface region 1522 to the user interface in a "sticky" manner.

FIGS. 15L-15S illustrate exemplary user interfaces with tactile (e.g., haptic) outputs indicating that a map is aligned with one or more orientations associated with the map. For example, in some embodiments, the one or more orientations include true north. In some embodiments, the one or more orientations include transit north indicating a principle direction of, for example, a subway system, a highway system, or a city block layout.

Figure 15L:
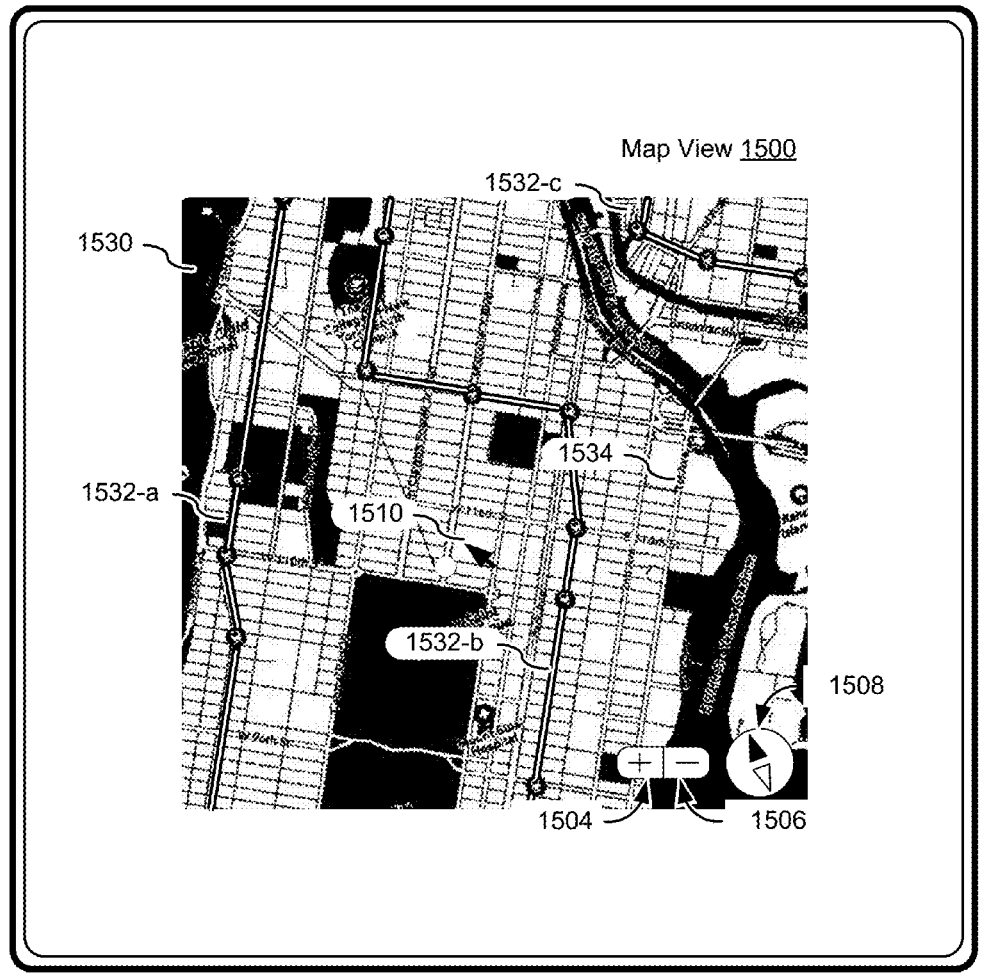
Figure 15L:
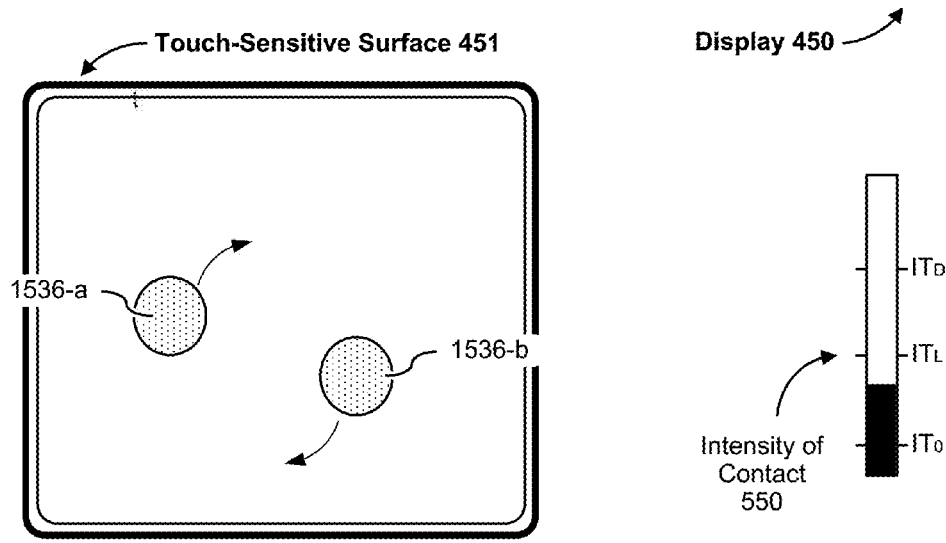

FIG. 15L illustrates a map 1530 representing a region of Manhattan. Map 1530 includes representations of subway lines 1532 (e.g., subway line 1532-*a*; subway line 1532-*b*; and subway line 1532-*c*) and representations of roads 1534 (e.g., 1st Avenue). As described above, compass 1508 indicates the displayed orientation of map 1530 (e.g., with respect to true north). In the exemplary region of Manhattan shown in map 1530, the transit system has an orientation that is approximately 29 degrees east of north (e.g., as defined by the principal direction of subways lines 1532 or the principal direction roads 1534).

FIG. 15L illustrates the device receiving a touch input 1536 on touch-sensitive surface 451 that is a request to rotate the orientation of map 1530 (e.g., a two-finger rotating gesture, with one finger contact 1536-*a* making a clockwise twisting motion relative to another finger contact 1536-*b*). For example, touch input 1536 is a request to rotate map 1530 clockwise.

Figure 15M:
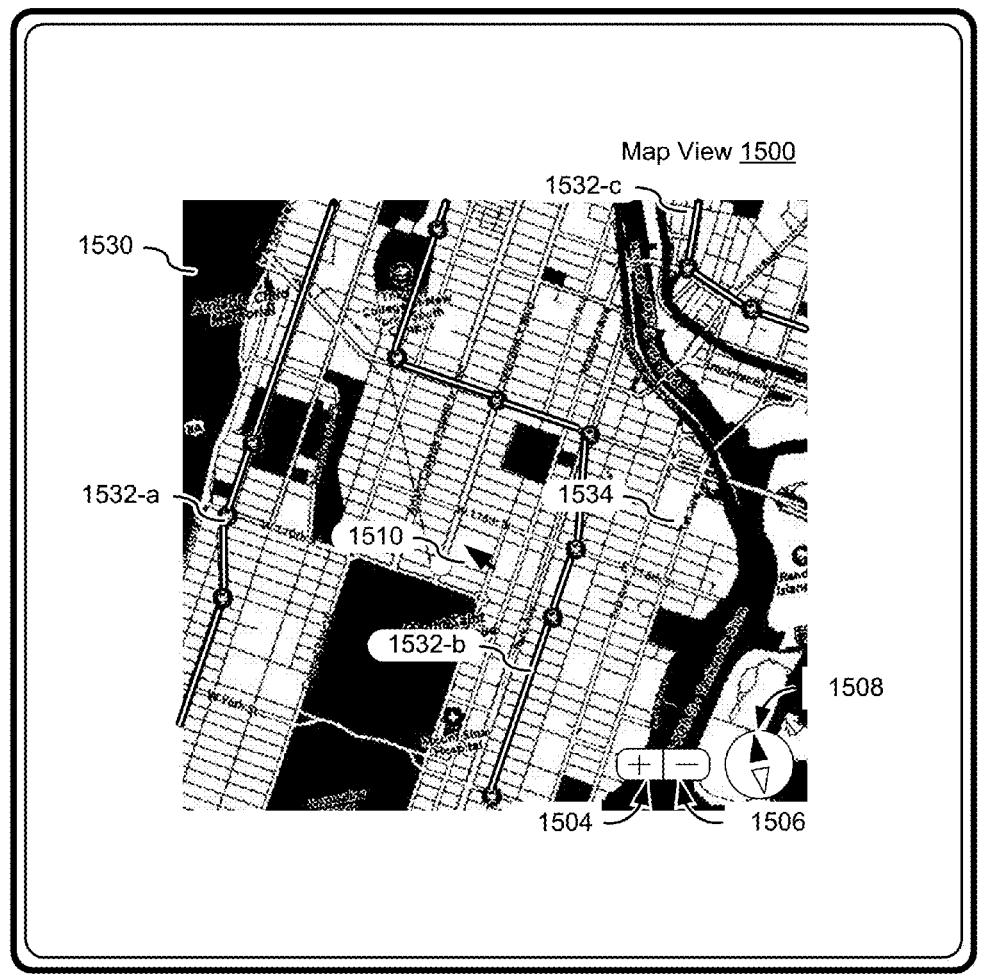
Figure 15M:
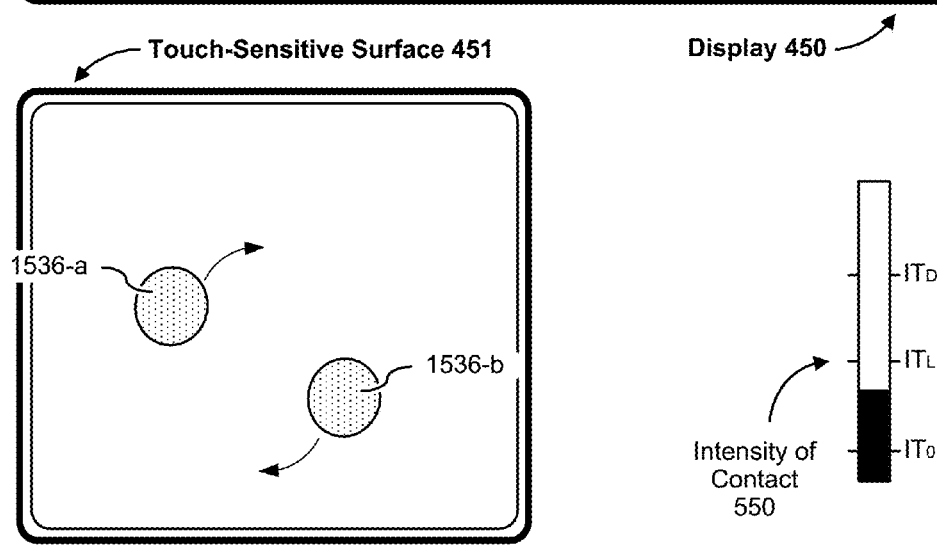
Figure 15N:
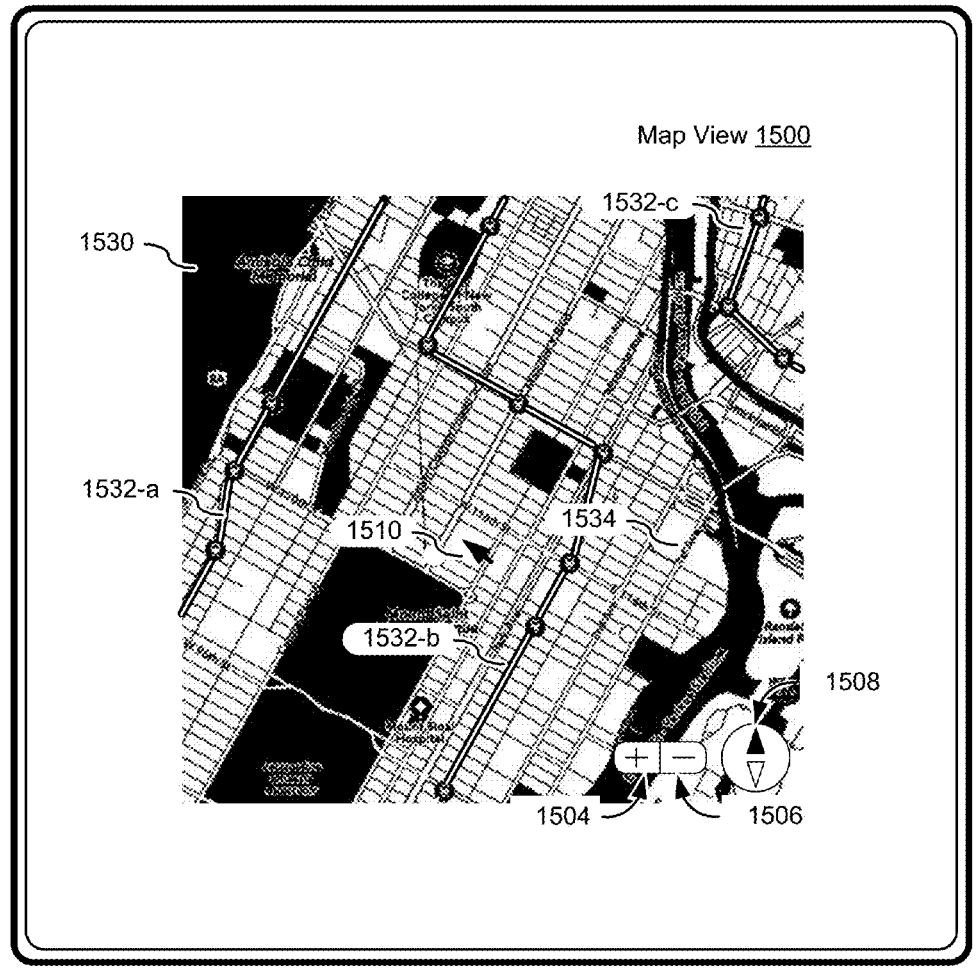
Figure 15N:
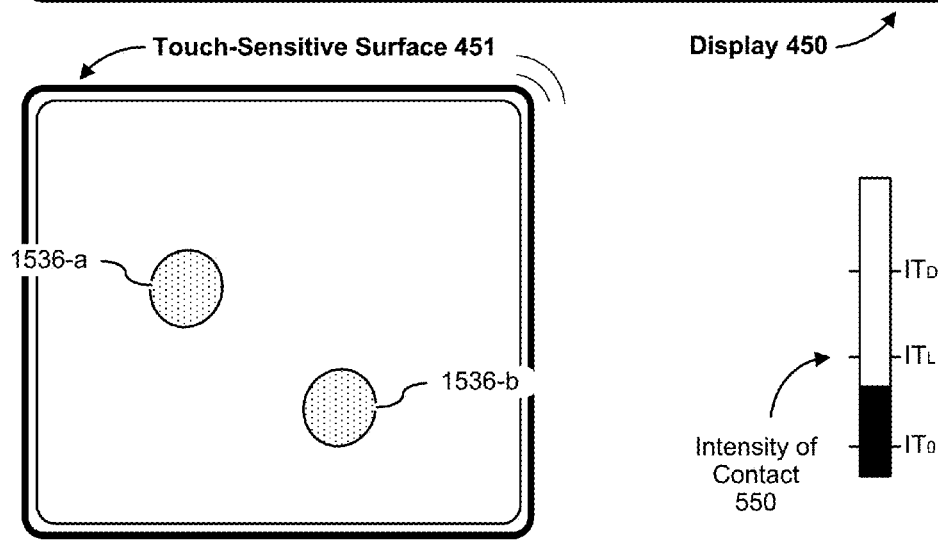

FIGS. 15M-15N illustrate that, in response to receiving touch input 1536, the device rotates map 1530 clockwise on display 450. In some embodiments, map 1530 is rotated about a center of the displayed portion of map 1530. In some embodiments, map 1530 is rotated about the location of cursor 1510. Compass 1508 in FIGS. 15M-15N also indicates the changes to the map orientation.

FIG. 15N also illustrates that, when the orientation of map 1530 reaches a first pre-determined orientation in response to touch input 1536 (e.g., true north aligns with a vertical direction on display 450), the device provides a tactile output (e.g., a vibration or movement of touch-sensitive surface 451). For example, the tactile output gives the user the sensation that the map is "snapping" into the true north direction. In some embodiments, when the orientation of map 1530 rotates within a pre-determined range of angles of the first pre-determined orientation (e.g., plus or minus 2 degrees of true north), the map aligns with the first pre-determined orientation and provides the tactile output. In some embodiments, the device provides the tactile output whenever one of the cardinal directions (north, south, east, west) is aligned with a principal direction of display 450 (e.g., a horizontal or vertical direction of display 450). In some embodiments, the device provides the tactile output whenever one of the cardinal directions (north, south, east, west) is starting to move away from the principal direction of display 450 (e.g., a horizontal or vertical direction of display 450).

Figure 15O:
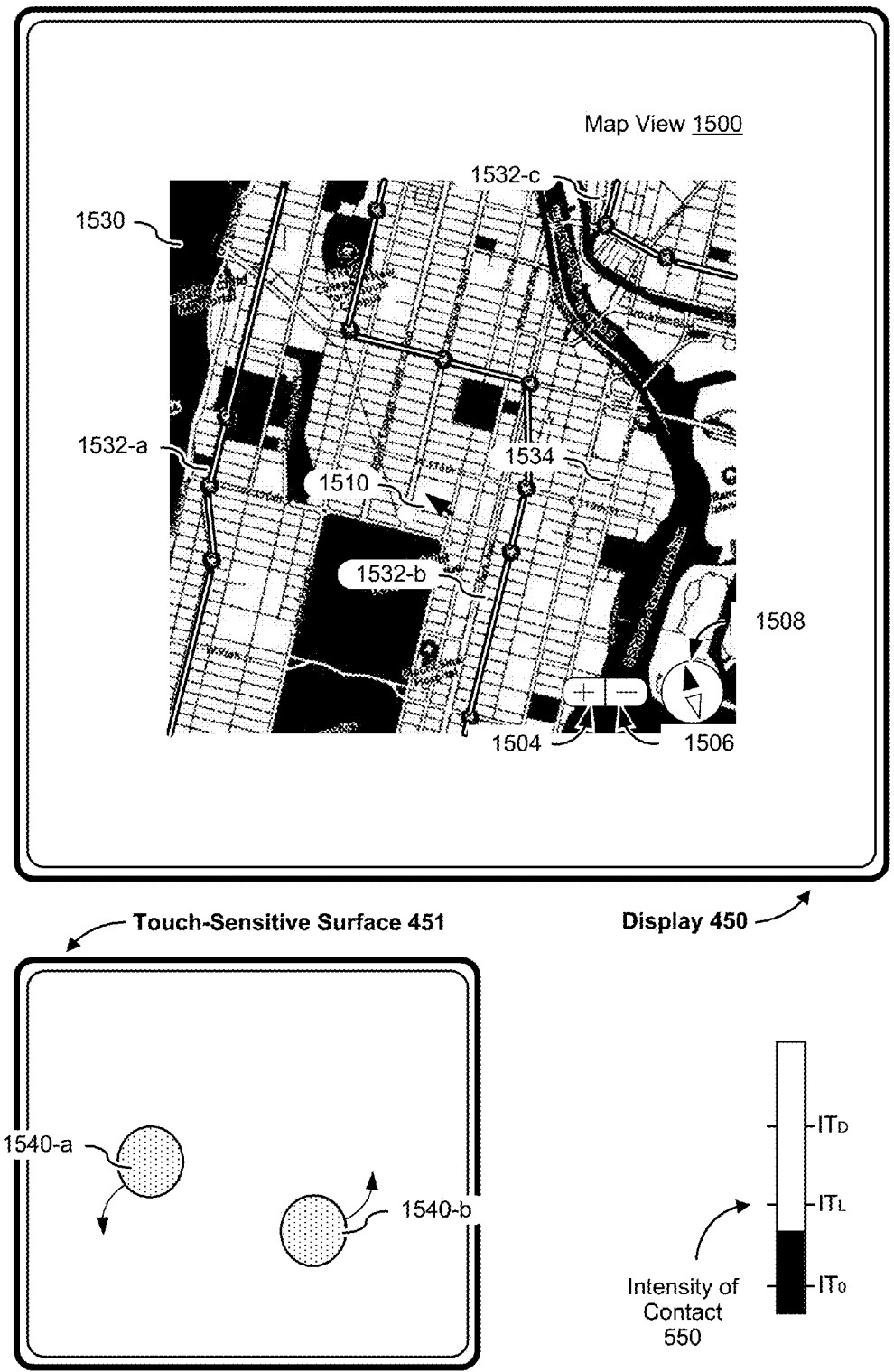
Figure 15P:
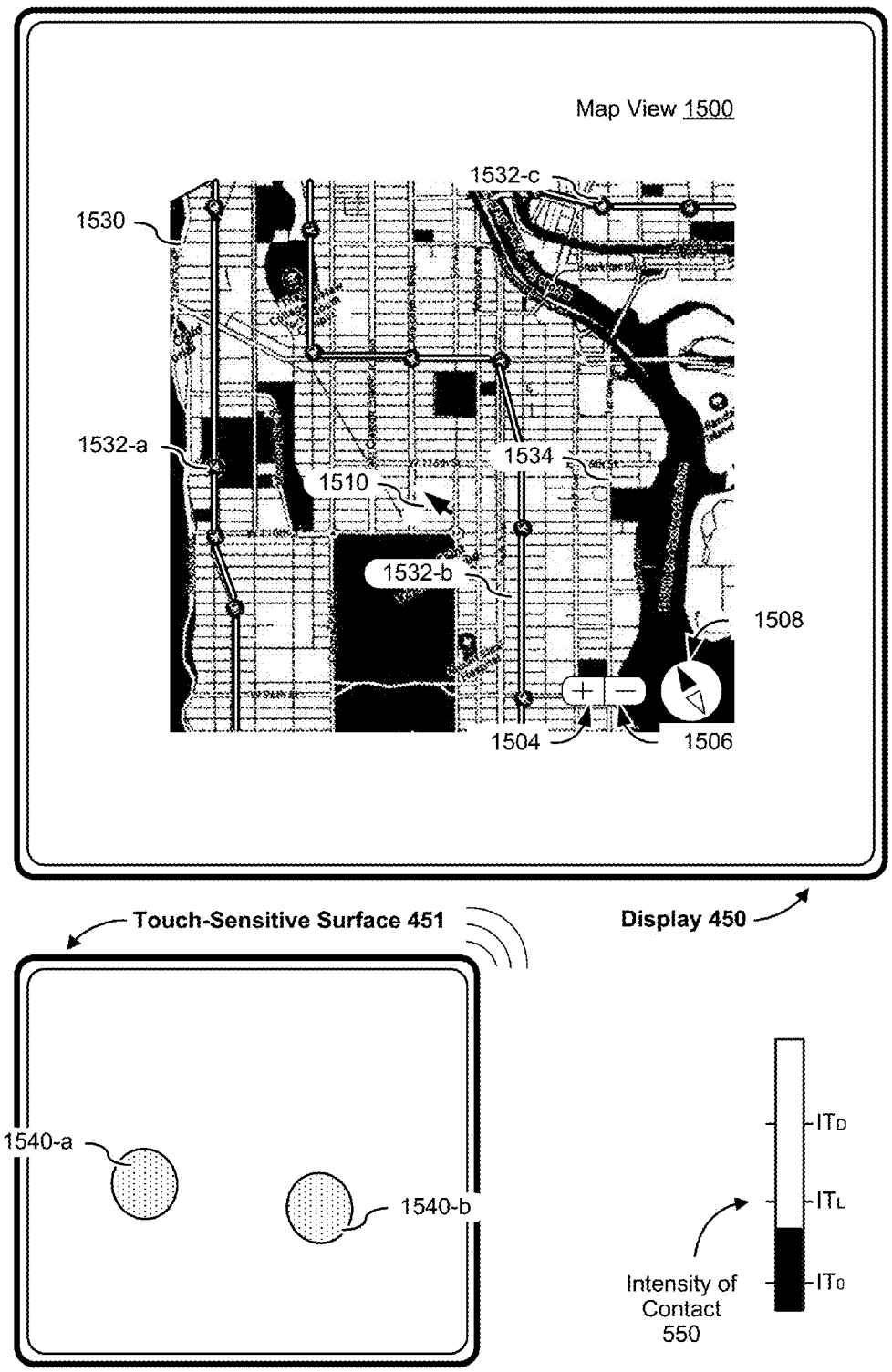

FIG. 15O illustrates the device receiving a touch input 1540 that is a request to rotate the orientation of map 1530 in the opposite direction as compared with touch input 1536 (e.g., a two-finger rotating gesture, with one finger contact 1540-*a* making a counter-clockwise twisting motion, as compared with touch input 1536, relative to another finger contact 1540-*b*). For example, touch input 1540 is a request to rotate map 1530 counter-clockwise. FIGS. 15O-15P illustrate that, in response to receiving touch input 1540, the device rotates map 1530 counter-clockwise on display 450.

As shown in FIG. 15P, when the orientation of map 1530 reaches a second pre-determined orientation in response to touch input 1540 (e.g., transit north), the device again provides a tactile output (e.g., a vibration or movement of touch-sensitive surface 451).

Figure 15Q:
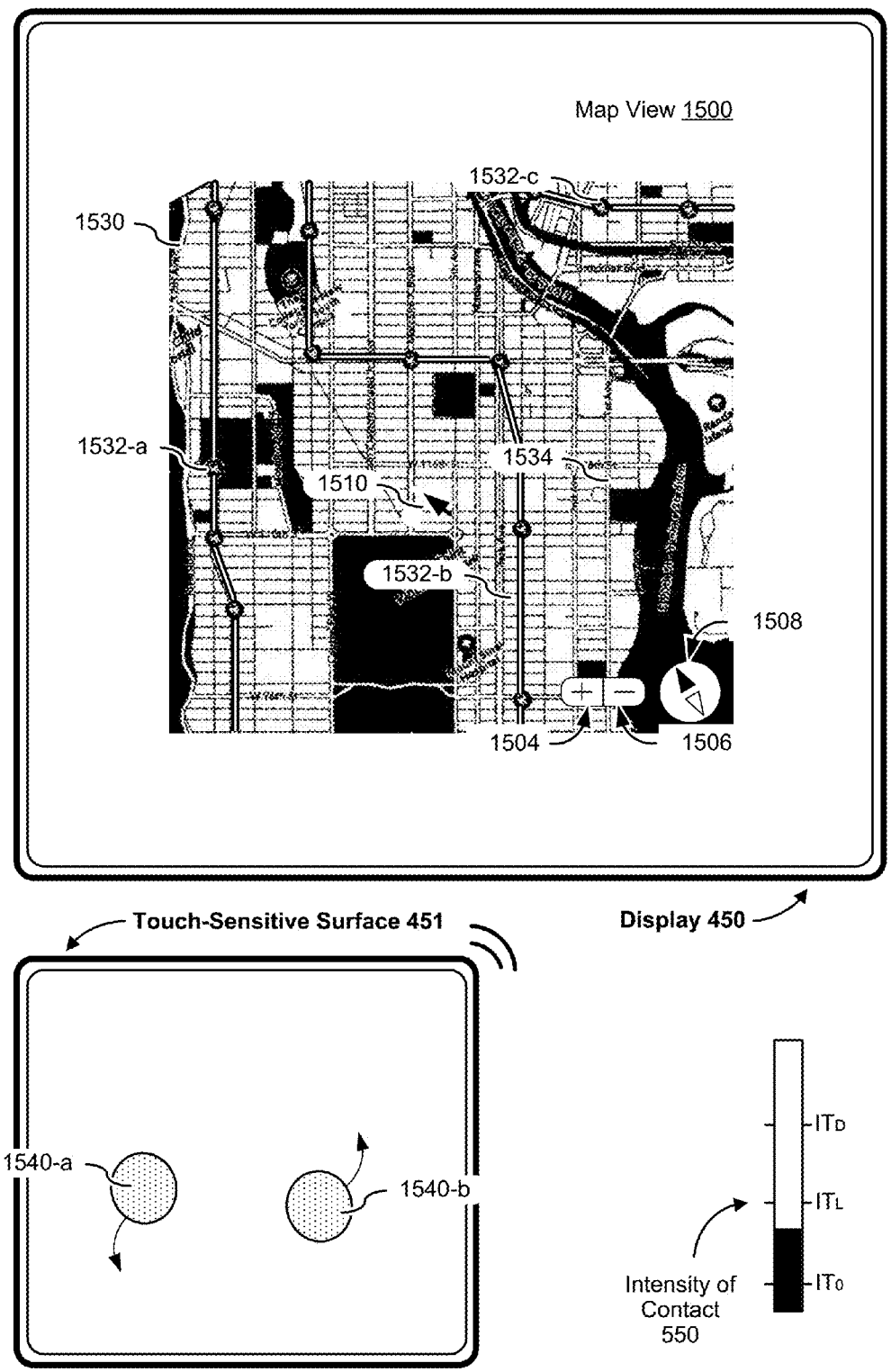
Figure 15R:
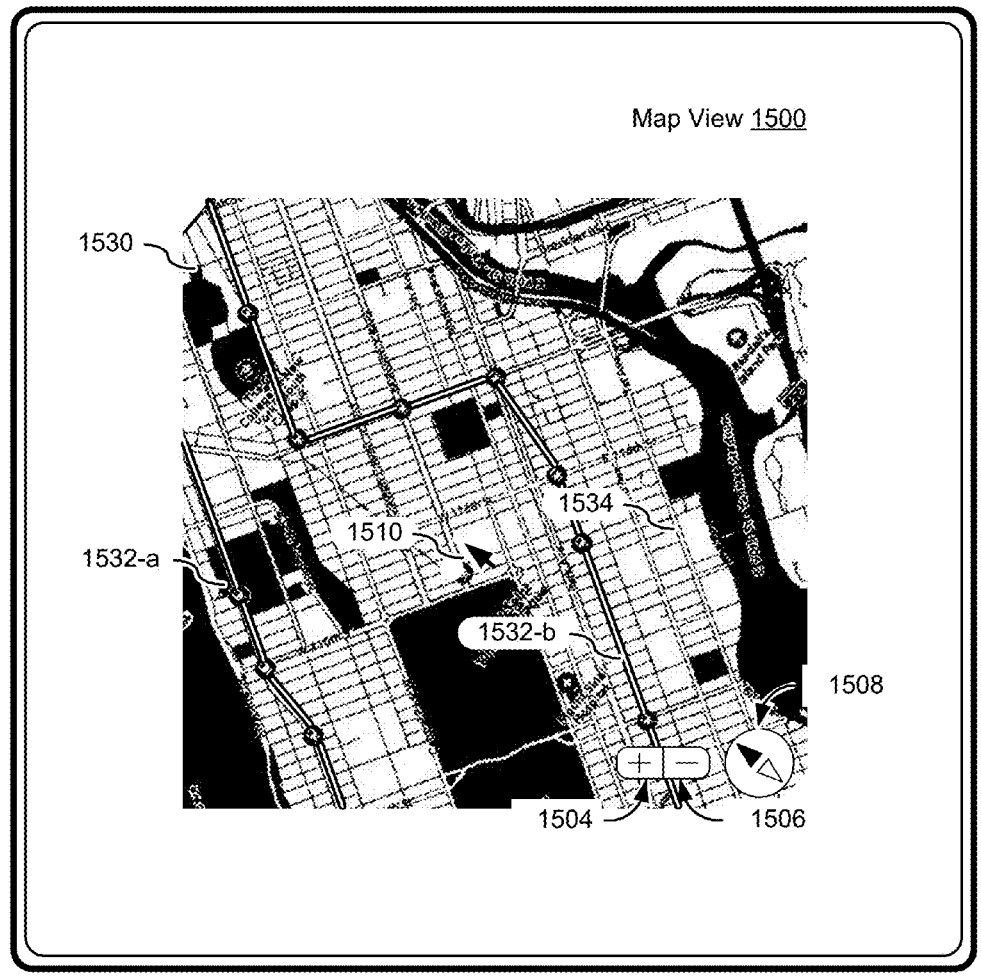
Figure 15R:
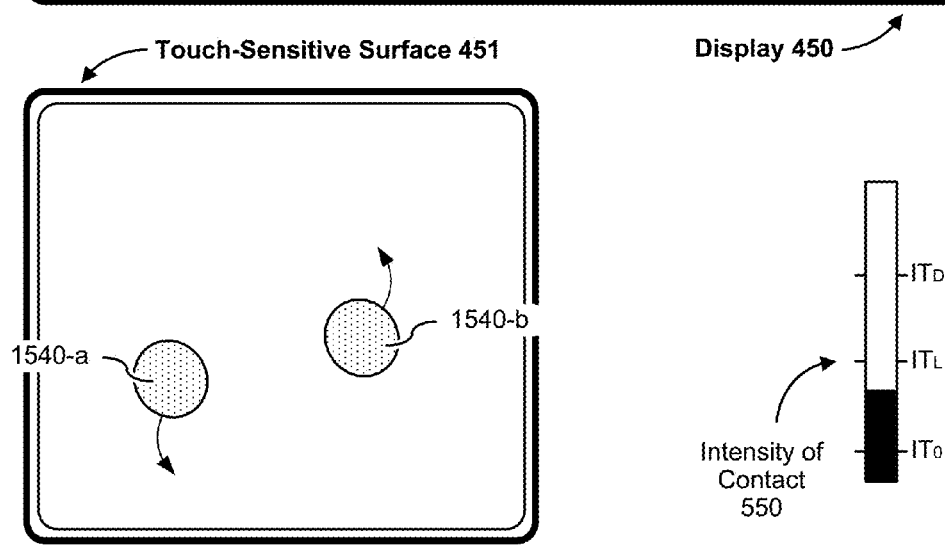

FIGS. 15Q-15R illustrate subsequent rotation of touch input 1540. FIG. 15Q illustrates that, in some embodiments, the device provides a tactile output (e.g., a vibration or movement of touch-sensitive surface 451) to indicate that the transit north direction of map 1530 is starting to move away from the principal direction of display 450. FIG. 15R illustrates that map 1530 is further rotated counter-clockwise in accordance with touch input 1540.

FIG. 15S illustrates the device receiving a touch input 1542 while the cursor is over zoom-in affordance 1504. In response, as shown in chart 1544, the device zooms into map 1530 (e.g., displays an animation that magnifies a region of Manhattan) at a rate that corresponds to the intensity of contact 1542. For example, in some embodiments, in accordance with a determination that touch input 1542 has a first intensity (e.g., an intensity between $IT_L$ and $IT_D$), the device zooms-in at a first rate (e.g., rate 1546-1), and in accordance with a determination that touch input 15 has a second intensity that is greater than the first intensity (e.g., an intensity above $IT_D$), the device zooms-in at a second rate (e.g., rate 1546-2) that is greater than the first rate (e.g., rate 1546-1). In some embodiments, the intensity of touch input 1542 maps to a respective range in a plurality of intensity ranges (e.g., with the plurality of intensity ranges collectively covering the dynamic range over which touch sensitive surface 451 is capable of detecting intensities). In some embodiments, each range in the plurality of intensity ranges maps to a respective zoom speed, with greater intensity mapping to greater zoom speeds (e.g., 1546-3 and 1546-4). In some embodiments, the zoom speed is proportional to the intensity of touch-input. In some embodiments, the zoom speed varies continuously with pressure (e.g., instead of the four discrete rates 1546 shown in FIG. 15S) In some embodiments, zoom-out affordance 1506 provides analogous behavior (e.g., when zoom-out affordance 1506 is activated by a touch input, the zoom-out rate is related to the intensity of the touch input, with greater intensities resulting in a faster zoom-out).

FIGS. 16A-16B illustrate a flow diagram of a method 1600 of generating a tactile (e.g., haptic) output when a user rotates a displayed map into certain predetermined directions in accordance with some embodiments. The method 1600 is performed at an electronic device (e.g., device 300, FIG. 3, or portable multifunction device 100, FIG. 1A) with a display, a touch-sensitive surface, and one or more tactile output generators to provide tactile outputs. In some embodiments, the display is a touch-screen display and the touch-sensitive surface is on or integrated with the display.

In some embodiments, the display is separate from the touch-sensitive surface. Some operations in method 1600 are, optionally, combined and/or the order of some operations is, optionally, changed.

As described below, the method 1600 provides an intuitive way to align a displayed map to an important orientation. The method reduces the number, extent, and/or nature of the inputs from a user when aligning maps, thereby creating a more efficient human-machine interface. For battery-operated electronic devices, enabling a user to align maps faster and more efficiently conserves power and increases the time between battery charges.

The electronic device displays (1602), on the display, a map that is associated with a first orientation. In some embodiments, the first orientation is (1604) true north. In some embodiments, a compass, that indicates the first orientation of the map, is (1606) displayed concurrently with the map (e.g., compass 1508, FIGS. 15A-15S).

The electronic device receives (1608) a touch input on the touch-sensitive surface (e.g., a two-finger rotation gesture comprising contacts 1536-*a* and 1536-*b* shown in FIGS. 15L-15N, or a two-finger rotate gesture comprising contacts 1540-*a* and 1540-*b* shown in FIGS. 15O-15S). In some embodiments, the touch input is (1610) a multi-finger rotate gesture (e.g., a two-finger rotate gesture).

In response to receiving the touch input on the touch-sensitive surface, the electronic device rotates (1612) the map on the display in accordance with the touch input (e.g., FIGS. 15L-15N illustrate a clockwise map rotation in response to a clockwise two-finger rotation gesture 1536, and FIGS. 15O-15P illustrate a counter-clockwise map rotation in response to a counter-clockwise two-finger rotation gesture 1540). For example, the map is directly manipulated in accordance with a rotation of the two-finger rotate gesture (e.g., a 30 degree rotation of the two-finger rotate gesture rotates the map by 30 degrees).

While rotating the map on the display in accordance with the touch input: in response to determining that a displayed orientation of the rotated map corresponds to the first orientation of the map, the electronic device generates (1614) a first tactile output (e.g., using the one or more tactile output generators). For example, FIG. 15N illustrates that the first tactile output is generated in response to determining that the displayed orientation of the rotated map corresponds to the first orientation (e.g., a true north) of the map (e.g., the direction of the true north aligns with a vertical direction of the device display). In some embodiments, the device snaps the map to the first orientation in accordance with a determination that the displayed orientation of the rotated map is within a predefined range of angles from the first orientation of the map (e.g., the device displays the map in the first orientation in accordance with a determination that the orientation of the rotated map comes within ±2 degrees from the first orientation).

In some embodiments, while rotating the map on the display in accordance with the touch input: in response to determining that the displayed orientation of the rotated map does not correspond to the first orientation of the map, the electronic device forgoes (1616) generation of the first tactile output. For example, in FIG. 15M, when the displayed orientation of the rotated map does not correspond to the true north, no tactile output is generated.

In some embodiments, the map is also associated (1618, FIG. 16B) with a second orientation that is distinct from the first orientation (e.g., a "transit north" as defined by a direction of roads, by a direction of subway lines, or by a direction of another transit system displayed on the map). While rotating the map on the display in accordance with the touch input: in response to determining that the displayed orientation of the rotated map corresponds to the second orientation of the map, the electronic device generates a second tactile output (e.g., using the one or more tactile output generators). For example, FIG. 15P illustrates that the second tactile output is generated in response to determining that the displayed orientation of the rotated map corresponds to the second orientation (e.g., the transit north) of the map (e.g., the direction of subway lines aligns with a vertical direction of the device display). In some embodiments, the second tactile output is identical to the first tactile output. In some embodiments, the second tactile output is distinct from the first tactile output.

In some embodiments, the device snaps the map to the second orientation in accordance with a determination that the displayed orientation of the rotated map is within a predefined range of angles from the second orientation of the map (e.g., the device displays the map in the second orientation in accordance with a determination that the orientation of the rotated map comes within ±2 degrees from the second orientation).

In some embodiments, the device snaps the map to the second orientation only when a transit layer (e.g., a road layer that shows roads on the map or a public transit layer that shows public transit routes, such as subway lines) is displayed on the map. In such embodiments, when the transit layer is not displayed on the map, no snapping of the map to the second orientation occurs (even if the displayed orientation of the map is within the predefined range of angles from the second orientation of the map). In some embodiments, the device snaps the map to the first orientation (e.g., true north) regardless of whether the transit layer is displayed on the map. In some embodiments, the device snaps the map to the first orientation only when the transit layer is displayed on the map.

In some embodiments, the snapping of the map to the second orientation (e.g., transit north) depends on the zoom/magnification level of the map, whereas the snapping of the map to the first orientation (e.g., true north) does not depend on the zoom/magnification level of the map. For example, the snapping of the map to transit north is provided at a first (e.g., high) zoom/magnification level and not provided at a second (e.g., low) zoom/magnification level, whereas the snapping of the map to true north is provided at both the first zoom/magnification level and the second zoom/magnification level.

In some embodiments, the second tactile output is generated only when a transit layer (e.g., a road layer that shows roads on the map or a public transit layer that shows public transit routes, such as subway lines) is displayed on the map. In such embodiments, when the transit layer is not displayed on the map, generation of the second tactile output is forgone (even if the displayed orientation of the rotated map corresponds to the second orientation of the map). In some embodiments, the first tactile output is generated regardless of whether the transit layer is displayed on the map. In some embodiments, the first tactile output is generated only when the transit layer is displayed on the map.

In some embodiments, the generation of the second tactile output (e.g., for transit north) depends on the zoom/magnification level of the map, whereas the generation of the first tactile output (e.g., for true north) does not depend on the zoom/magnification level of the map. For example, the haptic for transit north is provided at a first (e.g., high) zoom/magnification level and not provided at a second (e.g., low) zoom/magnification level, whereas the haptic for true north is provided at both the first zoom/magnification level and the second zoom/magnification level.

In some embodiments, the second orientation is (1620) transit north (also called transit system north, subway system north, or road grid north).

In some embodiments, while rotating the map on the display in accordance with the touch input: in response to determining that the displayed orientation of the rotated map does not correspond to either of the first orientation or the second orientation, the electronic device forgoes (1622) generation of a tactile output (e.g., forgoing generation of the first tactile output and forgoing generation of the second tactile output). For example, in FIG. 15M, when the displayed orientation of the rotated map does not correspond to the true north or the transit north, no tactile output is generated.

In some embodiments, while rotating the map on the display in accordance with the touch input, in response to determining that the displayed orientation of the rotated map starts to move away from the first orientation of the map (to which the map was previously snapped), the device generates a third tactile output. For example, in FIG. 15N, a further rotation of contacts 1536-*a* and 1536-*b* initiates generation of the third tactile output to indicate that the map will cease to be aligned with the first orientation (e.g., true north). In some embodiments, the third tactile output is distinct from the first tactile output. In some embodiments, the third tactile output is distinct from the second tactile output. In some embodiments, the third tactile output is the same as the first tactile output.

In some embodiments, while rotating the map on the display in accordance with the touch input, in response to determining that the displayed orientation of the rotated map starts to move away from the second orientation of the map (to which the map was previously snapped), the device generates a fourth tactile output. For example, in FIG. 15Q, a further rotation of contacts 1540-*a* and 1540-*b* initiates generation of the fourth tactile output to indicate that the map will cease to be aligned with the second orientation (e.g., transit north). In some embodiments, the fourth tactile output is distinct from the first tactile output. In some embodiments, the fourth tactile output is distinct from the second tactile output. In some embodiments, the fourth tactile output is distinct from the third tactile output. In some embodiments, the fourth tactile output is the same as the second tactile output. In some embodiments, the fourth tactile output is the same as the third tactile output.

In some embodiments, the device generates tactile outputs when the map snaps into the first orientation and/or the second orientation, but the device forgoes generating tactile outputs when the map starts to move away from the first orientation and/or the second orientation. For example, the device generates the first tactile feedback and/or the second tactile feedback, but the device forgoes generating the third tactile feedback and/or the fourth tactile feedback to avoid providing too much tactile feedback to the user.

In some embodiments, in accordance with a determination that the displayed map corresponds to a first city (or county, municipality, borough, metro region, map region, etc.), the electronic device selects (1624) an orientation associated with the first city (or county, municipality, borough, metro region, map region, etc.) as the second orientation (e.g., a transit system orientation of San Francisco Peninsula, FIGS. 15A-15K, which deviates from true north by approximately 39 degrees west). In accordance with a determination that the displayed map corresponds to a second city (or county, municipality, borough, metro region, map region, etc.) that is distinct from the first city, the electronic device selects an orientation associated with the second city as the second orientation (e.g., a transit system orientation of Manhattan, which deviates from true north by approximately 29 degrees east). The orientation associated with the first city is typically distinct from the orientation associated with the second city. Thus, if the map is snapped to "transit north" over a first city and then is moved laterally (without rotating) to a second city, the map can be rotated again to snap to the transit north of the second city.

In some embodiments, in accordance with a determination that the displayed map does not correspond to any city (or county, municipality, borough, metro region, map region, etc.), the device forgoes generation of the second tactile output (e.g., because a second orientation is not selected). In some embodiments, in accordance with a determination that the displayed map corresponds to multiple separate cities (or counties, municipalities, boroughs, metro regions, map regions, etc.), the device forgoes generation of the second tactile output (e.g., because orientations of the multiple separate cities may not be the same). For example, when the displayed map displays a large portion of the United States, or the entire United States, in some embodiments, the device forgoes generation of the second tactile output.

It should be understood that the particular order in which the operations in FIGS. 16A-16B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 1600 described above with respect to FIGS. 16A-16B. For example, the inputs, gestures, and tactile outputs, described above with reference to method 1600 optionally have one or more of the characteristics of the inputs, gestures, and tactile outputs described herein with reference to other methods described herein (e.g., methods 700, 800, 900, and 1000). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

APPENDIX A

| | Scenario | Left | Up | Right | Down | Immediate Action |
|---|---|---|---|---|---|---|
| System Wide | | | | | | |
| Data Detector Behavior | | On any data detected item, Deep press will show the popover action; selecting the text and Deep press would show text selection menu. | | | | |
| System - Phone Number | 1 on Phone Number (not in Contacts) | Message | Audio | FaceTime | Add to Contacts | Map Quick Look |
| System - Physical Address | 2 on Address | | | | | Calendar Data Detector |
| System - Date | 3 on Date Data Detected | | | | | Contact Card |
| System - Contact | 4 on Name/Atom/Avatar | | | | | Quick Look (of Tracking Web Page) |
| System - Package Number | 5 on Tracking Numbers | | | | | Quick Look (of Flight Preview Page) |
| System - Airline/Flight Info | 6 on Flight Numbers | | | | | Web Page Preview |
| System/WebKit - Web Link | 7 Link (outside of Safari) | Open in Safari | | | Add to Reading List | Web Page Preview |
| System/WebKit - Web Link | 9 Link (inside of Safari) | Open in New Window | Share as a Menu | Open in New Tab | Add to Reading List | |
| System - Mailto: Link | 8 on an email address | Compose | FaceTime Audio | FaceTime | Add to Contacts | |
| System - Images | 10 on Image in Content (i.e. Safari, Mail, . . . ) on Image in Read/Write Content | Copy | Add to photos | Add to Downloads | Share as a Menu | |
| System/WebKit - Editable Images | | Copy | Add to photos | Paste | Share as a Menu | |
| System - Video | 11 video in HTML content | Copy | Add to photos | Save to Downloads | Share as a Menu | |
| System/WebKit - Text | 12 Read-only Text (selects word) | Copy | | Paste (Disabled) | | Look Up |
| System/WebKit - Editable Text | 13 Read/Write Text (i.e. in TextEdit) | Copy | | Paste | | Look Up |
| System/WebKit - Editable Text (Whitespace) | Read/Write Text | Copy (Disabled) | | Paste | | |
| System - Misspelled Text | 14 Misspelled Text | Copy | | Paste | Spelling Corrections as a Menu | Look Up |
| System - Sidebar | 15 on Sidebar over Editable Row | | | | | Enter Rename |
| Safari | | | | | | |
| Main Window | 1 on a Reading List Item (in the Sidebar) | Delete | Open in New Window | Open in New Tab | Add to Reading List | — |
| | 2 on a Social Item (in the Sidebar) | Retweet | Open in New Window | Open in New Tab | | Rename |
| | 3 on a Bookmark (in the Sidebar) | Delete | Open in New Window | Open in New Tab | | Rename |
| | 4 on a Bookmark Folder (in the Sidebar) | Delete | Open in New Window | Open in New Tab | | |

APPENDIX A-continued

| | Scenario | Left | Up | Right | Down | Immediate Action |
|---|---|---|---|---|---|---|
| | 5 on a Bookmark (in the Bookmark Bar) | Delete | Open in New Window | Open in New Tab | | Rename |
| | 6 on a Bookmark Folder (in the Bookmark Bar) | Delete | Open in New Window | Open in New Tab | | Rename |
| | 7 on a Bookmark (in the Location "Tongue") | Delete | | | | Rename |
| | 8 on a Bookmark Folder (in the Location "Tongue") | Delete | | | | Rename |
| | 9 on a Top Site | Delete | Open in New Window | Open in New Tab | Add to Favorites | — |
| | 10 on a Web Site in the Visual Tab Picker | | Open in New Window | Open in New Tab | Add Bookmark | — |
| | 11 on a Web Link within Safari | Open in New Window | | Open in New Tab | Add to Reading List | Web Page Preview |
| System Wide Calendar | | Would also support system-wide actions for text, images, video, data detectors, etc. | | | | |
| Main Window | 1 on an Invited Event | Decline | Maybe | Accept | Menu (like Share); Email All Invitees Message All Invitees | Open Inspector |
| | 2 on an Event w/o Invitees | Delete | | | Menu (like Share); Email Message All Invitees | Open Inspector |
| | 3 on an Event w/ Invitees | Delete | | | Menu (like Share); Email All Invitees Message All Invitees | Open Inspector |
| | 4 on an Event from a Subscribed Calendar | | | | Menu (like Share); Email All Invitees Message All Invitees | Open Inspector |
| System Wide Mail | | Would also support system-wide actions within the inspector and on text, i.e. invitee atoms, URLs, etc. | | | | |
| Main Window & Message Viewer | 1 on a Message (in the Message List) | Delete | Reply All | Mark as Unread or Mark as Read | Flag | — |
| | 2 on a Message (in the Message Header Area) | Delete | Reply All | Mark as Unread or Mark as Read | Flag | — |
| | 3 on any Attachment | | | | Save to Downloads | Quick Look |
| | 4 a Photo (Read Only) | Copy | | Add to Photos | Save to Downloads | Quick Look |
| | 5 on a Video (Read Only) | Copy | | Add to Photos | Save to Downloads | Quick Look |
| | 6 on a PDF (Read Only) | | | | Save to Downloads | Quick Look |
| Main Window & Message Viewer - System Wide | | Would also support system-wide actions within messages and on text, i.e. recipient atoms, URLs, etc. | | | | |
| Compose Window | 7 on Image or PDF (in Mail Compose) | | | | | Markup |
| | 8 on other types of Attachment | | | | | Quick Look |

APPENDIX A-continued

| | Scenario | Left | Up | Right | Down | Immediate Action |
|---|---|---|---|---|---|---|
| Compose Window - System Wide | | Would also support system-wide actions for text, misspelled, data detectors, atoms, etc. | | | | |
| Notes | | | | | | |
| Notes Window System Wide | 1 on a Note | Delete | Share | Do Not Disturb | | — |
| Messages | | Would also support system-wide actions on text, misspelled, data detectors, URLs, etc. | | | | |
| Messages Window | 1 on a Conversation in the Message List | Delete | | Do Not Disturb | | Details |
| | 3 on a Message over Image Bubble | | | Add to Photos | Save to Downloads | Quick Look |
| | 4 on a Message over PDF Bubble | | | | Save to Downloads | Quick Look |
| | 5 on a Message over other Attachment Bubble | | | | Save to Downloads | Quick Look |
| | 6 on a Message over Audio Bubble | | | | Save to Downloads | Quick Look |
| | 7 on a Message over Video Bubble | | | Add to Photos | Save to Downloads | Quick Look |
| | 8 on a Avatar/Contact Head in a Conversation | — | — | — | — | Show Contact Card |
| People - System Wide | | Would also support system-wide actions for text, misspelled, data detectors, etc. | | | | |
| Text in a Bubble - System Wide | | | | | | |
| Text in a Input Field - System Wide | | Would also support system-wide actions for text. | | | | |
| FaceTime | | | | | | |
| FaceTime Window | 1 on a Recent Call in the sidebar | Delete | — | Opposite of current FaceTime Tab, i.e. FaceTime Audio-or-FaceTime | Message | Show Contact Card |
| | 2 on a Avatar/Contact Head on a recent call item | — | — | — | — | Show Contact Card |
| Contacts | | | | | | |
| Main Window | 1 on a Contact in Contact List | Delete | Share as a Menu | — | — | — |
| | 2 on an Editable Value in Contact Card | — | — | — | — | Enter Edit Mode (for everything except URLs) |
| System Wide | | Would also support system-wide actions for URLs, text in notes. | | | | |
| Finder & Dock | | | | | | |
| Desktop and Windows | 1 on a File (Icon) | — | — | — | — | Quick Look |
| | 2 on a File (Name) | — | — | — | — | Quick Look |
| | 3 on a Folder (Icon) | — | — | — | — | Quick Look |
| | 4 on a Folder (Name) | — | — | — | — | Enter Rename |

APPENDIX A-continued

| | Scenario | Left | Up | Right | Down | Immediate Action |
|---|---|---|---|---|---|---|
| Dock | 5 on a Sidebar item | — | — | — | — | Rename |
| | 6 on a Tag (in the Sidebar) | — | — | — | — | Rename |
| | 7 on a Tag Color | — | — | — | — | Color Picker |
| | 8 on Desktop Background | — | — | — | — | Reveal the Desktop |
| | 9 on an Application | — | — | — | — | Show All Windows (App Expose) |
| System Wide Preview | 10 over the contents of a Stack | Same behaviors as files and folders in Finder. Would also support system-wide actions for renaming text, atoms/avatars in AirDrop. etc. | | | | |
| PDF Window | 1 on an embedded image (in a PDF) | Copy | Add to photos | Save to Downloads | Share as a Menu | — |
| Sidebar | 2 on a single PDF (i.e. open) | Delete Page | — | — | — | — |
| | 3 on a sidebar document (i.e closed) | Move to Trash (PDF) | — | — | — | — |
| | 4 on a sidebar thumbnail (on an Image) | Move to Trash (Image) | — | — | — | — |
| | 5 on a highlight or annotation | Copy | Add Note | Paste (Disabled) | Highlight as a Menu (includes Color, Underline, No Highlight) | Look Up |
| | 6 on embedded text (in a PDF) | Copy | Add Note | Paste (Disabled) | Highlight as a Menu (includes Color, Underline, No Highlight) | Look Up |
| | 7 on embedded text/annotation/etc. associated with a note (in a PDF) | Copy | Remove Note | Paste (Disabled) | Highlight as a Menu (includes Color, Underline, No Highlight) | Look Up |
| | 8 on a note (Object) | Remove Note | | | | — |
| | 9 on an annotation (Object) | Remove Annotation | | | | — |
| System Wide Photos | | Would also support system-wide actions for URLs, text, etc. | | | | |
| Main Window | 1 on a Photo in Collections, Moments, 1-up | Delete | Share | | Favorite | — |
| | 2 on a Video in Collections, Moments, 1-up | Delete | Share | | Favorite | — |
| | 3 on an Album | Delete | Share | Play Slideshow | | — |
| | 4 on a Collection | — | — | — | — | — |
| | 5 on a Moment Header | — | — | — | — | — |
| System Wide Reminders | | Would also support system-wide actions for URLs, text, etc. | | | | |
| Main Window | 1 on a Reminder | Delete | Due Tomorrow | Priority (Menu like Share) High Medium | Notify (Menu like Share) Arrive at Home Arrive at Work | Open Inspector |

APPENDIX A-continued

| | Scenario | Left | Up | Right | Down | Immediate Action |
|---|---|---|---|---|---|---|
| System Wide Maps | | | | Low | Leave Home Leave Work | |
| | | Would also support system-wide actions for text, misspelled text, etc. | | | | |
| Main Window | 1 on the Map | — | — | — | — | Drop a Pin |
| | 2 on a Search Result (Pin) | Directions to Here | Share as a Menu | Call | Add to Favorites-or-Remove from Favorites | Open Place Card |
| | 3 on POI | Directions to Here | Share as a Menu | Call | Add to Favorites-or-Remove from Favorites | Open Place Card |
| System Wide Photo Booth | | Would also support system-wide actions if appropriate (like URLs), etc. | | | | |
| Main Window | 1 on a Photo in the Photo Tray | Delete | Share as a Menu | | | — |
| System Wide | | Would also support system-wide actions if appropriate (like URLs), etc. | | | | |

What is claimed is:

1. A method, comprising:
at an electronic device with a display and a touch-sensitive surface, wherein the electronic device includes one or more sensors to detect intensities of contacts with the touch-sensitive surface:
displaying, on the display, a user interface that includes one or more user interface elements;
detecting a press input by a contact on the touch-sensitive surface at a location that corresponds to a first user interface element of the one or more user interface elements; and,
in response to detecting the press input:
in accordance with a determination that the press input is a press input of a first type and meets first activation criteria, wherein the first activation criteria require that the contact has a characteristic intensity above a first intensity threshold and below a second intensity threshold, performing a first action;
in accordance with a determination that the press input is a press input of a second type and meets second activation criteria, wherein the second activation criteria require that
the characteristic intensity of the contact meets the second intensity threshold,
the first user interface element meets second action criteria, and
the second action criteria include a criterion that the first user interface element has a single option associated with the press input of the second type, initiating performance of a second action that corresponds to the single option and is different from the first action; and,
in accordance with a determination that the press input is a press input of the second type and meets intensity-based activation criteria and that the first user interface element meets third action criteria, the third action criteria including a criterion that the first user interface element has a first number of options associated with the press input of the second type, wherein the first number is greater than one, displaying a first menu overlaid on the user interface, wherein the first menu includes a first set of selectable options.

2. The method of claim 1, wherein the third action criteria include a criterion that the user interface element is associated with a first number of options associated with the press input of the second type, wherein the first number is greater than one and less than a first threshold number of options.

3. The method of claim 1, including:
in response to detecting the press input:
in accordance with a determination that the respective user interface element meets fourth action criteria, the fourth action criteria including a criterion that the user interface element is associated with a second number of options associated with the press input of the second type, wherein the second number is greater than a second threshold number of options, displaying a second menu, distinct from the first menu, overlaid on the user interface, wherein the second menu includes a second set of selectable options.

4. The method of claim 3, wherein the first set of selectable options in the first menu is a subset of the second set of selectable options in the second menu.

5. The method of claim 1, wherein the respective user interface element corresponds to a portion of an electronic document;
wherein performing the action that corresponds to the single option includes:
in accordance with a determination that the portion of the electronic document does not include data detected links, displaying a first additional user interface element overlaid on the electronic document with one or more selectable options that correspond to the portion of the electronic document; and,
in accordance with a determination that the portion of the electronic document includes a data detected link, displaying a second additional user interface element, distinct from the first additional user interface element, for the data detected link.

6. The method of claim 1, wherein the first menu is a radial menu with two or more distinct portions that is located on the display at a location that corresponds to a location of the contact in the press input on the touch sensitive surface.

7. The method of claim 6, wherein the radial menu includes two halves each comprising a distinct, unitary region forming half of the radial menu.

8. The method of claim 6, wherein the radial menu includes four quadrants each comprising a distinct, unitary region forming a quarter of the radial menu.

9. The method of claim 6, including:
detecting a selection input that selects a respective portion of the first menu; and,
in response to detecting the selection input, initiating performance of an action that corresponds to the selected respective portion of the first menu.

10. An electronic device, comprising:
a display;
a touch-sensitive surface;
one or more sensors to detect intensities of contacts with the touch-sensitive surface;
one or more processors;
memory; and
one or more programs, wherein the one or more programs are stored in the memory and configured to be executed by the one or more processors, the one or more programs including instructions for:
displaying, on the display, a user interface that includes one or more user interface elements;
detecting a press input by a contact on the touch-sensitive surface at a location that corresponds to a first user interface element of the one or more user interface elements; and,
in response to detecting the press input:
in accordance with a determination that the press input is a press input of a first type and meets first activation criteria, wherein the first activation criteria require that the contact has a characteristic intensity above a first intensity threshold and below a second intensity threshold, performing a first action;
in accordance with a determination that the pre input is a press input of second type and meets second activation criteria, wherein the second activation criteria require that
the characteristic intensity of the contact meets the second intensity threshold,
the first user interface element meets second action criteria, and
the second action criteria include a criterion that the first user interface element has a single option associated with the press input of the second type, initiating performance of a second action that corresponds to the single option and is different from the first action; and,
in accordance with a determination that the press input is a press input of the second type and meets intensity-based activation criteria and that the first user interface element meets third action criteria, the third action criteria including a criterion that the first user interface element has a first number of options associated with the press input of the second type, wherein the first number is greater than one, displaying a first menu overlaid on the user interface, wherein the first menu includes a first set of selectable options.

11. The device of claim 10, wherein the third action criteria include a criterion that the user interface element is associated with a first number of options associated with the press input of the second type, wherein the first number is greater than one and less than a first threshold number of options.

12. The device of claim 10, including instructions for:
in response to detecting the press input:
in accordance with a determination that the respective user interface element meets fourth action criteria, the fourth action criteria including a criterion that the user interface element is associated with a second number of options associated with the press input of the second type, wherein the second number is greater than a second threshold number of options, displaying a second menu, distinct from the first menu, overlaid on the user interface, wherein the second menu includes a second set of selectable options.

13. The device of claim 12, wherein the first set of selectable options in the first menu is a subset of the second set of selectable options in the second menu.

14. The device of claim 10, wherein the respective user interface element corresponds to a portion of an electronic document;
wherein performing the action that corresponds to the single option includes:
in accordance with a determination that the portion of the electronic document does not include data detected links, displaying a first additional user interface element overlaid on the electronic document with one or more selectable options that correspond to the portion of the electronic document; and,
in accordance with a determination that the portion of the electronic document includes a data detected link, displaying a second additional user interface element, distinct from the first additional user interface element, for the data detected link.

15. The device of claim 10, wherein the first menu is a radial menu with two or more distinct portions that is located on the display at a location that corresponds to a location of the contact in the press input on the touch sensitive surface.

16. The device of claim 15, wherein the radial menu includes two halves each comprising a distinct, unitary region forming half of the radial menu.

17. The device of claim 15, wherein the radial menu includes four quadrants each comprising a distinct, unitary region forming a quarter of the radial menu.

18. The device of claim 15, including instructions for:
detecting a selection input that selects a respective portion of the first menu; and,
in response to detecting the selection input, initiating performance of an action that corresponds to the selected respective portion of the first menu.

19. A non-transitory computer readable storage medium storing one or more programs, the one or more programs comprising instructions, which when executed by an electronic device with a display, a touch-sensitive surface and one or more sensors to detect intensities of contacts with the touch-sensitive surface, cause the electronic device to:
display, on the display, a user interface that includes one or more user interface elements;
detect a press input by a contact on the touch-sensitive surface at a location that corresponds to a first user interface element of the one or more user interface elements; and,
in response to detecting the press input:
in accordance with a determination that the press input is a press input of a first type and meets first activation criteria, wherein the first activation criteria require that the contact has a characteristic intensity above a first intensity threshold and below a second intensity threshold, perform a first action;
in accordance with a determination that the press input is a press input of a second type and meet second activation criteria, wherein the second activation criteria require that
the characteristic intensity of the contact meets the second intensity threshold,
the first user interface element meets second action criteria, and
the second action criteria include a criterion that the first user interface element has a single option associated with the press input of the second type, initiate performance of a second action that corresponds to the single option and is different from the first action; and,
in accordance with a determination that the press input is press input of the second type and meets intensity-based activation criteria and that the first user interface element meets third action criteria, the third action criteria including a criterion that the first user interface element has a first number of options associated with the press input of the second type, wherein the first number is greater than one, display a first menu overlaid on the user interface, wherein the first menu includes a first set of selectable options.

20. The computer readable storage medium of claim 19, wherein the third action criteria include a criterion that the user interface element is associated with a first number of options associated with the press input of the second type, wherein the first number is greater than one and less than a first threshold number of options.

21. The computer readable storage medium of claim 19, including instructions, which when executed by the electronic device, cause the electronic device to:
in response to detecting the press input:
in accordance with a determination that the respective user interface element meets fourth action criteria, the fourth action criteria including a criterion that the user interface element is associated with a second number of options associated with the press input of the second type, wherein the second number is greater than a second threshold number of options, display a second menu, distinct from the first menu, overlaid on the user interface, wherein the second menu includes a second set of selectable options.

22. The computer readable storage medium of claim 21, wherein the first set of selectable options in the first menu is a subset of the second set of selectable options in the second menu.

23. The computer readable storage medium of claim 19, wherein the respective user interface element corresponds to a portion of an electronic document;
wherein performing the action that corresponds to the single option includes:
in accordance with a determination that the portion of the electronic document does not include data detected links, displaying a first additional user interface element overlaid on the electronic document with one or more selectable options that correspond to the portion of the electronic document; and, in accordance with a determination that the portion of the electronic document includes a data detected link, displaying a second additional user interface element, distinct from the first additional user interface element, for the data detected link.

24. The computer readable storage medium of claim 19, wherein the first menu is a radial menu with two or more distinct portions that is located on the display at a location that corresponds to a location of the contact in the press input on the touch sensitive surface.

25. The computer readable storage medium of claim 24, wherein the radial menu includes two halves each comprising a distinct, unitary region forming half of the radial menu.

26. The computer readable storage medium of claim 24, wherein the radial menu includes four quadrants each comprising a distinct, unitary region forming a quarter of the radial menu.

27. The computer readable storage medium of claim 24, including instructions, which when executed by the electronic device, cause the electronic device to:

detect a selection input that selects a respective portion of the first menu; and, in response to detecting the selection input, initiate performance of an action that corresponds to the selected respective portion of the first menu.

* * * * *